US006535890B2

(12) United States Patent
Sandifer

(10) Patent No.: US 6,535,890 B2
(45) Date of Patent: Mar. 18, 2003

(54) COMPUTER AIDED MAINTENANCE AND REPAIR INFORMATION SYSTEM FOR EQUIPMENT SUBJECT TO REGULATORY COMPLIANCE

(75) Inventor: Michael A. Sandifer, Millbrae, CA (US)

(73) Assignee: Aircraft Technical Publishers, Brisbane, CA (US)

(*) Notice: Subject to any disclaimer, the term of this patent is extended or adjusted under 35 U.S.C. 154(b) by 0 days.

(21) Appl. No.: 09/956,615

(22) Filed: Sep. 17, 2001

(65) Prior Publication Data

US 2002/0046214 A1 Apr. 18, 2002

Related U.S. Application Data

(63) Continuation of application No. 09/441,236, filed on Nov. 16, 1999, now Pat. No. 6,292,806.

(51) Int. Cl.$^7$ .............................................. G06F 17/30
(52) U.S. Cl. ................................................... 707/104.1
(58) Field of Search ........................ 707/104.1, 3, 10; 705/26

(56) References Cited

U.S. PATENT DOCUMENTS 6,292,806 B1 * 9/2001 Sandifer ..................... 707/104

* cited by examiner

*Primary Examiner*—Diane D. Mizrahi
(74) *Attorney, Agent, or Firm*—William C. Milks, III; Russo & Hale LLP

(57) ABSTRACT

A computer based apparatus and method which provide access to complex technical information employed to maintain and repair complicated equipment, such as aircraft, to enable compliance with regulatory requirements.

7 Claims, 113 Drawing Sheets

Gulfstream G-IV Library
Airworthiness Directives Selection List
Cumulative Index

| AD Number | Effective Date | Description | Applicable Service Information |
|---|---|---|---|
| 88-02-01 R1 | 02/13/89 | To prevent the potential display and use of hazardously misleading information from | GC SH IV-53A |
| 88-20-04 | 05/11/81 | To prevent loss of engine power while flying in icing conditions | GC SH IV-51A |
| 89-02-12 | 04/03/89 | To prevent premature turns toward the runway while conducting ILS approaches | GC SH IV-110 |
| 89-04-10 | 04/03/89 | To prevent inadvertent pusher activation during rotation on takeoff | GC CA IV-4 |
| 89-05-05 | 05/08/89 | To ensure that the engine fire extinguishing system electrical power leads are properly connected | GC CA IV-5 |
| 90-02-05 | 02/13/90 | To prevent an airplane taking off in an unsafe takeoff configuration | GC SH IV-122 |

Gulfstream G-IV Library
Airworthiness Directives Selection List
Cumulative Index

| AD Number | Effective Date | Description | Applicable Service Information |
|---|---|---|---|
| 88-02-01 R1 | 02/13/89 | To prevent the potential display and use of hazardously misleading information from | GC SH IV-53A |
| 88-20-04 | 05/11/81 | To prevent loss of engine power while flying in icing conditions | GC SH IV-51A |
| 89-02-12 | 04/03/89 | To prevent premature turns toward the runway while conducting ILS approaches | GC SH IV-110 |
| 89-04-10 | 04/03/89 | To prevent inadvertent pusher activation during rotation on takeoff | GC CA IV-4 |
| 89-05-05 | 05/08/89 | To ensure that the engine fire extinguishing system electrical power leads are properly connected | GC CA IV-5 |
| 90-02-05 | 02/13/90 | To prevent an airplane taking off in an unsafe takeoff configuration | GC SH IV-122 |

Figure 48

ATP – US Federal Regulatory Library
Airworthiness Directives Selection List - 04/00/92
Small Aircraft and Rotorcraft Biweekly Listing

| AD Number | Manufacturer | Subject | General Applicability |
|---|---|---|---|
| Issue Number 92-04 | | | |
| 91-02-07 R1 | Bell - Correction | 39-6339 | Model: 204B, 205A, 205A-1, and 212 helicopters |
| 92-04-06 | Piper | 39-64-53 | Model: PA-25, -25-235, and -25-260 |
| 92-04-09 | Grob | 39-6447 | Model Twin Astir and Twin Astir Trainer, G103 Twin II, and G103A Twin II Acro gliders |
| 92-04-11 | Piper | 39-6455 | Model: PA-42, PA-42-720, and PA-42-720R |
| 92-04-11 | Cessna | 39-6445 | Model: 310, 320, 340, 401, 402, 411, 414, 421 |
| 92-04-14 | British Aerospace | 39-6434 | Model: Jetstream HP 137 MX 1, 200, 3101, and 3201 |

Figure 50

| Docket Number | Fed. Reg. Date | Action Date | Description |
|---|---|---|---|
| 92-CE-05-AD | 02/27/92 | 05/06/92 | Replacement of all Garrett AirResearch improperly overhauled aircraft starters procured from Classic Aviation with an approved part |
| 91-CE-89-AD | 03/02/92 | 05/04/92 | Inspection of possibly severed elevator trim tab guide on Piper models PA-46-310P (Malibu) and PA-16-350P (Mirage) |
| 91-CE-101-AD | 03/02/92 | 05/04/92 | Replacement of certain empennage countersunk rivets on Piper models PA-46-310P (Malibu) and PA-16-350P (Mirage) as indicated in Piper Service Bulletin 944 |
| 91-CE-96-AD | 03/02/92 | 05/04/92 | To prevent failure air driven attitude gyro and autopilot systems on Piper models PA-46-310P (Malibu) and PA-16-350P (Mirage) as indicated in Piper Service Bulletin 947A |

Figure 51

ATP -- US Federal Regulatory Library
Alert Customer Bulletin Selection List
Gulfstream

Alert Customer Bulletins

| Issue Number | Issue Date | Description | Status | Applicable ATA | AD |
|---|---|---|---|---|---|
| IV-4 | 02/01/89 | Angle of attack. Stall Warning Computer (SWC) part number 965-0041-035 | Mandatory | 27 | 89-04-10 |
| IV-5 | 02/02/89 | Fire protection. Engine fire extinguisher system | Mandatory | 26 | 89-05-05 |
| IV-7A | 10/01/91 | Electrical power. Feeder cable inspection | Mandatory | 24 | 91-25-05 |

Figure 54

ATP – US Federal Regulatory Library
Supplemental Type Certificate Index
Aircraft

| Aircraft Make, Model & T.C. No. | STC No. | Description | RG. | STC Holder |
|---|---|---|---|---|
| GULFSTREAM AMERICAN | | | | |
| G-44, AA-1, AA-1A, AA-1B, AA-5, AA-5A; T.C. A-734 A11EA, A16EA | SA308EA | Installation of A.R.P. Industries carburetor ice detection system 105AP in single and twin aircraft and single engine helicopters powered by Continental, Franklyn, and Lycoming type engines equipped with Marvel Schebler MA-2, MA-3, MA-3SPA,MA-4, MA-4-5, MA-6 and HA-6 series carburetors. Amended 10/20/787 | EA | Alfred R. Puccinelli Co. DER 1-145 36 Bay Drive East Huntington, L.I., NY 11743 |
| G-44; T.C. A-734 | SA366AL | Installation of Cessna P/N 1223000-7 and -8 wing tips. | AL | George Pappas Aircraft Rebuilders P.O. Box 3567 Anchorage, AK 99501 |

Figure 56

ATP - US Federal Regulatory Library
Alert Customer Bulletin Selection List
Gulfstream

| Issue Number | Issue Date | Description | Status | Applicable ATA | AD |
|---|---|---|---|---|---|
| Model G-IV | | | | | |
| IV-4 | 02/01/89 | Angle of attack. Stall Warning Computer (SWC) part number 965-0041-035 | Mandatory | 27 | 89-04-10 |
| IV-5 | 02/02/89 | Fire protection. Engine fire extinguisher system | Mandatory | 26 | 89-05-05 |
| IV-7A | 10/01/91 | Electrical power. Feeder cable inspection | Mandatory | 24 | 91-25-05 |
| Gulstream Aerospace Corporation - Customer Bulletins | | | | | |
| Model G-159 (G-I) | | | | | |
| I-11 | 14/02/79 | To prevent a potential hazard caused by inability to discharge the engine or APU fire extinguisher bottles. | Active | 26 | 79-06-03 |
| I-20RA | 11/18/71 | Inspection of trim tab actuators p/n | Active | 27 | 72-24-04 |

Figure 59

ATP – US Federal Regulatory Library
Supplemental Type Certificate Index
Aircraft

| Aircraft Make, Model & T.C. No. | STC No. | Description | RG. | STC Holder |
|---|---|---|---|---|
| GULFSTREAM AMERICAN | | | | |
| G-44, AA-1, AA-1A, AA-1B, AA-5, AA-5A; T.C. A-734 A11EA, A16EA | SA308EA | Installation of A.R.P. Industries carburetor ice detection system 105AP in single and twin aircraft and single engine helicopters powered by Continental, Franklyn, and Lycoming type engines equipped with Marvel Schebler MA-2, MA-3, MA-3SPA, MA-4, MA-4-5, MA-6 and HA-6 series carburetors. Amended 10/20/787 | EA | Alfred R. Puccinelli Co. DER 1-145 36 Bay Drive East Huntington, L.I., NY 11743 |
| G-44; T.C. A-734 | SA366AL | Installation of Cessna P/N 1223000-7 and -8 wing tips. | AL | George Pappas Aircraft Rebuilders P.O. Box 3567 Anchorage, AK 99501 |

Figure 61

ATP -- US Federal Regulatory Library
Advisory Circular Selection List - 02/00/92

| Issue Number | Revised Date | Description | Subject Category |
|---|---|---|---|
| 65-19E | 04/00/91 | Inspection Authorization Study Guide | Airmen |
| 65-23A | 07/22/87 | Certification of Repairmen (Experimental Aircraft Builders | Airmen |
| FAA-S-8081-1A | 11/00/87 | Private Pilot - Practical Test Standards For Airplane, Rotorcraft Glider, Lighter-Than-Air | Practical Test Standards |
| FAA-S-8081-2E | 09/00/88 | Commercial Pilot Practical Test Standard For Airplane, Rotorcraft Glider, Lighter-Than-Air | Practical Test Standards |
| FAA-S-8081-3 | 04/00/89 | Recreational Pilot Practical Test Standards For Airplanes (SEL, SES) and Rotorcraft (Helicopter, Gyroplane) | Practical Test Standards |
| FAA-S-8081-4A | 03/00/89 | Instrument Rating - Practical Test Standards For Airplane and Helicopter | Practical Test Standards |
| FAA-S-8081-5 | 08/00/88 | Airline Transport Pilot and Type Rating - Practical Test Standards For Airplane and | Practical Test Standards |

ATP - US Federal Regulatory Library
Advisory Circular Selection List - 02/00/92
AC 65-19E - Inspection Authorization Study Guide

| Chapter/Section | Title |
|---|---|

AC 65-19E - Inspection Authorization Study Guide

Introductory Information

Chapter 1  Eligibility, Issuance, Renewal, and Change of Fixed Base
 1 Eligibility
 2 Insurance
 3 Duration
 4 Renewal
 5 Change of Fixed Base Chapter 2  Ten Suggestions for Taking the IA Test Chapter 3  Basic Functions of an IA
 1 General
 2 Approving Major Repairs and Major Alterations

ATP - US Federal Regulatory Library
Hazardous Materials Selection List
Title 49 Subchapter C Parts 171 and 172

| Part/Subpart/Section | Topic |
|---|---|
| | Parts 171 and 172 - Hazardous Materials |
| Part 171 | General Info, Regulations & Special Programs Admin, DOT |
| .01 | Purpose and Scope |
| .02 | General Requirements |
| .03 | Hazardous Waste |
| .04 | Changes in specifications for Tank Cars |
| .05 | Procedure Covering Tank Car Construction |
| .07 | Matter Incorporated by Reference |
| .08 | Definitions and Abbreviations |
| .09 | Rules of Construction |
| .10 | Flammable/Combustible Liquids Onboard Vessels |
| .11 | Use of ICAO Technical Instructions |
| .12 | Import and Export Shipments |
| .12A | Canadian Shipments and Packaging |
| .13 | Emergency Regulations |
| .14 | Specification Markings |
| .15 | Immediate Notice-Certain Hazardous Materials Incidents |

Gulfstream G-IV Maintenance Manual
Maintenance Manual Selection List
Figure References Chapter/Section          Title

CHAPTER 32 — LANDING GEAR 32-0        Landing Gear

Figure 1.    Main Landing Gear Installation
            Figure 2.    Nose Landing Gear Installation 32-1-0      Main Gear and Doors Figure 1.    Main Gear Ground Safety Lock
            Figure 2.    Main Landing Gear -- Shock Strut
            Figure 3.    Main Gear Down Lock Mechanism -- Schematic
            Figure 4.    Main Gear Sequencing Linkage -- Schematic
            Figure 201.  Air Filler Valve
            Figure 202.  Main Gear Shock Strut -- Assembly
            Figure 203.  Main Landing Gear Uplock Roller
            Figure 204.  Main Landing Gear Side Braces Lower Attachment
            Figure 205.  Main Landing Gear Side Brace Upper Attachment
            Figure 206.  Main Landing Gear Side Brace Terminal End Adjustment
            Figure 207.  LH Main Landing Gear Sequencing Linkage
            Figure 208.  Uplock Roller -- Initial Trapped Position
            Figure 209.  Main Landing Gear -- Installation Details
            Figure 210.  Uplock Latch Fitting -- Inspection

Figure 74

Gulfstream G-IV Illustrated Parts Catalog
Illustrated Parts Catalog Table of Contents
Chapter 32 - Landing Gear

| Subject | Part Nomenclature | Chapter/Section/Sheet/View |
|---|---|---|
| | CHAPTER 32 – LANDING GEAR | |
| NOSE GEAR | | |
| Nose | Landing Gear Installation | 32-01-01 |
| | Uplock Latch Mechanism | 32-01-02-A |
| | Door Control Valve Spring Rod Assembly | 32-01-02-B |
| | Landing Gear Sequencing Arm | 32-01-03-C |
| | Locking Pins | 32-01-03-D |
| | Steering Unit and Mounting Brackets | 32-01-03-E |
| | Nose Wheel Assembly | 32-01-04-F |
| | Valve Stem | 32-01-04-G |
| | Steering and Damper Assembly | 32-01-04-H |
| Door | Installation | 32-02-01 |
| Nose | Landing Gear Assembly | 32-03-01 |
| | Tie Down Provisions | 32-03-01-A |
| | Actuator Pin (on trunnion assembly) | 32-03-01-B |
| | Truss Brace Assemblies | 32-03-02-C |
| | Shock Strut and Trunnion | 32-03-03-D |
| | Piston | 32-03-04-E |
| | Axle Fitting Assembly | 32-03-04-F |
| MAIN GEAR | | |
| Main | Landing Gear Installation | 32-04-01 |
| | Latch Assembly (uplock) | 32-04-02-A |
| | Uplock Mechanism Fitting Assembly | 32-04-02-B |

Figure 76

Gulfstream G-IV Library
Aircraft Service Changes Selection List

| Issue Number | Issue Date | Description | Status | Applicable ATA | AD |
|---|---|---|---|---|---|
| IV-107 | 06/13/90 | Lighting. Thrust reverser lights capsules- Replacement | Recomend | 33 | |
| IV-108 | Cancelled | | | | |
| IV-109 | Cancelled | | | | |
| IV-110 | 01/24/89 | Auto flight. Electronic display controllers | Mandatory | 22 | 89-02-12 |
| IV-111 | 04/27/89 | Hydraulics. Ground spoiler hydraulic plumbing - Modification | Optional | 24 | |
| IV-112 | 06/09/89 | Electrical Power. 300 Amp transformer- Rectifier with increase voltage capability | Optional | 24 | |
| IV-112 amend 1 | 12/21/90 | Electrical Power. 300 Amp transformer- Rectifier with increase voltage capability | Optional | 24 | |
| 113 | 03/22/91 | Flight Controls. Aileron/Spoiler input ballcrank - Lubrication provisions | Optional | 27 | |

Figure 78

ATP -- US Federal Regulatory Library
Alert Customer Bulletin Selection List
Gulfstream

| Issue Number | Issue Date | Description | Status | Applicable ATA | AD (red on CD) |
|---|---|---|---|---|---|
| IV-107 | 06/13/90 | Lighting. Thrust reverser lights capsules - Replacement | Recomend | 33 | |
| IV-108 | Cancelled | | | | |
| IV-109 | Cancelled | | | | |
| IV-110 | 01/24/89 | Auto flight. Electronic display controllers | Mandatory | 22 | 89-02-12 |
| IV-111 | 04/27/89 | Hydraulics. Ground spoiler hydraulic plumbing - Modification | Optional | 24 | |
| IV-112 | 06/09/89 | Electrical Power. 300 Amp transformer - Rectifier with increase voltage capability | Optional | 24 | |
| IV-112 amend 1 | 12/21/90 | Electrical Power. 300 Amp transformer - Rectifier with increase voltage capability | Optional | 24 | |
| 113 | 03/22/91 | Flight Controls. Aileron/Spoiler input bellcrank - Lubrication provisions | Optional | 27 | |

COMPUTER AIDED MAINTENANCE AND REPAIR INFORMATION SYSTEM FOR EQUIPMENT SUBJECT TO REGULATORY COMPLIANCE

This is a continuation of application Ser. No. 09/441,236, filed Nov. 16, 1999, now U.S. Pat. No. 6,292,806.

BACKGROUND OF THE INVENTION

The present invention relates in general to maintenance and repair of equipment and, more particularly, to systems for providing information for maintenance and repair of equipment. Specifically, one embodiment of the invention provides a computer based apparatus and method which provide access to complex technical information employed to maintain and repair complicated equipment, such as aircraft, to enable compliance with regulatory requirements.

Historically, various publishers, including manufacturers and governmental agencies, have provided printed information regarding maintenance and repair of equipment, such as aircraft, subject to regulatory requirements. As a service to aircraft maintenance and repair personnel, Aircraft Technical Publishers, located in Brisbane, Calif., for example, consolidates and serves as a central source of aircraft technical information for the aircraft industry. This company collects, catalogs, and synopsizes maintenance and repair information and provides a library of this information to subscribers. As a library service provider, this company interacts with aircraft manufacturers and maintenance and repair operations world-wide to support subscriber inquiry and develop products tailored to the needs of the subscribers.

More particularly, Aircraft Technical Publishers integrates the general maintenance and repair publications of the aviation fleet into a unified library service. This library service includes periodic updates of the library. See "Product Catalog," Aircraft Technical Publishers, Spring, 1992.

Presently, the library resides on microfiche which is periodically updated. Although microfiche reduces storage requirements, microfiche can be misfiled, and microfiche readers are cumbersome to use.

It is therefore desirable to provide a system to facilitate access to, and update of, maintenance and repair information by the aviation industry. Furthermore, it would be desirable to provide an approach that would enable subscribers to interact with a single interface to all the publications required for maintaining and repairing a specific aircraft. It is also desirable to provide an industry-appropriate solution which accommodates support of the maintenance and repair operations of subscribers by an independent source database publisher to reduce the large investment required for any particular organization, such as a manufacturer, independent maintenance and repair operation, or governmental agency, that wishes to publish libraries. Potentially, this single source approach would facilitate industry usage through adoption of common standards and conventions.

SUMMARY OF THE INVENTION

One embodiment of the invention provides a computer accessed database to facilitate retrieval and update of information for maintenance and repair of a given type of complex equipment, particularly equipment that is subject to regulatory requirements. It is also contemplated that the system in accordance with the invention can be generalized to manage text and graphics necessary to assist other service providers (such as doctors, lawyers, accountants, and others) in providing services.

A preferred embodiment of the invention provides a maintenance and repair information system based on a database of aircraft technical information. Specifically, a CD-ROM-based computer system is provided which runs an aircraft maintenance and repair assistance program that includes a number of novel features for accessing and managing aircraft maintenance and repair information. The use of CD-ROM technology enables the system to be economically feasible for both information providers, such as manufacturers and governmental agencies, and general aviation maintenance and repair operations to transfer to electronic delivery of maintenance and repair publications.

In accordance with the preferred embodiment, the maintenance and repair information system is a CD-ROM multimedia knowledge-based reference system designed specifically for aircraft maintenance personnel. The elements of this system include: an interactive audio tutorial; a security key for both users and the system, as well as system administration to provide different authorization levels for users; hypertext of publications stored on CD-ROM searchable for complex technical information; a profiler database for particular equipment entries; and system software. The software is designed for interactivity with the database residing on a hard drive of the computer and includes a way for the user to comment and add expertise to the system by allowing the user to opt for the ability to import data, such as an aircraft profile, or to create public or private bookmarks and annotations.

Other features general to the maintenance information system include: color title strips indicating the type of publication being viewed and the process used to reach that document; text coloration for easy identification of where hyperlinks are and what type of information they are linked to; document hyperlinks allowing quick migration between cross-referenced documents; and section/subsection hyperlinks providing easy access to associated information within a document.

An aircraft specific mode is the first of six modes listed vertically on the right-hand side of the main screen, and is oriented towards aircraft-specific maintenance tasks where the user has identified a particular make, model, and serial number. Contained in this mode are five main functions: publications research; inspections and routine maintenance; problem diagnosis, which saves several steps when diagnosing a problem by allowing rapid access with key words across the publications specific to the aircraft and/or component identified in the aircraft profile; troubleshooting, which supplies direct access to the trouble-shooting sections of those publications relating to the aircraft and/or components based on the identified aircraft profile to limit the scope of the search; and data manipulation, which comprises data import/data export (provides for the portability of information associated with an identified aircraft profile and is an easy way to back-up information and/or transfer aircraft maintenance history between repair facilities), job cards (furnishes any easy procedure of transferring text and graphics information from CD-ROM to a windows write editor), and parts purchase order options (allows the user to select part number and description from illustrated parts catalogs or parts kits identified in the service information from which a purchase order or report can be created and written to a separate file on the hard drive).

The other five modes of the maintenance and repair information system in accordance with a preferred embodiment of the invention are the bookshelf mode publication mode, which provides access to aircraft technical information by the subject or the title of the publication; the card catalog mode, which provides the user with cross-references to libraries external to the maintenance and repair information system; the report generator mode, which assists the user in making queries and writing reports based on the database residing on the hard drive, the individual user's profile database, and associated compliance information; the utilities mode, which serves as a built-in software support system; and the tutorial mode, which provides an interactive tutorial in which the user receives training on using the system.

BRIEF DESCRIPTION OF THE DRAWINGS

The above and other objects and features and the concomitant advantages of the present invention will be better understood and appreciated by those skilled in the art in view of the description of the preferred embodiments given below in conjunction with the accompanying drawings. In the drawings:

FIGS. 2–113 illustrate graphic representations of program screens (dumps and hand-scratch) to supplement detailed functionality descriptions of operation of the maintenance and repair information system shown in FIG. 1.

DETAILED DESCRIPTION OF THE PREFERRED EMBODIMENTS

Figure 1A:
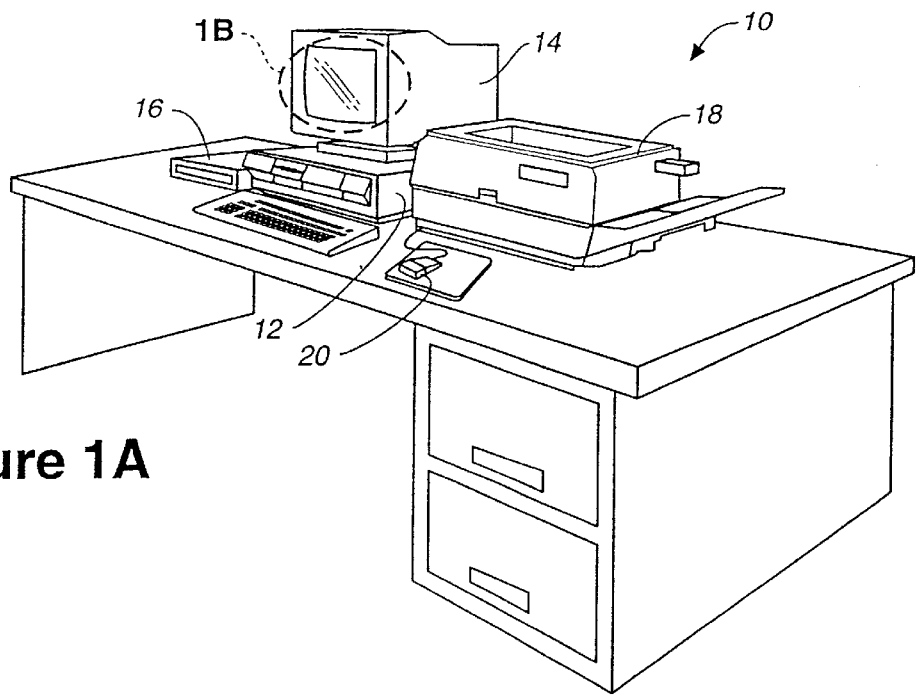
FIG. 1 is a block diagram of one embodiment of the regulatory compliance maintenance and repair information system in accordance with the invention.
Figure 1B:
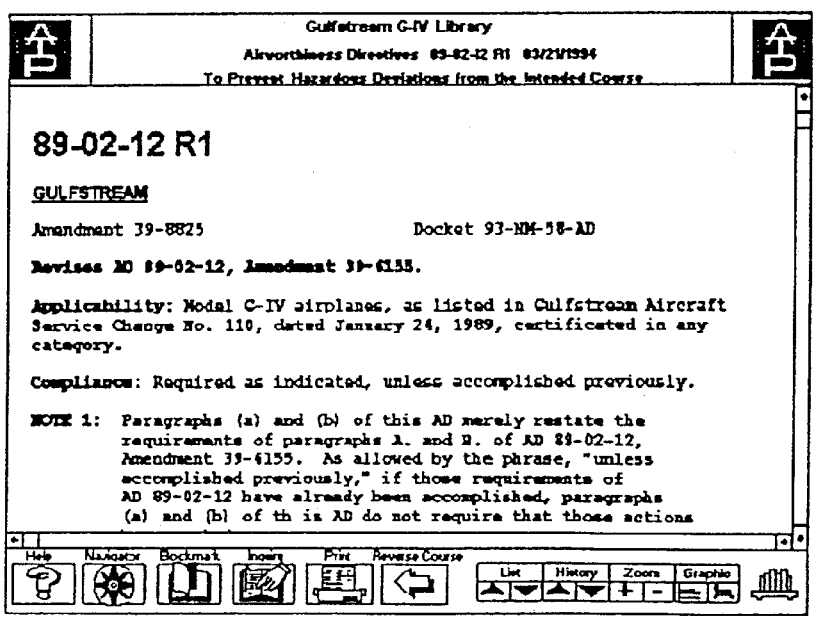

One embodiment of the regulatory compliance maintenance and repair information system in accordance with the invention, generally indicated by the numeral 10 in FIG. 1, provides an advanced, CD-ROM-based electronic information library which can be updated by simply substituting a CD-ROM with an updated CD-ROM. This system is structured for collection and integration of the publications of the aircraft industry into a repository database. A user interface, together with the electronic publications of aircraft manufacturers, regulators, and additional internally created database entries, enables users to quickly locate desired information, move directly from one page to related pages, and extract information to be displayed, archived, or printed on demand.

As shown in FIG. 1, the maintenance and repair information system 10 comprises a personal computer 12. For example, the personal computer 12 can be a 386SX/20 MHz personal computer having two megabytes of random access memory (RAM) and an 80 megabyte hard drive. The maintenance and repair information system 10 also comprises a color monitor 14, such as a 16" color monitor (1024×768), together with an extended VGA graphics card (1024×768 resolution) installed in the personal computer 12. The maintenance and repair information system 10 further comprises a CD-ROM drive 16 and a laser printer 18.

The personal computer 12 runs Microsoft Windows, version 3.1. As shown in FIG. 1, the maintenance and repair information system 10 also comprises a mouse 20 compatible with Windows 3.1. The application software preferably comprises InnerView, available from TMS, Inc. located in Stillwater, Okla., for word search and text retrieval. The software also preferably comprises TMS FAX available from TMS, Inc. for raster image retrieval.

Generally, the maintenance and repair information system 10 provides an intuitive graphical user interface. Accessing all of the publications pertinent to a specific aircraft from a single CD-ROM requires an easy to use, intuitive interface between the computer and the end-user. The icon oriented graphical user interface of the maintenance and repair information system 10 pictorially simplifies access to assure maximum productivity with minimum training time. The use of GAMA standard color conventions creates intuitive hyperlinks. The extensive use of pop-up and on-line help facilities, as well as the readily available tutorial function, provide the user with on-screen guidance whenever it is needed.

The maintenance and repair information system 10 supports a full range of browsing, searching, and hunting techniques. Whether selecting topics from the table of contents, or selecting a specific document reference point like Air Transport Association (ATA) chapter, section, and subject, users can scroll backward and forward through the information or jump directly to other cross-referenced documents or illustrations, through hyperlinks. Users can also search for the occurrences of a part number, word, or phrase by easy selection from a word wheel. If a one-step return to frequently needed information is desired, public or private bookmarks and notes can be left at any point within the text. Customized task cards and files can be created by simply cutting and pasting text and images.

The maintenance and repair information system 10 provides an enhanced graphics display. Aircraft technical information contains an abundance of illustrations and wiring diagrams in many different sizes and formats. The maintenance and repair information system 10 incorporates powerful imaging support to retrieve and display these illustrations and diagrams from originals up to J size drawings. No special graphics hardware components are required to achieve this high performance graphics capability. The imaging software instantly decompresses and scales images so that they can be displayed at the highest resolution accommodated by the monitor and graphics card. Then, users can easily pan across, up and down, and zoom in or out with simple mouse movements. High quality printing of both text and graphics is also supported.

The maintenance and repair information system 10 provides an authority file database. Publications produced by different manufacturers and regulatory agencies are inconsistent in the way in which they refer to aircraft and components and the way that they describe serial number affectivity ranges. Conventional CD-ROM retrieval engines are generally ineffective in dealing with these differences. To overcome these limitations and ensure thorough and accurate searches, the maintenance and repair information system 10 utilizes an aviation authority file database. This database is comprised of all manufacturer make, model, and serial numbers for aircraft and components, including their synonyms and the affectivity to all aviation publications. The authority file is an extension of the database that has been utilized to index publications previously contained on microfiche.

The maintenance and repair information system 10 features integrated electronic logbooks that contain both aircraft profiles and compliance information. The aircraft profiles store the manufacturer, model, and serial number information for the airframe and each major component associated with an aircraft, thereby simplifying information retrieval by using a global reference, such as a tail number. The status of compliance with Airworthiness Directives and manufacturer service information is also maintained for each component, allowing users to determine whether or not an aircraft is in compliance with airworthiness regulations. The maintenance and repair information system 10 also provides a portable means of storing profile and compliance records and transferring them with the aircraft from one service center to another.

Additionally, the maintenance and repair information system 10 provides access to both manufacturer and governmental agency information. In addition to manufacturer aircraft maintenance and repair information, operators can elect to utilize the same user interface to access all of the required regulatory information. The regulatory library on CD-ROM contains all of the regulatory data that must be maintained by manufacturers and operators. This library is organized and indexed so that it can be integrated with cross-referenced aircraft maintenance and repair information. This product includes all Airworthiness Directives and their associated manufacturers' service information, Federal Aviation Regulations, Advisory Circulars, Type Certificate Data Sheets and specifications, Summary of Supplemental Type Certificates, and various Handbooks and hazardous materials regulations. Updated every two weeks, this service enables an operator to effortlessly maintain a completely integrated system of regulatory and maintenance information.

In the absence of general aviation standards, but with the need to produce solutions today, the maintenance and repair information system 10 in accordance with the invention can be adapted to applicable ATA standards and can invoke conventions that are most suitable to the technology and general aviation requirements. Consequently, the maintenance and repair information system 10 in accordance with the invention can evolve with trends in standards as they develop.

The maintenance and repair information system 10 in accordance with the invention is a tool designed for different types of subscribers within the general aviation field. These subscribers include: personnel at maintenance facilities; aircraft operators (pilots and mechanics); civil aviation authorities; aircraft inspectors; information authors; and product support representatives.

Each of these categories of subscribers has different needs and unique information access perspectives that serve as the foundation for the different access modes built into the maintenance and repair information system 10 in accordance with the invention.

The combinations of different modes and functions incorporated into the maintenance and repair information system 10 in accordance with the invention are intended to completely satisfy the specific needs of each user. Specifically, maintenance facilities need to access aircraft technical information based on the task that personnel at these facilities must perform on a specific part of a particular aircraft. Therefore, the maintenance and repair information system 10 in accordance with the invention has an Aircraft Specific Mode which supports an aircraft and component orientation to information.

Considered in more detail, aircraft operators (which include pilots and the mechanics responsible for keeping aircraft airworthy) need to perform troubleshooting and compliance record keeping. Therefore, the maintenance and repair information system 10 in accordance with the invention provides troubleshooting and inspection aids functions within the Aircraft Specific Mode.

On the other hand, civil aviation authorities have a regulatory perspective. They need to have a view of the information that spans beyond aircraft. Therefore, the maintenance and repair information system 10 in accordance with the invention provides a Bookshelf Mode. The global view of the Bookshelf Mode makes it possible for civil aviation authorities to interpret and administer regulatory information based upon the relationships between documents.

Aircraft inspectors need to know if an aircraft is in compliance with all applicable regulatory and mandatory manufacturer publications and also that the maintenance performed is in accordance with manufacturers specifications. An Electronic Log Book and the inspection aids in the Aircraft Specific Mode incorporated into the maintenance and repair information system 10 in accordance with the invention are very important tools, but the instant access to all publications ensures that nothing has been overlooked.

Information authors, such as manufacturers, want to create information that enables an accurate and thorough understanding of the operation, maintenance, and repair of their products. Complete electronic cross references incorporated into the maintenance and repair information system 10 in accordance with the invention facilitate an interrelated information system that allows their authors to easily access and cross-reference the work of other authors. References to figures in the Illustrated Parts Catalog (IPC) can be placed next to the disassembly instructions in the maintenance manual so that the IPC can be just a mouse click away.

The following provides detailed software specifications relating to the CD-ROM development associated with the maintenance and repair information system 10 in accordance with the invention to generate a robust, easy-to-use information system. These specifications identify all specification characteristics of the maintenance and repair information system 10 in accordance with the invention. These specifications also attempt to identify the intended direction for modified versions in the future based on the present structure of the maintenance and repair information system 10 in accordance with the invention.

The maintenance and repair information system 10 in accordance with the invention has the following look and feel guidelines and priorities. While the maintenance and repair information system 10 in accordance with the invention borrows from many Windows conventions, this system is not intended to be entirely Windows compliant. In an effort to serve the aviation industry, rather than the computer industry is general, the maintenance and repair information system 10 in accordance with the invention stress ease-of-use and common sense in an interface that requires a minimum of computer knowledge or skills.

Even though a keyboard is standard equipment on every personal computer (PC), the maintenance and repair information system 10 in accordance with the invention allows mouse point and left click to provide access to every feature of the software. Double click and right click occasionally provide faster or more direct access, but those are not required operations. The keyboard is supported as a means to move through the interface, but the keyboard is only required to perform data entry.

The maintenance and repair information system 10 in accordance with the invention does not use standard Windows pull-down menus. Choices are presented through dialog boxes that use radio buttons, check boxes, and control buttons, as will be described in connection with Dialog Boxes below.

Overall, the maintenance and repair information system 10 in accordance with the invention stresses clean screen design over total information or feature access. Every effort has been expended to display related information on the same screen and to group related choices in a single dialog, but the breadth of information never compromises the clarity of the current screen. Stated another way, the user is afforded latitude of choice to minimize keystrokes, but not if the variety of choices prevents the user from understanding the alternatives.

The focus of each screen presentation is absolute. There is never any doubt as to what demands the user's attention. Screen design leads the user toward his or her next action, as will be described in connection with placement of Dialog Boxes below. Where possible, users are guided with defaults.

Finally, the maintenance and repair information system 10 in accordance with the invention conforms to the view of the aviation professional regarding aircraft technical data. That view is associated with both the book metaphor (TOC and Index, in which the maintenance and repair information system 10 in accordance with the invention is an "electronic page turner") and to other access procedures employed in the aviation industry (task-based compliance tracking and hyperlinking, in which the maintenance and repair information system 10 in accordance with the invention is an "electronic information access tool"). The maintenance and repair information system 10 in accordance with the invention employs the latest techniques in hyperlinking and data management, but presents them as the electronic version of the tools that aviation professionals have used before. The maintenance and repair information system 10 in accordance with the invention stresses the perspective of the aviation professional over the view of the computer professional.

The use of color within the maintenance and repair information system 10 in accordance with the invention conveys meaning. Color conveys function, information type, and, where it is necessary, color establishes boundaries between different parts of the screen. Color is not used merely to render the program aesthetically pleasing. The primary purpose of color is to denote form and function over aesthetics.

The program is already very colorful by design. Decorative color detracts from the methodical placement of meaningful color. The specific use of color is defined where applicable in the specifications. Uses of color are defined in the chart below.

| | Color Conventions | | |
|---|---|---|---|
| Where | What | Text/Elements | Background |
| System | Main Area | N/A | Blue |
| | Product Title Bar | White | Dark Blue |
| | Mode Icons | Square | Grey |
| | Control Function Icons | Rectangle | Grey |
| | Icon Areas | Multi-colored square Icons | Grey |
| Dialog Boxes | Title Bars | White | Dark Blue |
| | Input Area | Black/Grey | White |
| Information Boxes | Title Bars | Yellow | Black |
| | Text Area | Black | Yellow |
| Document Display | Default | Black | White |
| Text | Search Hits | White | Black |
| and | Highlighting | White | Black |
| Text | Sticky Notes | Yellow | White |
| Hyperlinks | ATP Prepared | Orange | White |
| | Regulatory | Red | White |
| | Maint. Manual | Green | White |
| | Service Info. | Grey | White |
| | IPC's | Blue | White |
| | Vendor Ref's | Purple | White |
| Document | Selection List | White | Orange |
| Display | Regulatory | White | Red |

-continued

| | Color Conventions | | |
|---|---|---|---|
| Where | What | Text/Elements | Background |
| Title Strips | Maint. Manual | White | Green |
| | Service Info. | White | Grey |
| | IPC's | White | Blue |
| | Vendor Ref's | White | Purple |
| Document Display | Graphics | Black | White |

The maintenance and repair information system 10 in accordance with the invention uses black text on white screens when color conventions do not specify other color usage. In general, the maintenance and repair information system 10 in accordance with the invention employs bright primary colors. It does not mimic use of pastels and other muted colors found in Windows.

The text display specifications for each publication type are set forth in the display attributes tables. Those tables outline how text and figure references within the various publications are to appear in document display. Those documents are an appendix to these specifications.

A mouse pointer is provided in the form of white airplane with a pointy nose. The airplane mouse pointer changes from white to black whenever it is positioned over any area of the screen where clicking the mouse will perform an action (i.e., a Co-Pilot help area, function icon, or data entry screen). When the maintenance and repair information system 10 in accordance with the invention is busy and the airplane pointer is "out of service," a hanger appears over the airplane pointer until the airplane pointer is available again.

Various title strips are provided. The following vocabulary is used.

A publication is one specific printed book, manual, issue, Airworthiness Directive (AD), Service Information (SI), Federal Aviation Regulation (FAR), etc. This refers to the complete printed document as it was originally released in paper form. For example, a FAR "publication" includes all its parts, namely, preamble and rule.

A publication type refers to a category of publication. For example, AD is a publication type, AD 89-02-12 is a publication of that publication type. For the regulatory library, most of the books presented on the Bookshelf represent publication types composed of many publications. For a particular manufacturer, such as a Gulfsteam product, the maintenance manual on the Bookshelf represents a single publication, for example, the G-IV maintenance manual.

A document is the portion of a publication which is the unit useful for InnerView display. For example, a FAR is organized by Part, Subpart, and Section within a Rule; the InnerView document level of a FAR will likely be Section. InnerView documents are the items presented in selection lists. In many cases the publication is also the document (i.e., AD, SI, Type Certificate (TC), or Supplemental Type Certificate (STC)). A document can also refer to whatever is currently being viewed in document display; and, therefore, a selection list or history list might also be referred to as the document currently being viewed.

Because of the ability to point to specific places within an InnerView document using Segment pointers, the division of some publication types into documents is not important to the usefulness of selection lists and is therefore not specified.

Programmers can determine the InnerView document level based on best software performance. Those publication types are noted under Bookshelf Browse, as will be described in more detail below.

Issue type refers to the different kinds of service information publications published by manufacturers. Each manufacturer may produce several different issue types as service information publications.

When first starting up, the title strip at the top of the screen lists the software program title (i.e., Maintenance Information System). After a product(s) has been selected, the title strip at the top of the screen contains the CD-ROM product title (e.g., U.S. Federal Regulatory Library) and the revision date of the maintenance and repair information system 10 in accordance with the invention. This strip is only one text-line tall.

When the maintenance and repair information system 10 in accordance with the invention is in document display, corner icons and two more lines of text are added to the top title strip. The left top and right top corners of the screen will contain graphical icons. Displayed between these two icons will be one title strip which is three text-lines tall and colored according to the type of document being displayed.

When a selection list generated by the maintenance and repair information system 10 in accordance with the invention is being displayed, both icons can be predetermined logos to identify the library service provider. The left icon can indicate that this list was generated by and is the property of the library service provider. When the user clicks on the left icon, a product title, copyright notice, and revision information are preferably displayed.

The right icon is always employed to indicate how the user got to the current document in document display and the number of documents that were available at every step, where applicable. Clicking on this icon drops a box from the icon with fields listing: publication type selected, browse/search function (either or), search criteria specified, and sort order (access method or browse sequence).

The search criteria specified only include those elements that are specified by the user (or filled out automatically based on user specifications) on the search dialog box. Even when a specific document is being displayed, document identification and issuance would not be part of this list if they were not part of the original search.

The top line of the title strip contains the product title (as before). The middle line of the title strip contains the name of the list (i.e., Advisory Circular Selection List). Note that when presenting service information of a manufacturer, the second line of a selection list presenting service information reads "Service Information Selection List," rather than identifying the issue type. This allows more than one issue type to be listed in the selection list.

The bottom line of the title strip displays a brief of the selection criteria information (as defined above for the right icon.) Of the selection criteria information, the publication type can be eliminated since it is reflected in the selection list title. The third line indicates browse or search and what sort order was employed in creating the list. Search criteria are either eliminated or truncated depending on space available with top priority given to any word search expression used in a search.

When a history list is displayed, the top line of the title strip contains a product title (as before). The middle line of the title strip contains the name of the list which is "History of Documents Viewed." The bottom line of the title strip indicates either "Current History for this Session" or the name of the history file loaded.

When the contents of a publication (text or graphics) are displayed, the title strip is in the same format as the title strip for selection lists. The right icon still provides a detailed report listing every step in the process to arrive at the current document and the number of documents available at each step where applicable, but the left icon changes to the publisher's icon (manufacturer's logo) to indicate who authored the document. The publisher's icon displays a list of text or graphics parts associated with the document that the user rarely wants to see, and these have therefore been moved out of the normal access path to the important information in the document. Fields in the drop-down box that is displayed by clicking on the publisher's icon include: title page, masthead, page footer, list of effected pages, and disclaimer. Clicking on one of these fields takes the user to that information in document display. Text pages referred to by these fields take the user to that page of text, which includes appropriate graphic references, such as "See Masthead" or "See Signature." Graphics referred to take the user to that graphic. It is noted that these pages may be presented as part of the document appearing before a designated starting pointer into the document; or they may be presented as separate documents altogether. This depends upon the desire to use InnerView segments to point to a starting position. It may also depend upon how standard parts, such as the disclaimer, appear for a publication type (i.e., whether one disclaimer can be used for all publications within a publication type; or perhaps across publication types). it is preferred that manufacturers will follow Gulfstream's lead in providing one disclaimer that applies to all of their publications.

The background color of the title strip depends upon the type of document being displayed, as described earlier in connection with color usage. The top line of the title strip contains the document type name and document numeric identifier (e.g., Federal Aviation Regulation—FAR 91.1.1). The middle line of the title strip generally contains the Manufacturer's Short Name or Document title, revision information, and sometimes a truncation of the document description. If a field must be truncated then " . . . " is inserted as the last three characters. To accommodate the different issue types of service information, the maintenance and repair information system 10 in accordance with the invention substitutes the issue type for the publication type in the first line of service information title strip.

The bottom line of the title strip contains a brief of the selection criteria. The specific contents of line three will depend upon how the user accessed the document or selection list being displayed. The brief will be derived from the information presented under the right icon as described above.

TCs—Selection List

Ln 1: [product title]_[revision date]

Ln 2: [list name="Type Certificate Selection List"]

TC Headers—InnerView

Ln 1: [doc type name="Type Certificate"]_-_[doc type code="TC"]_[TC number]

Ln 2: [Manufacture Short Name]_[issue date]_[1st 40 characters of the series model block]

TC Model Block—InnerView

Ln 1: [doc type name ="Type Certificate"]_-_[doc type code="TC"]_[TC number]_[model block number]

Ln 2: [Manufacture Short Name]_[1st 40 characters of the series model block]

TC Notes—InnerView

Ln 1: [doc type name="Type Certificate"]_-_[doc type code="TC"]_[TC number]_[text="Notes"]
Ln 2: [Manufacture Short Name]_[1st 40 characters of the series model block]

ADs—Selection List

Ln 1: [product title]_[revision date]
Ln 2: [list name="Airworthiness Directive Selection List"]

ADs—InnerView

Ln 1: [doc type name="Airworthiness Directive"]_-_ [doc type code="AD"]_[AD number]
Ln 2: [Manufacture Short Name]_[revision date]_[1st 40 characters of the RMS description]

SI—Selection List

Ln 1: [product title]_[revision date]
Ln 2: [list name="Service Information Selection List"]

SI—InnerView

Ln 1: [doc type name*][doc type code*]_[doc number]
Ln 2: [Manufacture Short Name]_[revision date]_[1st 40 characters of the RMS description]

For service information publications, the doc type in the first line is being "infused" with the issue type, which is more commonly known out in the field. The doc type code is also being infused with a two-character code actually representing the issue type. It is to be noted that for consistency within the maintenance and repair information system 10 in accordance with the invention, these fields are still the "doc type name" and "doc type code." Therefore, in one respect, several new doc types are being added. However, all SI's are lumped together in the Bookshelf Mode.

FARs—Selection List

Ln 1: [product title]_[revision date]
Ln 2: [list name="Federal Aviation Regulation Selection List"]

FAR Preamble—InnerView

Ln 1: [doc type name="Federal Aviation Regulation"]_-_[doc type code ="FR"]_[part number].[section number]
Ln 2: [text="Part"]_[part number]_-_[text= "Preamble"]

FAR Rule—InnerView

Ln 1: [doc type name="Federal Aviation Regulation"]_-_[doc type code ="FR"]_[part number].[section number]
Ln 2: [text="Part"]_[part number]_-_[text="Rule"]

FAR Appendix—InnerView

Ln 1: [doc type name="Federal Aviation Regulation"]_-_[doc type code ="FR"]_[part number].[section number]

Ln 2: [text="Part"]_[part number]_-_[text ="Appendix"]

Orders—Selection List

Ln 1: [product title]_[revision date]
Ln 2: [list name="FAA Orders Selection List"]

Orders—InnerView

Ln 1: [doc type name="FAA Orders"]_-_[doc type code="??"]_[order number]
Ln 2: [order number]_[revision info]_[order title]_ [date]

ACs—Selection List

Ln 1: [product title]_[revision date]
Ln 2: [list name="Advisory Circular Selection List"]

ACs—InnerView

Ln 1: [doc type name="Advisory Circular"]_-_[doc type code="AU"]_[part]_[section]_[revision]
Ln 2: [document title]_[revision date]

Alerts

For FAA purposes, alerts are a unique flavor of ACs, since maintenance information system alerts are to be broken out as a separate document type. From a Standard Generalized Markup language (SGML) point of view, these documents break into parts (similar to TCs), with each part having different affectivity.

STCs—Selection Lists

Ln 1: [product title]_[revision date]
Ln 2: [list name="Supplemental Type Certificate Selection List"]

STCs—InnerView

Ln 1: [doc type name="Supplemental Type Certificate"]_-_[doc type code="??"]_[STC number]
Ln 2: [truncated description.] . . . _[issue date]

Truncated length is determined according to field lengths and space availability.

The document display area is a unique space on the screen where the user views informational text and uses specific document viewing tools provided by the maintenance and repair information system 10 in accordance with the invention (which includes TMS InnerView and TMS FAX functionality). Three types of documents that can be presented in document display are: InnerView documents (tagged and paged SGML text files consisting of text and graphics stored on the CD-ROM), selection lists (ordered and sorted lists of documents created "on the fly" by the maintenance and repair information system 10 in accordance with the invention based on user inquiry procedures), and Document Navigation History (the chronological list of documents, not including selection lists, that the user has viewed since he or she entered document display). It is noted that publication lists (created on the fly by the maintenance and repair information system 10 in accordance with the invention) and the Aircraft Profile (created by the user) are two other dynamic lists, but they are displayed in dialog boxes according to dialog box conventions, as will be described later in connection with the Aircraft Specific Mode.

When the document display area is invoked, the document display area covers the entire area under the title strip except for the control function icons at the bottom of the screen, which are always visible. A three-line title strip tops every document display area in accordance with the conventions outlined for title strips.

For the purpose of the Path Forward/Reverse control function (which moves along the path one screen at a time), document display is considered to be a single screen. This screen can display several different documents (selection lists and publications) while invoked, but when the user clicks on the Reverse Path control function, the user is returned to the preceding screen, the screen just before entering document display.

Navigation within documents is through the use of scroll bars and document control tools contained in the document control toolbox. The primary navigation aid from within the document display area is hyperlinking, the ability to click on a reference to another document or section within the current publication (indicated by colorized text) and jump to another referenced location. In the case of selection lists, colored text (used to display document cross-references only) operates in the same manner as the hyperlinks described above to take the user directly to a specific document.

The maintenance and repair information system 10 in accordance with the invention also provides for scrolling one screen of text to the next by clicking on the scroll bar above or below the position marker. The maintenance and repair information system 10 in accordance with the invention does not provide for scrolling according to the original pages.

When a selection list is displayed, vertical scrolling is supported whenever the document length exceeds the window height. When an InnerView document is displayed, horizontal and vertical scrolling is always supported. Vertical and horizontal scrolling is always supported while viewing an image.

One contemplated modification of the maintenance and repair information system 10 in accordance with the invention (dependent upon InnerView) is that the horizontal scroll bar can be intelligent. It would only appear when there is actually text to be viewed beyond that being displayed on the screen.

As shown in FIG. 1, the vertical scroll bar provides "double arrow" boxes at the top and bottom of the scroll bar (in addition to the single arrow boxes which allow the user to scroll line by line). Although some Windows programs use such boxes to represent page up and page down within a document, in the maintenance and repair information system 10 in accordance with the invention, these boxes always take the user to the next or previous document dependent upon how they are ordered on the CD-ROM, that is, the published order. This allows for logical progression through FARs and TC's despite the way they have been split, and it allows the user to page through all DOC types in published order, which are sometimes content related one to the next. These double arrow boxes are not active when the user is viewing a selection or history list.

It is noted that the maintenance and repair information system 10 in accordance with the invention associates page identifications (the physical page markers) with the InnerView page tag. This provides for the insertion of page breaks when printing. Nonetheless, equating page identifications with a printer page break do not ensure that an original page will fill up a single page when it is printed.

There are several document display tools that are only used for controlling the display of a document in document display. These document display tools include: selection list (next/previous); history (next/previous); word search hit (next previous); zoom (in/out); and view (text, graphics). These document display tools are presented through icons in the Document Display Toolbox. This toolbox is always displayed as part of the document display, even if none of its features are active.

As shown in FIG. 2, the Selection List next and previous icon allows the user to change the document that is currently being displayed in document display according to the order of documents on the preceding selection list. This is a three-part icon. While a publication is being viewed, if the user clicks on the "selection list" title portion of the icon, he or she will be returned to the preceding selection list. If the user clicks on the up or down arrow portions of this icon, the next or previous document on the selection list (relative to the last document on the selection list that was viewed) will be displayed. It is to be noted that this feature remains fully active, even if a user has hyperlinked off the selection list, since next and previous are relative to the last document viewed that was part of the selection list.

If no selection list were used to gain access to the publication, the Selection List icon is grayed out. (Recall the scroll bars described above for information on browsing in Published Order.) When a selection list itself is viewed, the "selection list" title portion of the icon is grayed out, but the up and down arrows will launch the user directly to the publication before or after the publication on the selection list that was last viewed.

Whenever a user happens to be at an end of the list, the appropriate arrow is also grayed out. (The arrows do not scroll the list; that is the function of the scroll bar.) Of course, with any selection list, the user can always click on a document in the list to view it directly. The selection list icon is fully active when a history list is being displayed, as will be described later in connection with History (Next/Previous) below.

The item pointed to by a search or last selected on a selection list is be highlighted. This indicates where in the list the user is oriented.

The History (Next/Previous) icon is also a three-part icon similar in appearance to the Selection List icon. It also functions similarly, but with respect to the history list being compiled by the maintenance and repair information system 10 in accordance with the invention. The History List is a list of the documents that the user has viewed during the current session using the maintenance and repair information system 10 in accordance with the invention. It is noted that the History List is a list of all of the documents that the user has viewed in this entire session (i.e., since log-on), not merely those documents that have been viewed since entering the document display screen.

Clicking on the "History List" title portion of the icon brings up the current history list as a document in document display so that the user can see where he or she has travelled. Only true InnerView documents are on this list. That is, selection lists and previous visits to the history list are not noted on this list.

As in the case of the selection list icon, the title portion of the icon is grayed out when a history list itself is being displayed, but the up and down arrows will still launch the user to the next or previous document in the list. The history list is also fully active when a selection list is being displayed.

When the Word Search Hit (next/previous) function is active, clicking on this two-sided icon moves ahead or backward to the next or previous occurrence of a word search hit. This icon not only functions within a single document but across any documents that were included in a preceding selection list.

The user also has the ability to Zoom in on a graphic in predetermined incremental steps (defined by preferences in InnerView). This is accomplished by clicking on the two-sided zoom in/out icon located in the Document Display Toolbox. Pressing the + or − keys also supports zoom in and zoom out in predetermined increments.

Regarding the View (text/graphics) function, the view toggle allows the user to move back and forth between current text being displayed and the graphic that was last displayed by InnerView, even if the user has left document display and performed another search. If no graphic has been displayed yet during the current session, then the graphic button is inactive.

It is noted that when switching between text and graphics, the maintenance and repair information system 10 in accordance with the invention must remember what part of a page of text, or what part and magnification of a document, the user is viewing so that the user can toggle back and forth between the desired views of each page. Until compound documents (both text and graphics on the same screen) are supported by InnerView the user needs to click on graphic hyperlinks to see a graphic.

Insofar as text display is concerned, text within the document display area is generally black on a white background. However colored text indicates a link to another document, other text in the same document, or a graphic. When a document is finally displayed as a result of a word search, hits from the word search are highlighted within the document, and the user is able to jump from one word hit to another within the current document and across documents in the order they appeared in the selection list that resulted from the word search.

Regarding graphics display, graphics are the figures associated with publications. These bit-mapped images are configured as pages within an InnerView document.

In addition to using the incremental zoom feature available from the toolbox, the user can zoom in and out on any graphic in the following manner. Initially, the user moves the mouse pointer to a corner of the area he or she wants to zoom in on. Next, he or she presses and holds the left mouse button. Then, the user drags the mouse pointer to the opposite corner of the area to be zoomed. Finally, he or she releases the mouse button.

As the user "clicks and drags," a border defines the area to be zoomed. Upon release of the mouse, the defined area enlarges to fill the document display area. Since the user is unlikely to define an area that matches the aspect ratio of the screen, the maintenance and repair information system 10 in accordance with the invention relies on InnerView to display all of the image requested by the user.

Selection Lists are ordered lists of documents created "on-the-fly" by the maintenance and repair information system 10 in accordance with the invention from which the user can select an individual document to view. A detailed breakdown of what is presented on a selection for each document type is available from the Authority File Tables in Appendix A. For some selection lists, a single document listing in the selection list must be able to cross-reference multiple document types.

Any screen that requires the user to enter data, or to enter choices, is presented in the form of a dialog box. The dialog boxes in connection with the maintenance and repair information system 10 in accordance with the invention obtain information from the user in five different ways: data input fields; radio buttons; check boxes; control buttons in a control panel; or word wheel text entry.

Rules are defined below to insure consistency between dialog boxes. The vast majority of dialog boxes fit the rules. However, the rules should not force awkward dialog box presentation when there is an obvious, intuitive alternative, even if the alternative violates the rules.

Data input fields allow the user to input text in any form limited only by a field length. Radio buttons allow the user to select one item from a variety of choices, but never initiate an action. Check boxes allow multiple (or single) items to be selected from a finite list of choices, but do not initiate an action when clicked. Control buttons always initiate an action when clicked. Double clicking on a radio button or check box will select or toggle the desired item and initiate action as if the user had also clicked on the OK button.

A word wheel text entry field allows the user to indicate a search string. A user can choose a search string from a finite list of words or phrases by scrolling the list and clicking on a word or phrase in the list, or by typing the first letters to uniquely identify a choice. A user can also elect to search for any word or phrase (even if it is not on the list), since the word search text entry field will accept any valid Boolean search.

A control panel is the bottom area of a dialog box where two or more control buttons are placed. Since every dialog box has at least an OK and a CANCEL button, every dialog box must have a control panel.

All dialog boxes have a shadowed black boarder around the entire box and a shadowed title bar at the top with white letters on a black background. When a dialog box contains more than one group of data inputs, the dialog box is subdivided into sub-areas.

Different areas of a dialog box are distinguished by fine lines, and the line at the top is broken with the title of that area spelled out.

The control panel is not named. It is set apart on the bottom of every box by a black line.

Control panels always appear on the bottom of dialog boxes. No other control buttons appear elsewhere in a dialog box. Check box items and radio buttons appear above the control panel. If check boxes and radio buttons appear in the same dialog box, they are placed side-by-side as often as possible. The commonality among choices within a dialog box sub-area is reflected in the title of that sub-area so that the common theme does not necessarily have to be repeated in the text of every choice (i.e., Profile, . . . , Create, Delete, Edit, Import, Export in the pictured example).

Dialog boxes employ color only in the display of publication types or publication titles (publication lists are the type of dialog box where this use of color will occur). Colors conform to the color conventions established for publication types.

When the same dialog box is used for several different features or across several different products, some of the dialog box options may not be applicable in all situations. It is preferable to show the same dialog box with options grayed out. In this manner, the user only has to become familiar with one dialog box, instead of ten different variations which may not be recognized as the same.

Insofar as the word wheel is concerned, whenever the user needs to enter a word or phrase from a finite but long list of choices, the choices are presented in word wheel.

To work a word wheel, the user positions the cursor in the text entry field of the word wheel and then starts typing the first letters of the desired word or phrase. In most cases, the word wheel is the default focus of the dialog box so the cursor is already positioned in the text entry field. As letters/numbers are typed into the text entry field, the text in the list box automatically adjusts to reflect the closest match to what is being typed.

Boolean searching is also supported by word wheels throughout the maintenance and repair information system 10 in accordance with the invention. Word wheel text entry fields allow the user to build a complete word search expression complete with Boolean links.

Word wheel lists appear in a box below the text entry field and are driven by a vertical scroll bar. Scrolling allows a user who may not know the first letters of a choice to select from the list of words or phrases offered as possible choices. The current word(s) that appear in the expression field are accepted when the user initiates an action with a control button such as OK.

The maintenance and repair information system 10 in accordance with the invention suggests default choices to users on radio buttons or check boxes where certain choices are most commonly invoked, or where some users may not understand all of the choices, but one will always function. For example, some users may not be familiar with a print queue, so the maintenance and repair information system 10 in accordance with the invention suggests "print now" as the default. Defaults allow the user to press OK without filling out the dialog box.

Although the maintenance and repair information system 10 in accordance with the invention is designed to be used with a pointing device, keyboard alternatives are available for those users who have and prefer to use a keyboard. Each control function is associated with a function key (e.g., "Help" is F1).

Within dialog boxes, TAB and SHIFT-TAB change the focus. Focus is shown within a dialog box by a thin dotted line that surrounds the text of the check box, radio button, or control button that is the current focus. Focus on a text entry field is shown by the dotted line that surrounds the sub-area title (or more appropriate text within the text entry field if there is any) and by the appearance of a flashing cursor.

The change of focus with TAB and SHIFT-TAB is intuitively left to right then down (i.e., the way the tab key would operate on a page of text). When a radio button, check box, or control button is in focus, pressing the space bar is the equivalent of clicking on that item.

The ENTER key invokes OK. The ESC key invokes CANCEL. Arrow keys, backspace, and delete are active within a word wheel text entry field when that field is in focus.

Control buttons can be invoked with an ALT-[letter] key combination. The letter that activates a control button when pressed with ALT is indicated by the one letter that is underlined in the name of the control button.

The maintenance and repair information system 10 in accordance with the invention also provides information boxes. An information box is a unique type of dialog box that presents system information or help information to the user. This is the one type of dialog box where no input is required from the user other than clicking OK to remove it.

Information boxes conform to the standard dialog box title format. They also have a control panel area, but only the OK button appears there. One difference of information boxes is their color. An information box has yellow background and the text in the title bar is yellow on black.

Error messages are presented in information boxes. The title strip reads "Error ###" with the three digit number being used to track the error message and the text associated with that message. Error numbering facilitates the future creation of an error cross-reference (either printed or part of the on-line reference manual) providing corrective information to the user.

Additionally, help boxes are information boxes with the help icon incorporated into the layout of text in the box. The help icon along with a uniform title bar that reads "Help ###" uniquely identifies these as help dialog boxes. A three digit help number is used to track this help screen and it's associated text.

The foregoing describes the general attributes of the maintenance and repair system 10 in accordance with the invention. General aspects of the operation of the system will now be described.

The files of the maintenance and repair information system 10 contain the expected return code from a Security Key. The system files also contain the authorized product code(s) and respective subscription dates. For each product code there is a corresponding library service, revision date, authorized data type access, and authorized program functionality. If the Security Key does not provide the expected return code, then an error condition will be generated. Otherwise, the product information in the system files will be utilized.

The maintenance and repair system 10 in accordance with the invention decodes the authorization number to generate product and subscription date information. An additional program is required for the library service provider which tracks customers, CD-ROM products, CD-ROM product subscriptions, and security key serial numbers. This program generates the authorization number to be given to the customer after payment has been received for the subscription.

The security key preferably has a six-month expiration. No renewal is possible. This is a unique code that is different from the real code to prevent future attempts to "hot-wire" CD-ROM access.

A CD-ROM check is performed. The system files are checked to see what kind of CD-ROM setup is in place. The CD-ROM drives are checked and the CD-ROM disc volume label(s) are checked against the system authorized product file. An error is generated if the CD-ROM volume label does not match the authorized list. Another error is generated if the revision of a product falls outside the subscription date. Otherwise, the CD-ROM check provides a list of available products (and revisions), as well as sets the required drive\path specifications required to access these products.

If an update error is generated during the CD-ROM checks, an opportunity is preferably provided to users with supervisory level authority to start and monitor a CD-ROM product update. The supervisor may be called upon to re-establish bookmark and annotation links which were broken as part of the product update cycle.

Various update procedures are contemplated. The entire product CD-ROM disc can be changed. Alternatively, soft updates can be generated on floppy disk which are applied through the maintenance and repair information system 10 in accordance with the invention maintenance facility. Preferably, soft updates can be issued via CD-ROM disc, the CD-ROM disc actually containing a number of soft updates for a number of products. If the subscription has expired, there is an opportunity for the supervisor to enter a subscription update code which will alter the security key and change the expiration data. Once the expiration date has been changed, the supervisor level used will be offered a opportunity to update the product.

If operation is abnormally terminated (i.e., power down or reboot), the program can recognize that it was abnormally terminated during it's last use and inform the user of the unusual termination. In Aircraft Specific Mode while creating or editing a profile, the maintenance and repair information system 10 in accordance with the invention does not save any temporary data files. Individual component records are stored as created. Therefore, a partially completed profile would be available after an abnormal termination, although a partially completed component record would be lost. For example, if the user had previously entered a portion of an aircraft profile when the power went out, when the maintenance and repair information system 10 in accordance with the invention was restarted, it would inform the user that the program was abnormally interrupted before proceeding with normal startup.

A record is maintained of program activity and will specifically record any retrieval of documents and the method in which the documents were accessed. This information is recorded on the hard disk and will be available to library service provider for analysis of documents viewed and the method of access to retrieve the documents.

It is desired that a supervisor level user could "record" his keystrokes/mouse actions for "playback" by a novice level user. An example would be for a supervisor to record reference landing gear maintenance procedures. The novice user could then "run" the standard routine, stopping only for selection of the aircraft profile identification and always be presented with the landing gear maintenance procedure.

Another example is if the supervisor wanted to "record" the displaying of all new publisher bookmarks for a product update. The novice user could simply "playback" the bookmarks for review.

The operation of the maintenance and repair system 10 in accordance with the invention will now be described in detail. The following chronologically details the use of the maintenance and repair information system 10 in accordance with the invention. The functionality is the primary focus of the following description. Contemplated modifications to functionality will be noted secondarily, set apart by paragraphs and italics.

The following description of operation is organized using a numbering convention as outlined below. These numbers set the groundwork for an element tracking scheme and are a convenient way to identify any part of the software.

At every level of the functionality section, the description provides the following types of information: the graphic element(s); name; description; functionality; examples; cross-references; and contemplated modified implementations. Graphic representations of program screens (dumps and hand-scratch) appear in the accompanying figures to supplement detailed functionality descriptions.

0.0.0 Startup

Description:

When the maintenance and repair information system 10 is started, there is a series of operations that must be completed before accessing one of the five modes. The process of stepping through those operations is referred to as startup.

Functionality:

The maintenance and repair information system 10 is started either by clicking on the icon for the maintenance and repair information system, or it is automatically started when the computer is turned on. This initiates the maintenance and repair information system 10 startup operations.

Examples:

From a user perspective, startup operations include:

Program Initialization

Terms and Conditions for use of the maintenance and repair information system 10

Log-in

System Administration

Product Selection/Acceptance of Revisions Date

Product Copyright Acknowledgement

Product Opening Animation

Programmatically, startup operations include:

Program self-checks

The maintenance and repair information system 10 Terms and Conditions

Open user files (allow log-in)

Open product information files (check availability/security)

Display product library list

Product Copyright Acknowledgement

Product Opening animation

Initialize InnerView

Show Navigator Screen

Cross-References:

Prior to startup, there is an installation program required to install the system, associated files, and first CD ROM product disc.

0.0.1 Program Initialization

Description:

The maintenance and repair information system 10 needs to load and initialize all applicable Dynamic Link Libraries (DLLs). Program initialization is the time when the maintenance and repair information system 10 checks for the existence of all required files, DLLs are loaded, and pertinent system files are opened.

Functionality:

The mouse pointer changes to a busy state while a message is displayed that requests the user to please wait while the program is initializing. There is a countdown bar indicating how far along in the program initialization process the system is.

0.0.2 Terms and Conditions Acknowledgement

Description:

The user must acknowledge that he agrees to the Terms and Conditions related to the use of the software interface of the maintenance and repair information system 10 before continuing. The Terms and Conditions dialog box forces the user to either accept or exit the program.

This is related to the use of the interface. The product copyright acknowledgement that appears after selecting a product is related to the information presented in each product.

Figure 3:
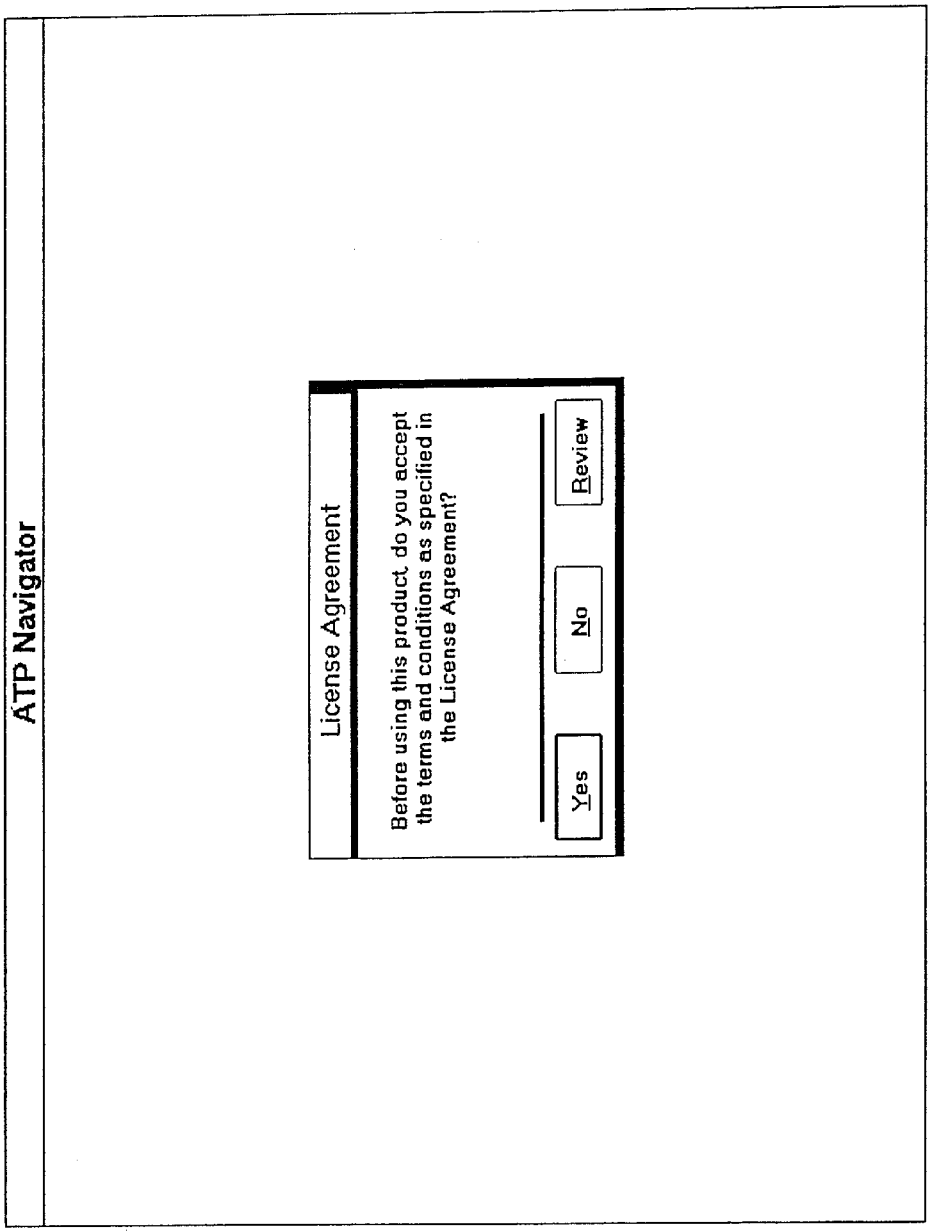

(See FIG. 3.)

Functionality:

The Terms and Conditions dialog box informs the user that the maintenance and repair information system 10 is copyrighted material. The terms and conditions dialog box gives the user the option to accept the license for use and all copyrights that apply, review the actual terms and conditions of the license and the copyrights, or exit the program.

Figure 4:
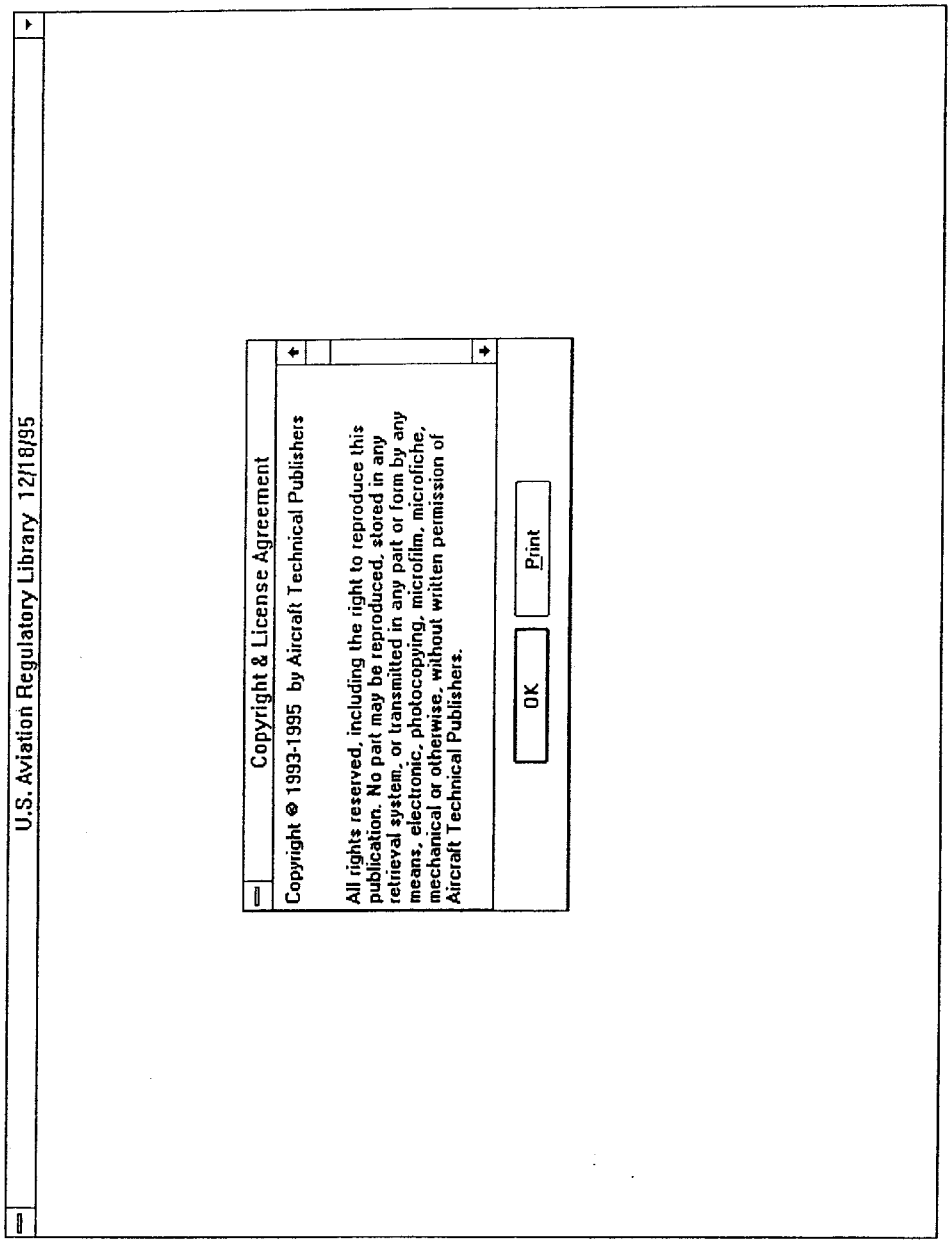

If the user elects to review the actual license, the license will be read in from a system file and displayed in a dialog box for review. The library service provider is responsible for providing, in Microsoft Word format, the text file associated with the license agreement.
(See FIG. 4.)
Contemplated Modification:

The mandatory acknowledgement of the terms and conditions can alternatively be required upon system startup, rather than upon user log on.

0.1.0 User Log-in

Description:

If password security is enabled during installation, then users must identify themselves before using the maintenance and repair information system 10. This process is known as user log-in. If password checking is not enabled during installation, the user log-in function is skipped. If the function is skipped, only one user is considered to exist. That user will have supervisor-level authority with all privileges.

Based on the information provided by the user at log-in, the maintenance and repair information system 10 identifies the particular user, determines which products the user is authorized to use, and determines how this user has been configured for use of the system. User log-in also allows some users to change their configurations for use of the program.

Functionality:

Each user is presented with the user log-in dialog box. That box provides a text entry field for the user's name and the user's password. It also provides a "user utilities" check box.

Upon installation, if password security is enabled, then one user is placed in the list of current users. That user's name is supervisor and the password for that name is supervisor and that user has supervisor privileges.

0.2.0 Password Entry

Description:

The user must enter his or her name and the password associated with that name in the system security files created by the supervisor.

Figure 5:
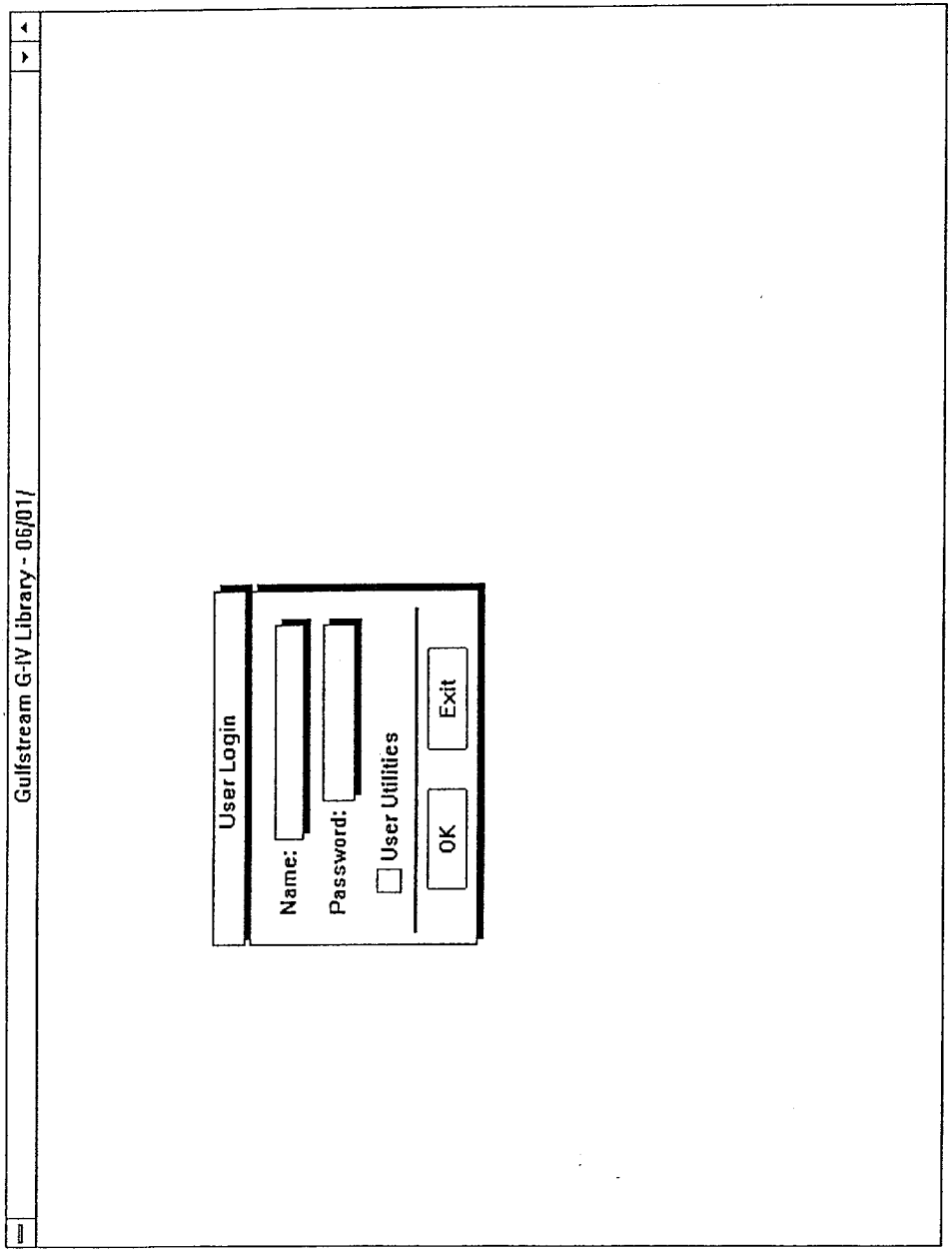

Functionality:

(See FIG. 5.)

The user enters his or her name and password in the respective text entry fields in the log-in dialog box. When the OK control button is clicked, the name and password entered by the user are checked against those in the system files.

If there is a match, the user ID and authority level are noted for continuation of the startup process. If there is no match, an error dialog box is displayed that requests the user to try again. After three invalid attempts, an error message informs the user that the user has failed three times and then exits back to the Window's program manager.

0.3.0 Product Selection List/Revision Date Acceptance

Description:

The product selection list allows selection of one or more products if more than one product is available with their current subscription. If only one product is available, this list must still be shown since it also forces the user to acknowledge the revision date. To limit legal liability for the timeliness of information, users are required to acknowledge the Product Name and its revision date.

Each product has an update period assigned. If the product revision date plus the product update period compared to the system date indicates that the revision is overdue, then the warning message will be displayed.

Figure 6:
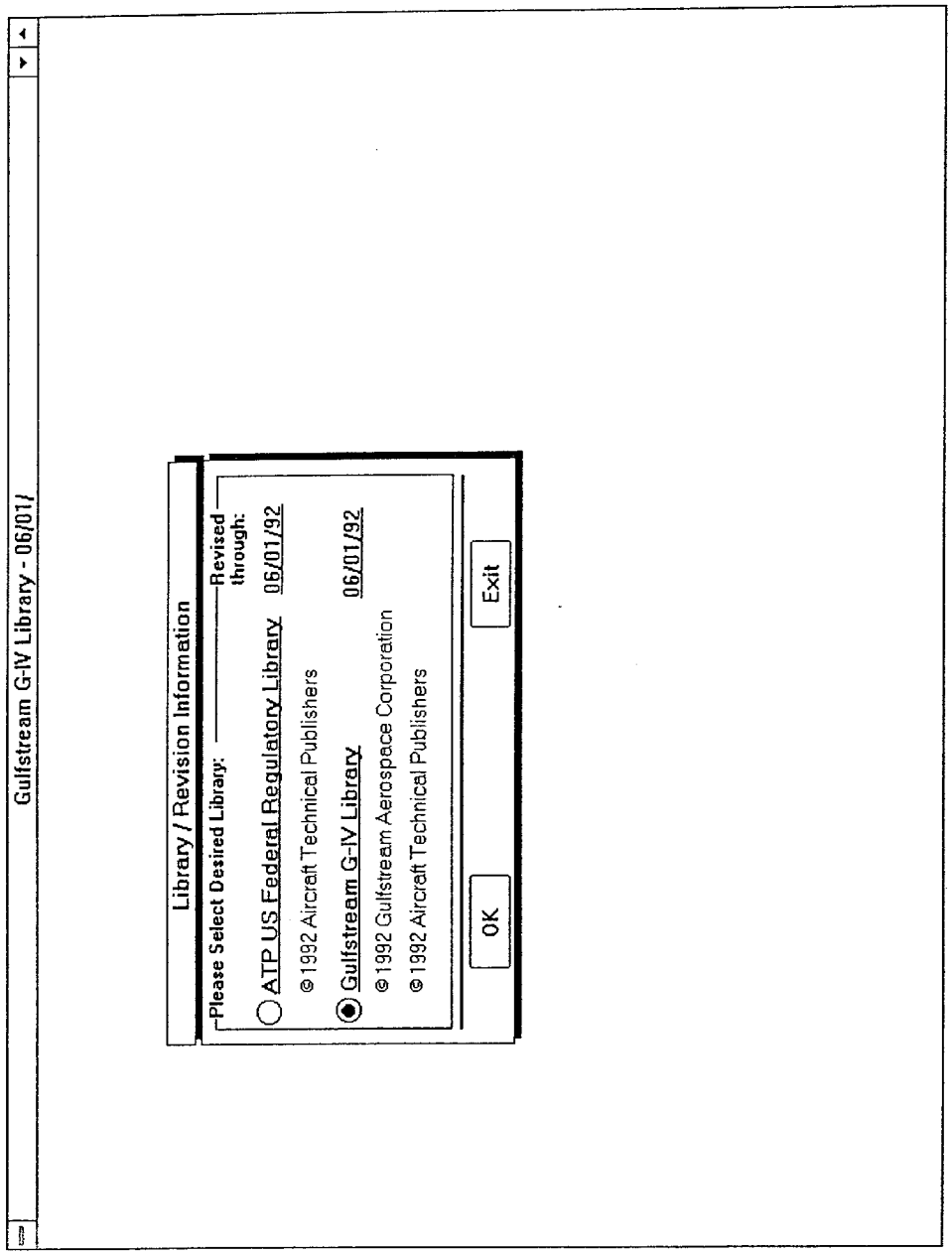

The maintenance and repair information system 10 checks so that it does not run on any computer with a system date prior to the product revision date. Logically, the current system date should not be earlier than the date the CD-ROM was revised. This prevents users with extremely inaccurate system dates from using out-of-date or expired products. When the CD-ROM will not run for this reason, an error message explains the problem and suggests that the system date needs maintenance.
(See FIG. 6.)

Initially, two federal regulatory products are likely to be available for the maintenance and repair information system 10. The U.S. Library and Joint Airworthiness Regulations (JARs) which apply to Europe. The maintenance and repair information system 10 must offer different security for either the U.S. Library or both the U.S. Library and JARs. In addition, users may also purchase the Gulfstream product. The security device must track product code, revision paid through date, and authorized user for all three products.

Because the different products licensed to a single user may be on different CD-ROM discs, the maintenance and repair information system 10 must be aware of multiple disc players or be able to prompt the user to change CD-ROM discs.

Functionality:

There is an installed product list from which the user can select which product he or she wants to work with. At this time, there is no plan to electronically commingle multiple products.

Contemplated Modification:

One product may be on one disc or may span two disks.

0.4.0 Product Copyright Acknowledgement

Description:

This screen forces the user to acknowledge that the information presented in the product he or she has selected (the data, not the interface) is also copyrighted.

Functionality:

Users acknowledge the copyrights by clicking the OK button.

0.5.0 Opening Animation

Description:

The opening animation introduces the particular product selected from the product selection list. It is noted that the animation is different dependent upon which product is selected. For example, a Federal Regulatory product can use a spinning globe animation. Animation can be implemented using Autodesk Animator Pro to be appropriate for VGA display.

Functionality:

The maintenance and repair information system 10 displays the animation as an AA Flick (Autodesk Animator Flick) run through AA Play. Based on the product chosen from the product selection list, the maintenance and repair information system 10 calls whichever animation batch file runs the appropriate animation.

0.6.0 Product Initialization

Description:

Once all Security and CD-ROM checks have been performed and the user privileges have been determined (as well as drive\path specifications to access the product information), the program configures itself for the current user.

Functionality:

Any privileges/authority levels that determine accessibility or functionality are resolved here.

1.0.0 The Navigator Screen

Description:

The Navigator Screen is first displayed after program initialization. There is a row of icons arrayed across the bottom of the screen. The features offered by these icons are known as the Navigator Control Functions. These functions are used throughout the maintenance and repair information system 10. It is noted that the VIEW text/graphics/both function, the DOC up/down functions, and the ZOOM in/out function all appear as part of the document display toolbox only available when the user is in document display of an InnerView document.

Along the right side of the Navigator Screen are the mode icons which initiate one of the maintenance and repair information system 10 modes of operation.

Figure 7:
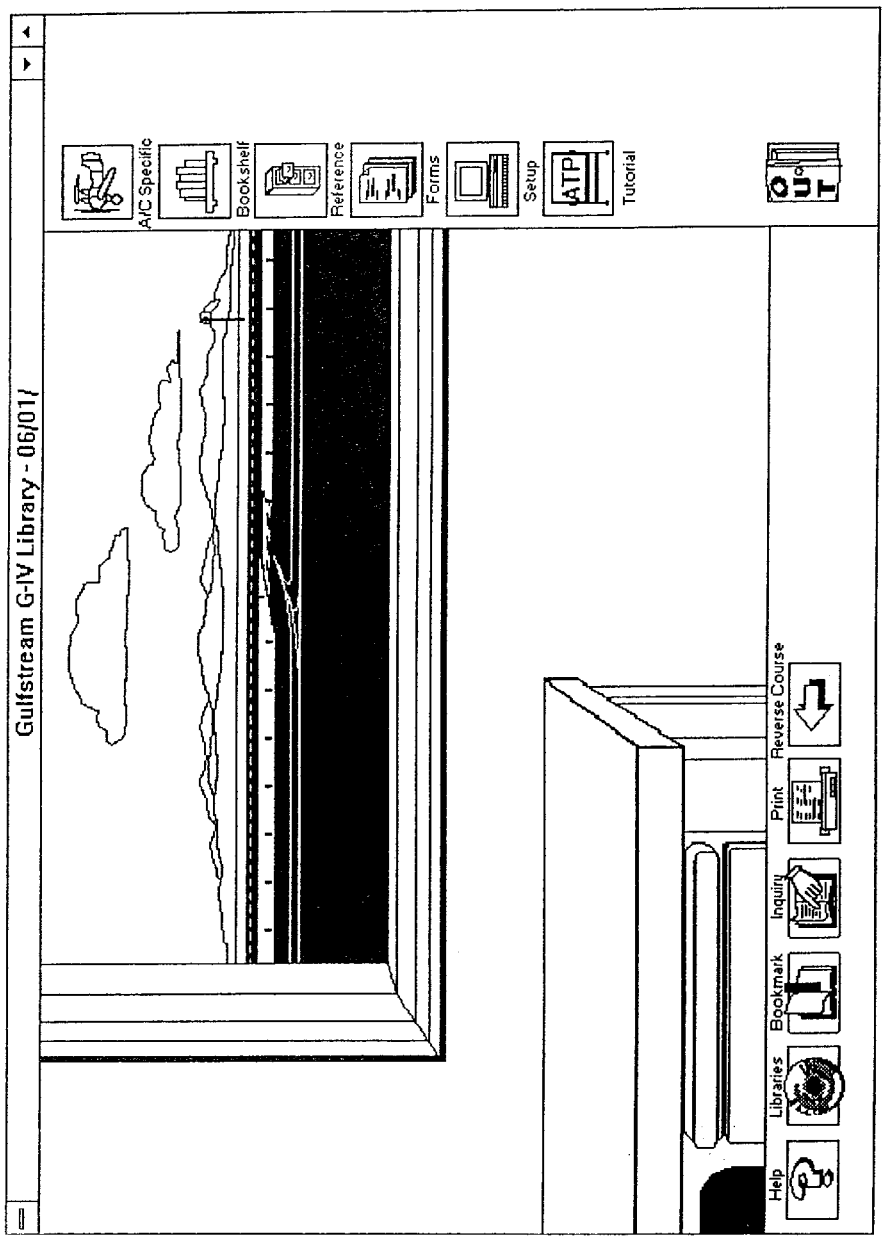

Functionality:

(See FIG. 7.)

The user must select either a mode or an active function to proceed.

1.1.0 Help Function

Description:

This icon offers two different types of help: Pop-Up help and the On-line Reference. Pop-up help is "what-to-do-next" help that is available to the user at any time. The on-line reference manual is the complete source of help information as presented in the Windows help system.

Figure 8:
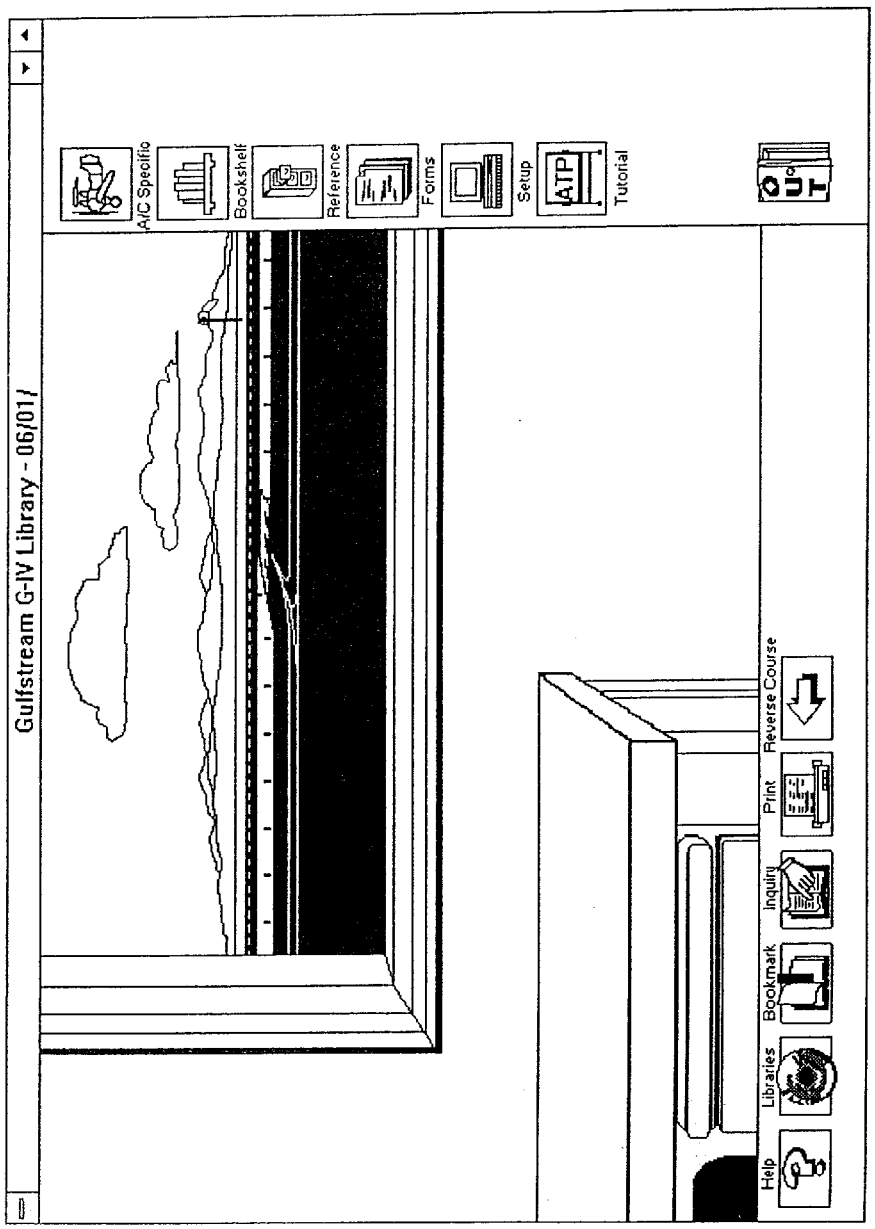

Functionality:

(See FIG. 8.)

Regardless of where the user is in the maintenance and repair information system 10, right clicking the mouse pointer over the help icon pops up a help box which briefly describes the current focus of the screen and how to proceed. Left clicking on the help icon launches the Windows help system and takes the user to the on-line reference manual.

1.2.0 Navigator Return Function

Description:

The Navigator Screen is the first screen displayed after the user acknowledges the Product Revision Date. The Navigator Return function redisplays and returns the user to this screen from anywhere within the program. When at the Navigator Screen, the function allows the user to select a new product.

Functionality:

Clicking on the Navigator Return icon at any time returns the user to the Navigator Screen, the very first screen of the program. It is to be noted that the Navigator Return icon is always active. When at the Navigator Screen, the icon changes to a CD-ROM disc, and clicking on the disk takes the user to the product selection dialog box where the product can be selected.

1.3.0 Bookmark Function

Description:

The implementation of bookmarks depends upon the API provided by TMS. TMS provides functions to retrieve, save, and delete bookmarks. However, TMS does not provide any actual user interface for this functionality. All controls, list boxes, and text display are displayed by the maintenance and repair information system 10.

There are three different types of bookmarks: Public, Private, and Publisher. The difference between the types centers on who can create and view them. Any bookmark can also be qualified as a sticky note, that is, a bookmarks with added functionality. Sticky notes are bookmarks in that they can be public, private, or publisher; but, rather than guiding the user to a specific point in a document as bookmarks do, sticky notes guide the user to a section of yellow highlighted text within a document and allow the user to attach a note about that text.

Publisher bookmarks are created by the library service provider and are intended for all users. They can never be created, deleted, or edited by any level or user. To the user, they are permanently attached to a document.

Figure 9:
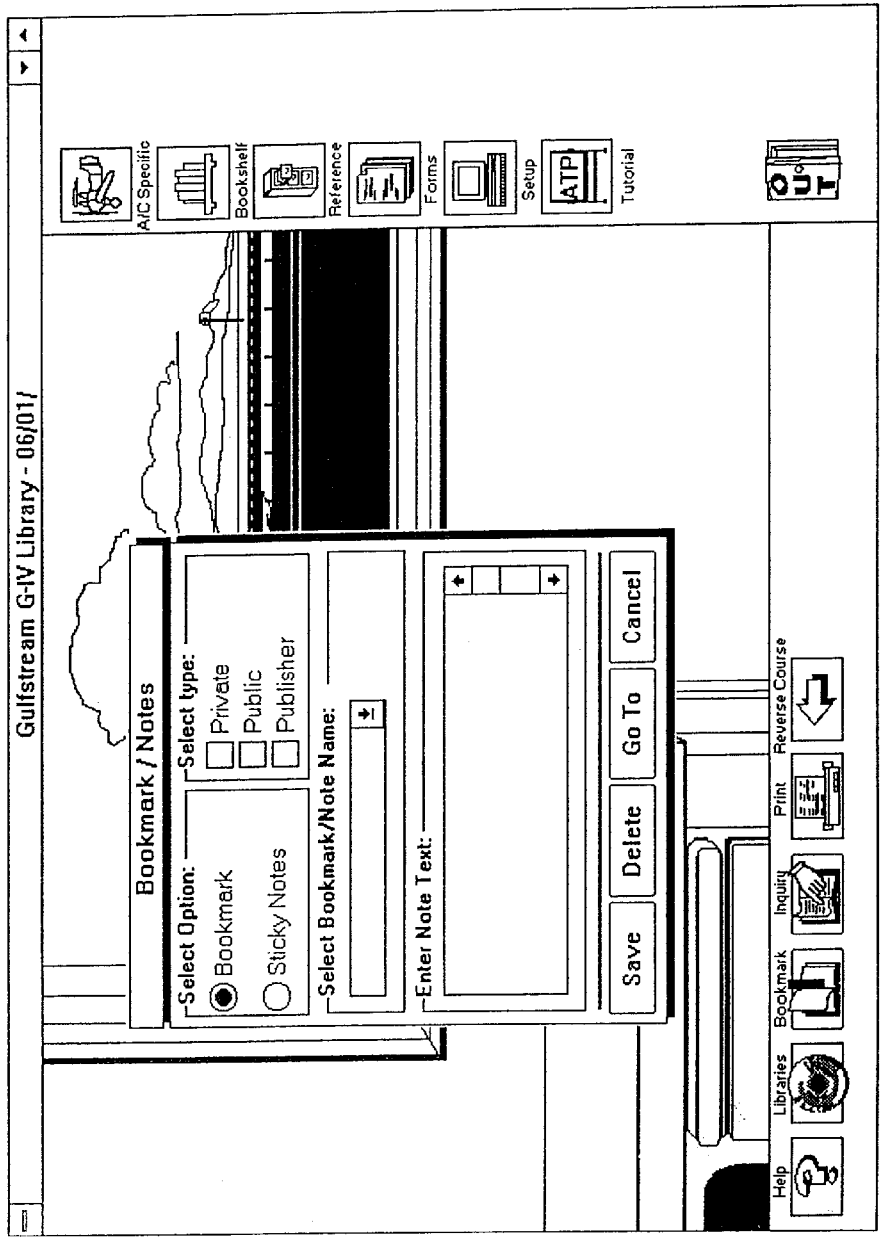

(See FIG. 9.)

Public bookmarks can be created by any user authorized to do so by the system administrator. Once public bookmarks are created, they are visible to all users of the maintenance and repair information system 10.

Private bookmarks can be created by any user authorized to do so by the system administrator. Once private bookmarks are created, they are only visible to the person who created them and the system administrator.

Functionality:

The Bookmark/Notes dialog box is accessed by clicking on the Bookmark icon. This dialog box allows the user to view or define Bookmarks that are Public, Private, or Publisher.

Public or Private creations, deletions, or changes may or may not be permitted based on the privileges set for that user. It may be that the user is only authorized to view bookmarks and is not authorized to create new ones or delete existing ones. Private bookmarks can be disabled if the system setup option has been selected to not log-in users.

The ability to create bookmarks is also available through this icon. However, the create option is gray unless the user is in document display.

1.3.1 Go to Existing Bookmark

Description:

Bookmarks point to a location in the text of a document. Like a real bookmark, InnerView bookmarks are placeholders that are used to mark an important or noteworthy point in the text that users can go to instantly.

Functionality:

From the Bookmark/Notes dialog box the user is free to go to any bookmark or sticky note available in the "Select Bookmark/Note Name" word wheel text entry field.

The Bookmark/Sticky Note Option and Type option at the top of the dialog box are grayed out to users who do not have the appropriate bookmark privileges. Those options change to reflect the option settings for whatever bookmark is called into the word wheel text entry field. If that field is blank, then those options are also blank.

Available from the "Select Bookmark/Note Name" word wheel text entry field are all the bookmarks and sticky notes available to the current user (depending upon that user's bookmark privileges). They are all combined on the same list.

If the item chosen from the word wheel is a sticky note, the note text associated with that sticky note fills in the "Enter Note Text" area below. Once a bookmark name has been selected, clicking the GoTo control button takes the user to the exact place in the document to which the bookmark points.

The appearance of a bookmark or sticky note within the text of an InnerView document is entirely dependent upon InnerView. The text associated with a sticky note is preferably highlighted yellow (black text on a yellow background). The place a bookmark points is noted with an InnerView bookmark character.

1.3.2 Create/Delete Bookmark

Figure 10:
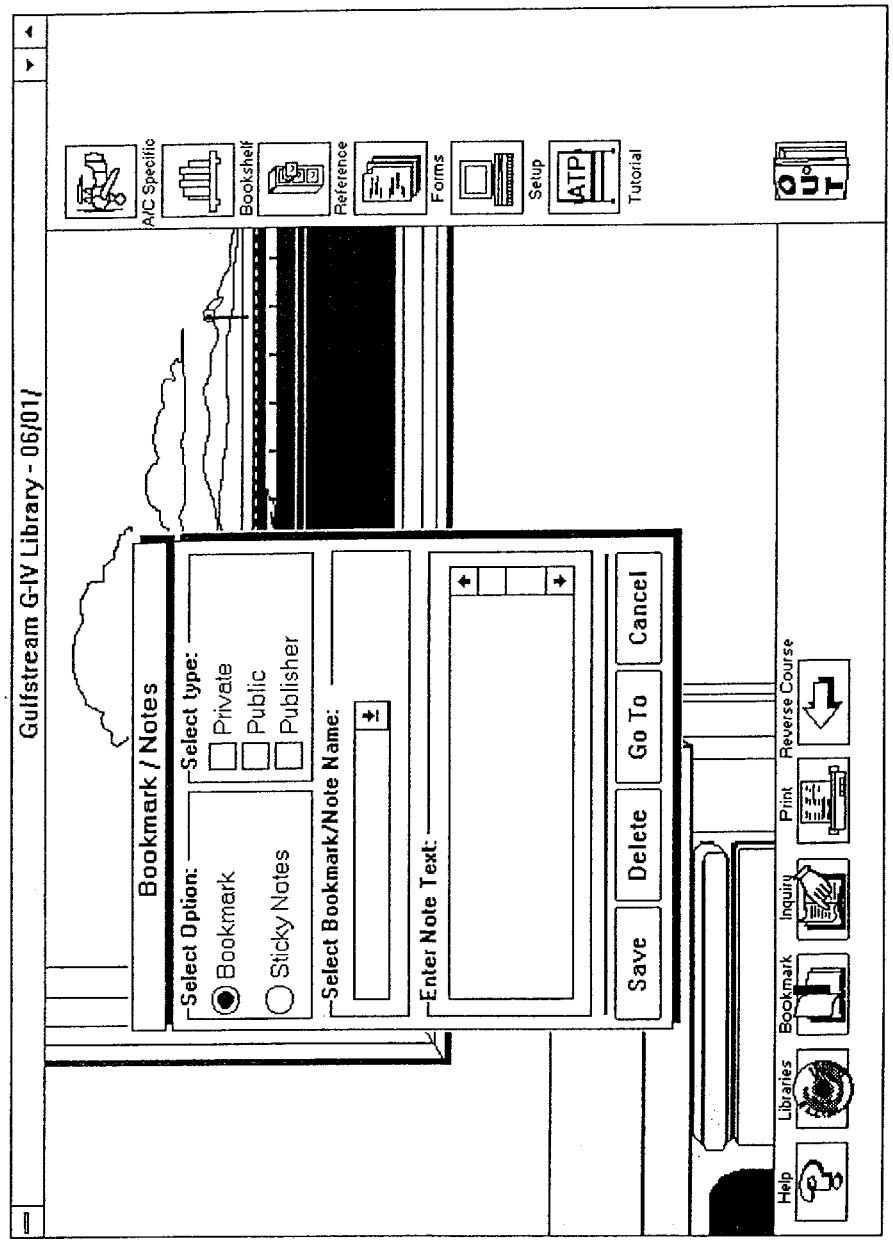

Description:

Users with the appropriate bookmark privileges have the power to create, delete, and modify bookmarks. However, because of the way bookmarks are created, it is impossible to change the place in the text to which a bookmark points. A new bookmark must be created.
Functionality:
(See FIG. 10.)

To users without the appropriate privileges to create bookmarks, the options and control buttons used in bookmark creation are grayed out. In connection with changing an existing bookmark, it is possible for a user with appropriate bookmark privileges to change any of the fields associated with a bookmark or sticky note. However, merely changing them in the bookmark/notes dialog box does not permanently change them on the maintenance and repair information system 10. The save control button saves the current bookmark options under the current bookmark name.

On the one hand, if the user enters any changes to the bookmark options in the bookmark/notes dialog box and attempts to GoTo or Cancel without saving, the user is prompted to save the changes or cancel. On the other hand, if the user has entered any changes to the Bookmark/Note Name and attempts to save the changes, the maintenance and repair information system 10 prompts to "Save as New Bookmark" or "Overwrite Old Bookmark."

Outside of document display, the Create control button is always grayed out. It is only possible to create a bookmark when displaying an InnerView document. That is how InnerView knows where to place the bookmark.

At an InnerView document within document display, clicking on the bookmark icon brings up the same Bookmark/Notes dialog box. Within that box the Create control button is ungrayed. It is still possible to use this box to GoTo or edit an existing bookmark, but clicking on Create clears the name and note text fields and fills the other option fields with defaults (Bookmark and private). The user can change or fill in fields freely.

It is noted that the Bookmark/Note Name field is no longer a word wheel but a freeform text entry field in which the user can assign any valid name to the bookmark. The sticky notes text field is unavailable unless the sticky note option has been indicated.

As with changes to bookmarks, merely filling in the fields in the bookmark/notes dialog box does not permanently store them on the maintenance and repair information system 10. The save control button saves the current bookmark options under the current bookmark name. If the user attempts to GoTo or Cancel without saving, the user is prompted to save or cancel the new bookmark.

Regarding marking text for sticky notes, dependent upon InnerView, it is desirable for the user to be able to mark sticky note text within an InnerView document before clicking on the bookmark icon and bringing the bookmark dialog box to the screen. If this is possible, marked text would cause the sticky note option to come up as the default in the dialog box.

If text cannot be marked before selecting the sticky notes option, the user should be prompted upon saving a sticky note to mark the text within the document that is to be associated with this sticky note. This allows the dialog box to be hidden while the user marks text.

It is desired that a left click and drag action mark a portion of text (or graphic) within an InnerView document. Marking text causes the text to appear highlighted in yellow.
Contemplated Modification:

Once text is marked, two actions can be performed with it: create a bookmark or copy it to the program maintained clipboard. This requirement is dependent upon InnerView.

Figure 11:
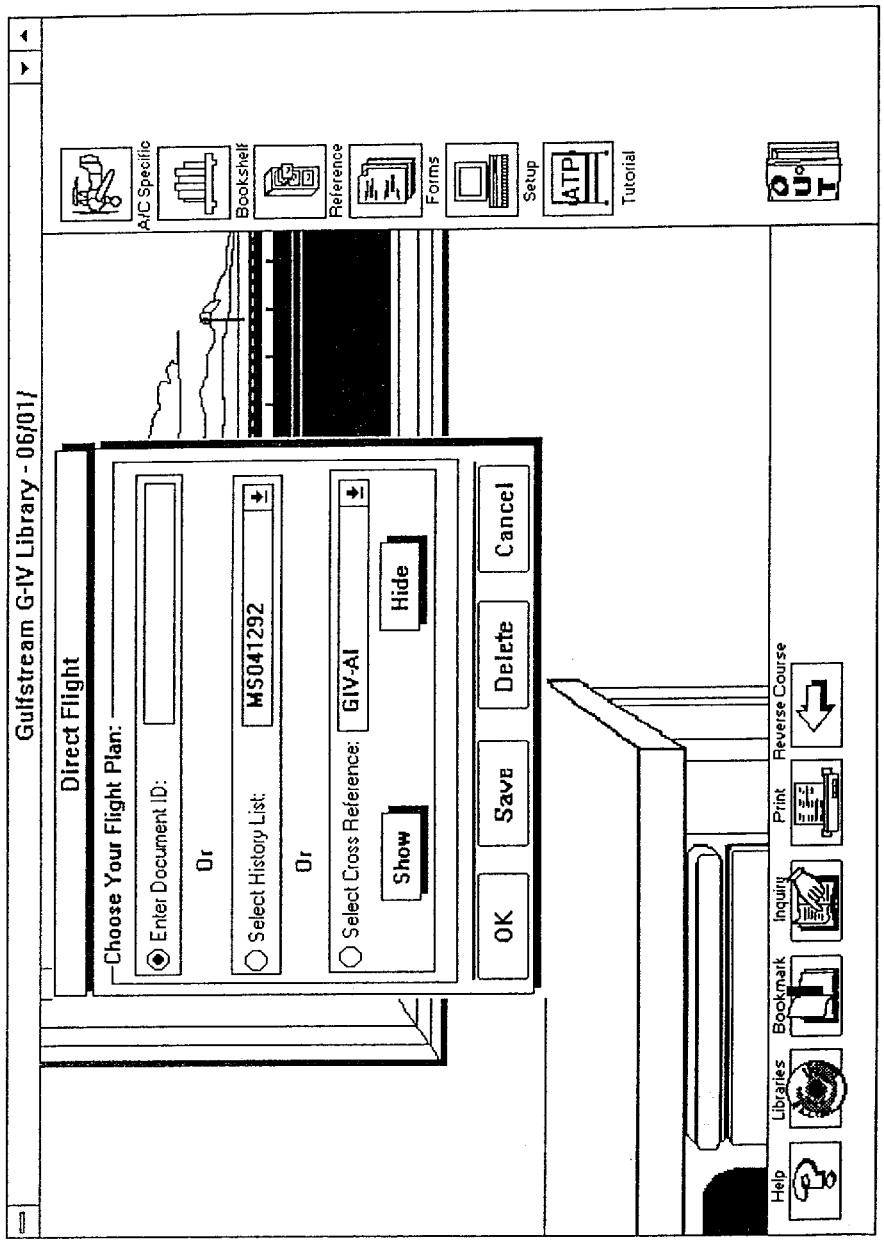

1.4.0 Flight Plan Control Function
Description:
Like a pilot's flight plan, the Flight Plan Control Function suggests methods for reaching a destination by an established route.
Functionality:
(See FIG. 11.)

The Flight Plan function is accessed by clicking the Flight Plan icon. Three Flight Plan options are provided: Direct Flight; History List; and Aircraft Inspector Cross Reference.

1.4.1 Direct Flight Option
Description:
This function allows a user who knows a publication's document type and identification number to go directly to that document without going through one of the modes. This is not designed to be an intelligent, multi-leveled, selection-list type system. The user must know precise information about the document.

The direct flight function supports wildcards (*,?) at the end of the search text string. This allows users to type in the document type code and the first few characters in the document number and receive a selection list of documents that match. This is the same selection list used in Bookshelf Browse.
Functionality:

The Direct Flight option is accessed by clicking on the Flight Plan icon. This opens the flight plan dialog box which allows the user to enter the document identification as the first option, the two character document type code (i.e., TC, AD, or SB) and numeric designator for that document. If no wildcards were used, the next screen shows the actual document in document display. However, the next and previous double arrow boxes on the scroll bar navigate through documents according to the order in which they are organized on the CD-ROM disc, that is, in published order.

If wildcards were included at the end of the search string, then the search results in a selection list. Upon selecting a specific document from the selection list, the next screen is the actual document. Now, the next and previous document tools (in the document display toolbox) navigate through documents according to the order of the preceding selection list.

Figure 12:
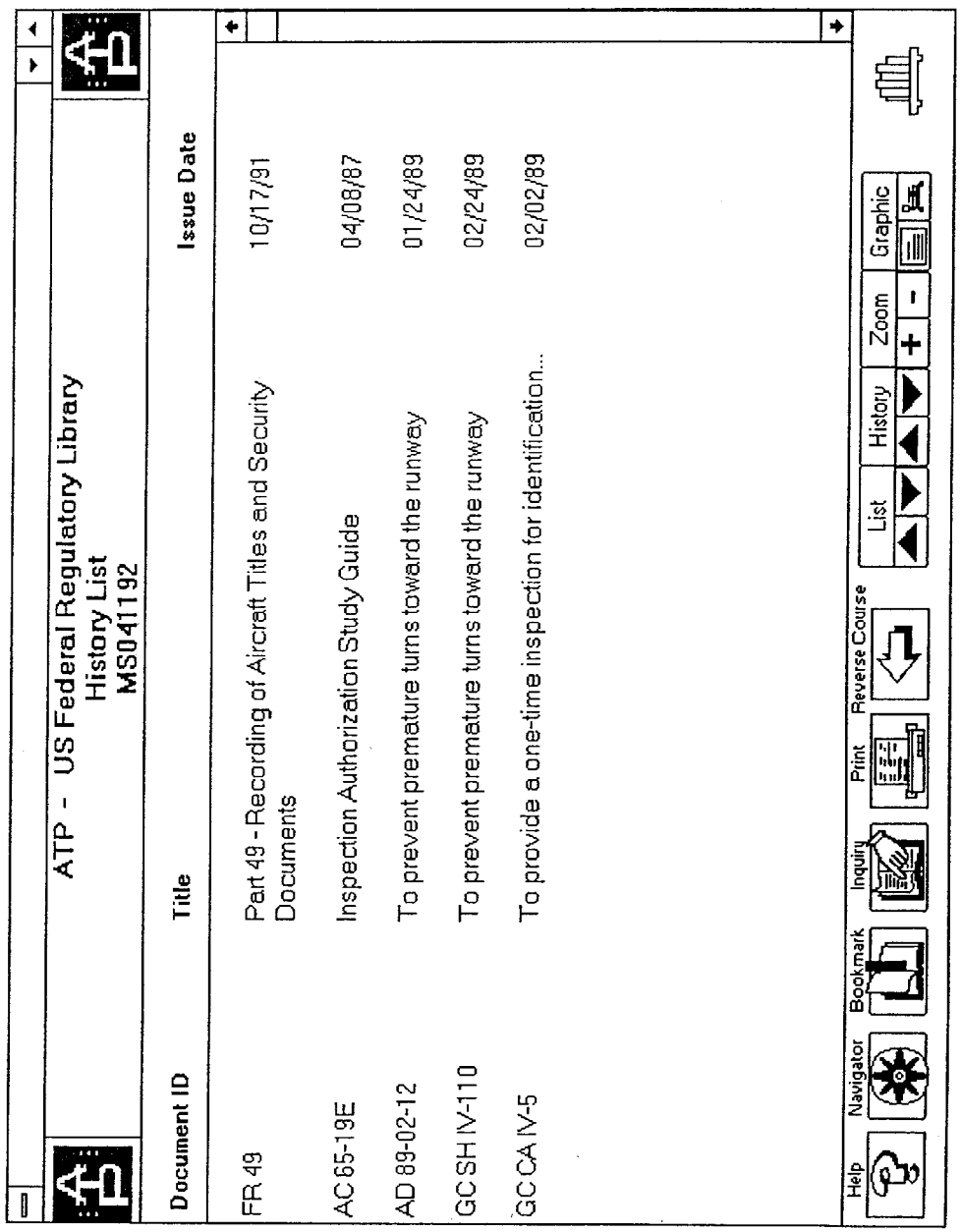

1.4.2 History List Option
Description:
The history list is a list of documents viewed in document display since the beginning of a session. The History icon in the document display toolbox provides access to the current history. The history list option allows the user to jump to a history list in document display.
Functionality:

On the flight plan dialog box are the history list options. On the list of histories is "current history" which is a list of all of the documents a user has viewed in this session. Selecting the current history takes the user to the current history list in document display.
(See FIG. 12.)

Selecting a previous history allows the user to call that history into document display and go to any document on that history. Only one history file can he viewed at a time, and that history file is the one selected from the history list option under flight plan. When a file other than the current history file is being displayed in document display, a message at the top of the screen informs the user "You are viewing a Previously Stored History file named . . . , to view your current document viewing history select Current History as your Flight Plan."

Regardless of the history file selected from the History Map option, only the current history is active. That is, only the current history file is having documents added to it as they are viewed by InnerView. Also, every time that a document is viewed during a session, it is added to the current history (even while another history file is recalled for document display).

No new documents are ever added to a recalled history. Instead, any document the user visits from a recalled history is added to the running "current history" file. When "current history" is re-selected from the history map option, it includes any document(s) viewed using the recalled history file. As always, the current history can be saved as a history file. This provides a "poor man's" cut and paste.

1.4.3 Aircraft Inspector Cross Reference Option

Description:

On a selection list of ADs, the maintenance and repair information system 10 offers the user related SI. Within a document, hyperlinked text takes the user to related graphics, other places in the text, or entirely other documents. The Aircraft Inspector's Option is yet another tool to link one document location to another. It is an index that links a location in one publication to a location in another.

This index is presented to the user in a dialog box that can be positioned anywhere over the document display area. The box consists of three fields: Destination; Title; and Keyword.

The cross-reference index that supports this dialog box is created to support a link between two documents. It can be configured with the following four fields: From; Destination; Title; and Keyword (word search expression to be passed to InnerView).

It is noted that "From" is the document location in InnerView where these cross-references are valid. It is also noted that the supporting index can specify a from location so it applies to several portions of a publication by using wildcards. For example, if a from location for a maintenance manual specifies 32-7-* (chapter 32 section 7 subject *), then that from applies to all subjects in that section.

Furthermore, it is noted that this index dictates a "one-way" relationship. A two-way index where the "destination" in the above example points back to the "from" may include these fields: X-Ref A; Title A; Keyword A (word search expression to be passed to InnerView); X-Ref B; Title B; and Keyword B (word search expression to be passed to InnerView). This index could still support wildcards with the user being taken to the top of the text included in a wildcard. This index, by not distinguishing "from" and "to," does not allow for as much pointing flexibility as the first model. Index format should be decided based on system design considerations.

With respect to the cross-reference dialog box, "Destination" is the exact place in a document to which the user is taken. "Title" is associated with the place to which the user is taken. Also, "Keyword" (when present) is the word that is highlighted as a word search hit when the user reaches that location. For the maintenance and repair information system 10, find is a word search expression to be searched against the document being pointed to.

Figure 13:
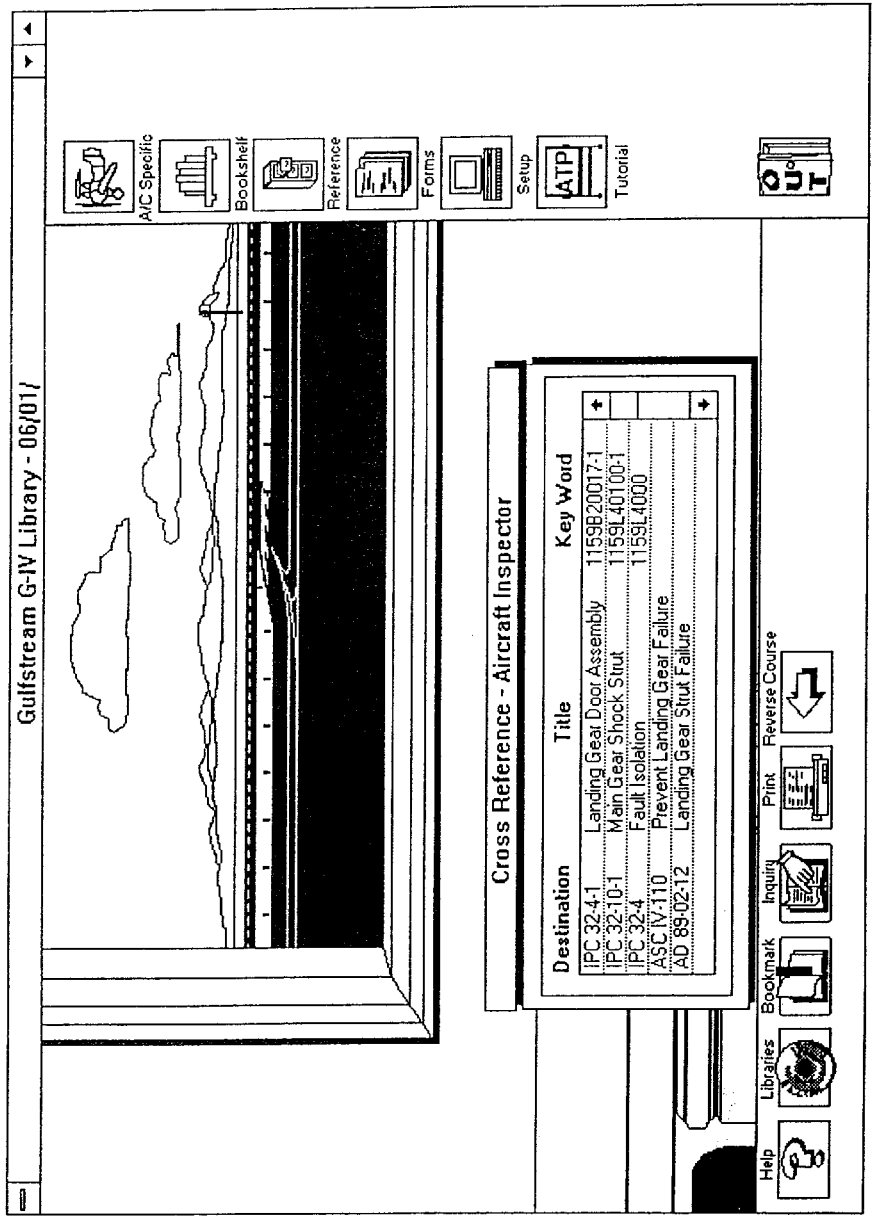

Functionality:

(See FIG. 13.)

The Aircraft Inspector Cross-Reference Option is only available when the user is in document display and a document is specified (either being viewed or highlighted in a selection list or history list; not from the navigator screen, as FIG. 13 shows). The Aircraft Inspector Cross-Reference is an option available from the Flight Plan control function. If this option is unavailable, the option reads "Aircraft Inspector" and is grayed out. If available, the option reads either "show aircraft inspector" or "hide aircraft inspector." Since having the box hidden is the default, "show aircraft inspector" is the default choice.

When displayed, the Aircraft Inspector's box is aware of the user's location in the current document. Using that location as the "From," all items in the index with that identification are displayed in the Aircraft Inspector dialog box.

The Aircraft Inspector dialog box is a fixed size. If there are more items in that box than can be displayed, a scroll bar allows the user to scroll through every item. Clicking on an item in the dialog box takes the user to that document location and at the specified location (submitting the word search find expression if appropriate). For the purposes of selection and history lists, this is a flight plan link just like the direct flight option.

1.5.0 Print Function

Description:

The print function accesses print processes for every part of the maintenance and repair information system 10 system. The functionality provided by the print function varies depending upon what is currently on the screen and what the user wants to print out.

The print function icon is the only way to access printing. As in other Windows applications, the Print Screen key is used to copy the current screen to the Clipboard.

Because of the re-organization of pages away from their original layout, one page of the original document may take up considerably more or less than one page upon reprinting. Therefore, printing is not dependent upon the original page structure. Whatever text happens to fit on a page is printed there. Page numbers and revision information (which have all been forced to precede the text that originally appeared on the page) is printed wherever inserted into the document to serve as a marker of the original page breaks. This means that on a printed page there may be more than one page number/revision information marker which do not necessarily appear at the top of the page.

Figure 14:
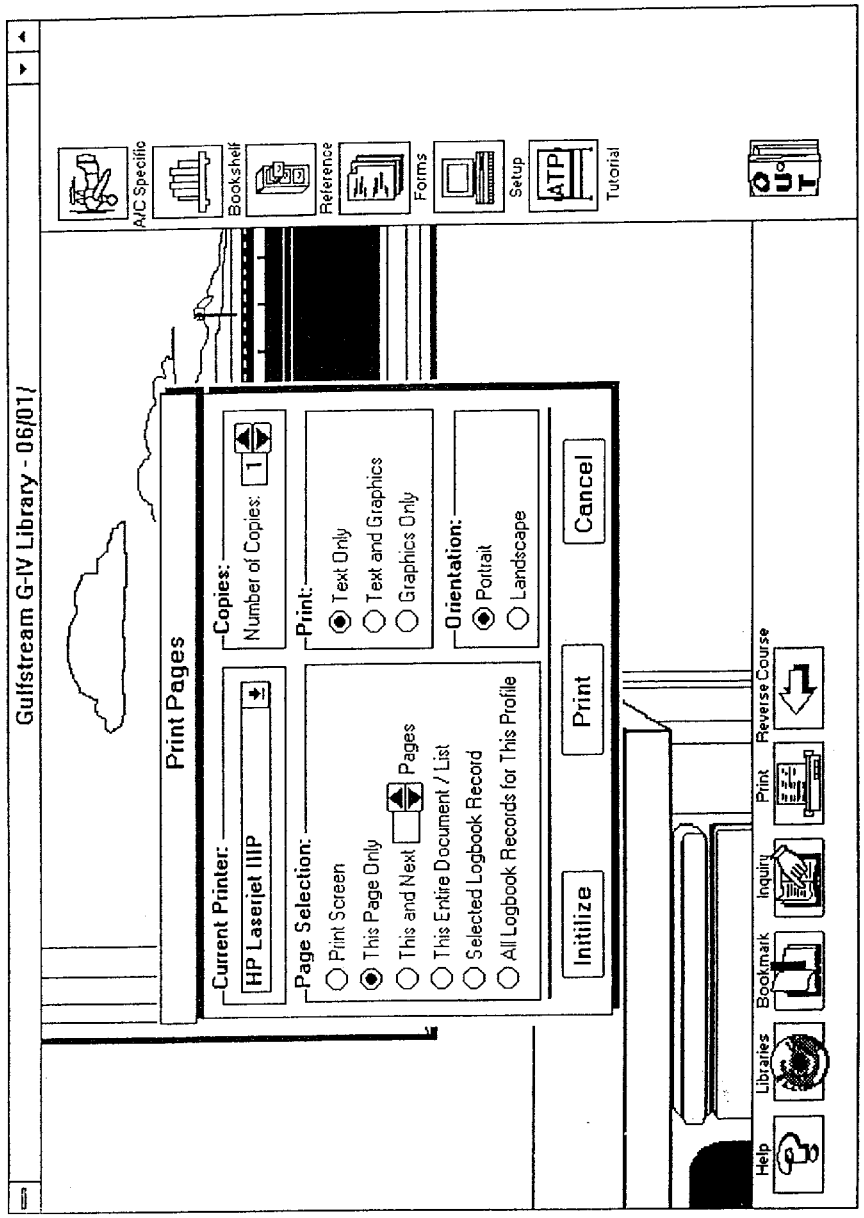

Functionality:

(See FIG. 14.)

When the user clicks on the print function icon, a dialog box appears on the screen indicating the print options that are currently available. All of the possible print options are included. Those that are inappropriate for the current print job would appear grayed out.

The print function is always active whenever the print function icon is displayed. However, when a document (anything in document display), an aircraft profile, a publication list, or a selection list does not appear on the screen, the user often has only one option, namely, print the current screen. The print screen option only prints the title bar and work area of the screen. Function icons on the bottom and mode icons on the right-hand side of the screen are not printed.

When a document (anything in document display including selection lists and history lists), an aircraft profile, or a publication list appears on the screen, unique print options allow the user to print the information in several meaningful formats.

Everything printed has a standard header which includes the subscriber name entered during system setup, as well as the current user name, date, and time. The library service provider copyright notice, as well as any publisher/manufacturer copyright and disclaimer notices, are also printed as part of the header on these reports. It is noted that this standard header is dependent upon the InnerView print function.

The print dialog box also offers a toggle between landscape or portrait mode. This choice is grayed out if the print dialog box was accessed from a selection list.

It is noted that this is a work-around way of offering a convenient way to print landscape. However, it is potentially inconvenient to a use printing an entire document with only one page that needs to be printed in landscape.

1.6.0 Reverse Course Function

Description:

The Reverse Course function allows the user to retrace his or her steps back though the program.

Figure 15:
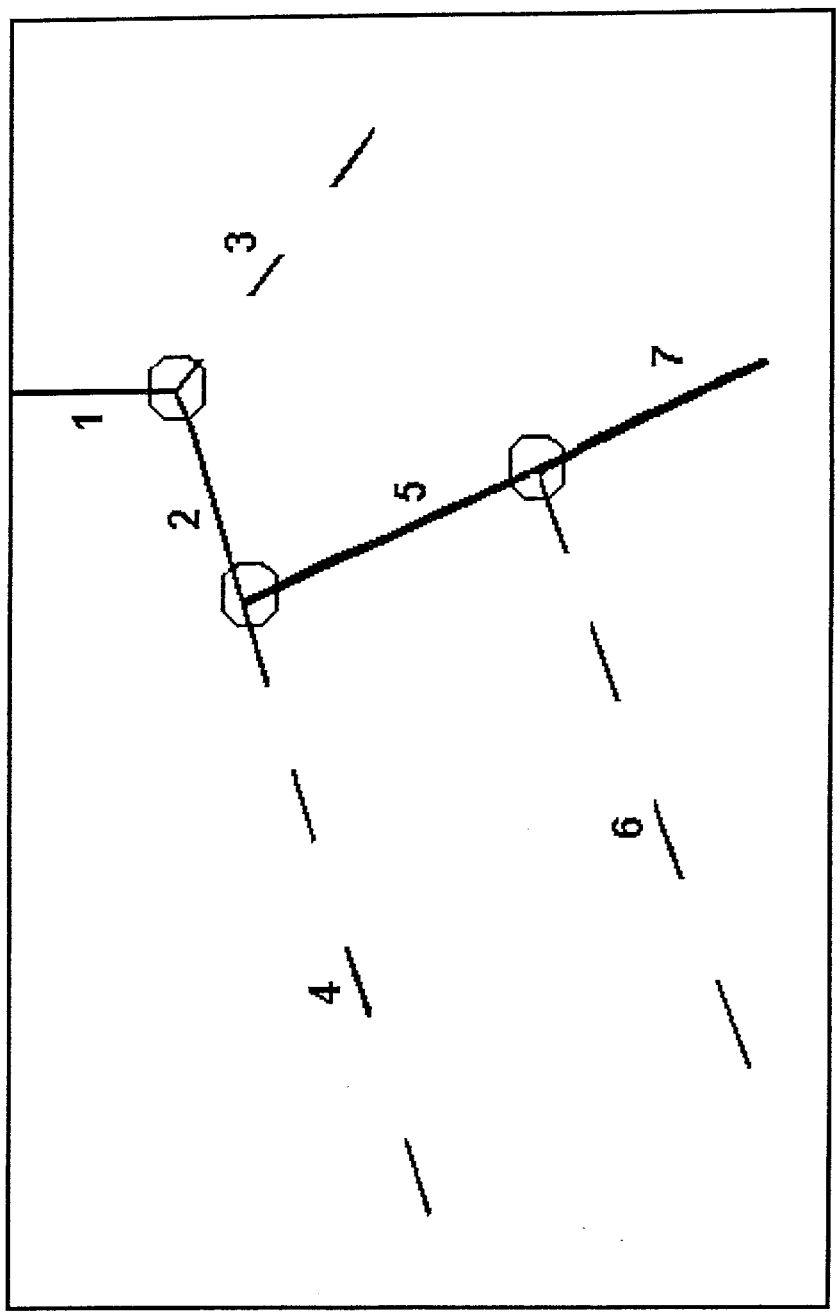

Functionality:

When the reverse icon is selected by left mouse click, the user is returned to the previous screen. This allows a user to reverse the steps used to "navigate" to the current position. (See FIG. 15.)

Nonetheless, the reverse function does not merely remember all the branches a user takes and play them back sequentially. The path history stored by this function is always a backward/forward history.

To clarify with the chart, if the user steps down a path including legs 1,2,5, and 6, but then backs up to follow a new forward branch 7, the path forgets about the original branch and adds the new branch to the recorded path of the user. Using the reverse feature always allows a user to back up all the way to the navigator screen, but without revisiting various branches at the same level. The reverse icon is active only if there is a way back to the previous screen.

Examples:

If in the Aircraft Specific Mode a user was working with the publication function, and uses the reverse function to get back to the profile display dialog box, and now elects to use the inspection aids and routine maintenance function, then the steps the user followed down the publication function are lost, but the steps the user is now taking down the routine maintenance function are added to the steps the user took to get from the navigator screen to the profile display dialog box.

1.7.0 Exit/Return Flight Function

Description:

The icon in the lower right corner of the screen is the one control function icon that changes during operation of the maintenance and repair information system 10. From the Navigator screen, this is the exit icon and provides the only way to exit the program. From any other mode, this icon changes to a copy of the mode icon of the mode currently active and gives the user a way to jump back along the existing path to the first screen of the mode, that is, the exact same screen the user is taken to when he or she click the icon from the navigator screen. It is noted that a Return Flight does not wipe out the stored path. The user could use the forward arrow of the path function to return to where he or she was.

Figure 16:
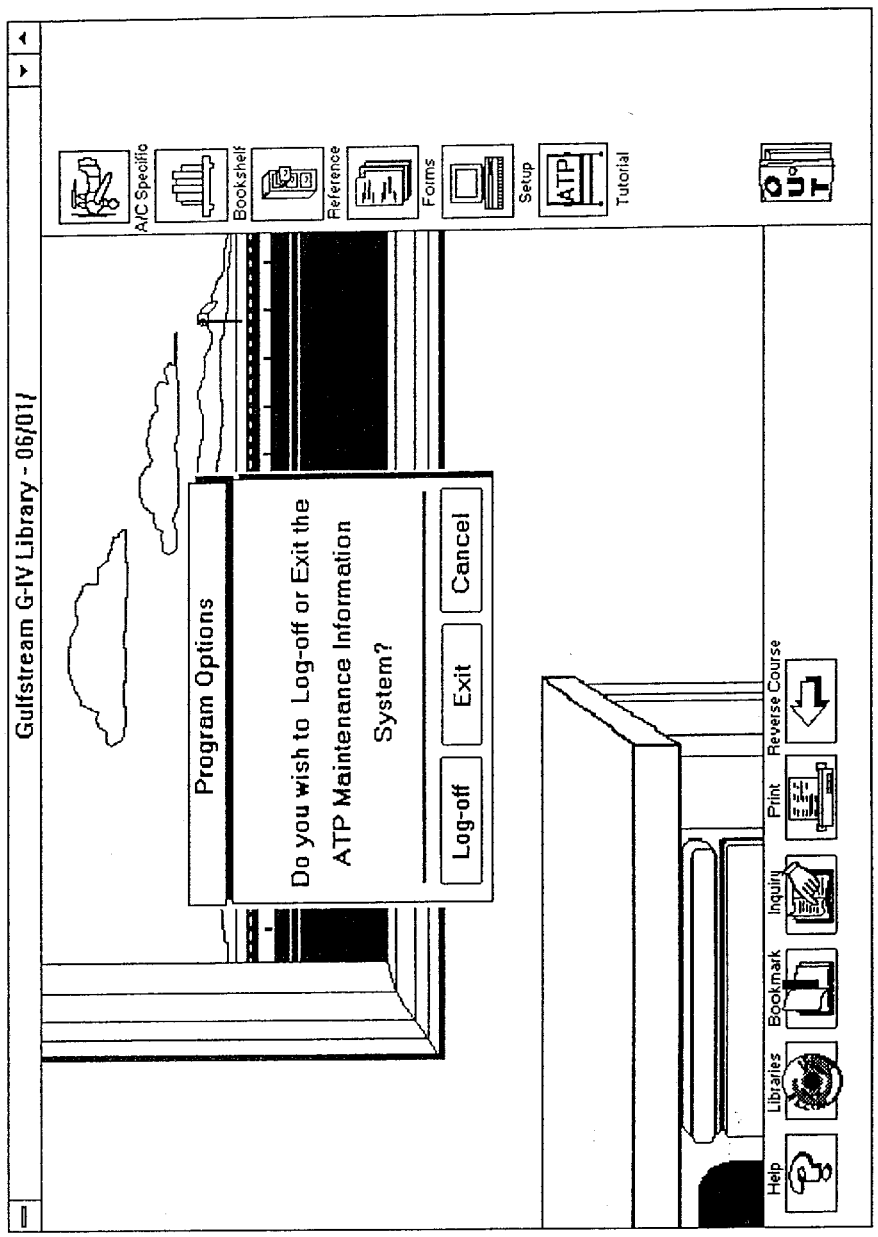

(See FIG. 16.)

Functionality:

From the Navigator Screen, when the Exit Function ICON is pressed, the user is taken to an exit dialog box that verifies that the user really wants to end this session with the maintenance and repair information system 10 and specify where the user wants to go. Dialog box options are: Log-off (End this session and log-off current user); Exit (Shutdown the maintenance and repair information system 10 and exit to program manager); and Cancel (Return to Previous Screen).

If password protection was selected upon installation, then selecting Log-off from the exit dialog box removes the user and returns the program to the log-in screen where another user can log-in with his or her password. If password protection was not selected upon installation, then selecting End Session merely returns to the product selection screen. Selecting shutdown leaves the maintenance and repair information system 10 altogether and returns to Windows.

Upon shutting down, Exit takes care of any necessary shutdown sequences. An end of program screen is displayed momentarily before the program actually returns to Windows.

2.0.0 Aircraft Specific Mode

Description:

The Aircraft Specific Mode allows the user to search for technical information based on an aircraft profile which uniquely identifies either an aircraft or particular components on an aircraft. This mode also provides for creating, storing, and editing aircraft profiles. To maintenance professionals, the Aircraft Specific Mode is the most important mode.

Figure 17:
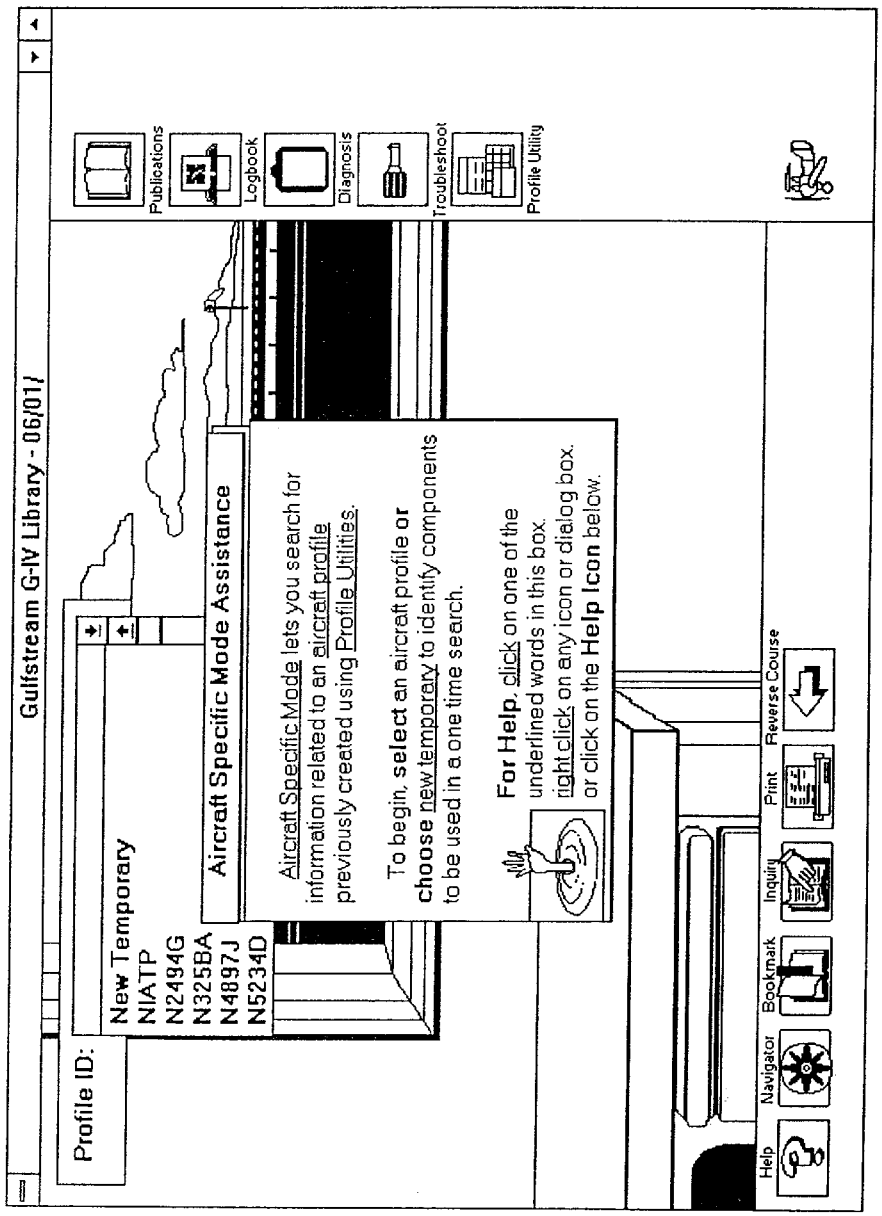

Functionality:

(See FIG. 17.)

A user chooses the Aircraft Specific Mode by pressing the Aircraft Specific Mode icon. The opening screen includes a user help information box.

Removing the box with any keystroke reveals the aircraft profile dialog box which is blank. A new set of option icons appear on the right-hand side of the screen. These represent the options to be used within the aircraft specific mode, namely: Publication Search; Electronic Logbook; Problem Diagnosis; Trouble Shooting; and Profile Utilities.

2.1.0 Aircraft Profile Function

Description:

The aircraft profile uniquely identifies an aircraft (or a component, or collection of components) for use in searching publications for related information. A user must enter an aircraft profile to use the Aircraft Specific Mode.

Figure 18:
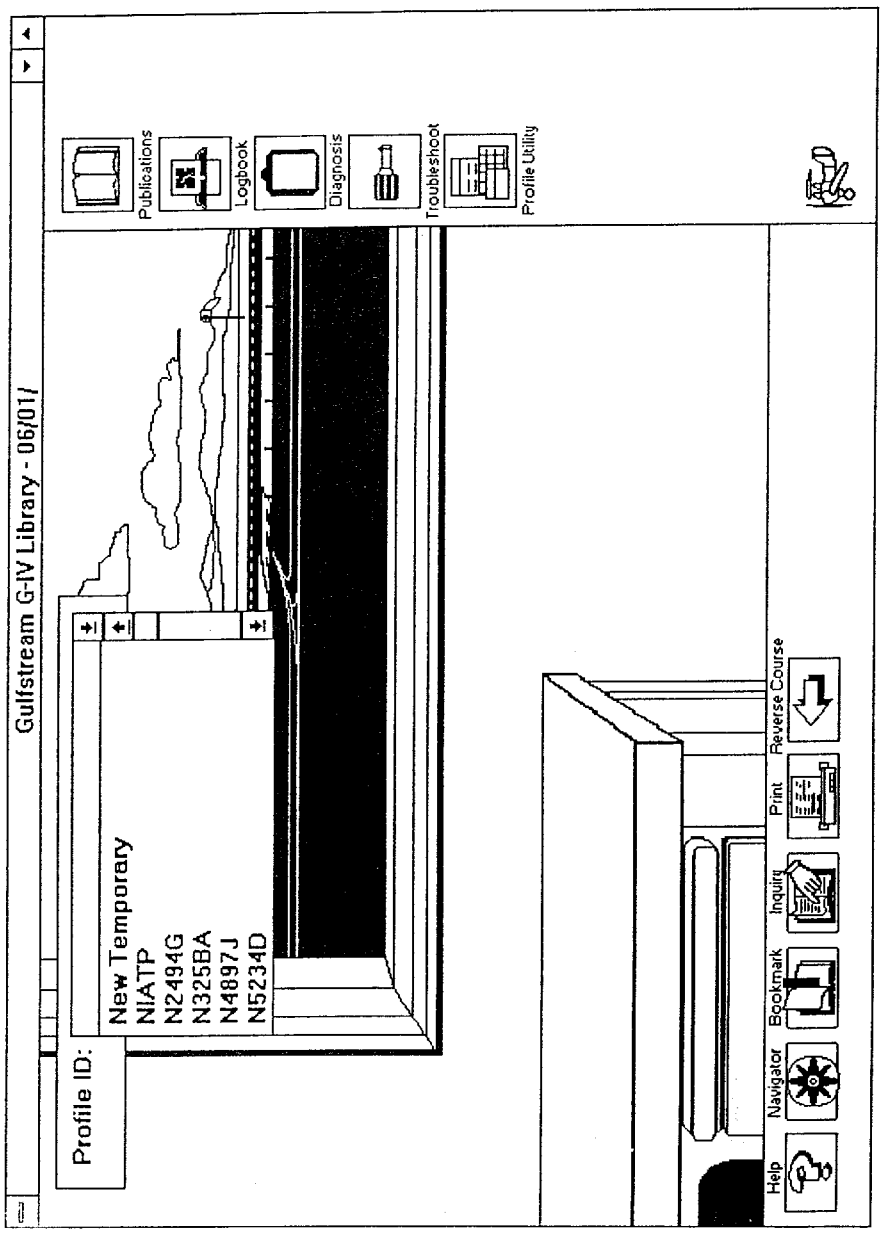

Functionality:

(See FIG. 18.)

When the user chooses the Aircraft Specific Mode the Profile ID field in the profile dialog box allows the user to load an existing profile, or choose the temporary profile option by selecting "new temporary" which is always the first profile identification. Only that field is displayed on the yellow pad, so focus is clear.

The Aircraft Profile function does not provide for creating or editing profiles. This functionality is found under profile utilities.

2.1.1 Existing Profile

Description:

This allows the user to work with an existing aircraft profile, a profile created earlier under Profile Utilities and saved to the hard disk.

Figure 19:
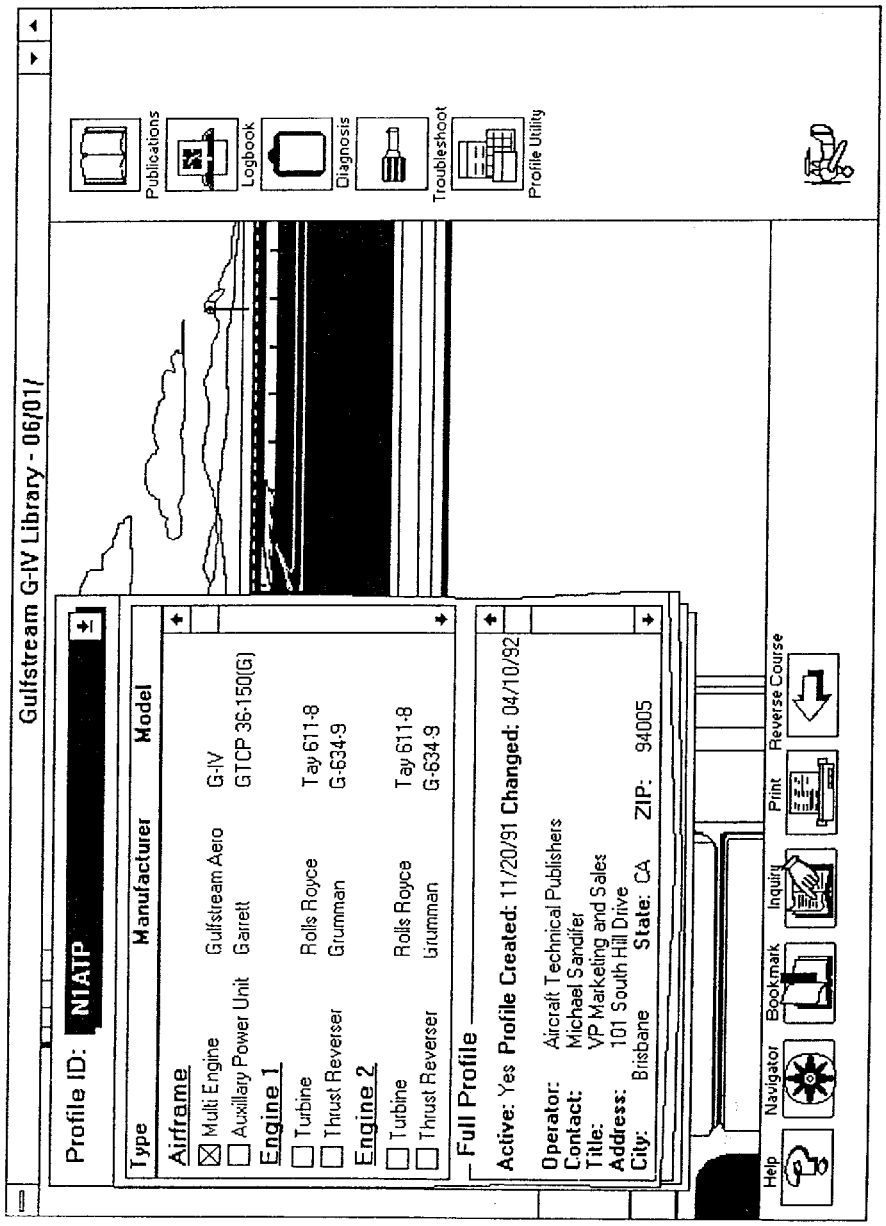

Functionality:

(See FIG. 19.)

The user chooses to load an existing profile, from the word wheel of all existing profiles presented in the Profile ID field. Only a single profile can be selected at a time.

Upon selecting a profile, the components that constitute that profile are called into the profile component listing sorted by category (e.g., airframe, engine, propeller, accessories, avionics, etc.). It is not possible to edit or delete a profile or its individual components from the profile component listing. Editing and deleting are performed from the Add/Edit Profile option under the Profile Utilities function.

A profile is loaded into the profile component listing to be used as search criteria for the Aircraft Specific Mode functions. However, it is not necessary to accept the entire component listing as search criteria. The user can select one or more individual components by clicking on that component's check box. The user can select all the components in a category by clicking on a category heading. If no specific components are selected, then the maintenance and repair information system 10 assumes that the entire profile is intended to serve as search criteria.

2.1.2 Temporary Profile

Description:

With a temporary profile, the user can build a list of components (or enter a single component) into the Aircraft Profile dialog box without establishing any profile data. This allows the user to perform an ad hoc aircraft specific search on several components without creating a permanent profile.

Figure 20:
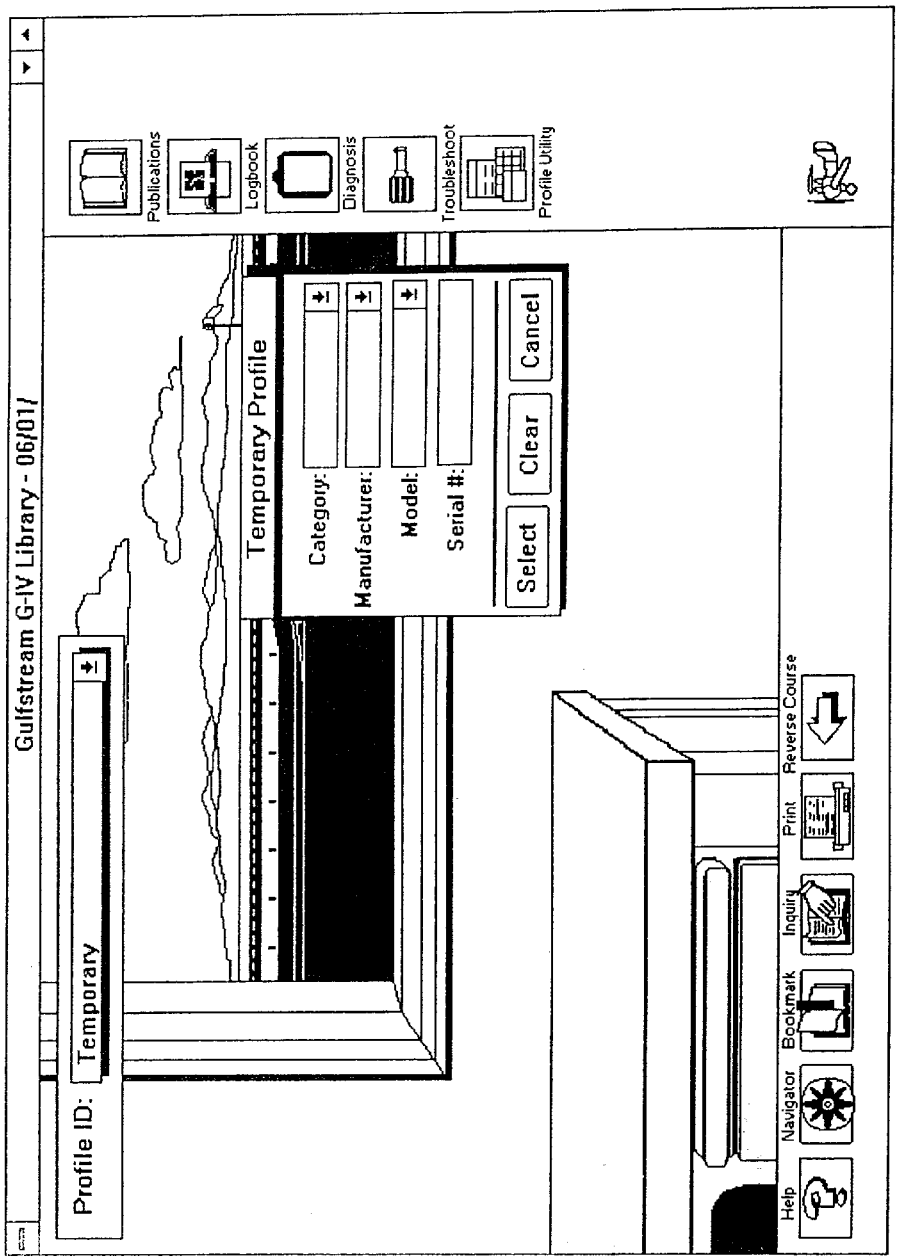

Functionality:

(See FIG. 20.)

The Temporary Profile dialog box appears adjacent to the yellow profile pad when "New Temporary" is selected from the list of available profile identifications. New Temporary is the first item in the Profile ID word wheel.

Of the fields available in the Temporary Profile dialog box, the user must provide at least the manufacturer and model of the listed components in order to perform a search. Serial number can also be available as a search tool. Any occurrence of serial number is grayed out by the maintenance and repair information system 10. There is only one box on the yellow profile pad because no profile or records are associated with the temporary components, so the information presented below is non-existent.

As components are added to the temporary profile, they are added to the yellow pad. These components are the temporary components that appear on the yellow profile pad until the user either leaves the Aircraft Specific Mode or clears the pad by selecting New Temporary. This allows the current temporary profile to be used as the default profile for all the aircraft specific functions.

Using the temporary profile establishes much of the same search criteria specified in the Bookshelf Search function. However, here the user can specify criteria for several components. In either case, the search performed against an aircraft profile generates the same type of publication selection list generated by the Bookshelf Search function. These selection lists include the fields as outlined in the Authority File Tables in Appendix A.

2.2.0 Publication Search Function

Description:

The publication search function allows the user to search publications for information applicable to the current aircraft profile.

Figure 21:
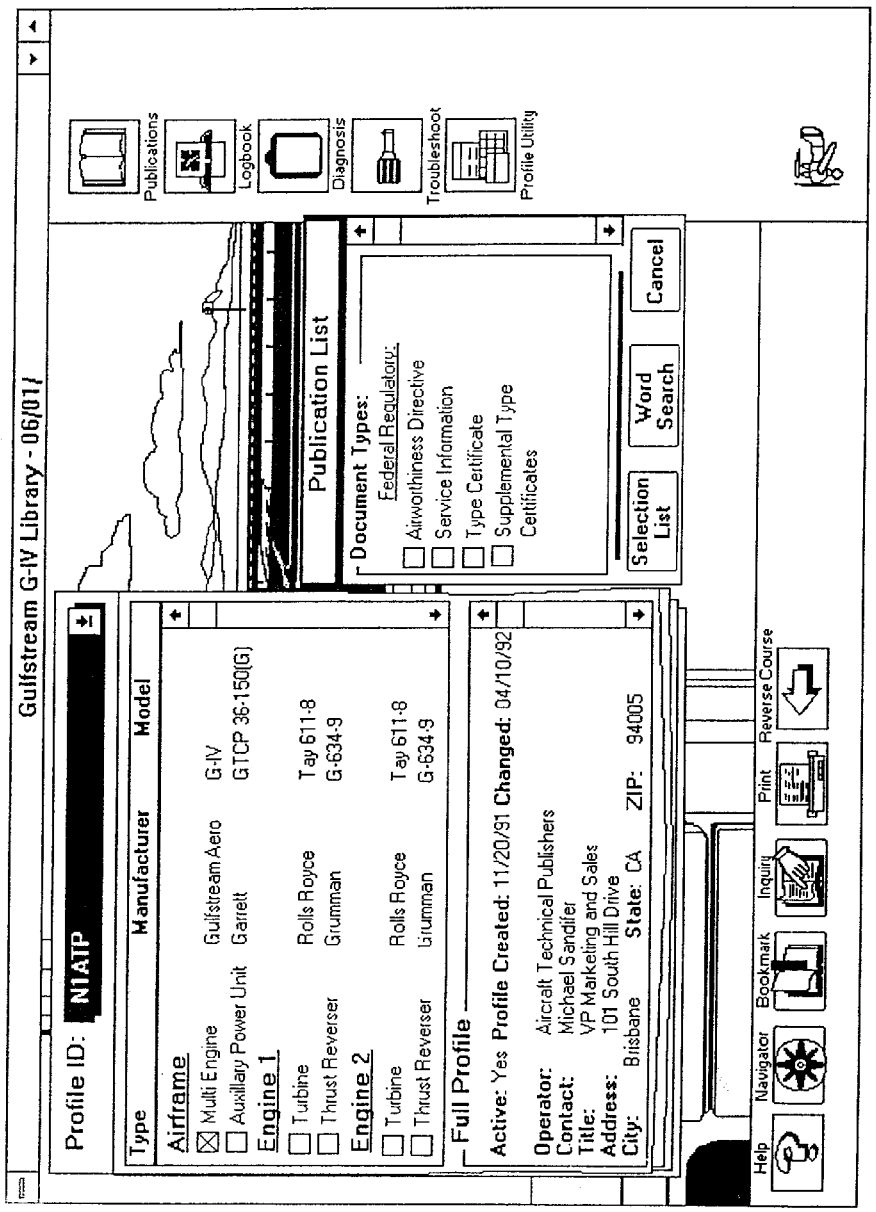

Functionality:

(See FIG. 21.)

The user can select specific components from the current aircraft profile to be the qualifying search criteria. If no individual components are chosen, then it is assumed that all the components in the profile are to be included in any publication search.

Upon selecting the publication search function by clicking on the publication search icon, the maintenance and repair information system 10 determines the applicable documents based on the components selected from the profile and generates a publication list.

The publication list is presented with check boxes in dialog box format so that it is possible for multiple documents to be selected. When publication categories other than regulatory exist in a publication list, particular publications, not just publication types, appear in the publication list.

2.2.1 Publication List Options

Description:

In producing a publication list, the maintenance and repair information system 10 limits the available publication types to those applicable to the current profile. However, the user can further limit the number of publication types to be used in an upcoming search by selecting certain publications (in the case of regulatory, a user selects publication types).

Functionality:

The publication list dialog box presents those publications or publication types relevant to the current profile. Also, for any publication type, the number of publications relevant to the current profile is also displayed. When an actual publication is listed (i.e., the Gulfstream G-IV maintenance manual) the numeral 1 should not appear after it. Check boxes allow the user to choose publications or publication types to view or search. Multiple publications or publication types can be selected from the publication list at any one time if the intent is to do a Word Search.

However, if the user intends to go directly to a selection list, then only one publication (or one regulatory publication type) can be selected at a time. Once the desired publication (s) has been selected from the publication list, the user clicks one of the publication access control buttons to continue the Publication Search.

2.2.2 Publication Access Options

Description:

From a publication list the user can either go directly to a selection list of a chosen publication as it relates to the current profile or elect to add word search criteria to the publication search.

Functionality:

The access options are presented as control buttons on the publication list. The number of access options depends upon the availability of the various sorts for each document type.

The federal regulatory product offers two access methods: Selection List and Word Search. The ATA Sort option is grayed out for the regulatory product, because regulatory publications do not have an ATA established order. All access options are available for manufacturer specific products, such as those available from Gulfstream.

Regardless of the type of search performed, if no related documents are found, an information box informs the user that there are no documents that meet the search criteria.

Contemplated Modification:

Additional sorts can be defined and added, and this list can expand to accommodate the searches/sorts that are available.

2.2.2.1 Publication Word Search Option

Description:

The publication word search option allows a user to search the documents marked on the publication list for the occurrence of a selected word or phrase. The publications are still checked against the current profile, but they are also required to meet the word search criteria in order to be added to the selection list.

Figure 22:
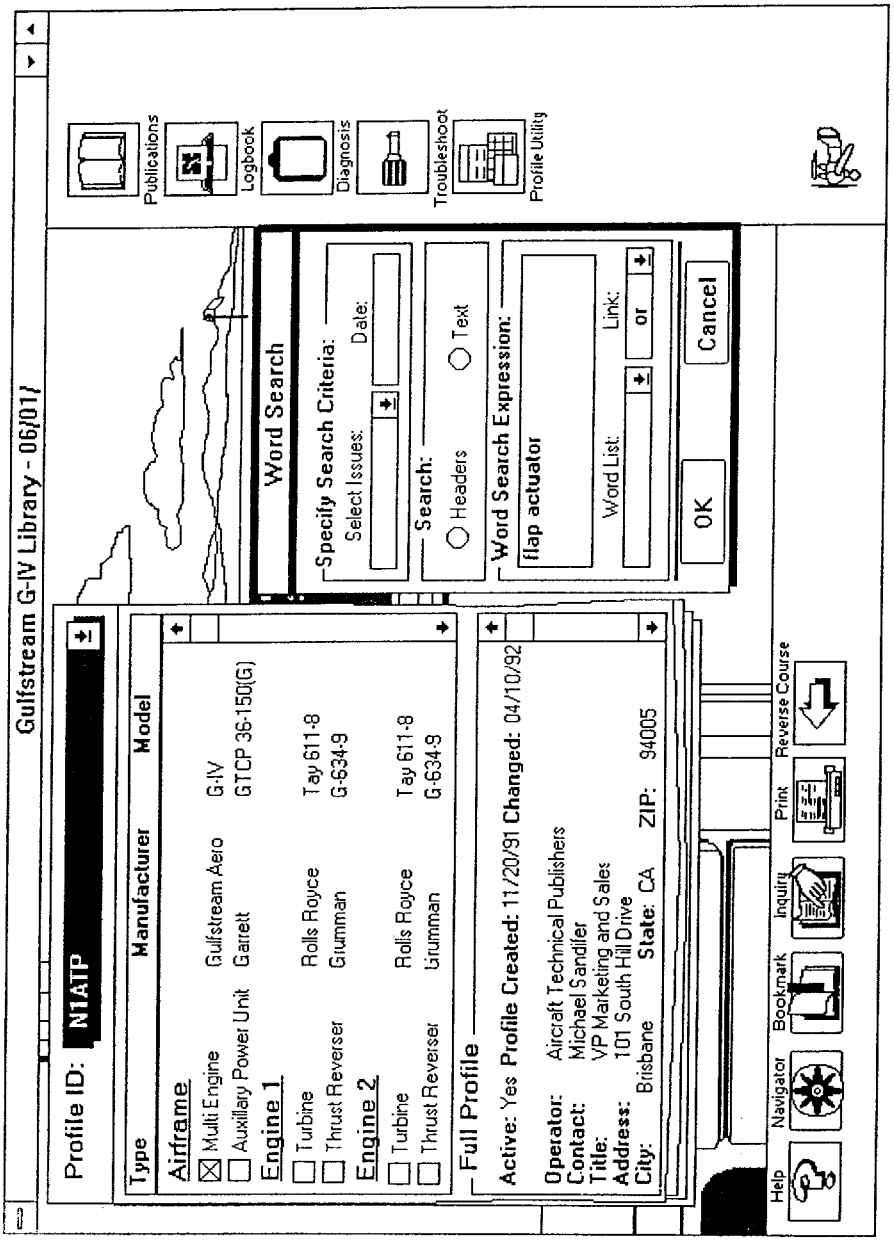

Functionality:

(See FIG. 22.)

No matter what document(s) is marked on the publication list, word search is initiated in the same manner. First, the standard word search dialog box (as used in Bookshelf Word Search) allows the user to build a search expression to search, and radio buttons to select either the header or all document text to be searched. Issue date is also part of the standard word search box.

The word search expression and document identification is passed to the InnerView engine for searching. If more than one publication type is found to contain the word search expression, the maintenance and repair information system 10 displays a second publication dialog box showing the new number of publications available after the word search. If only one publication type contains the word search expression, then the user is taken directly to a selection list.

It is noted that when a document is finally displayed as a result of a word search, hits from the word search are highlighted within the document, and the user is able to jump from one word hit to another when viewing the document in document display with the word hit next/previous tool.

Since the InnerView search routine is preferably used, full Boolean search capability exists. The ability to build a search expression with boolean links is built into the dialog box.

Cross References:
Document Display, Text Display
2.2.2.2 Selection List Option
Description:

This option allows the user to generate a selection list of the document sections or regulatory documents that he or she selected from the publication list that applies to the current aircraft profile.

Figure 23:
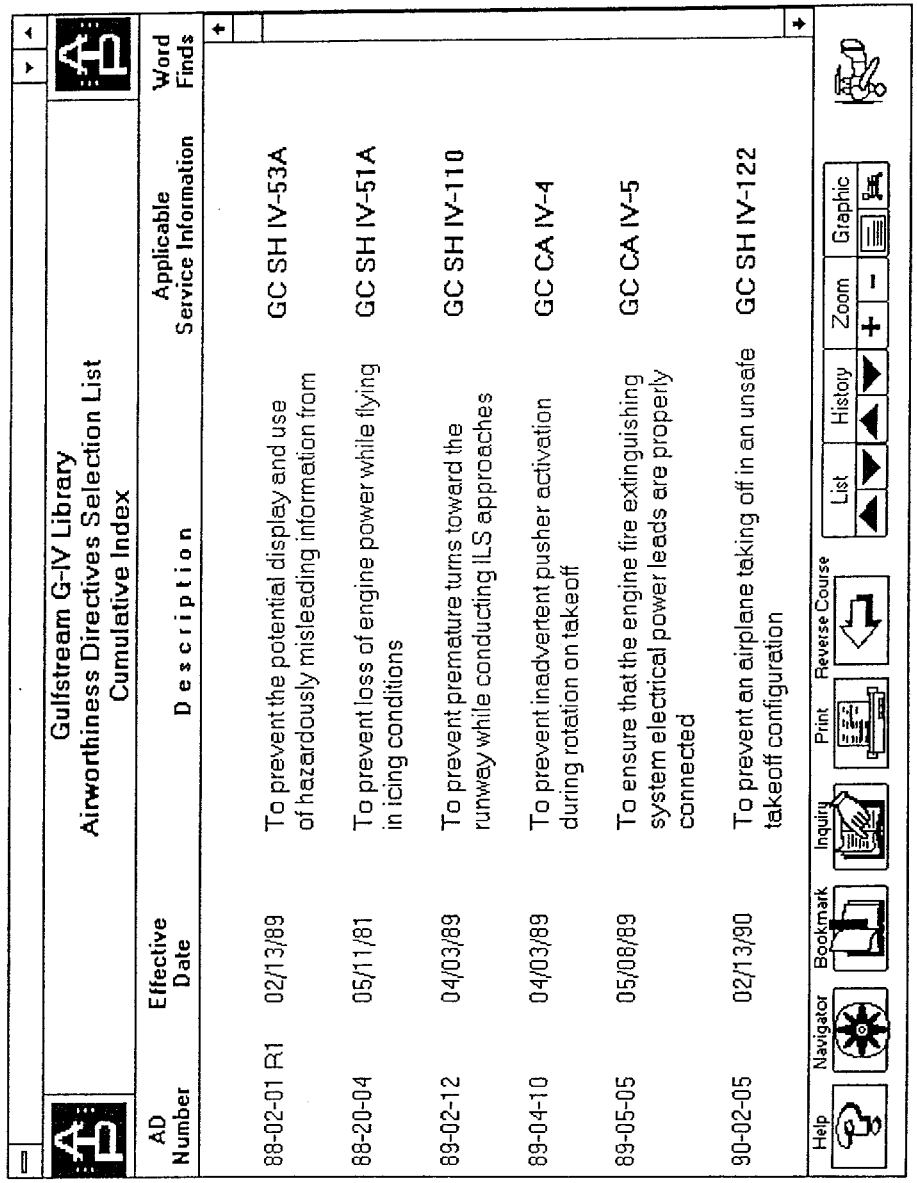

Functionality:
(See FIG. 23.)

The selection list option is only available when one publication or publication type is checked. The Selection List option takes the user to a selection list of publications related to the current aircraft profile.

The selection list is unique for each document type as defined in the Authority File Tables in Appendix A.

2.2.23 Publication ATA Sort Option
Description:

When a publication chosen from the publication list has an established ATA ordering convention that applies to publications of its type, then an ATA-ordered selection list is provided for that publication, even if the publication isn't really ATA standard. This option is not applicable to the regulatory library.

Functionality:

Selecting ATA Sort indicates the desired browse sequence for the selection list that is created for the selected publication type when searched against the aircraft profile.

2.2.3 Publication List
Description:

A publication list is the result of any publication search resulting in more than one document. This is the exact same type of list presented initially when selecting the publications search function, only it is presented again after a search has tried to limit the number of available publications.

This list is created on the fly by the maintenance and repair information system 10 based on user selections, but it is not a selection list and does not appear in document display.

Functionality:

A publication list appears in a dialog box and shows the publications or publication types available based on specified search criteria. For publication types, it shows the number of publications within that publication type that are still available.

It is noted that the number in the publication list dialog box does not reflect the total number of word search hits, only the number of publications (actually InnerView documents) in which the word search expression occurs at least once.

2.3.0 Electronic Logbook Function
Description:

The Electronic Logbook function offers tools to: identify what maintenance tasks are required by various publications; record compliance with maintenance tasks into an electronic logbook; collect inspection and sign-off information; track squawks and their resolution; and print out reports to attach to the actual paper logbooks.

This tracking of maintenance tasks is what a user currently does in a paper logbook. Since the maintenance and repair information system 10 has been developed to generate all of the documents that call for maintenance activity, the next step is to compile the list of required maintenance activity and then track compliance, that is, the completion of those tasks.

Currently, the Federal Aviation Regulations require the up-to-date original logbooks to be kept at an airplane's base of operation. FARs also require that any mechanic who services an aircraft sign the original logbooks. If the airplane should ever need service somewhere other than its base, one regulation or the other is often violated. In fact, operators are frequently forced into violation because of this contradiction in the law. Electronic logbooks offer more flexibility, and the ability to have multiple "original" logbooks.

Electronic Logbooks utilize records with unique keys which identify the site that creates each record. Subsequent changes to a record may occur at other sites, but the key always reflects the site that first created it. In this manner, each record is always unique, allowing records to be exchanged between maintenance and repair information systems 10 without duplication.

To provide data security for inspection and compliance records, a write protect flag is set automatically upon extraction of a record during electronic logbook transfer. Although write protected records could still be altered by the site that created them, the records would be unalterable to other sites, thus securing the inspection and compliance information.

Figure 24:
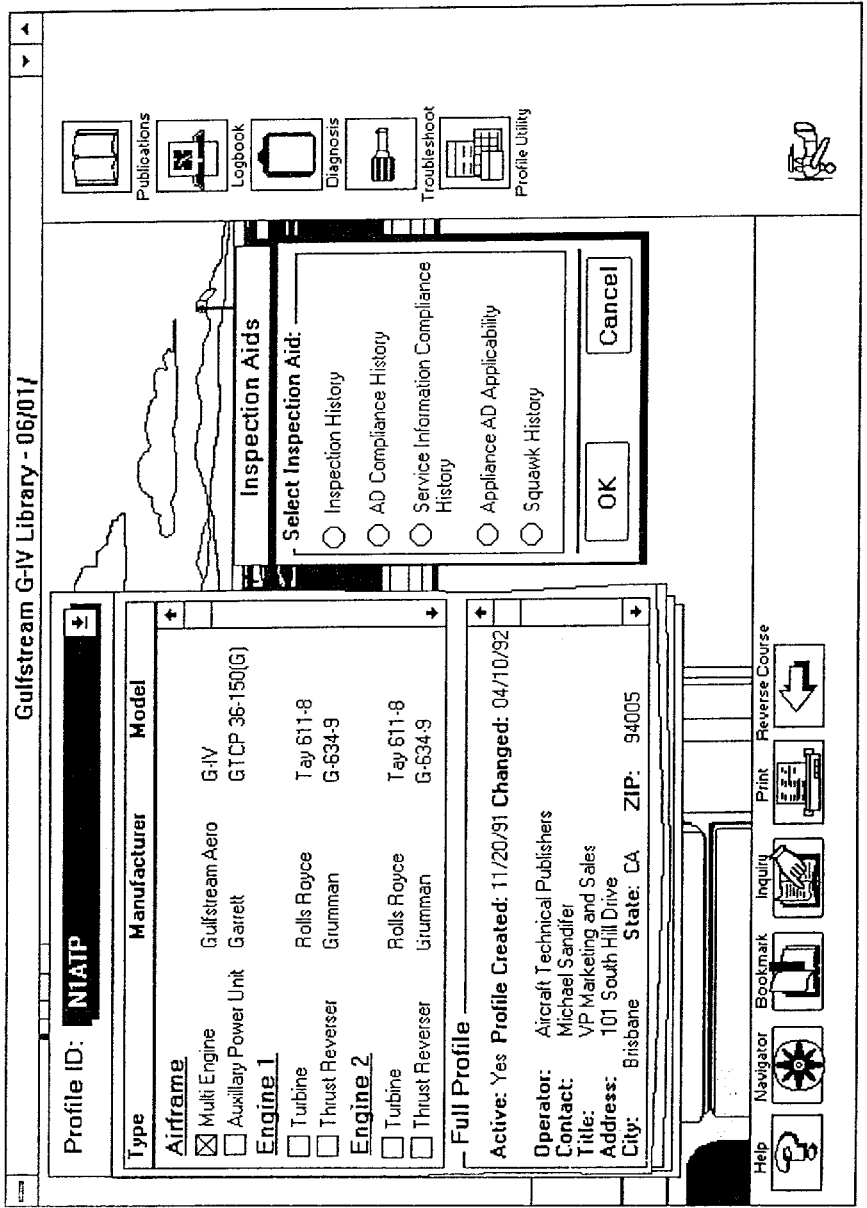

Functionality:
(See FIG. 24.)

Choosing the Electronic Logbook function displays an inspection dialog box with the following bulleted options: Inspections; Airworthiness Directives Compliance; Service Information Compliance; Appliance Applicability; Squawks; and, preferably, Job Card. Each of these options selects a database management function which allows information to be entered and tracked for that part of the electronic logbook based upon the selected Aircraft Profile.

It is noted that because of the complexity of many of the screens, a new user assistance box is presented at the beginning of each section in the electronic logbook option to explain to new users how to get started. It is also noted that because the maintenance and repair information system 10 is not required to be serial number specific, there can be some "false hits" (cases where an AD or SI is found by the computer as applicable with respect to manufacturer and model when in reality it is not due to serial number). The user needs to be informed or trained regarding false hits.

An information box is preferably displayed after using the Find ADs, Find SI, or AD applicability Find options explaining that all of the publications determined to be applicable should be checked to see if they are serial number specific. In this case, they may not apply to the current profile.

2.3.1 Inspections

Description:

Many different types of inspections are performed on an aircraft and its components. From annual inspections to the determination that routine maintenance has been performed in accordance with the approved procedures. Inspection records track which maintenance facility and inspector performed the inspection and when it was done. The inspection is recorded in compliance events and appliance AD applicability, as well as squawk resolution. In this manner, the maintenance and repair information system 10 tracks what activity was accomplished at each inspection. This section of the electronic logbook tracks inspections for an entire profile and that profile's components.

Figure 25:
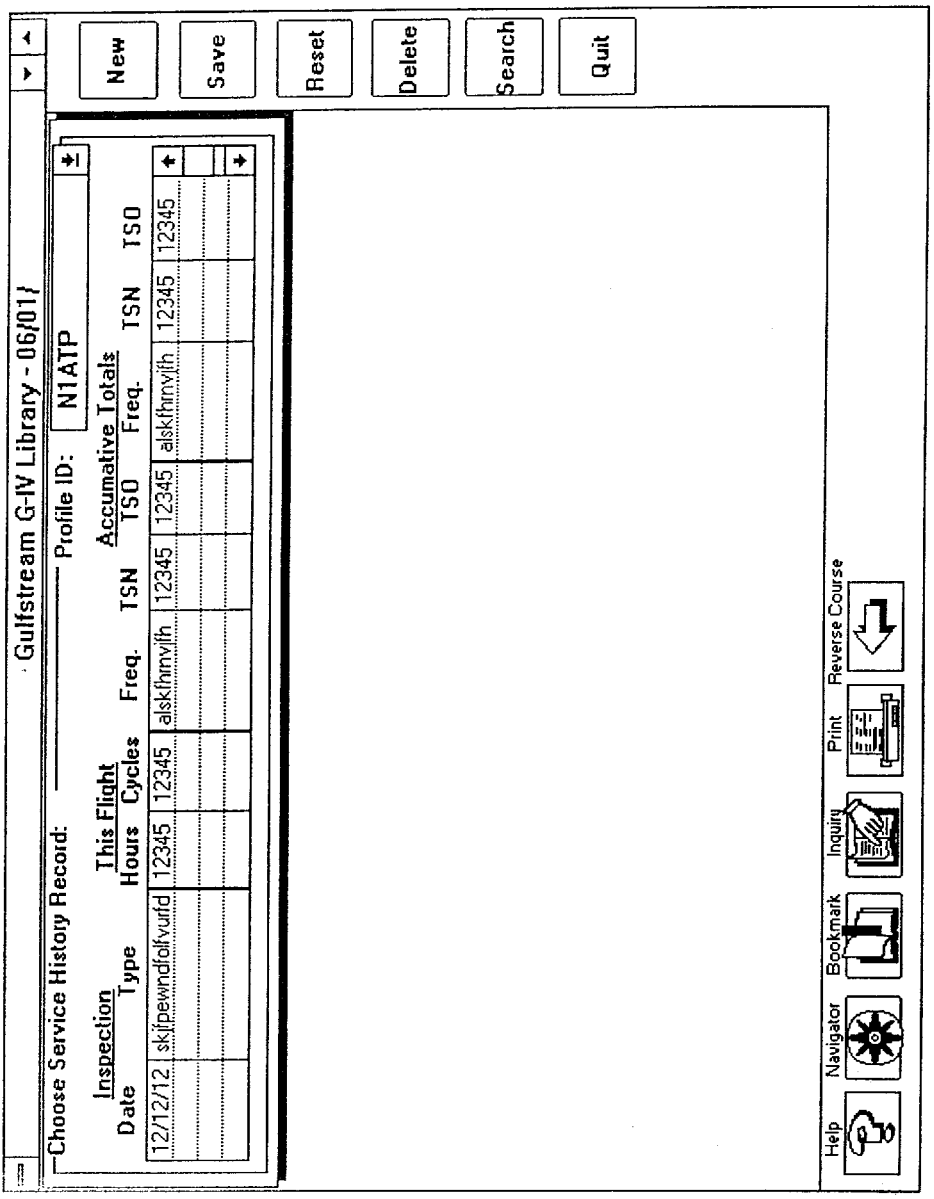

Functionality:

(See FIG. 25.)

At the first Inspections screen, the Profile ID field at the top right of the screen displays the profile identification for the current profile. Any inspection records previously recorded for this profile identification are displayed as part of the inspection list at the top of the data entry screen.

As with the top of the profile entry screen, this is where data is displayed only. No editing is permitted, only selecting.

Write protection is provided. Once an inspection is noted anywhere in the Electronic Logbook, it is preferably permanently attached to that record. This provides security for the inspector who has indicated what has and has not been checked in a given inspection. To accomplish this, records should be write protected whenever they are transferred. Because records employ a key unique to the site they were created, the inspection record and all other records where inspection has been attached are unalterable at other sites.

Figure 26:
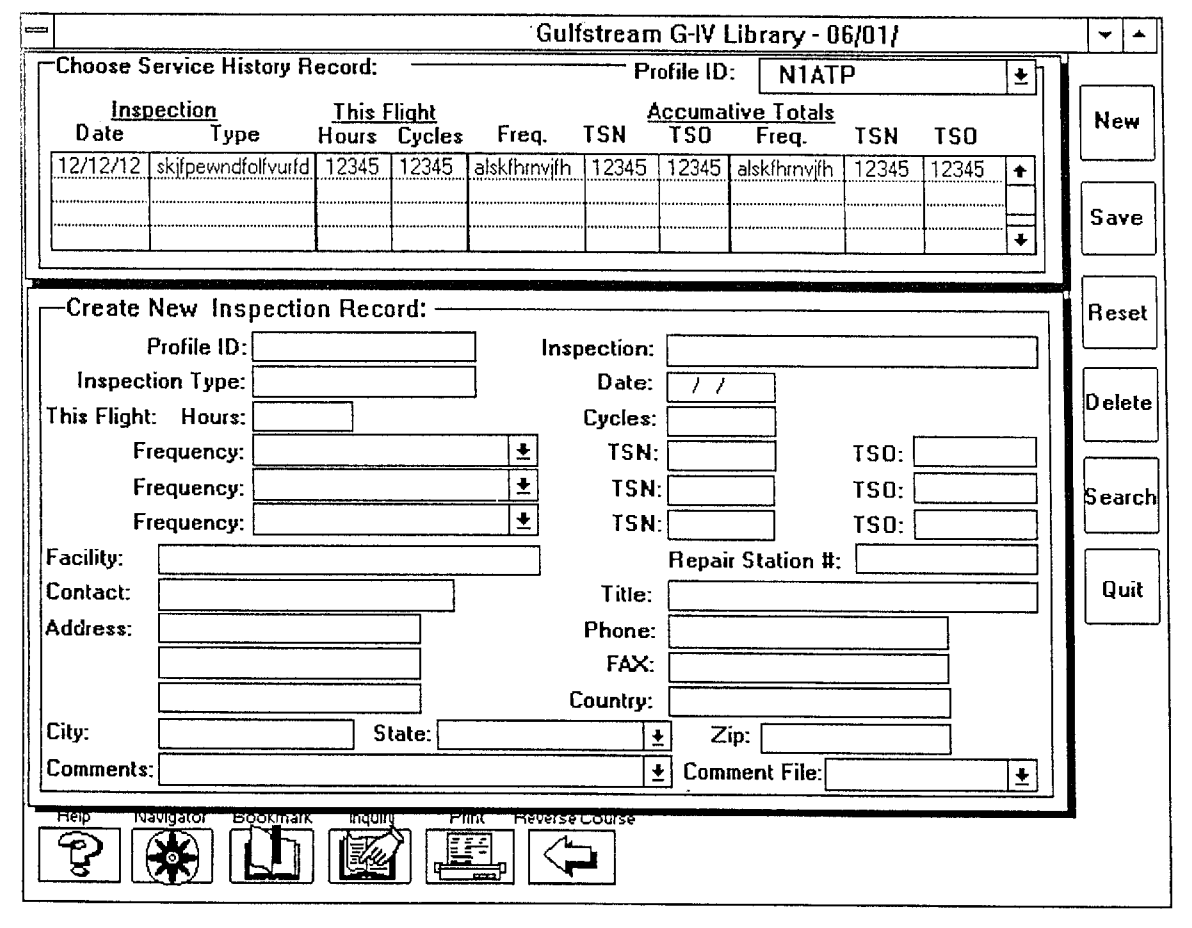

(See FIG. 26.)

With regard to creating and/or changing records, clicking on a particular inspection event brings up the database text entry fields below where the record can be changed if the user's authority level allows editing, and the inspection record is not write protected. The option buttons along the right-hand side of the screen include New, Save, Reset, Delete, Search, and Quit.

New allows the user to add a new inspection to the list of inspections for that profile.

Save permanently saves the changes made to a new or existing inspection record. If the inspection title has been changed, save causes the a dialog box to offer the user of an option of saving as a new inspection record or overwrite previous.

Reset returns the data fields to the values they contained at the last save (if this is a new record that has never been saved, it clears the record).

Delete deletes the current record.

Search allows the user to search existing inspection records for compliance type, inspection date, or word content using the familiar search dialog box.

Quit leaves the inspections screen and returns the user to the Electronic Logbook dialog box.

One of the database text-entry fields allows the user to enter a text file name. This is a way for the user to link any information he or she wants with an external text file. (Editing of this text file can be supported by a built-in text editor).

See Appendix B for the complete file structure of inspections in the electronic logbook.

2.3.2 Airworthiness Directives Compliance

Description:

This section of the Electronic Logbook allows the user to track compliance with Airworthiness Directives (ADs).

Functionality:

(See FIG. 27.)

When the user selects AD compliance, the top of the electronic logbook editing screen shows the compliance records already created for the current profile. These include only the compliance events from the last time the user conducted a compliance check for the current profile. These do not automatically include compliance events called for by the most recent ADs or newly required due to new components being added to the profile. Like inspections, no editing occurs in the top box. Any compliance record listed along the top can be clicked to edit in the database editing fields below.

Figure 28:
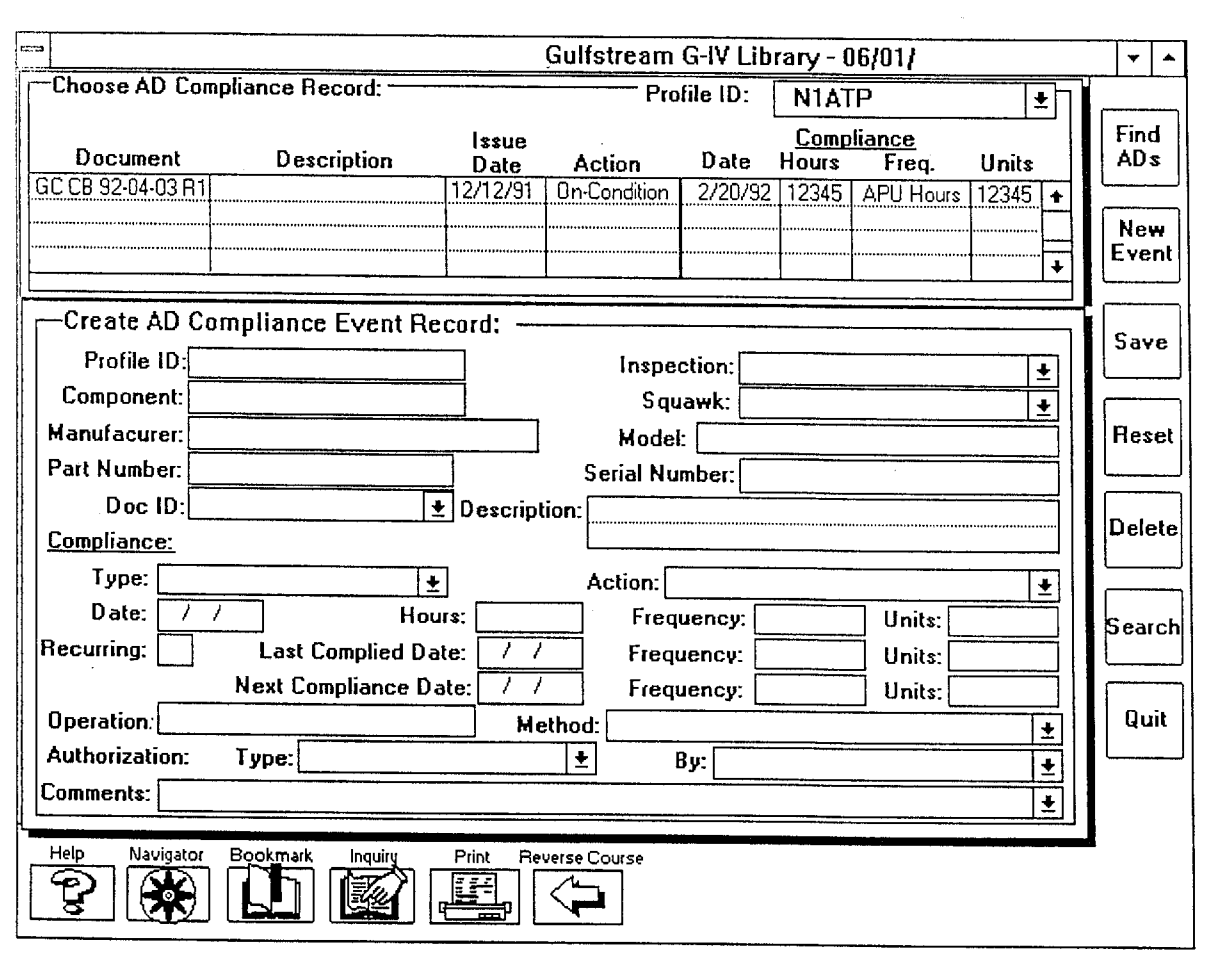

(See FIG. 28.)

Option buttons along the right-hand side of the screen include Find ADs, New Event, Save, Reset, Delete, Search, Quit. If the user wants to assure that the most recent ADs and newly added components are accounted for in the compliance records, the user clicks on Find ADs on the top right. This checks the list of all ADs against the list of all the components in the current aircraft profile and adds compliance records for any newly applicable ADs.

It is noted that components that are not "Active" are not included in the AD search. This is the reason behind the active field in the component record. The default for this field is Y and must be changed to N. This field cannot be blank.

New ADs found to be relevant have a compliance event record created. AD number, description, issue date, and component are automatically entered into the record by the maintenance and repair information system 10. Action taken is left appropriately blank.

The Find ADs option includes in its search all major component ADs (e.g., airframes, engines, propellers, and accessories) and any appliance ADs that have been marked applicable using the Appliance AD Applicability option from the Electronic Logbook dialog box. Additionally, if an appliance AD has affectivity for a component in the profile, a compliance record is created for it, even if it has not been added manually to the list of applicable ADs. This ensures that the user is not relying on an old appliance AD applicability check to catch all applicable ADs. See Appliance AD applicability, section 2.3.4.

New Event allows a user who already knows the AD number being complied with to enter a compliance event without going through the process of finding all new ADs or creating the component record needed to comply with a particular AD.

The other option buttons function the same as the Inspections options. The search option allows the user to search by Action, compliance type, compliance date, recurring (Y or N), and issue date. See Appendix A for the complete file structure for ADs in the Electronic Logbook.

With regard to recurring ADs, a single recurring AD needs to have numerous compliance events associated with it. If the recurring field of an AD compliance record is set to Y, then whenever the compliance for that record has been filled in a new compliance record preferably should automatically be generated against that same AD so it can continue to be monitored.

It is noted that every AD should preferably be coded recurring or not so the maintenance and repair information system 10 can automatically set this field in the compliance record.

2.3.3 Service Information Compliance

Description:

This section of the Electronic Logbook allows the user to track compliance with Service Information (SI). Only the SI referenced by ADs are presented in the regulatory product, not all SI.

Figure 29:
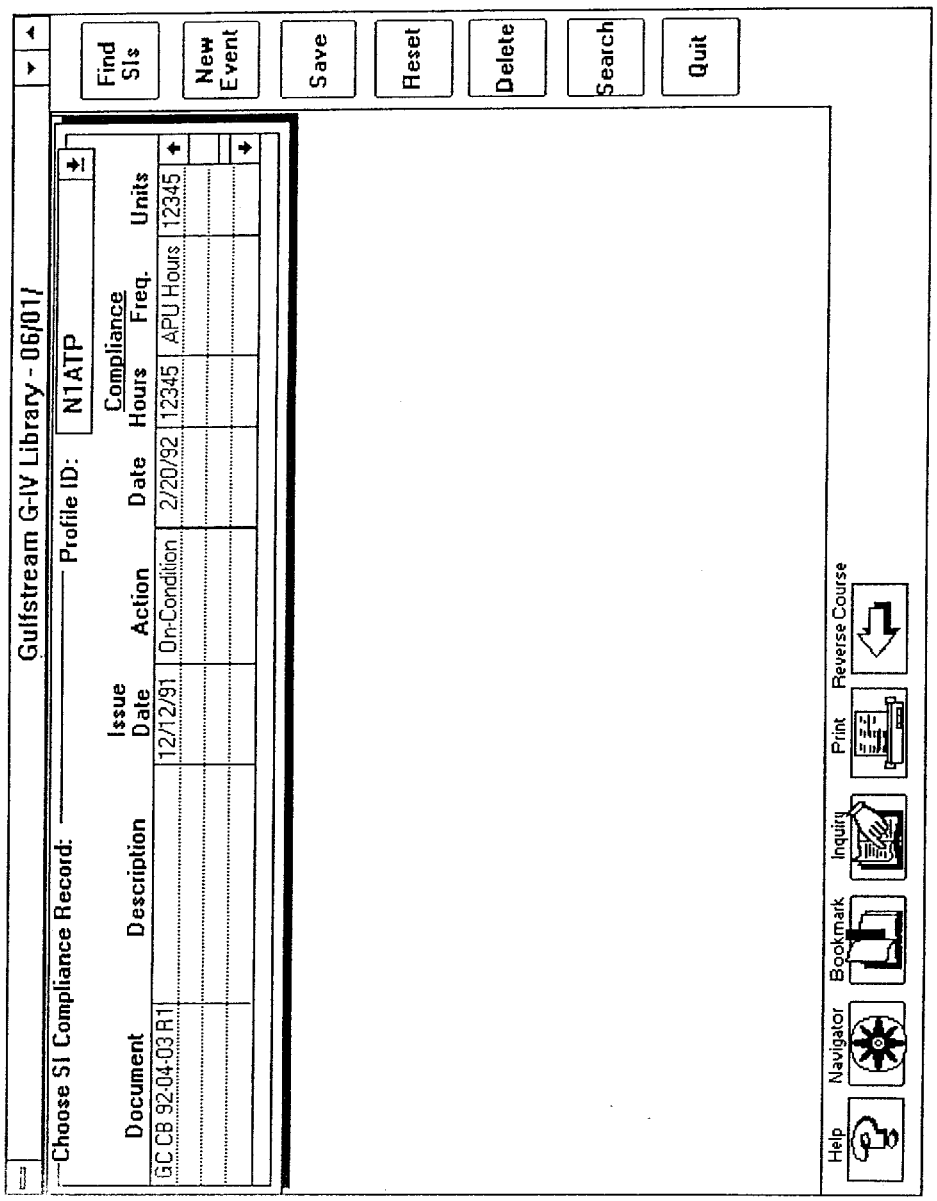

Functionality:
(See FIG. 29.)

When the user selects SI compliance, the top of the Electronic Logbook editing screen shows the compliance records already created for the current profile. For the Federal Regulatory library, an information box automatically presents an "information reminder" noting that only SI referenced by ADs are included with this regulatory product, not all SI. The information box is removed by hitting the OK button (acknowledging the limitation of this regulatory library).

Like ADs, the compliance events in the box at the top of the screen only include from the last time the user conducted a compliance check for the current profile. These do not automatically include compliance events called for by the most recent SI or newly required due to new components being added to the profile. As in the case of inspections, no editing occurs in the top box.

Option buttons along the right-hand side of the screen include Find SI, New Event, Save, Reset, Delete, Search, and Quit. If the user wants to assure that the most recent SI and newly added components are accounted for in the compliance records, the user clicks on Find SI on the top right. This checks the list of SI against all components in the aircraft profile and adds compliance event records for the newly applicable SI.

Figure 30:
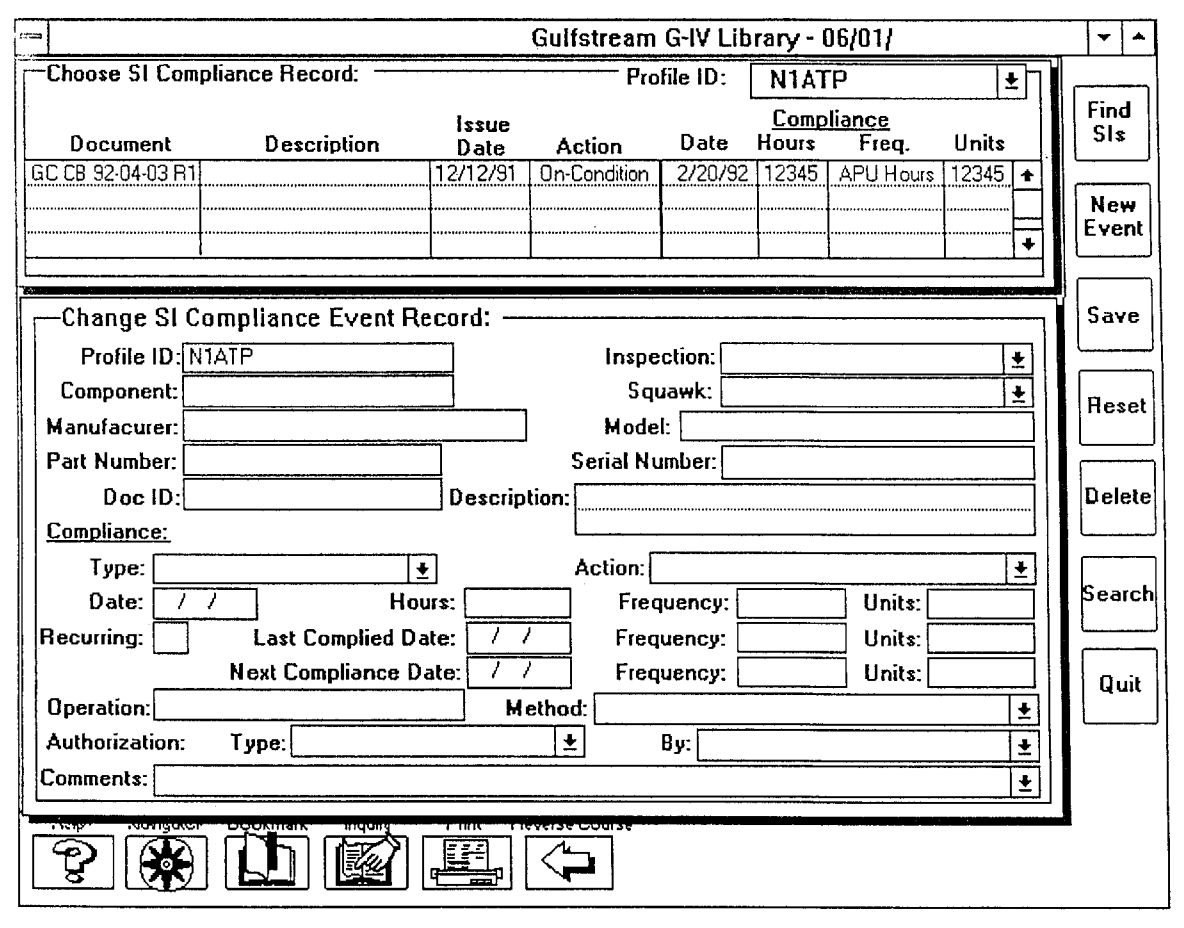

It is noted that components that are not "Active" are not included in the compliance applicability search. This is the reason behind the active field in the component record. The default for this field is Y and must be changed to N. This field cannot be blank.
(See FIG. 30.)

New SIs found to be relevant have a compliance record created. SI number, description, issue date, and component are automatically entered into the record by the maintenance and repair information system 10. To the extent that manufacturers specify the compliance type (mandatory, optional, etc.) that field is also filled in automatically. Action taken is left appropriately blank.

New Event allows a user who already knows the SI number being complied with to enter a compliance event without going through the process of finding all new SI.

The other buttons perform as in the case of Inspections and ADs. Recurring SI is also handled just like recurring ADs. See AD Compliance in section 2.3.1.

Any compliance record listed along the top can be clicked to edit in the database editing fields below. See Appendix B for the complete file structure for AD in the Electronic Logbook.

2.3.4 Appliance Airworthiness Directives Applicability

Description:

This allows the user to mark every Appliance AD as applicable to the current profile or not. Once ADs are tagged applicable and components are added to the profile, then these ADs are found in an AD search, and compliance can be tracked through normal AD compliance.

Appliance Applicability is for the 1000+ Appliance Airworthiness Directives that need to be individually checked for each Aircraft Profile. The status of each of these airworthiness directives is flagged on this screen based on whether or not the related component is currently in the profile or a compliance event record exists.

Figure 31:
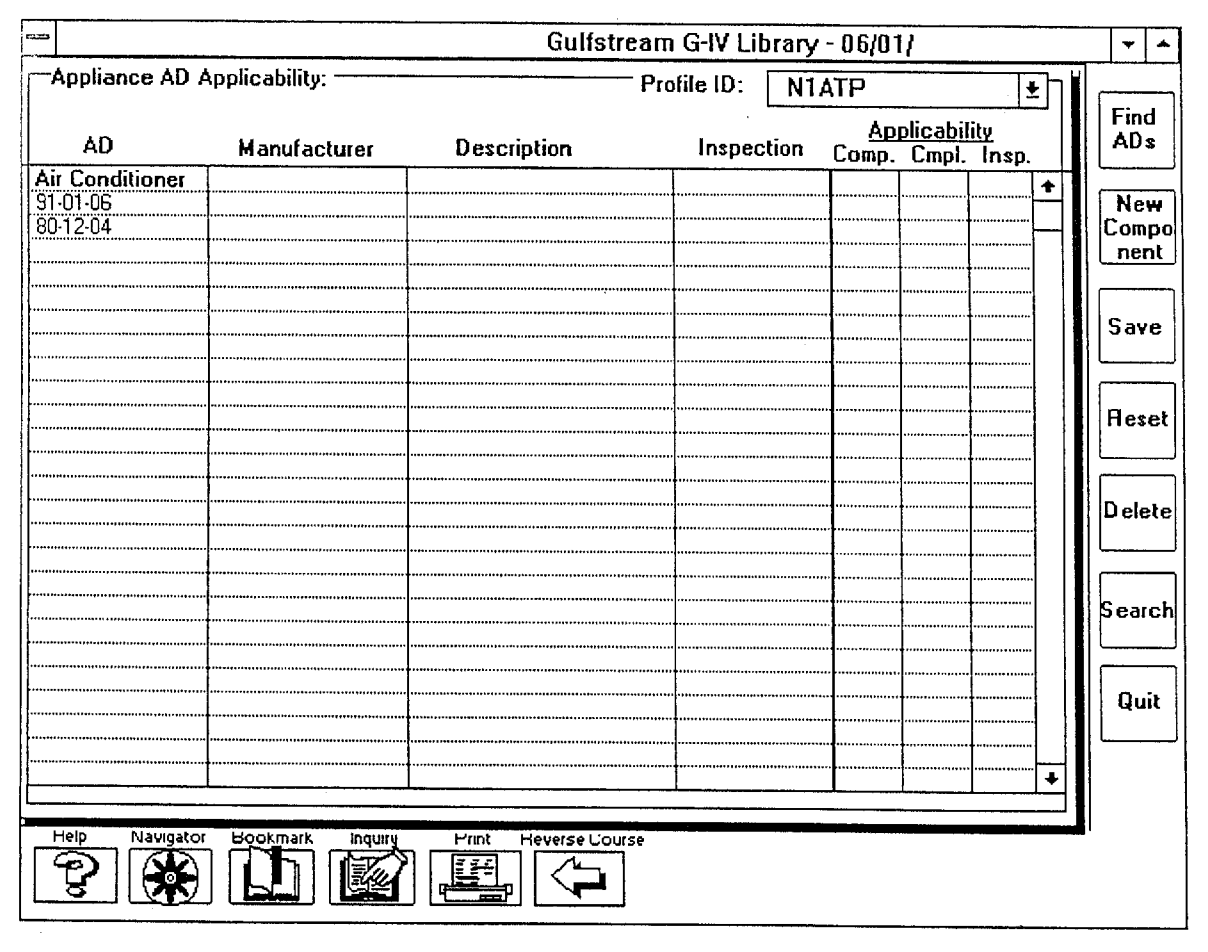

Functionality:
(See FIG. 31.)

Selecting Appliance AD Applicability from the Electronic Logbook dialog box brings up the Appliance Applicability records for the current profile. Unlike ADs and SI, this is not a list of compliance events but merely a list of all appliance ADs grouped by category and showing their current applicability status. This list is used to feed the AD compliance option which tracks compliance events associated with these ADs.

Like with SI and ADs, the list of applicable ADs may or may not be current. It is merely the list last saved with the current profile. The last three fields in the list are applicability determinants, namely, component exists, compliance event record exists, and inspector determined applicability.

Component Exists is set to Y (Yes) or N (No) depending upon whether or not the computer was able to determine that this AD is related to a component in the current profile. Every time the Find ADs option is run, this field can change independent of the other applicability determinants.

Compliance Event Record Exists notes if a compliance event record exists that refers to this AD number. Every time the Find ADs option is run, this field can change independent of the other applicability determinants.

Inspector Determined Applicability notes that during the AD applicability inspection noted in the inspection field, the inspector tagged this AD as being applicable or not. This field can be blank.

The inspection field (which preferably immediately follows the inspector determined field on the screen) records the current inspection ID when the inspector determined field for this AD was last changed. This is a unique system generated ID which includes the site information.

It is noted that only the inspector determined field is alterable (computer flag and compliance record are set by the maintenance and repair information system 10 based on other data), so whenever the inspector applicability field is altered in any way, the current inspection identification is recorded in this field. If no inspector determined status is shown (i.e., it is blank), then there is no inspection identification.

Figure 32:
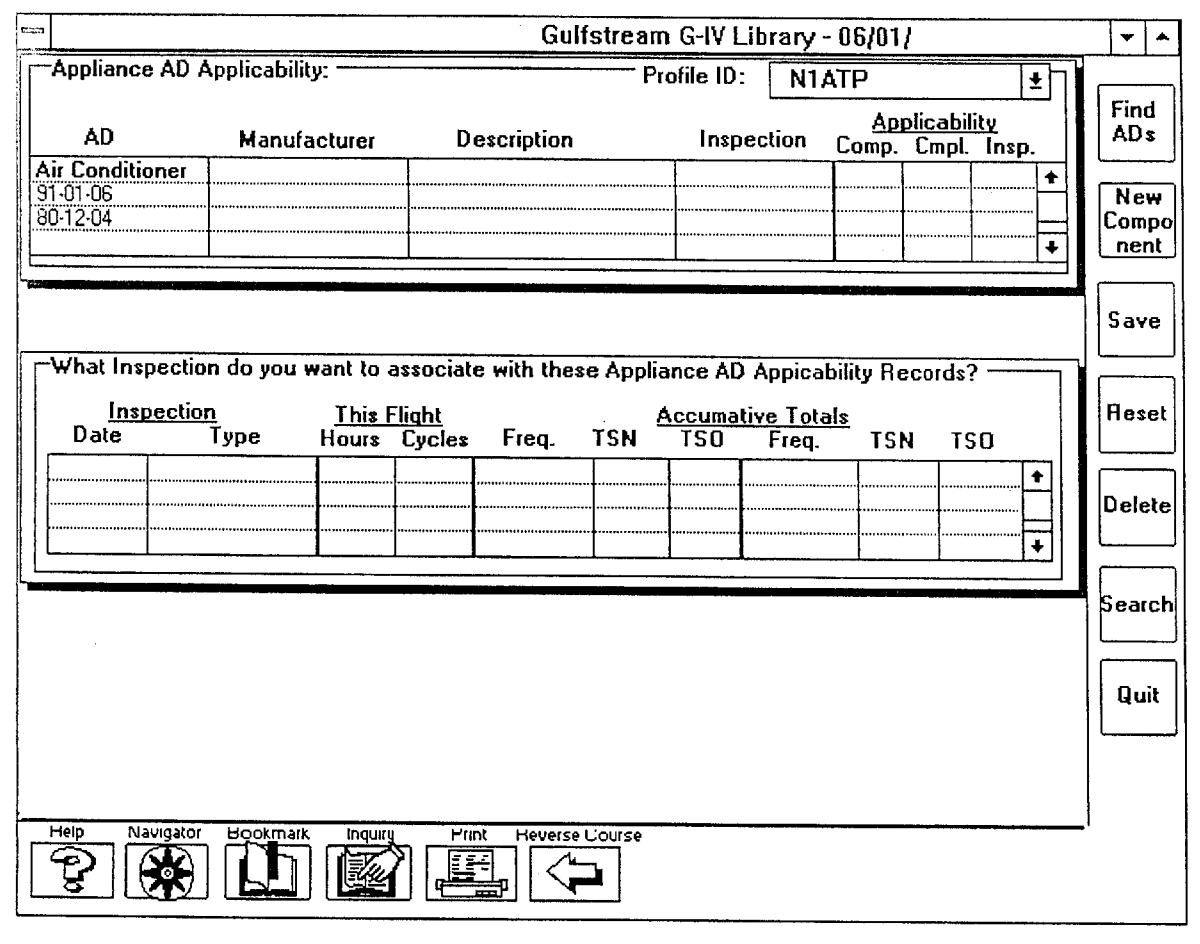

Option buttons along the right of the screen include Find ADs, Add Component, Save, Reset, Delete, Search, and Quit.
(See FIG. 32.)

If the user wants to assure that the most recent ADs and newly added components are accounted for in the applicability listing, the user selects Find ADs on the top right. This checks the list of all appliance ADs and adds any missing ADs to the applicability list. The complete applicability list includes all appliance ADs, since they must all be determined as being applicable or not. Find ADs can also change either the component exists flag or compliance event record exists flag based on current component and compliance data linked to the profile (it checks to see if any new component records or compliance events have been added since the last AD applicability check).

Figure 33:
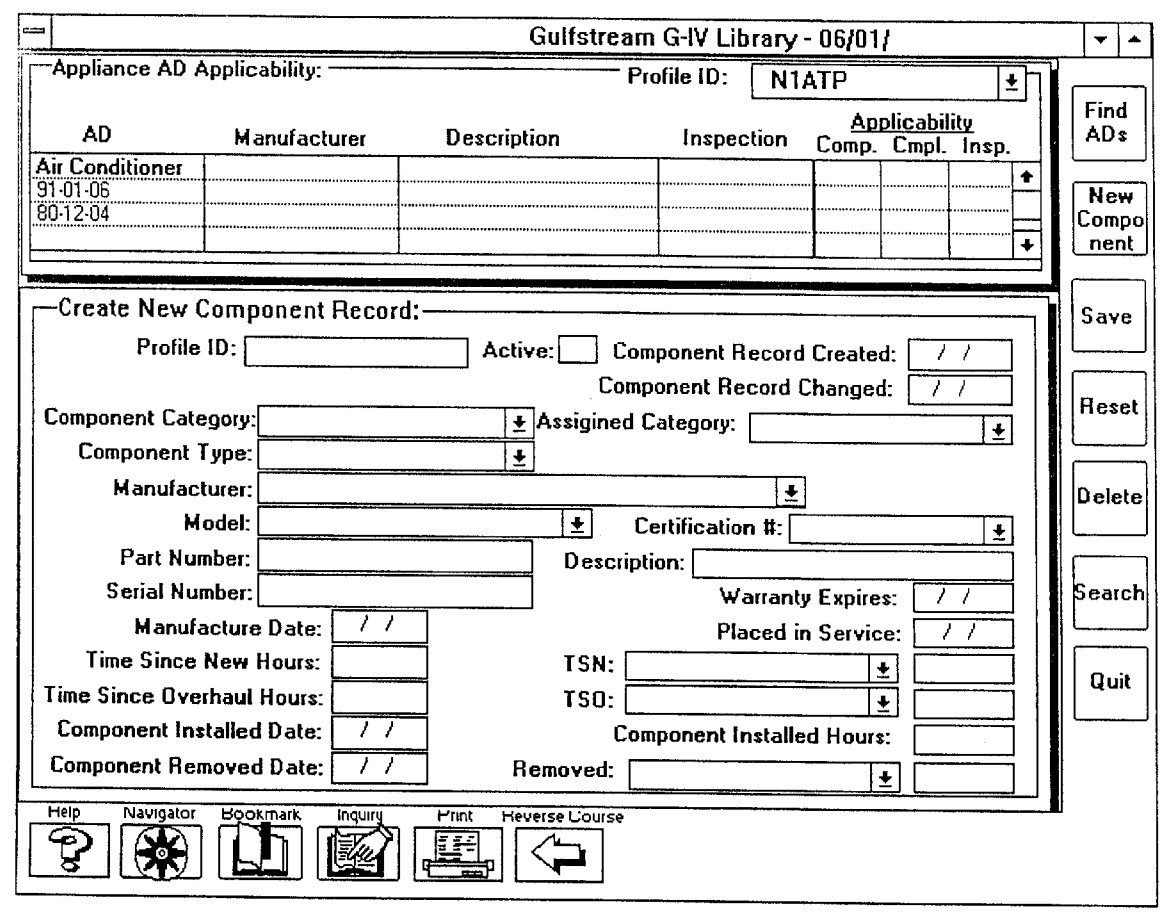

Because an inspection identification is always to be associated with an applicability check, the inspection identification must be determined before the user can use the Find ADs option (which adds and changes applicability records). If the inspection identification has not yet been determined, selecting Find ADs brings up a dialog box where the user must define the inspection and establish an inspection identification before continuing. For security and accountability, the inspection identification cannot be manually altered on an appliance applicability record.
(See FIG. 33.)

The add component option allows any user having appropriate authority to add a component to the aircraft profile. This is the same add component capability available from the profile utilities box. It has been added here merely as a convenience to users who want to add components based on the appliance ADs determined to be applicable.

Save, Reset, Delete, Search, and Quit function buttons function the same here as described above.

With regard to inspector determined applicability, if an inspector attempts to change applicability and the inspection identification has not yet been determined, the inspection definition dialog box is displayed. The inspection must be defined and an inspection identification determined before any inspector determined status can be changed.

With the inspection identification determined, the inspector is free to change the status of the inspector determined field from Y to N by clicking on the inspector determined field for an individual AD record. Whenever the complete AD list is being viewed, the user also has the ability to click on the category heading and fill in the blank applicability fields in that category with N. It is noted that where a Y appeared in that category, it is not overwritten with a N.

The maintenance and repair information system 10 also checks the appliance AD applicability list. On the complete list of Appliance ADs, an appliance AD is considered applicable (and therefore made available for use with the AD Compliance History section of the Electronic Logbook) if the inspector determined applicability is Y, even if compliance and component flags are N. Nonetheless, even when the inspector determined applicability is set to N or left blank, if the component or compliance flag is set to Y, then that AD is still considered for the AD Compliance History. This ensures that the user does not rely on an old AD applicability check to find all of the currently applicable ADs.

When reviewing the complete Appliance AD list, four conditions exist that can point to an AD that should apply but is not currently tagged as applicable in the inspector determined field. These conditions are: 1) Component=Y, but Compliance or Inspector=N; 2) Compliance=Y, but Component or Inspector=N; 3) Component and Compliance=Y, but Inspector=N; or 4) Inspection=0 (blank).

Clicking the search option button on the right-hand side of the screen presents the search dialog box. Radio buttons at the top of this box offer the user the options to search for records with: Component Y; Compliance Y; or Records with questionable inspector status. The last option searches the applicability list for any one of the above four conditions automatically.

When first marking an AD as being applicable, the user can add the component to the Aircraft Profile.

2.3.5 Squawks

Description:

This option allows the user to track the history of problems on an aircraft or any of its components and the procedures used to resolve the squawk. Squawks can result in inspections, compliance event records (AD or SI or routine maintenance), or lengthy reports.

Figure 34:
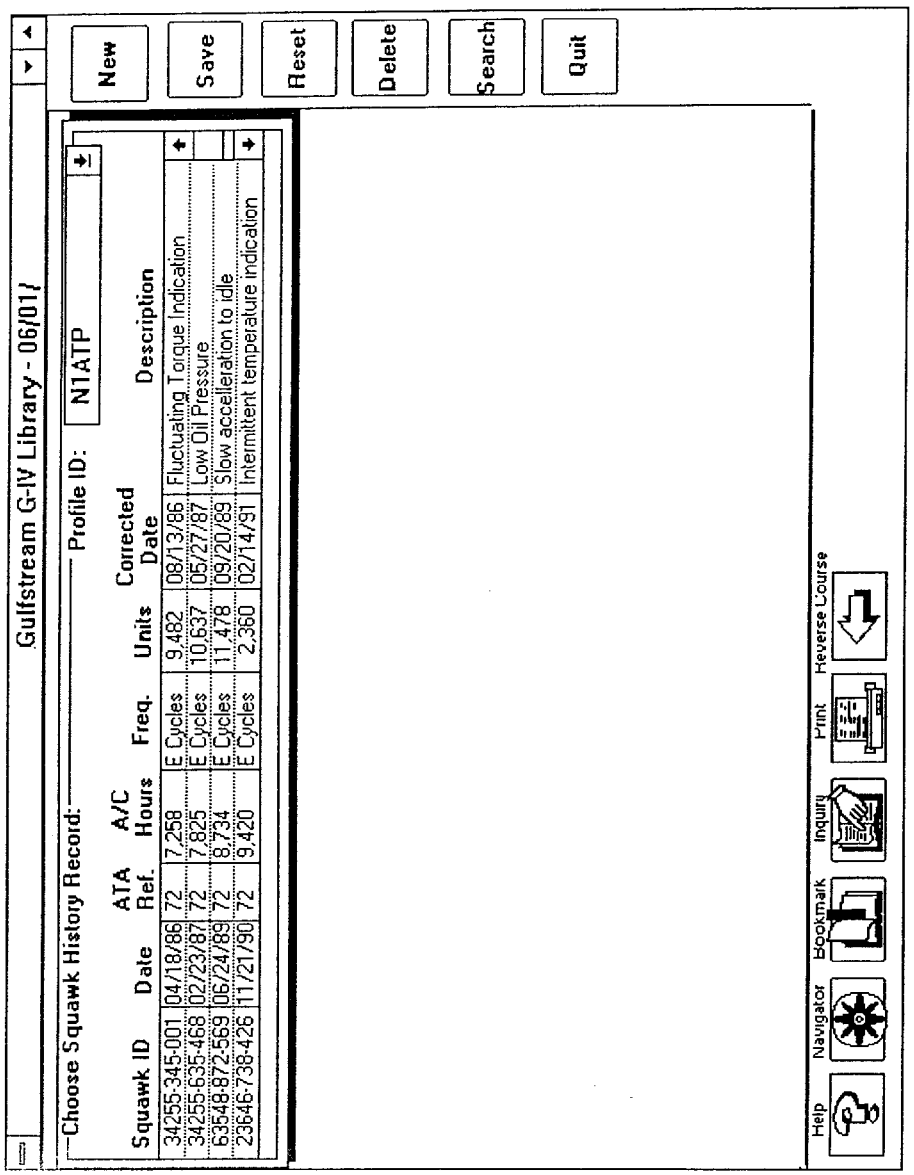

Functionality:

(See FIG. 34.)

At the first Squawks screen, the Profile ID field at the top right of the screen displays the profile identification for the current profile. Any squawk records previously recorded for this profile identification is displayed as part of the squawk list at the top of the data entry screen.

As with the top of the profile entry screen, this is where data is displayed only. No editing is permitted, only selecting.

Figure 35:
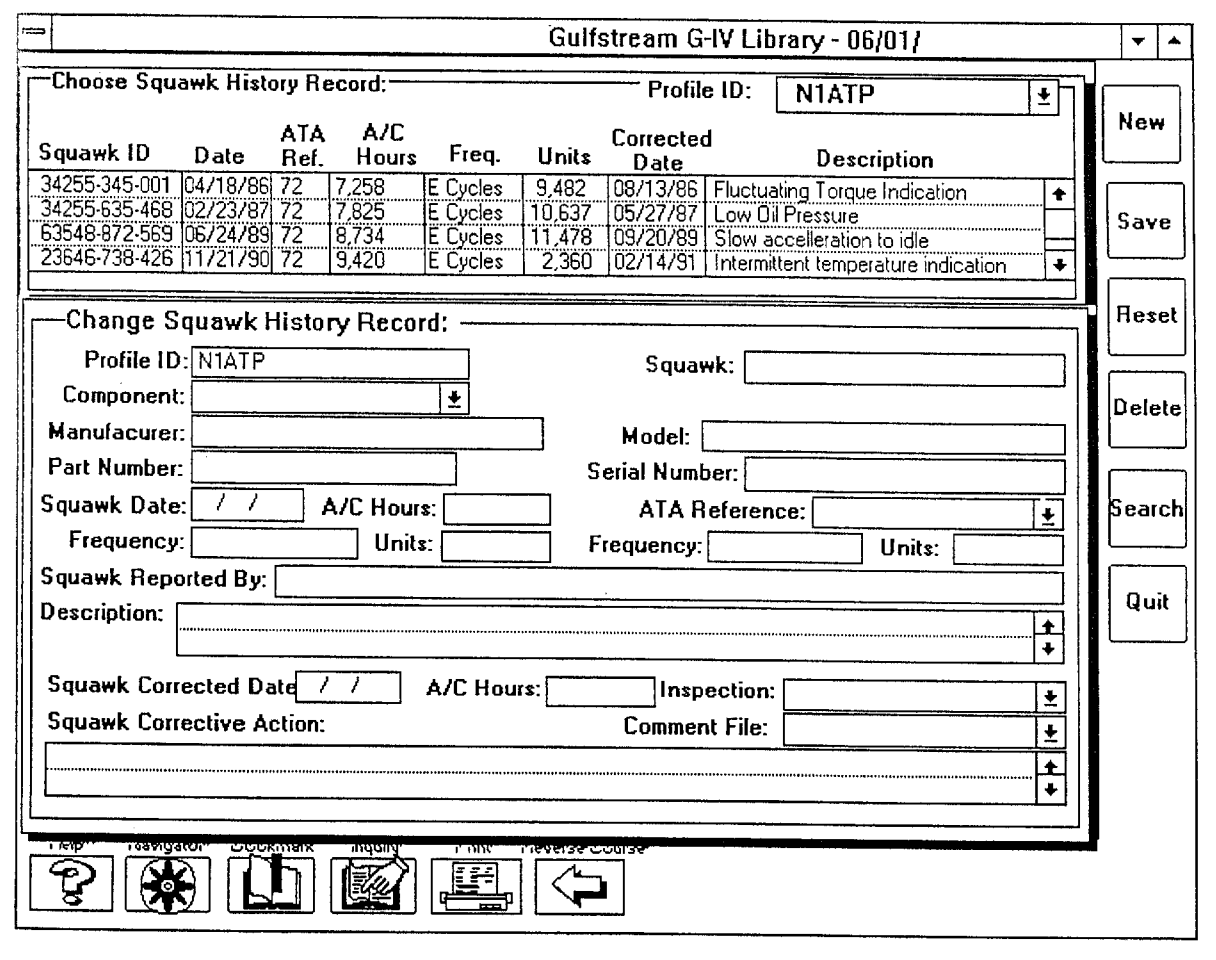

(See FIG. 35.)

Clicking on a particular squawk event brings up the database text entry fields below, where the record can be changed if the user's authority level allows editing.

The option buttons along the right-hand side of the screen include New, Save, Reset, Delete, Search, and Quit. These options function the same as in the case of inspections.

With squawks, one of the database-text entry fields allows the user to enter a text file name as with inspections. (See Inspection History section 2.3.1.) The inspection field allows the user to link this squawk to an inspection identification.

See Appendix B for the complete file structure of inspections in the Electronic Logbook.

Contemplated Modification:

Squawks can currently be linked to compliance events through one of the database text-entry fields in the compliance event record. It is also desirable for the user to link the squawk to the compliance event record from this screen.

2.4.0 Problem Diagnosis Function

Description:

This function allows the user to search all publications in the library related to the current profile for the occurrence of a word or phrase. This function caters to a user's desire to look for a particular "problem word" everywhere possible. However, no additional functionality is provided over performing a publication search selecting every publication type and adding a word search.

Figure 36:
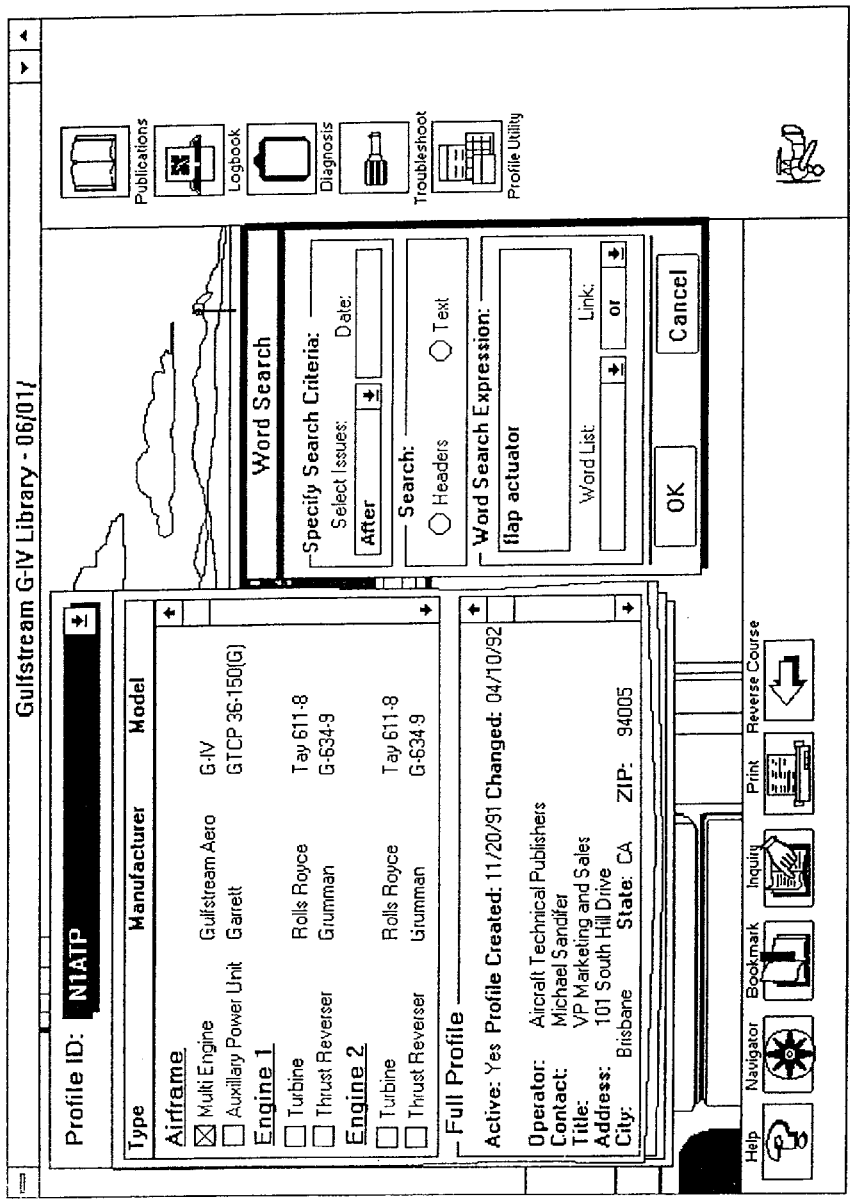

Functionality:

(See FIG. 36.)

The standard Word Search dialog box is used to create a search expression and specify whether the search is of headers only or the entire text. The result is a Problem Diagnosis Publication List which lists all the publications where the word search expression is found (for regulatory, it only lists the publication types on the publication list). Also listed on the publication list is the number of word search hits for each publication type. Selecting a publication type takes the user to a selection list of documents related to the current profile where word search hits were found.

For the maintenance and repair information system 10, there is only one word list for all the different types of word searches. This same word list is used in the problem diagnosis function.

Contemplated Modification:

A special word search expression list can be prepared editorially by the library service provider to facilitate problem diagnosis.

2.5.0 Troubleshooting Function (1.5)

Description:

In accordance with ATA standards, maintenance manuals have small sections throughout the manual marked as troubleshooting sections. These sections of the manuals are designed to help troubleshoot a particular problem on an aircraft. Other aircraft specific publications also have troubleshooting sections (but not any documents in the regulatory library). The Troubleshooting Function in Aircraft Specific Mode provides search access exclusively to troubleshooting sections within publications.

It is noted that the SGML process is identifying these troubleshooting sections for use with the Troubleshooting Function. In InnerView these troubleshooting sections are tagged segments of the document. The maintenance and repair information system 10 passes this segment information along in the search and then with the document identification to drive the user to the beginning of the segment within the document.

Functionality:

Selecting the Troubleshooting Function brings up the standard word search dialog box to specify a word search expression and identify whether headers only or the entire text is to be searched. This dialog box has one additional field that allows the user to specify an "issued since" date to include only the more recent documents. The search for the specified word search expression is limited to troubleshooting "segments" of publications in the library that relate to the current profile.

A Troubleshooting search results in a Troubleshooting publication list if more than one publication type has troubleshooting segments that relate to the current profile and contain the specified word search expression. Choosing a publication type from the publication list displays a selection list of documents where the word search expression was found.

The maintenance and repair information system 10 determines that this is a troubleshooting selection list and is prepared to pass the troubleshooting segment to InnerView along with the document identification when a particular document is selected from the selection list. This allows the user to pick a document and go into that document at the troubleshooting segment and at the highlighted word search expression.

2.6.0 Profile Utilities

Figure 37:
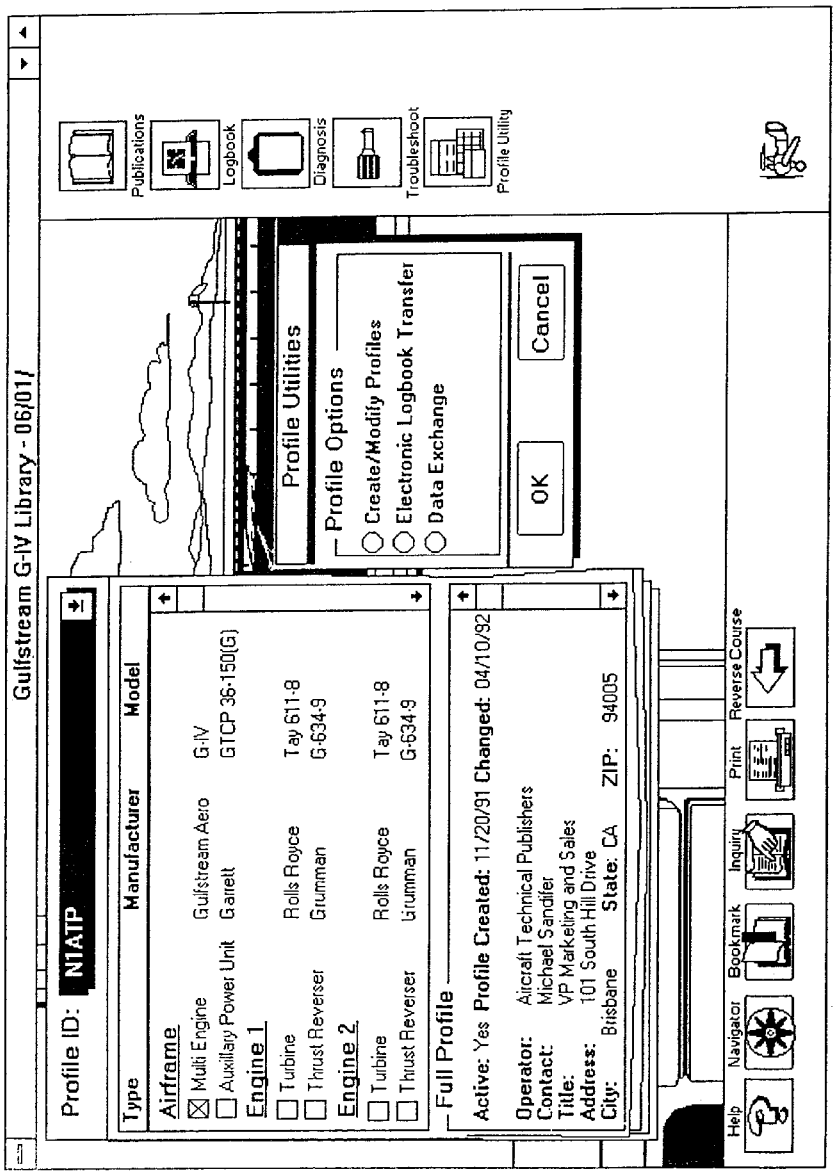

Description:

In Aircraft Specific Mode, the focus is on maintenance information for a particular aircraft profile. Profiles are the collection of information about the operator of any aircraft or major component (e.g., airframe, engine, propeller, or accessory) stored under the Profile ID (a system identity, usually its N (tail) number). Profile Utilities provides the user the ability to edit, create, and import/export profile and component records.
(See FIG. 37.)

Component records are used to identify each component (defined as any item that may have ADs, SI, or maintenance procedures associated with it). Within component records, components are uniquely identified by manufacturer, model, part number, and serial number, as well as item specific TSO and TSN data.

Functionality:

Upon choosing Profile Utilities from the mode function icons, the user is presented with the profile utilities dialog box which presents three choices: Create/Modify Profile; Electronic Logbook transfer; and, preferably, Data Exchange.

Contemplated Modification:

This feature can also help the user record and/or print other information related to a particular profile with features, such as parts ordering and manufacturer communications.

2.6.1 Create/Modify Profile

Description:

Create/Modify profile allows the user to add a new aircraft profile to the list of existing profiles. The privilege of creating, editing, or deleting profile information is set for each user in System Administration.

Figure 38:
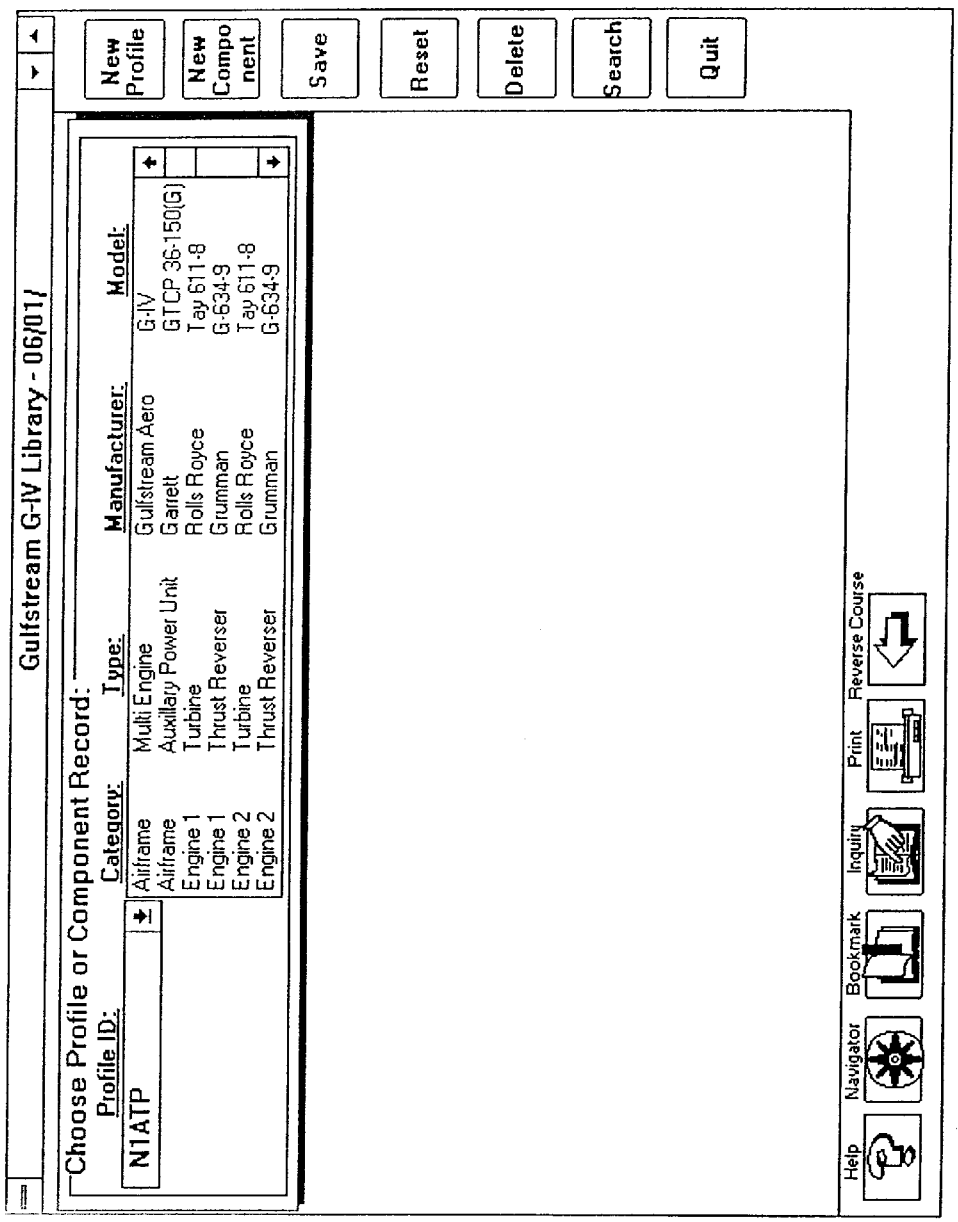

Functionality:
(See FIG. 38.)

If Create/Modify Profile is chosen from the profile utilities dialog box, the user is taken to the profile editing screen. This is where aircraft profiles and their component records are created and changed (stored and edited).

A "New User Assistance" information box appears over the first screen to explain the Create/Modify Profile option. It is dismissed with the very next keystroke or mouse click.

At the top of the profile editing screen is a pseudo selection list box where the user can select which profile and component records to edit. This is similar to a selection list in that no editing occurs in this top portion, only selection of what is the user wants to create or edit.

With a profile identification filled in at the top left, the identifying fields of all of the component records associated with that profile identification are displayed on the top right. Clicking on either the profile identification or one of the component records highlights the item and brings up a series of database-style entry fields along the bottom of the profile editing screen. The bottom of the editing screen is the "editing box." The fields in the editing box correspond to the file structure for a profile or component record in the Electronic Logbook, as defined in Appendix B.

Figure 39:

It is in the editing box that all the creating and editing occurs. Wherever possible, these fields are word wheel text entry fields.
(See FIG. 39.)

Replacing the usual mode functions along the right-hand side of the screen are control buttons. These control buttons are: New Profile; New Component; Delete; Save Changes; and Reset Changes.

New profile is always active. It clears any profile that may be specified in the profile identification, and brings up the profile database entry fields in the editing box for the user to fill in. A profile identification is the only required field.

Figure 40:

New Component is active only when a profile identification is specified at the top left. It clears any component record that may be highlighted and brings up the component record database entry fields in the editing box for the user to fill in.
(See FIG. 40.)

If Delete is clicked while a profile is in the editing box, that profile and all of its associated records are deleted. If Delete is clicked while a component record is in the editing box, that component record is deleted. Delete does not affect a profile or component record displayed on the top unless it is highlighted and loaded for editing below.

Save Changes permanently saves any changes or additions to a profile or component record in the editing box. If the profile of the same name previously exists or the profile name field has been changed, Save Changes brings up a dialog box allowing the user to "Save as new profile" or "overwrite previous profile."

Reset Changes cancels any changes made in the editing box since last time the editing box was saved. If a new profile or component record was being edited, the editing box is cleared.

It is noted that word wheel text entry fields ensure that only components with corresponding authority files can be entered into the maintenance and repair information system 10. In this way, the user is assured that the maintenance and repair information system 10 is tracking every component in his or her profile.

Contemplated Modification:

The program can allow the user to input components that do not have corresponding authority files. The program can inform the user that it has no corresponding part information, but it should not block the user from entering a part simply because the library service provider records are incomplete. Where appropriate, constant reminders would inform the user that searches could not resolve any document applicability to unidentified components.

2.6.2 Electronic Logbook Transfer

Description:

The Electronic Logbook allows the user to transfer Aircraft Profiles and all their associated records from one disk to another. This procedure is an extraction of records from the database to a file.

Figure 41:
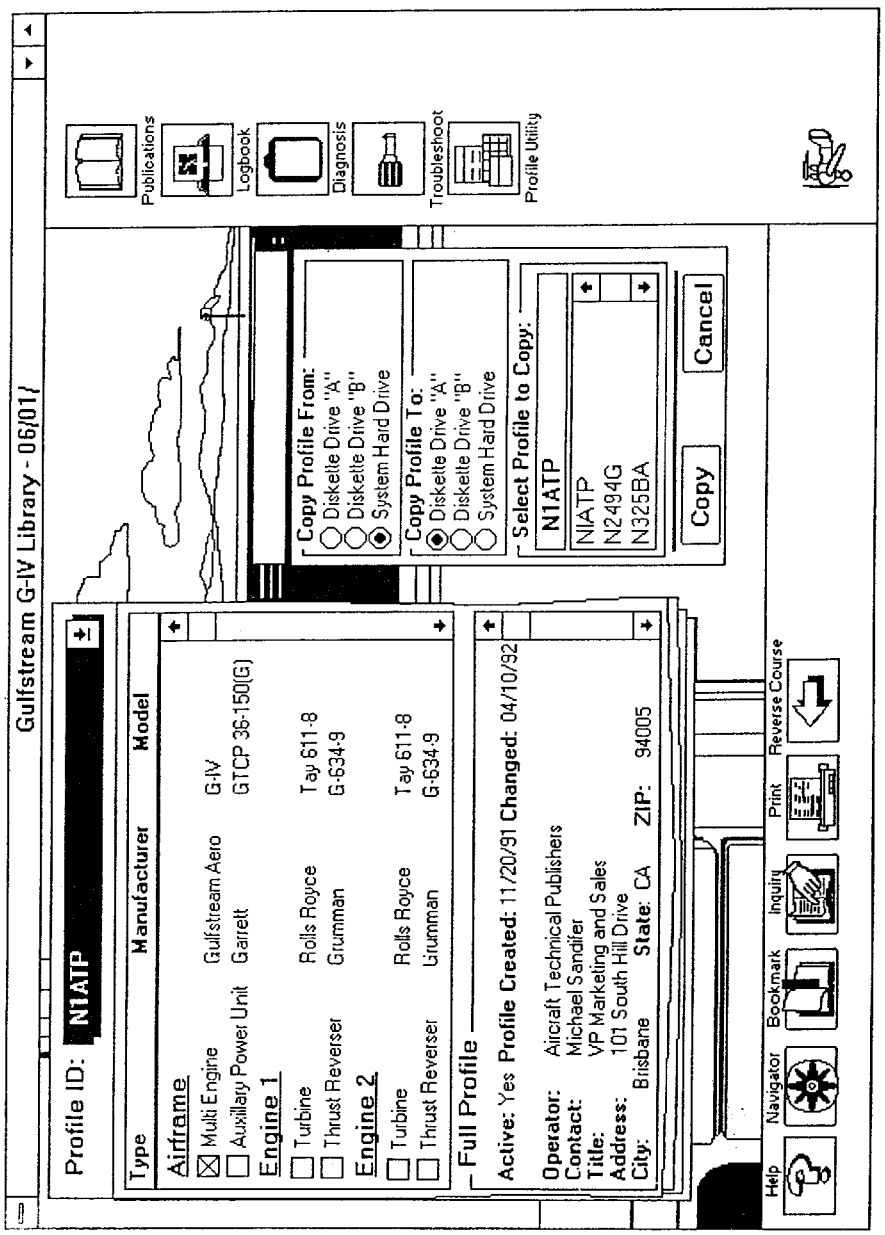

Functionality:

A dialog box is presented requiring the following information: Copy Profile From: A, B, or Hard Drive; Copy Profile To: A, B, or Hard Drive; Select Profile to Copy. (See FIG. 41.)

Where aircraft profiles are stored on disk is predetermined by the maintenance and repair information system 10, so A, B, or Hard Drive is all the system needs to know to carry out a copy command.

When the user chooses "Select Profile to Copy," he or she is shown the current Profile ID's that exist on the source drive, that is, the "copy profiles from" drive. Therefore, "Select Profiles to Copy" is grayed out until the "from" option has been filled in.

Once a user selects a profile identification from the list, clicking on the "Copy" control button brings up a copy confirmation dialog box that confirms the from and to destinations, as well as the profile identification, and offers the user the opportunity to click OK or CANCEL. Upon copying, the copy confirmation dialog box either displays a "copying . . . " message or reports an error.

Since this procedure involves the transfer of records from one site's database to another, a universal key is necessary to make the records unique. Attaching the site identification to individual records establishes uniqueness. This also allows records to be write protected for any site other than the site at which they were created.

Also, because the transfer of data in a standard format is a possible environment for viruses, a virus checking mechanism is preferably built into the Electronic Logbook transfer process.

Contemplated Modification:

Preferably this feature supports the ability to insert a full DOS path.

2.6.3 Data Exchange (Not for 1.0)

Description:

In an effort to allow other third party software developers to easily transfer data out of or into the maintenance and repair information system 10, the Data Exchange option accommodates the exporting and importing of database information in a variety of industry standard formats.

Specifically, developers of maintenance scheduling software want to be able to read the maintenance and repair information system 10 Electronic Logbook files.

The maintenance and repair information system 10 file documentation details the database file structures and file locations used in the maintenance and repair information system software. This way, any licensed developer who wants access to data files can do so.

Contemplated Modification:

A software developers kit can be provided to help developers tap into the maintenance and repair information system 10 in all the file formats it supports and all the information it stores.

3.0.0 Bookshelf Mode

Description:

The Bookshelf Mode permits the user access to technical data starting with a certain publication or, in the case of the regulatory library, publication type. In contrast to the Aircraft Specific Mode which is tailored to the airplane mechanic who wants to start with an aircraft profile and find information related to that profile, the Bookshelf Mode is tailored to FAA users who need to find information within a certain publication or publication type.

Although much of the utility presented in the Bookshelf Mode is similar to utility already described in connection with the Aircraft Specific Mode, the two modes cater to different users. Nonetheless, continuity between the modes is be maintained. Selection lists generated from the Bookshelf Mode are similar in format and functionality to selection lists generated from the Aircraft Specific Mode. A word search or aircraft specific search generates similar selection lists in either mode.

Figure 42:
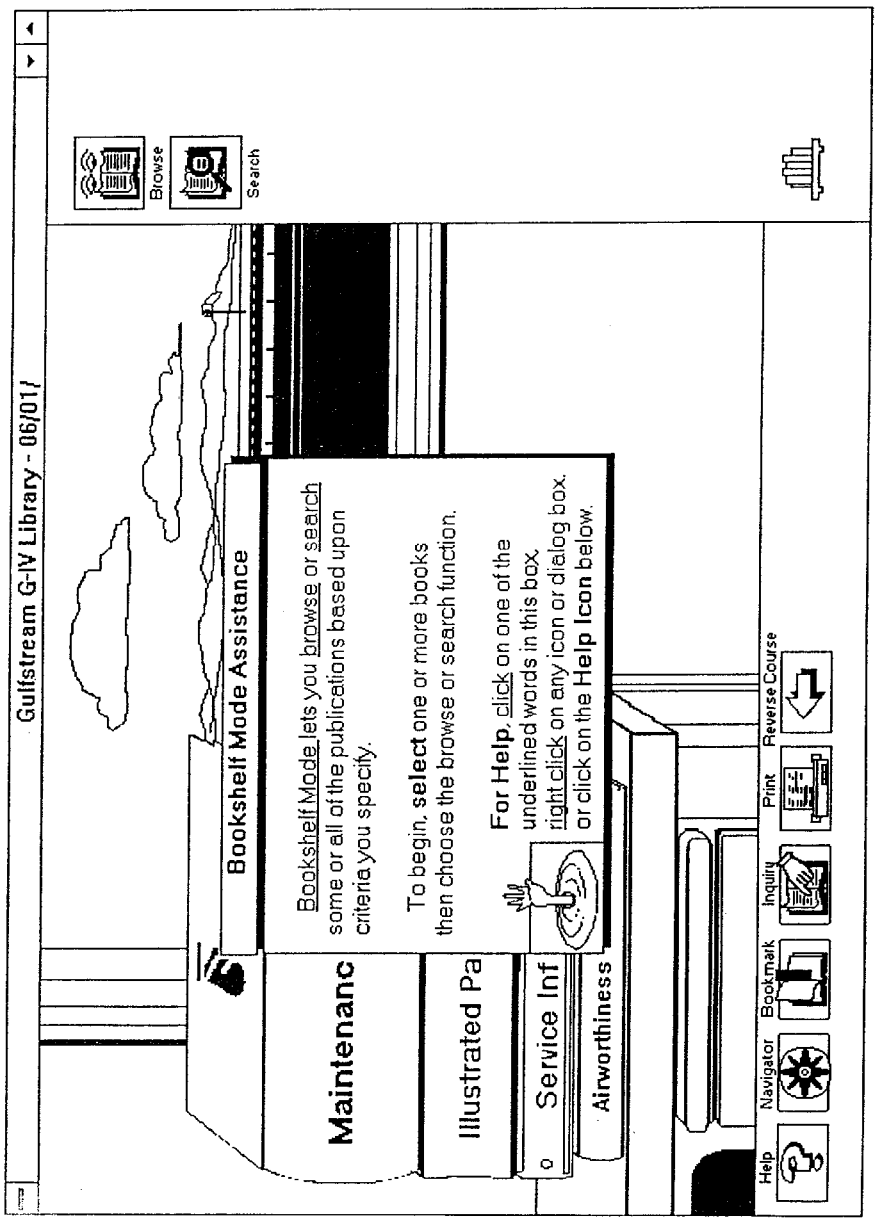

Functionality:

(See FIG. 42.)

When a user selects the Bookshelf Mode icon from the Navigator Screen, he or she is taken to the Bookshelf Mode which opens with a new user help screen.

The Bookshelf Mode starts with a graphical representation of a stack of books, each book representing a publication type contained in the selected library. Artwork for the opening Bookshelf Mode screen pictures a stack of books on a desktop against a runway and horizon line backdrop. This artwork is provided by the library service provider. The user selects a publication(s) of interest by clicking on the spine of the book. The maintenance and repair information system 10 displays two types of books: regulatory publications specific to aircraft (e.g., ADs, SI, Alerts, TCs, and STCs) and regulatory publications not specific to aircraft (e.g., ACs, FARs, Hazardous Materials which is a portion of the Code of Federal Regulations that legislates the transport of hazardous materials, and Orders.

Figure 43:
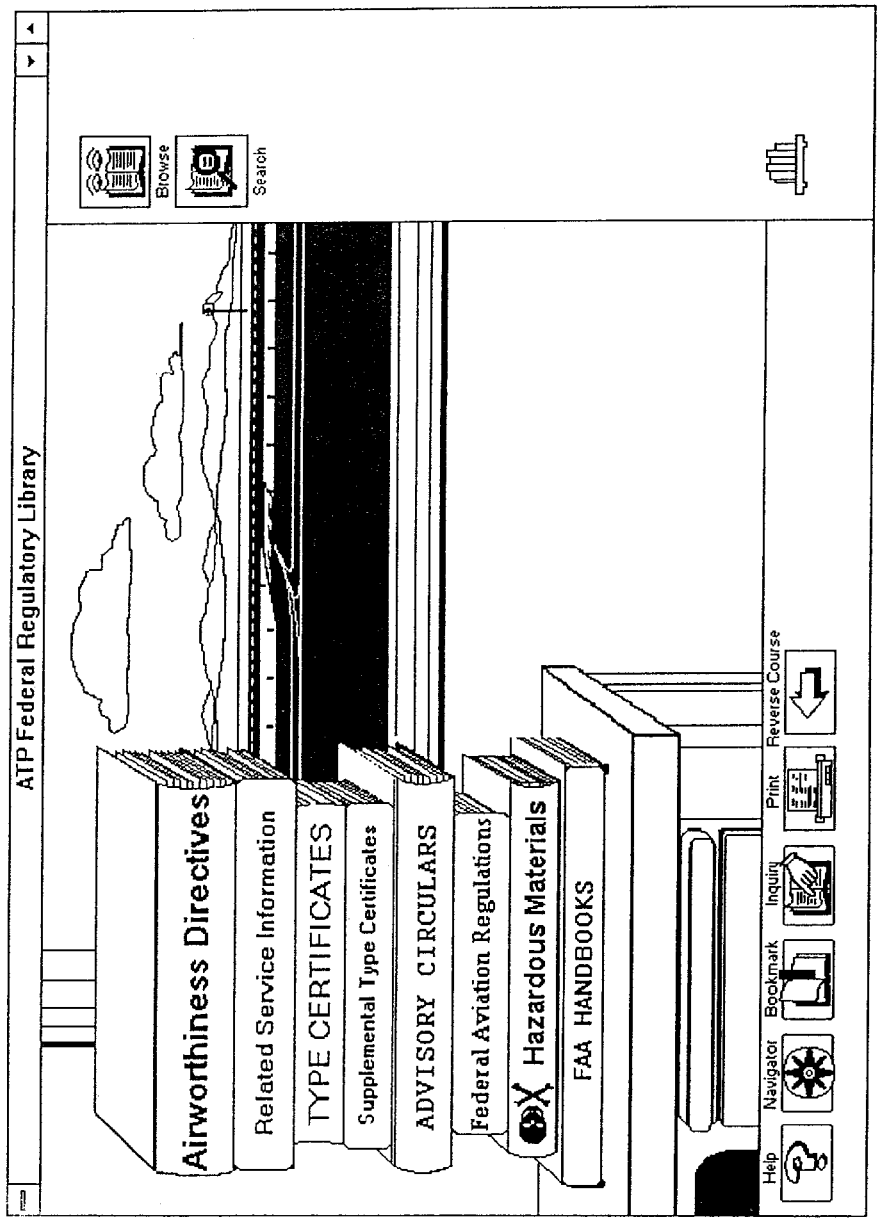

(See FIG. 43.)

It is noted that on the Bookshelf, SI is not be broken out to its different issue types. Instead, SI is lumped together as Manufacturer Service Information.

To select a book, the user left clicks on a particular book, which causes a book mark to appear at the top of the book. The maintenance and repair information system 10 is required to "show and hide" a small graphic (a bookmark depicted by artwork from the library service provider) on the book to show that it has been selected. The purpose of selecting a book from the bookshelf is to access that book directly through browse or apply search criteria to that publication. Arrayed along the right-hand side of the screen are the two functions that can be performed on publications selected from the bookshelf: Browse and Word Search.

Figure 44:
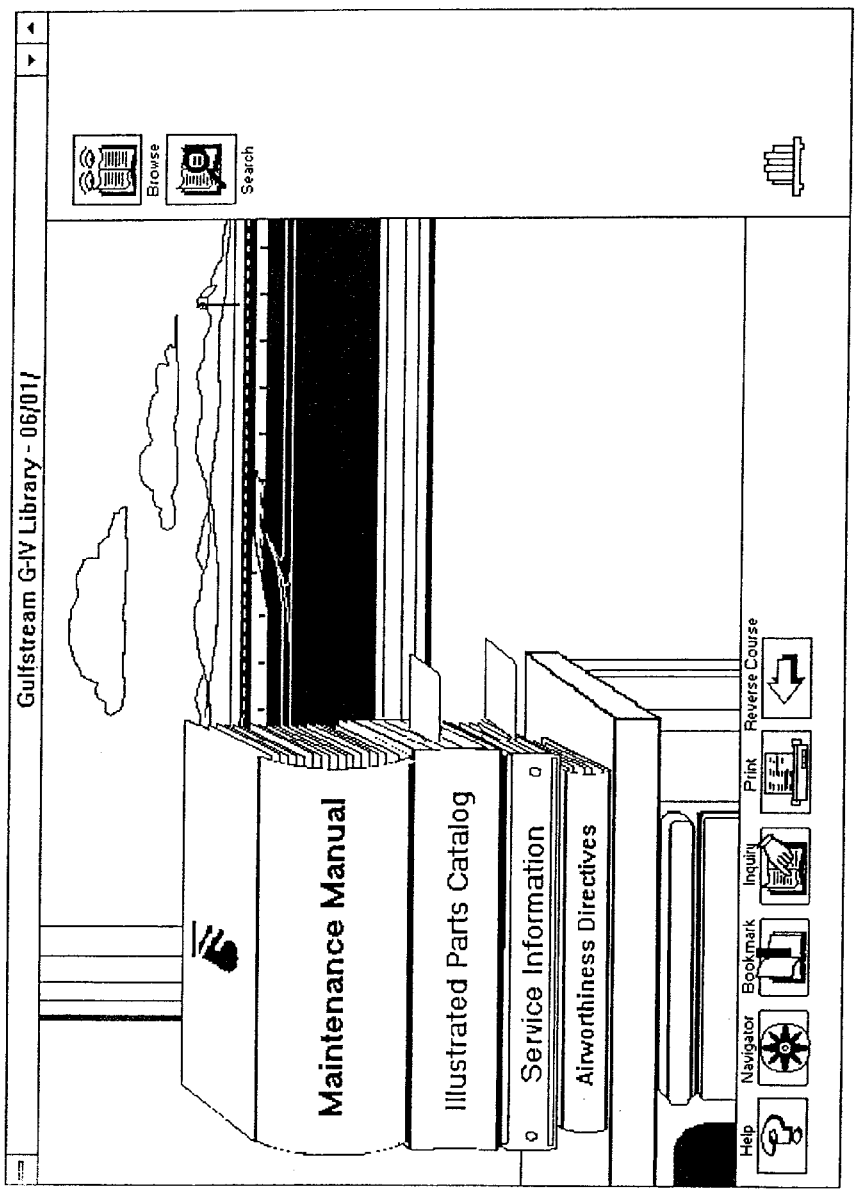

(See FIG. 44.)

As shown in FIG. 44, the bookshelf for the Gulfstream Bookshelf is depicted, which shows the publications and publication types available for the G-IV aircraft.

3.1.0 Browse Functions

Description:

The purpose of the Browse function is to point the user to an indexed selection list of all of the documents within a document type. That complete selection list serves as a master "table of contents" for that document type. With the Browse function, the Bookshelf Mode functions as a bookshelf at a library. A person decides where to look, then expects to find all of the publications, in order, one right after the other. However, with the CD-ROM, books are never checked out or missing, as they sometimes are at the library. All of the publications that should be included on the bookshelf are available from browse.

Continuing the library analogy, the maintenance and repair information system 10 determines which bookshelf is available to the user. For example, for the federal regulatory product, the books on the bookshelf are limited to regulatory publications and related manufacturer service information (SI). Choosing a book from the bookshelf allows the user to focus on a particular publication or publication type. Other browse options point the user to an even more precise place in the book, but always in the context of all documents around it. In fact, a primary feature of Browse is the ability to move from one publication to the next in the order that they are indexed.

Of course, paper books on a library bookshelf are limited to a single system of organization. They can only be ordered one way. In contrast, the maintenance and repair information system 10 electronic bookshelf can offer a variety of browse sequences to satisfy different user needs. Each publication type available from the bookshelf has a primary index which also serves as the CD-ROM order (the order of the documents on the CD-ROM), and some also have an alternate index which offers the user another browse sequence for the documents in a selection list.

The chart below lists the preferred primary index (CD-ROM order), as well as alternate indexes for each document type.

Airworthiness Directives (ADs)

Bi-Weekly (Primary Index) ordered by:
Size breaks ADs into two indices—Small and Large
   AD Number
Cumulative Indices (Alternate Index) ordered by:
Size breaks ADs into two indices—Small and Large
   Component Category (Airframe, Engine, Propeller, Appliance)
     Manufacturer
       Model
         AD Number
It is noted that the Cumulative Index does not serve as the CD-ROM order because ADs occur multiple times in that Index. All appliance ADs are listed in both the small and large cumulative indices.
Appliance Category Index (Alternate Index)
Only appliances are included in this index
   Appliance Category
     Manufacturer
       AD Number

Proposed Airworthiness Directives

Proposed ADs (Primary Index) ordered by:
Federal Registry Date

Related Service Information

Manufacturer Publication Type (Primary Index) ordered by:
Manufacturer
   Publication Type
     Document Identification
Model (Alternate Index) ordered by:
Manufacturer
   Model
     Publication Type
       Document Identification

Airworthiness Alerts

Monthly Issue (Primary Index) ordered by:
Issuance Number
   Then according to the original Alerts Issue TOC (which is close to but not exactly following the Category, Manufacturer, Model, Document Identification)
Cumulative (Alternate Index) ordered by:
Category
   Manufacturer
     Model
       Document Identification

Type Certificates

Cumulative Index (Primary Index) ordered by:
Category by GPO TC Volume
   Manufacturer
     TC Number
It is noted that the user can access the Cumulative index by model number (as described later), although that level of specificity is part of the TC itself and not part of the index.

Supplemental Type Certificates

Cumulative Index (Primary Index) ordered by:
Category (akin to TC Volumes)
   Manufacturer
     STC Number
It is noted that, as with TCs, the user can access the Cumulative index by model number (as described later), although that level of specificity is part of the TC itself and not part of the index.

Advisory Circulars

Subject Index (Primary Index) ordered by:
Subject (including Practical Tests Standards and FAA Question Books)
   Issue Number

Federal Aviation Regulations

FARs (Primary Index) ordered by:
FAR Part Number
   Then according to the original FAR's TOC (Preamble, Rules)
   SFARS

Proposed Federal Aviation Regulations

Proposed FARs (Primary Index) ordered by:
Federal Registry Date

Hazardous Materials

Code of Federal Regulations (Primary Index) ordered by:
Part Number
   Then according to the original publication's TOC (Subpart, Section)

Proposed Hazardous Materials

Proposed Hazardous Materials (Primary Index) ordered by:
Federal Registry Date

Orders

Orders (Primary Index) ordered by:
   Order Number
     Then according to the original Order's TOC Manufacturer Specific Products (i.e., Gulfstream) Maintenance Manual
   ATA Ordered Maintenance Manual
   Chapter
     Section
       Subject
   Original Publication Order (not applicable for Gulfstream)

For any MM ordered different from ATA order Illustrated Parts Catalog (IPC)
ATA Ordered IPC
Chapter
  Section
    Subject
Original Publication Order (not applicable for Gulfstream)
For any MM ordered different from ATA order
Manufacturer SI
To be handled exactly as SI for regulatory product.

Unlike all other modes and functions in the maintenance and repair information system 10, Browse is not intended to limit the documents a user can choose from. That is, Browse does not limit the number of available documents based on a word search, component affectivity, or any other criteria. Instead, Browse merely provides a pointer into the selection list of all of the documents within a publication type.

Because Browse does not invoke qualifying or limiting searches, it provides the most general and complete access to publications. In fact, every selection list generated by Browse contains all of the documents available for the specified document type. Given the nature of Browse, the user must start with at least a general idea of where he or she wants to look (in what publications) in order for Browse to be useful.

Like the Direct Flight control function, Browse provides access to any document, but multiple indices allow users who do not know a document identification to use Browse options to reach a particular document. It is noted that using wildcards at the end of a Direct Flight entry takes the user to the same selection lists used for the Browse function in the Bookshelf Mode.

Functionality:

When the user selects one publication (that is, "one book" on the bookshelf or, in the case of the regulatory library, one publication type), the Browse icon becomes available. When no book, or more than one book, is selected, the Browse function is grayed out.

Figure 45:
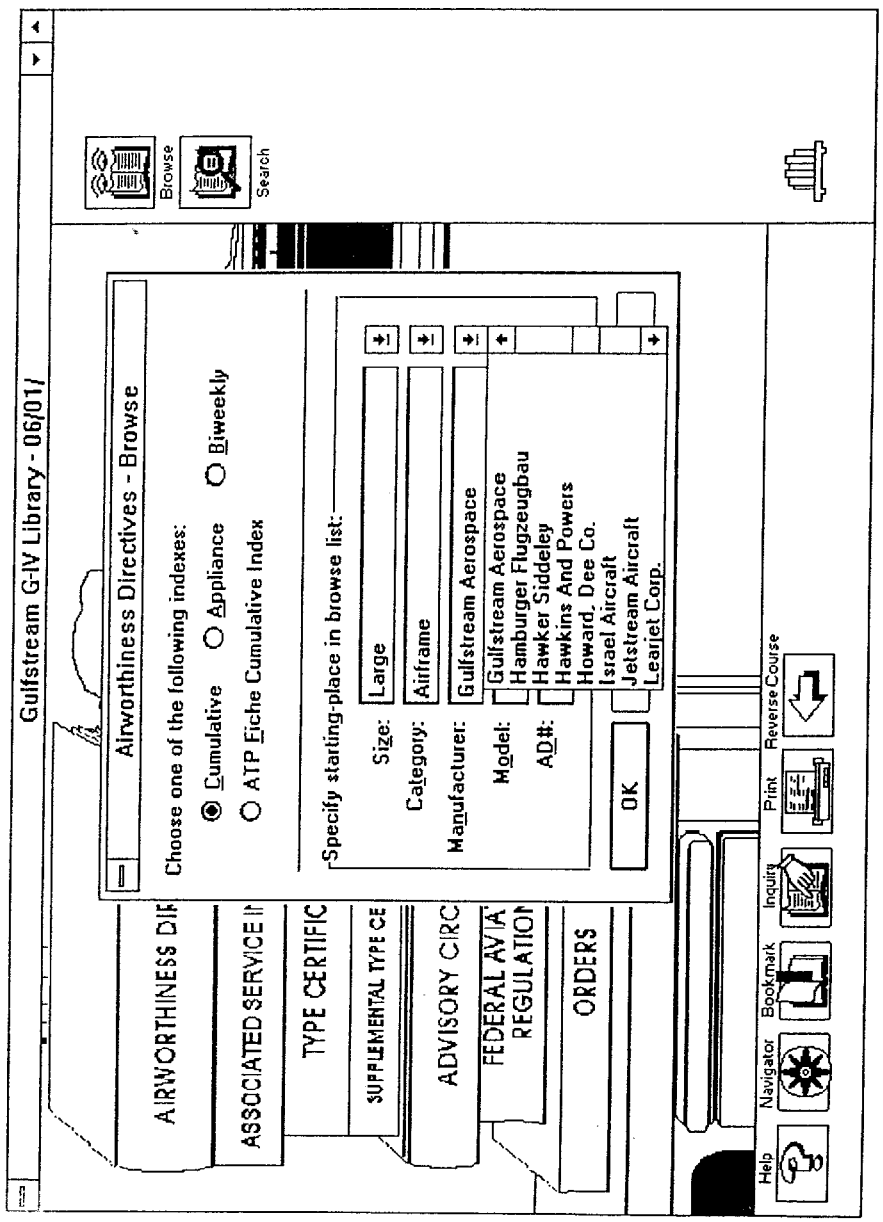

Selecting Browse brings up a Browse Options dialog box. From here, the exact function of Browse depends upon the publication type selected on the bookshelf. The functionality for each publication is as follows.
(See FIG. 45.)

From the Browse Option dialog box, the user is prompted to fill in "Some, None, or All" of the data field options. Most of the fields in a Browse Options dialog box are driven by word wheel text entry fields. Based on the data fields the user has chosen to fill in, the maintenance and repair information system 10 establishes which browse sequence (if more than one) and where in the selection list.

Examples of browse options available to the user are category, manufacturer, model, issuance, or document number. By filling in category and manufacturer, the user implies the cumulative or "subject" index is preferred and that he or she wants to start browsing at the first document for that manufacturer. If the user had filled in the model, then he or she would have started browsing in the same selection list at the first document for that model. The more information there is, the more specific the pointer.

Suppose that instead of category and manufacturer, the user specified an issuance such as Bi-Weekly for ADs. That implies that the user is interested in a numeric index of all of the documents. Therefore, the user would go to the selection list ordered according to the numeric browse sequence.

These are general examples. Within each document type, the unique numbering schemes, category organizations, and issuance schedules make comparison with other document types difficult. Each document type has evolved separately and requires its own organization and indexing conventions. To the programmer or system designer, the organizational inconsistencies between document types are apparent. To the users, the inconsistencies between document types are familiar.

With regard to selection lists, clicking OK from the Browse Options dialog box launches into the selection list in document display. Once launched into a selection list, an item is preferably highlighted. This item can be the particular item pointed to by the Browse options, or the first item in the group pointed to by the Browse options. Headings are preferably not highlighted.

If the user leaves all of the Browse options blank but still initiates Browse, the user would go to the first item on the selection list in the Browse sequence that corresponds to the primary index.

In an effort to help the user realize that he or she is browsing in the context of all of the documents in a selection list of all documents, the selection list is preferably a step in the Browse process, even if the preceding dialog boxes point to a specific document. The assumed desire to browse up and down the selection list of all documents is fundamental to the Browse function. If browsing at the selection list level is not the intent the user, then he or she should use the Search function, not Browse.

When displaying cumulative or "subject" selection lists in document display, headings mark important divisions between groups of documents. For example, in the Cumulative Index selection list for ADs, the manufacturer and model appear as headings before the ADs listed for that model.

When more than one index is available for a given document type, the information presented in the two selection lists may vary. For example, in the cumulative index, the manufacturer associated with an AD is part of a selection list heading, but in the numerical index, the manufacturer is a field of information presented for every AD.

For a complete list of all possible search criteria and all selection list fields for each document type, see The Browse and Search Authority File Tables in Appendix A.

Contemplated Modification:

For the maintenance and repair information system 10, the word wheel Browse option fields are probably best driven by finite lists of choices that are always available. Preferably, the Browse options can be sensitive to what is being specified in the surrounding fields. For example, if a the category Browse option is specified, the manufacturer Browse options at that dialog box would be limited to manufacturers that produce components in the specified category. In reverse, if a manufacturer is the first option specified, the category can automatically be filled in if that manufacturer only produces components in one category.

3.1.1 Browse Access for ADs

Description:

All ADs have two browse sequences for existing ADs, namely, Cumulative and Bi-Weekly. The Cumulative Index provides the user the option of browsing ADs as separated into small and large aircraft, then broken down by component category (airframe, engine, propeller, and accessories), manufacturer, and model.

The Bi-Weekly Index permits the user view ADs in the order in which they were published as grouped into the bi-weekly releases (which means every other week to the FAA).

Unlike the different indices the maintenance and repair information system 10 provides for other document types, both of these AD indices are provided as documents by the FAA and readily recognized by aviation professionals.

Figure 46:
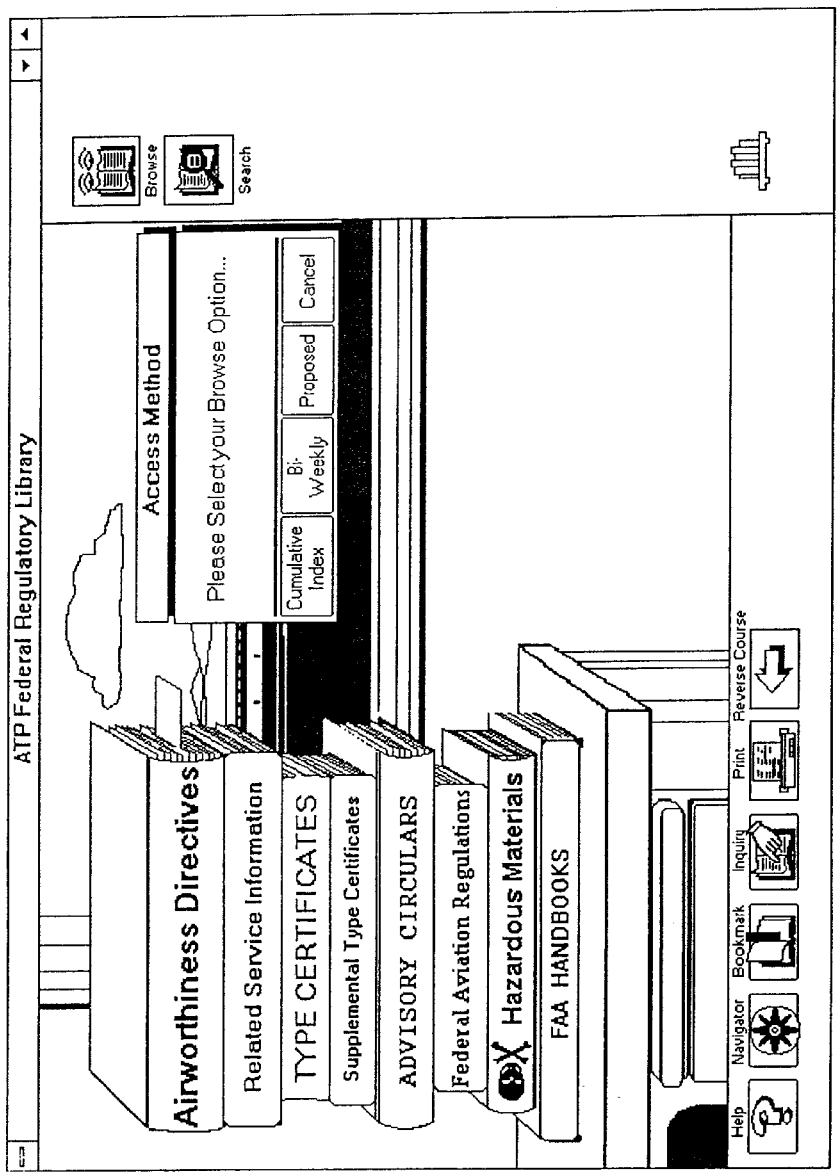

In addition to being included in the cumulative and bi-weekly indices, Appliance ADs have their own third Browse sequence according to the Appliance Category Index which groups appliance ADs by appliance category. In the cumulative index, appliances are grouped by manufacturer and then appliance category like any other component (airframe, engine, etc.). However, with the Appliance Category Index, the user can browse a list of appliance ADs ordered by appliance category and then manufacturer (i.e., he or she can browse all of the ADs for batteries across manufacturers).
(See FIG. 46.)

Figure 47:
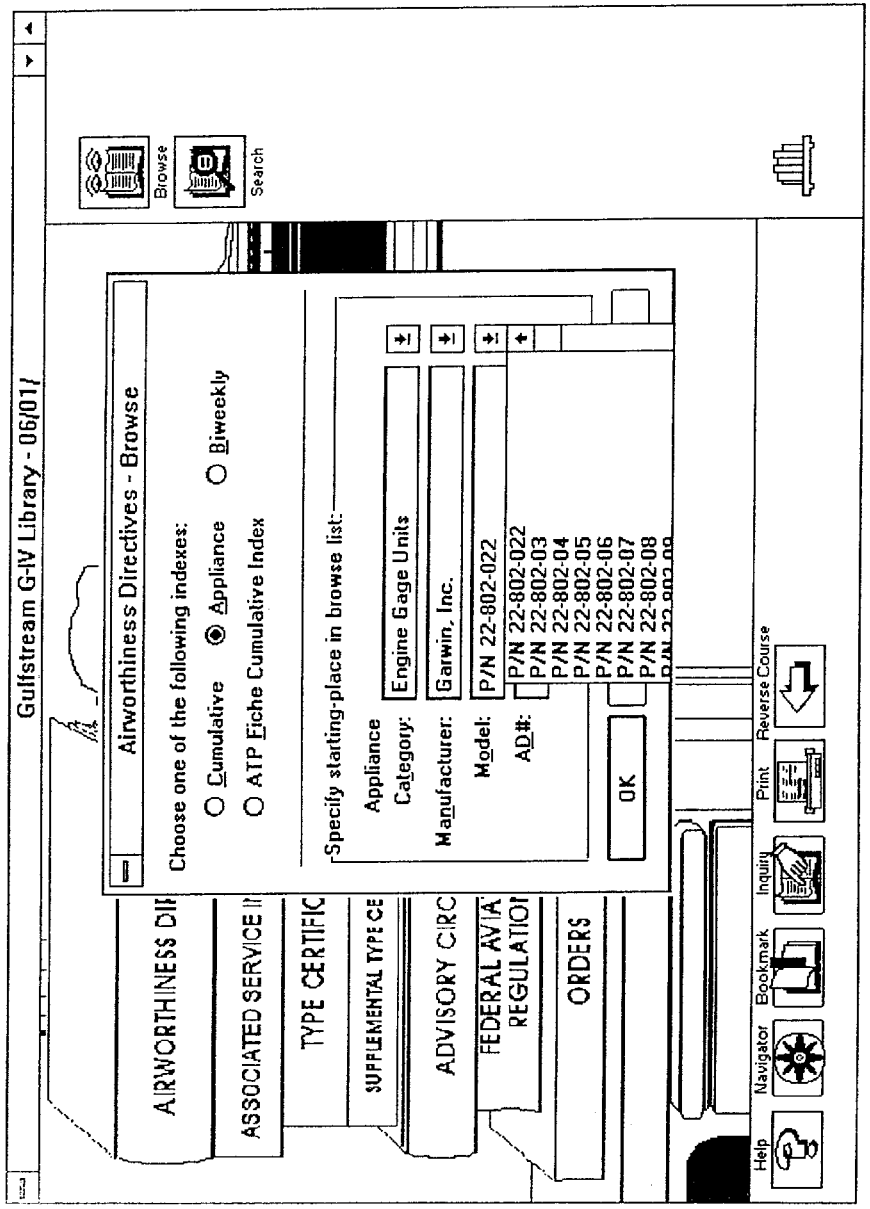

The user can also view a separate list of proposed ADs. This is not another Browse sequence of existing ADs, but a separate list of ADs pending release.
Functionality:

If the user clicks on the Browse icon when the AD book is selected from bookshelf, the Browse Index dialog box for ADs is presented. Since users will be looking for the different FAA indices by name, this first dialog box orients them toward their preferred finding aid. Control buttons present the choices, namely, Cumulative Index, Bi-Weekly, and Proposed.
(See FIG. 47.)

With regard to the Cumulative Index, choosing Cumulative Index brings up the Cumulative Browse Options dialog box. The size Browse option allows the user to indicate large or small aircraft (the default is small aircraft).
(See FIG. 48.)

The first four choices available from the category Browse option allow the user to specify Airframe by Manufacturer, Engine by Manufacturer, Propeller by Manufacturer, or Appliance by Manufacturer. Choosing one of these options indicates that the user wants to browse the selection list ordered according to the Cumulative Index. In the Cumulative Index, appliances are ordered by manufacturer and then appliance category like any other component (airframe, engine, etc.). This is the Browse sequence when "Appliances by Manufacturer" is selected from the category.

The other choices available from the category Browse option list all of the categories of all the appliance ADs (batteries, fuel filters, fire extinguishers, etc.). Choosing a specific appliance category indicates that the user wants to browse the selection list ordered according to the Appliance Category Index. In the Appliance Category Index, Appliances are grouped by category, not manufacturer.

Below the category Browse option is the manufacturer Browse option used to specify a manufacturer for the category chosen above. Note that it points to a more specific location in either the Cumulative Index or the Appliance Category Index depending upon what category was indicated above.

If a manufacturer is specified, but not a category, the user is pointed to the first AD in the Cumulative Index that applies to that manufacturer. If a manufacturer and model identify an appliance, but no category is specified, the user is pointed to the first AD in the Cumulative Index that applies to that appliance.

Figure 49:
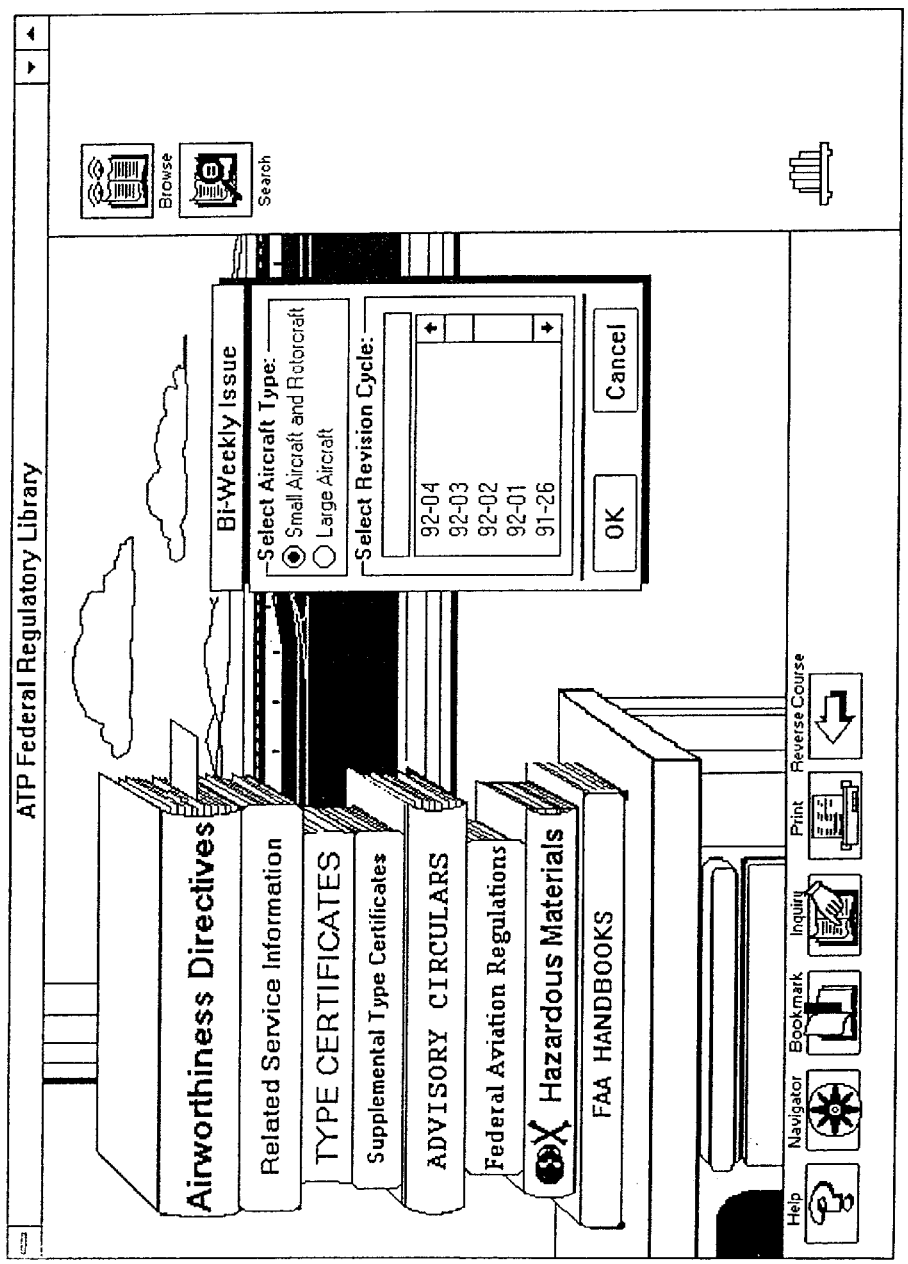

It is noted that the FAA currently publishes a "Summary Subject Index" of ADs which is similar to the Cumulative Index defined above. When a single AD applies to several models, rather than list that AD under each model (the way the library service provider intends in the described selection list), the FAA lists the ADs that apply to several models under an "all model block" that the FAA calls "model" (what the library service provider would refer to as "series"). Then, the FAA lists the ADs that only apply to one model in something that the FAA calls a "series block" (what the library service provider would refer to as "model").
(See FIG. 49.)

Selecting the Bi-Weekly option brings up the Bi-Weekly Issue dialog box. Even in published order, ADs are separated into large and small aircraft, despite the fact that they share the same numbering system.
(See FIG. 50.)

Along the bottom of the Bi-Weekly Issue dialog box are all of the bi-weekly revision cycles presented in descending order (most recent first). There are 26 cycles for each year dating back to 1947. The first number in the set is the year and the second is the issuance for that year (1-26). Note that the bi-weekly option presents the FAA's bi-weekly AD index, not the library service provider's.

Since the bi-weekly revision cycle is the same for large and small aircraft, the user is free to select a cycle either before or after selecting large or small aircraft. Defaults for this dialog box are small aircraft and the most recent revision cycle.

Upon selecting either large or small aircraft and a revision cycle, the user is positioned at the first AD in the chosen cycle on the selection list of numerically ordered AD's related to either small or large aircraft (not both). The revision cycle appears in the selection list as a heading separating one bi-weekly AD from the next. Clicking on a particular AD takes the user directly to that AD.
(See FIG. 51.)

Clicking on Proposed from the Browse dialog box takes the user directly to the selection list of ADs currently proposed but not yet issued. Proposed ADs are ordered according to the Proposed index which sorts by the date they were published in the Federal Register.

3.1.2 Browse Access for SIs

Figure 52:
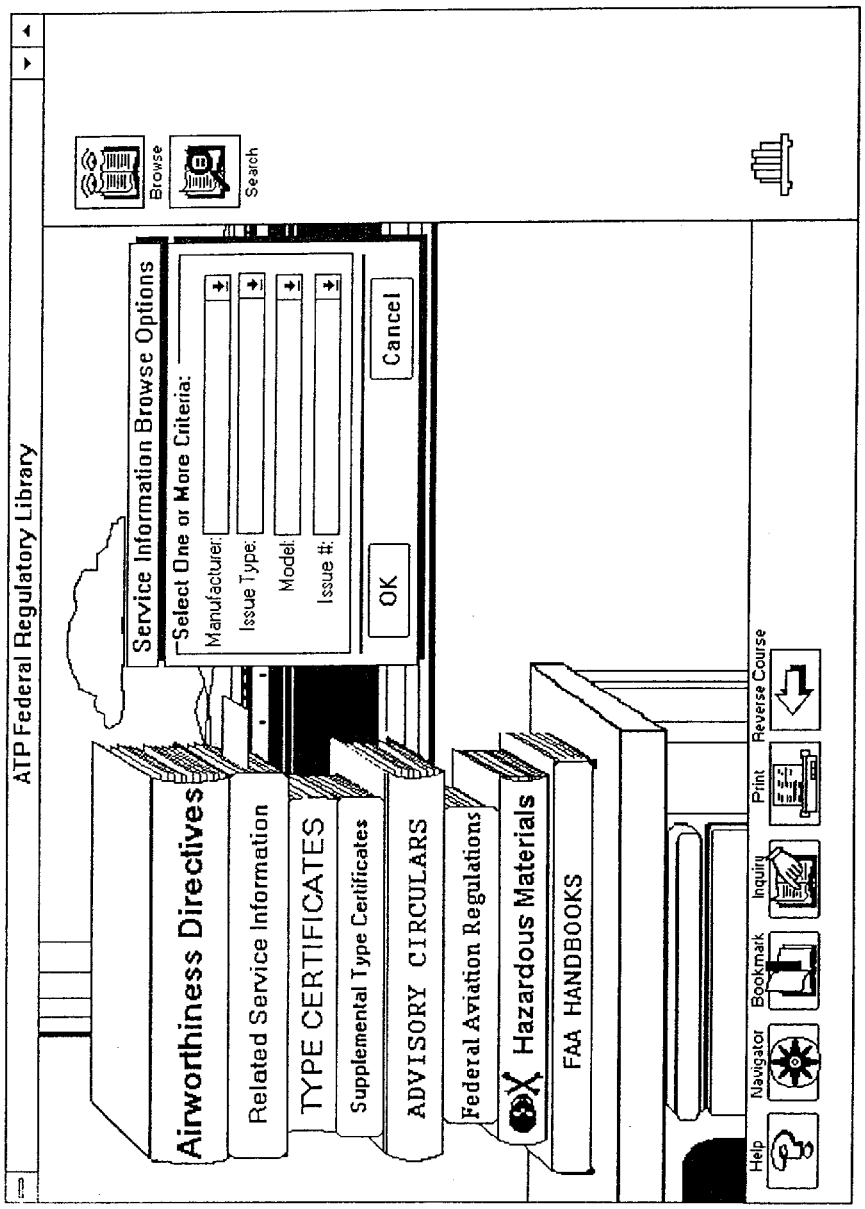

Description:

All of the different issue types of Service Information (SI) documents are presented as a single book on the bookshelf The maintenance and repair information system 10 offers the user two browse sequences, by manufacturer publication type or by model. For the manufacturer publication type index (which is also CD-ROM order), a manufacturer's SI is grouped by publication type and then ordered by document identification. For the model index, a manufacturer's SI is grouped by model, then subgrouped by issue type, and then ordered by document identification.
Functionality:
(See FIG. 52.)

Figure 53:
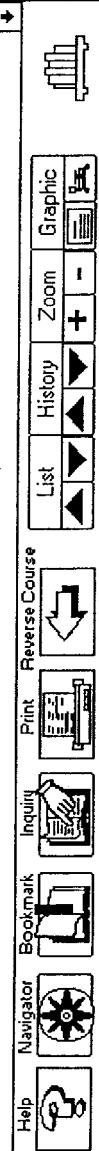

With the Service Information (SI) book selected on the bookshelf, clicking the Browse icon brings up the Service Information Browse Options dialog box. Browse options allow the user to specify a manufacturer, model, publication type, and document number.
Examples:

Because both indices key on the manufacturer, the manufacturer option should be the first item that a user wants to specify. If only a manufacturer is specified, document display would bring up the selection list in manufacturer publication type Browse sequence (because that is CD-ROM order) positioned at the first document for the first publication type. Not enough options have been filled in to get the user any closer.
(See FIG. 53.)

With a manufacturer indicated, specifying a publication type and clicking OK brings up the selection list in manufacturer publication type Browse sequence pointing to the first document of the desired publication type. The selection list is ordered by manufacturer and then document identification, of which issue type is the first two characters. Headings in this selection list indicate divisions between manufacturers and issue types.

With a manufacturer indicated, specifying a Model and clicking OK brings up the selection list ordered according to the alternate index, that is, manufacturer, then model, and then issue types. Headings in this selection list indicate divisions between manufacturers, models, and issue types. (See FIG. 54.)

It is the act of specifying either a publication type or a model number that indicates to the maintenance and repair information system 10 which Browse sequence is preferred by the user. Specifying a document number merely points to a single item on either selection list. When both a publication type and a model are provided by the user, the maintenance and repair information system 10 assumes that the user prefers the selection list ordered according to the manufacturer publication type index (CD-ROM order).

3.1.3 Browse Access for Alerts

Figure 55:
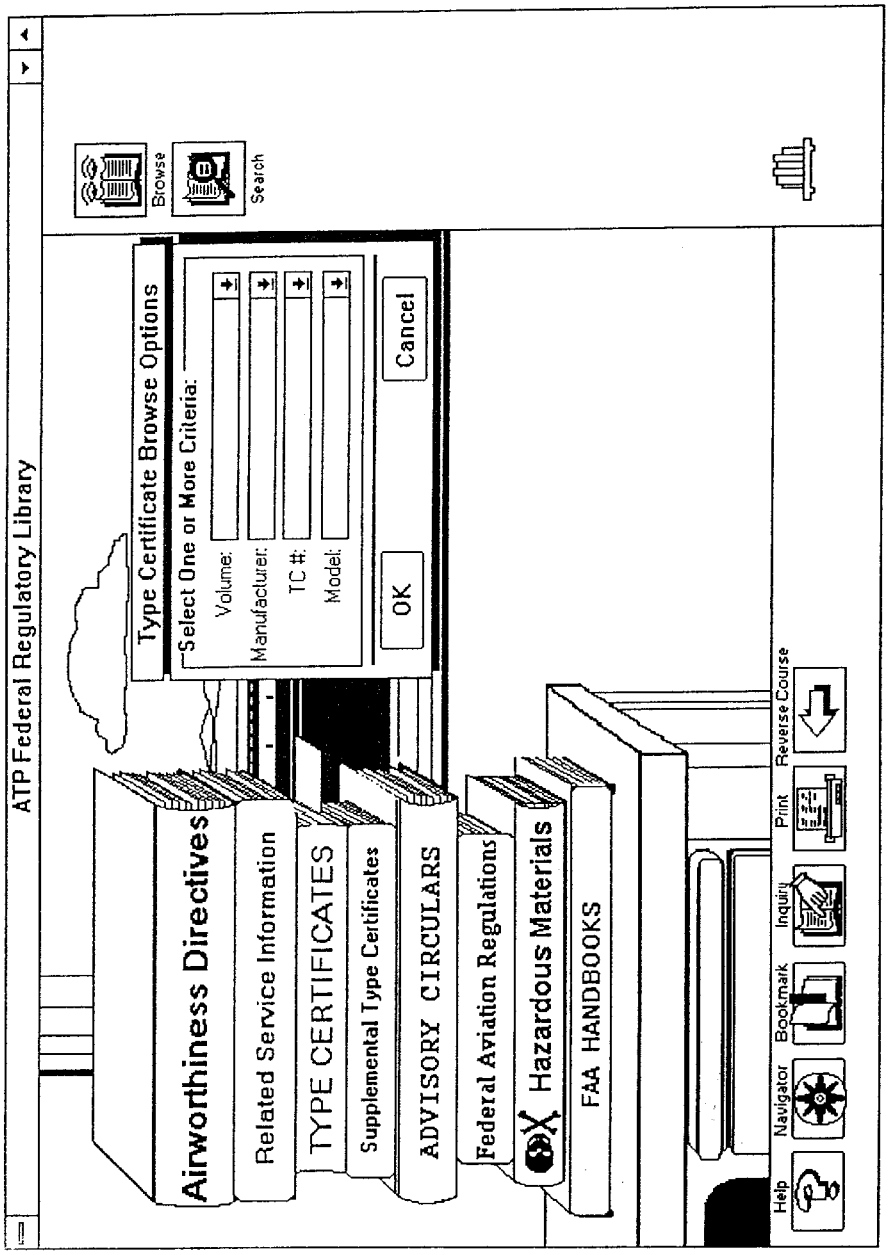

Description:

Like ADs, Alerts have a regular release cycle. They are published in a monthly Alerts issue. Also like ADs, an Alert is generally issued against an airframe or component. Therefore, it is sensible to have a Cumulative Index so users can find all of the Alerts applicable to a particular component. Unlike ADs, the FAA does not actually publish a cumulative index for Alerts. This index is an index generated by the library service provider.
(See FIG. 55.)
Functionaity:

With the Alerts book selected on the bookshelf, clicking the Browse icon brings up the Airworthiness Alerts Browse Options dialog box. The Browse options available are issue, category, manufacturer, and model.

If no Browse options are filled in, the user is taken to the selection list ordered according to the monthly issue index positioned at the first Alert in the most recent monthly issue.

Whenever the monthly issue is specified, the maintenance and repair information system 10 assumes that the user wants to go to the selection list ordered according to the monthly issue index where Alerts are grouped as they were originally released, that is, a monthly Alerts issue. Any other options specified in addition to monthly issue help point toward a specific Alert in that issue. If none of the other Browse options points toward an Alert in that issue, the user is taken to the first Alert in the specified issue.
(See FIG. 56.)

Figure 57:
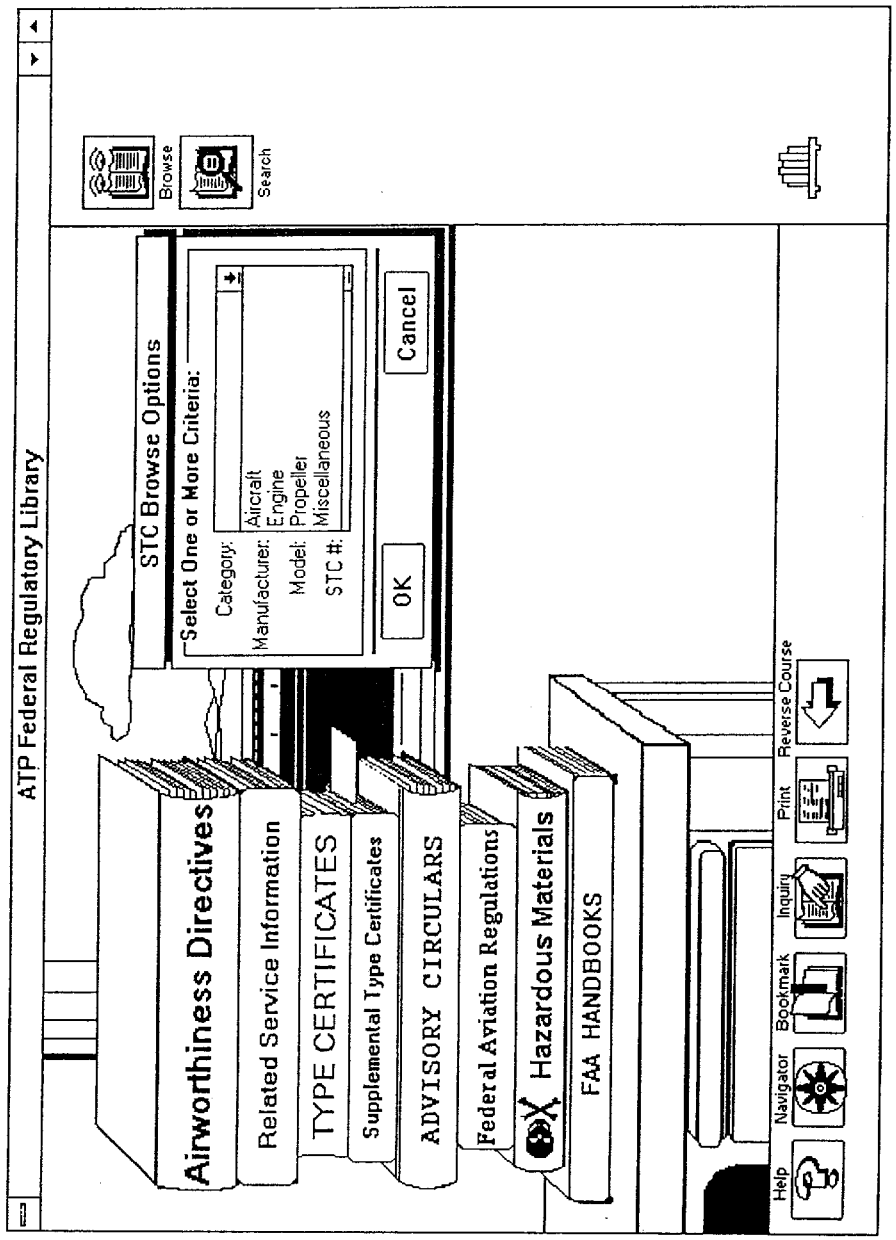

With regard to the monthly issue selection list, the selection list ordered according to the monthly issue index lists all Alerts in descending order by monthly issuance (most recent first). The month issued and the actual Alert issuance number appear as headings in the selection lists. Each individual Alert is listed as a selection list item following the headings. It is noted that unlike ADs, the Alerts issuance number is actually the number of the entire issuance, not the number for an individual Alert that applies to a particular aircraft or component. Therefore, document identifications for each Alert have to be assigned. Those document identifications preferably include the two-letter document type code, the Alerts issuance number, and, finally, a unique number indicating where in the original Alerts issuance an Alert appeared (where and on what page). Since this Alert number is not used outside the library service provider, it preferably does not appear in the selection list.
(See FIG. 57.)

Within monthly issue, Alerts are broken down into all the same headings that appear in an Alerts' table of contents (Airframe, Engines, Propeller, Accessories, etc.). These headings are usually components affected by Alerts in an issuance, but sometimes these headings include general categories, such as "Be Aware" and "Of Interest." These headings also appear in the selection list and group Alerts as they did in the original document.

With regard to the Cumulative Index, whenever the monthly issue is not specified and any other Browse options are specified, the maintenance and repair information system 10 assumes that the user wants to look at the selection list ordered according to the Cumulative Index.

Specifying a component category, manufacturer, and/or model brings up the selection list of Alerts ordered according to component category, manufacturer, model, and, lastly, the document identification (which references the alert issuance). Like ADs, Alerts can apply to more than one model. Therefore, one Alert can be referenced under several different models within this same selection list.

3.1.4 Browse Access for TCs

Figure 58:
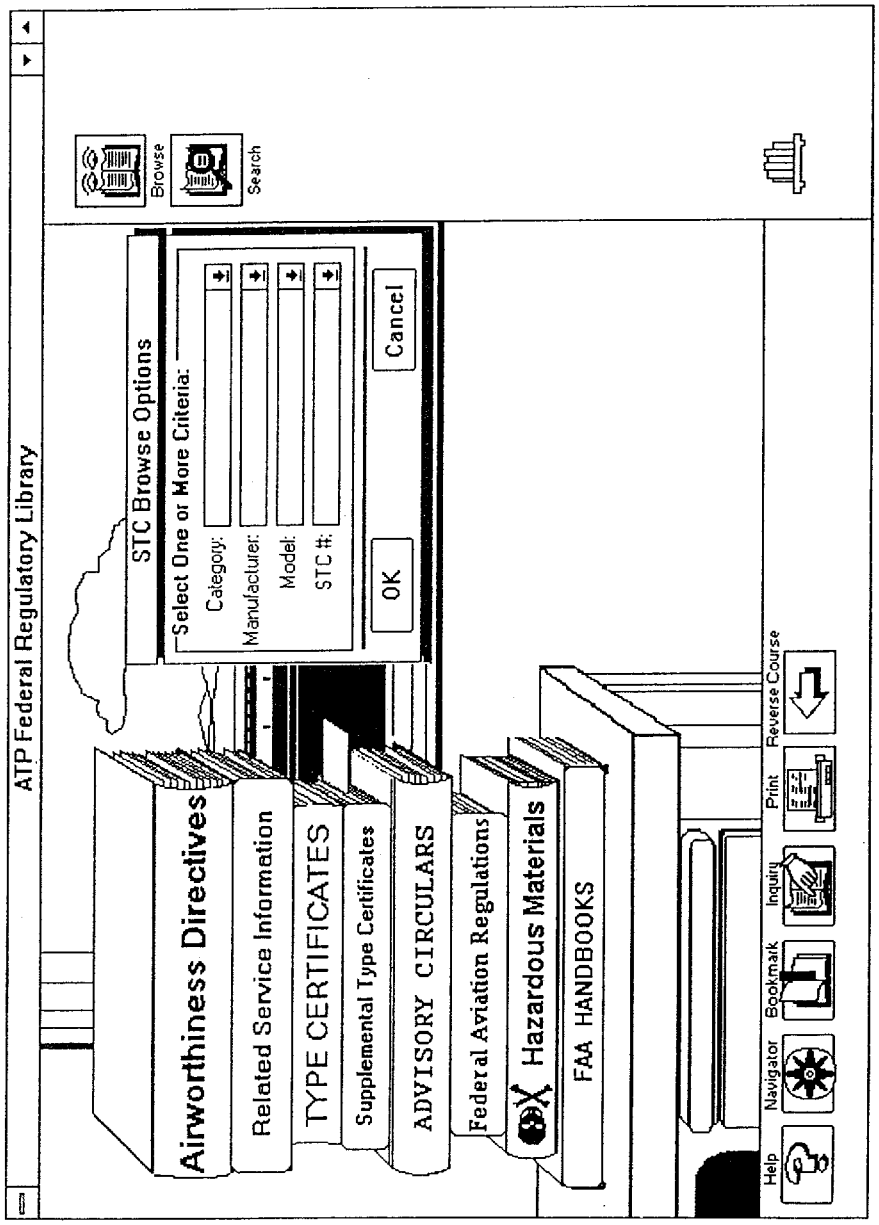

Description:

TCs have one Browse sequence ordered according to the Cumulative Index. The Cumulative index groups TCs into their FAA Volumes. The FAA breaks TCs into four volumes. That is how user is accustomed to finding them.
Functionality:
(See FIG. 58.)

With the TC book selected at the bookshelf, clicking the Browse icon brings up the TC Browse Options dialog box. The model option is grayed out. The user cannot choose a model until he or she has specified either a manufacturer or TC number. (There would be too many models to pick from.)

The volume option permits the user to specify the TC categories as published by the GPO. This points to the top of a volume within the selection list.

Specifying a manufacturer points to the top of a manufacturer within the selection list. If no volume is specified with the manufacturer, it points to the first occurrence of that manufacturer within the selection list.
(See FIG. 59.)

If the user can specify either a TC number or a model number (or both), the user is pointed to a specific TC on the selection list. Because one TC on the selection list covers multiple models, the model option points to a TC on the selection list.

Each TC is an item on the selection list. Clicking on a TC number takes the user to the top of the first page of the TC. If the user is actually interested in the part of that TC which applies to one model (the model block), the user can click on the model number in the model listing at the beginning of every TC. These model numbers are hyperlinked to the beginning of the related model block.

It is noted that in an effort to ease programming demands and present a more fluid view of TCs, TCs are presented as a single document. This eliminates the complicated need for the maintenance and repair information system 10 to track TCs separated into headers, model blocks, and notes. It does not impact the SGML process.

3.1.5 Browse Access for STCs

Description:

STCs have one Browse sequence ordered according to the Cumulative Index. The Cumulative Index groups STCs by category, then by manufacturer, and then by model number within manufacturer.

Since the maintenance and repair information system 10 does not present the STCs themselves, but rather a synopsis of the STCs, the selection list is essentially the data to be presented.

Figure 60:
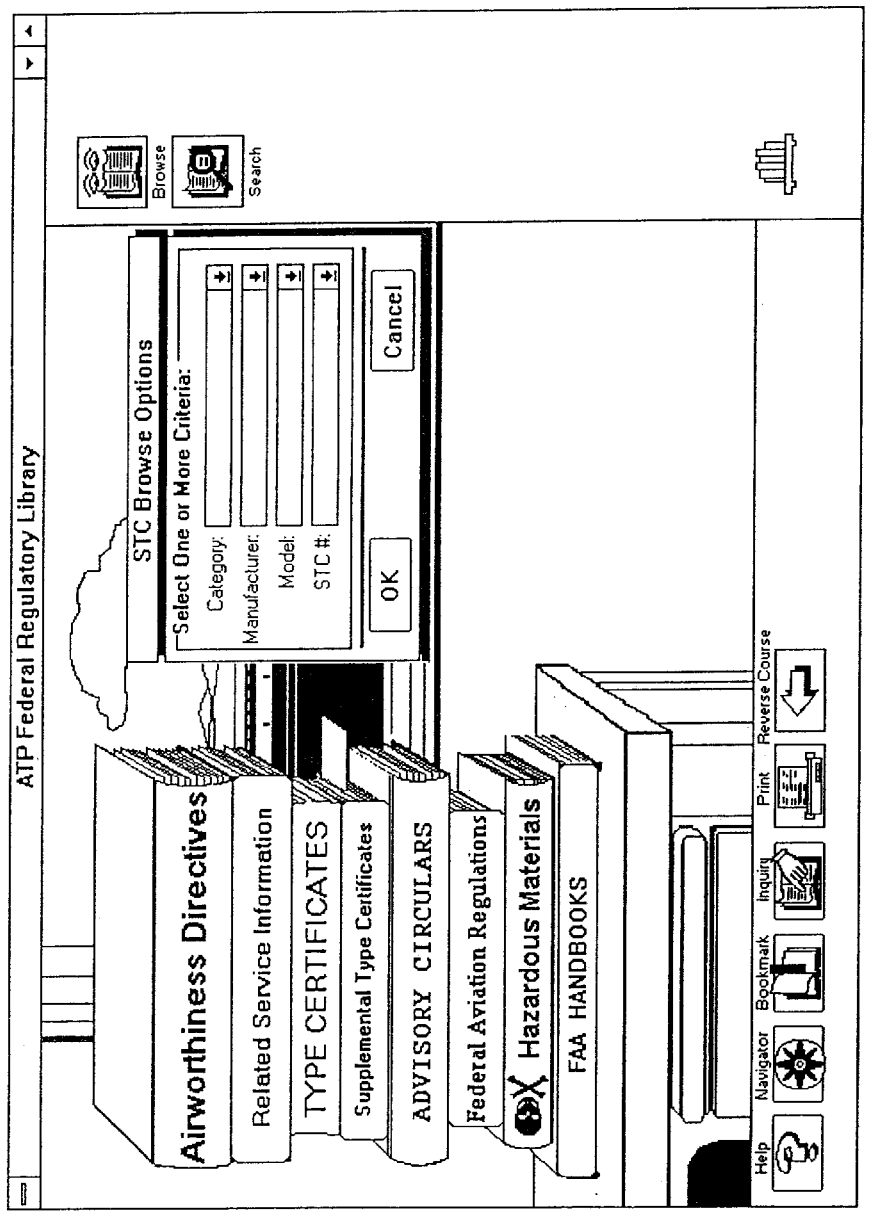

Functionality:

(See FIG. 60.)

With the STC book selected at the bookshelf, clicking the Browse icon brings up the STC Browse Options dialog box which allows the user to specify a component category. These are the types of components that have STCs (i.e., Aircraft, Engine, Propeller).

(See FIG. 61.)

The other Browse options point to a specific STC on the selection list. Since the selection list is the data, there is nothing to select on this selection list.

3.1.6 Browse Access for ACs

Description:

Advisory Circulars (ACs) have one Browse sequence ordered according to the Numerical Index. With ACs, numerical sequence also happens to order ACs by subject, since the first two numbers in the AC number indicate subject.

Also, since many aviation professionals recognize ACs by the FAR Part they reference, the Browse options for ACs allow users to locate ACs by FAR Part.

Figure 62:
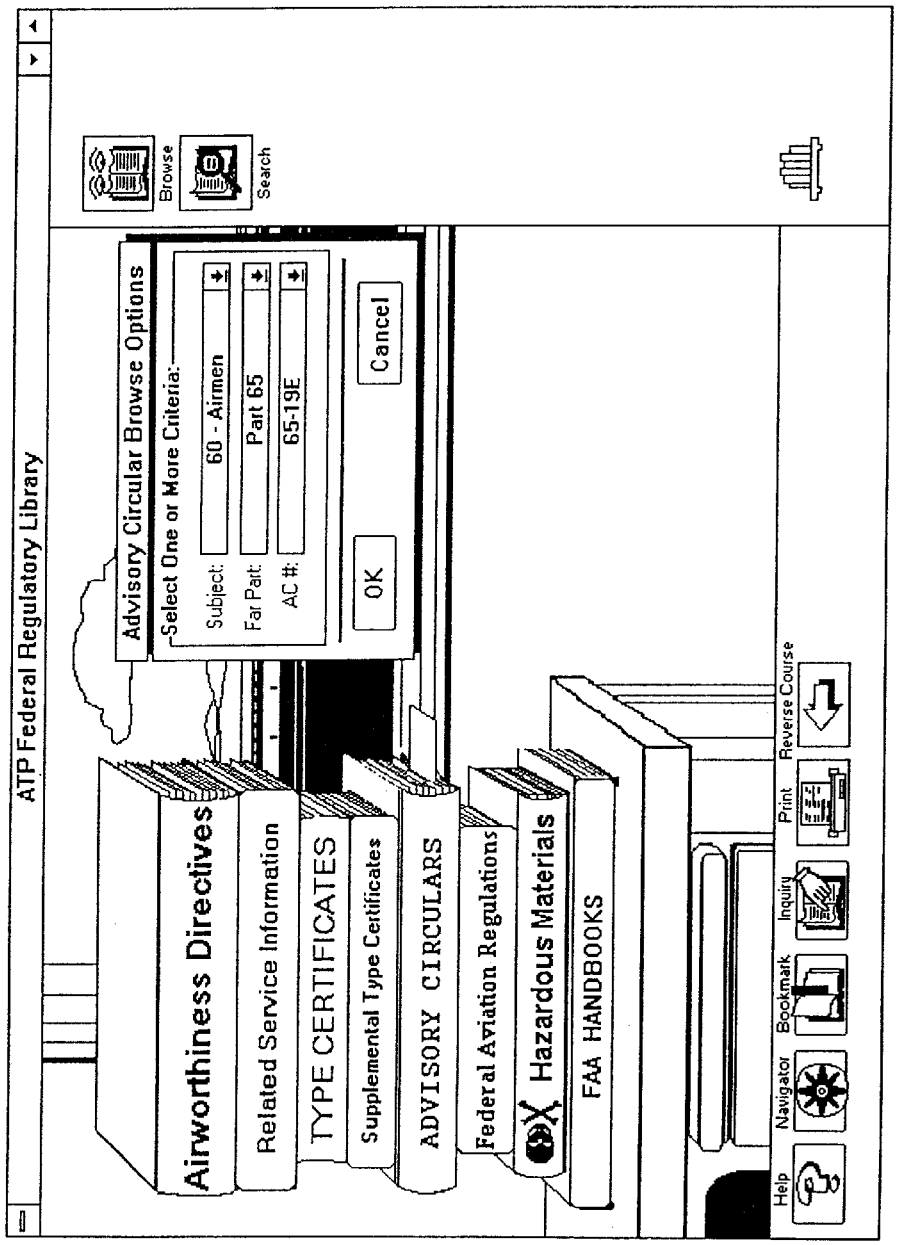

Functionality:

(See FIG. 62.)

If the user clicks on the Browse icon while the AC book is selected from the bookshelf, the Advisory Circular Browse options dialog box is presented and prompts the user to specify browse criteria. Browse options allow the user to specify Subject, FAR Part, or AC number.

The subject Browse option presents a word wheel of different subjects under which all of the ACs are categorized. The categories are numbered in accordance with the FAA standards set forth in AC 00-2.5. Indicating a subject points to the beginning of that subject on the selection list.

It is noted that there are some ACs (i.e., "tests") that do not reference to an existing subject in the subject index. Rather than only have these ACs available to users who know the exact AC number, the library service provider offers two more subjects, Practical Test Standards and FAA Question Books. These new subjects are not numbered, only named, and appear at the bottom of the subject list.

(See FIG. 63.)

The FAR Part Browse option presents a word wheel of FAR Part numbers, which points to a place on the selection list within a subject. Practical Test Standards and FAA Question Books do not have corresponding FAR Part numbers.

The AC number Browse option allows the user to enter the actual AC number point to that exact item on the selection list. Because an AC number identifies a particular item on the sole selection list, it implies a subject and FAR part.

(See FIG. 64.)

It is noted that the first characters in the AC numbers of Practical Test Standards and FAA Question Books are letters. These are sorted to appear at the bottom of the selection list (not the top).

Clicking on an issue number on the selection list takes the user to the table of contents for that specific AC (see AC Search Selection List under section 3.2.1 AC Search).

3.1.7 Browse Access for FARs

Figure 65:
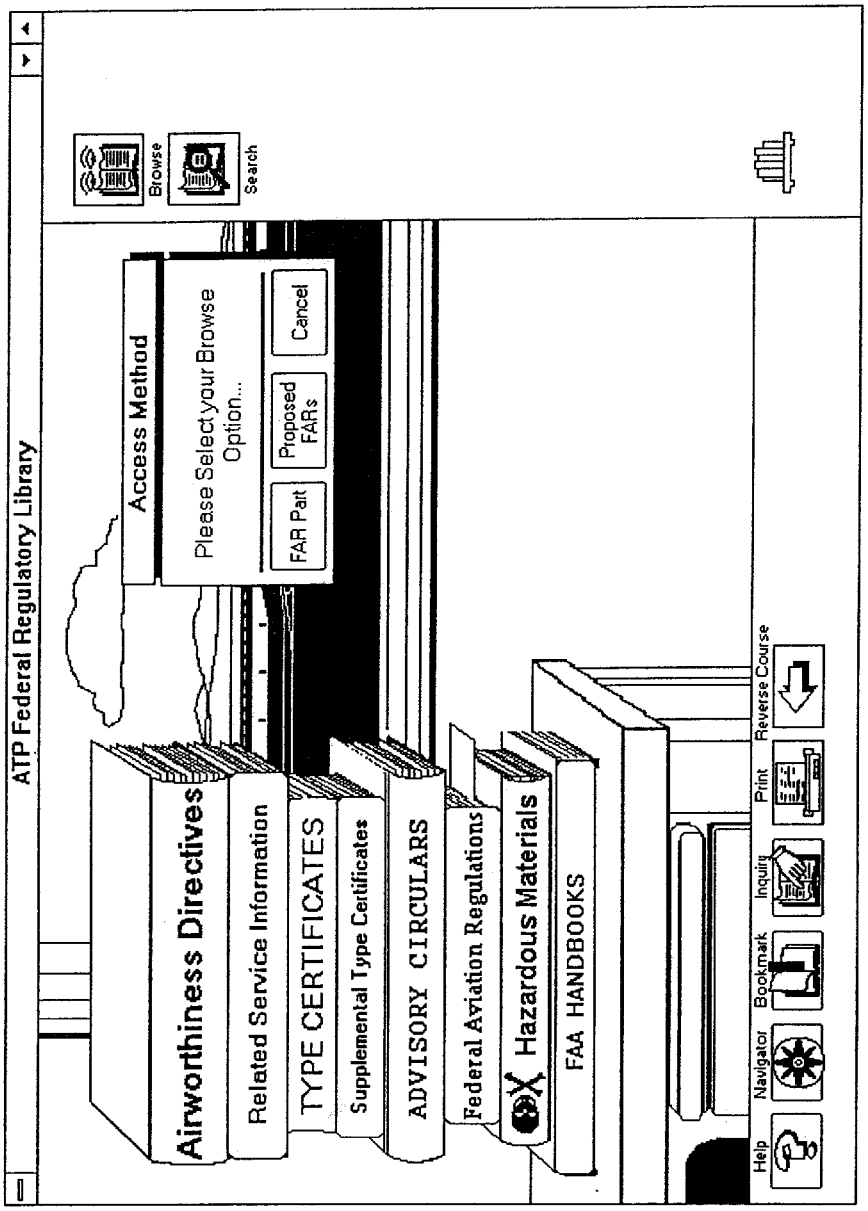

Description:

(See FIG. 65.)

There is only one Browse sequence available for FARs (Federal Aviation Regulations). In this sequence FARs are ordered numerically and then broken into their respective parts in the order in which they occur in the original document. Since there is no aircraft specific information in FARs, the index is merely intended to take the user to the right FAR number. FAR Part Browse also provides the user an opportunity to view proposed FARs and proposed changes to FARs.

Figure 66:
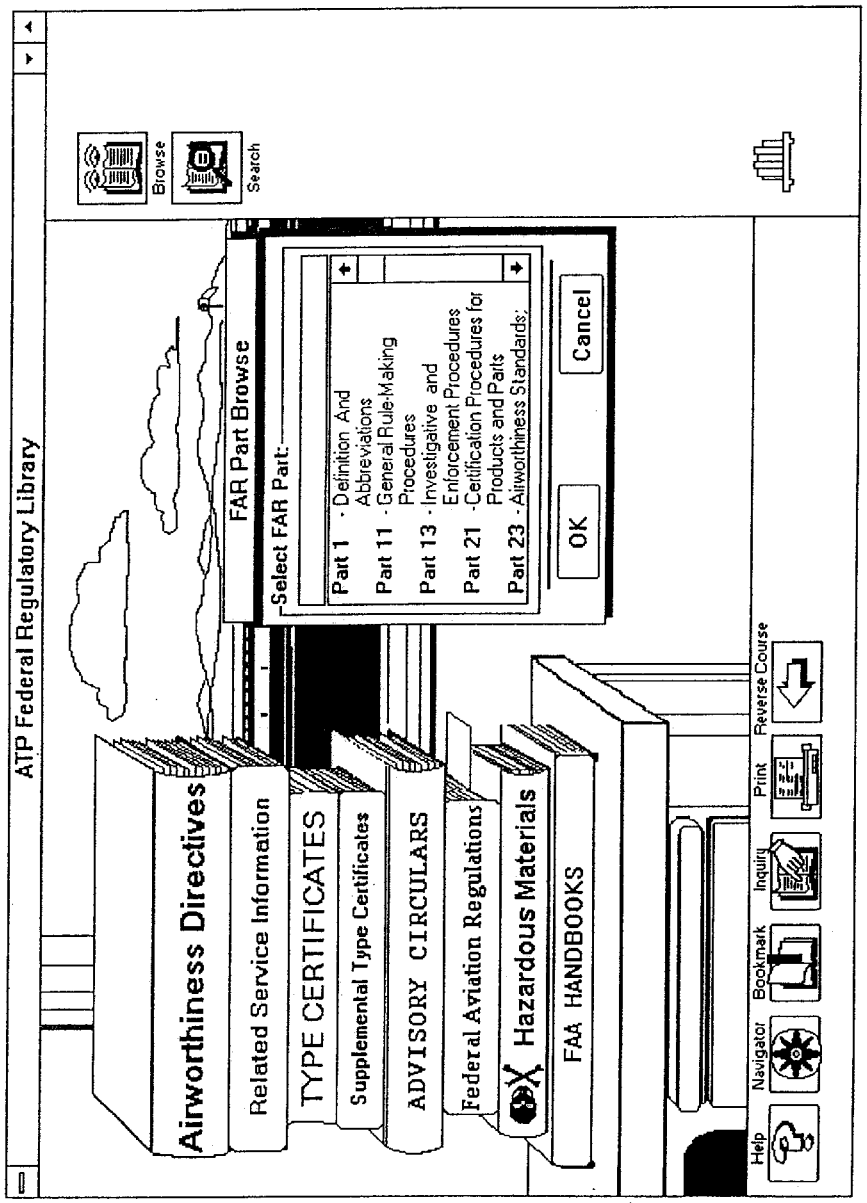

Functionality:

(See FIG. 66.)

With the FAR book selected at the bookshelf, clicking the Browse icon brings up the FAR Browse dialog box which allows the user to browse FAR Parts or the proposed changes to existing FARs. The choices are presented with control buttons in the same manner that the initial AD Browse choices are presented.

If the user clicks on the FAR Part control button, a second dialog box presents the sole browse option, namely, FAR part number. Choosing a FAR part number brings up the selection list of FARs. Clicking on a FAR takes the user to the table of contents for that FAR where the user can choose the preamble, one of the rules (subparts), or an SFAR associated with the FAR.

It is noted that depending upon the best software performance, this reconstruction of the table of contents can be a scanned and hyperlinked copy of the original table of contents or, alternatively, a selection list constructed by the maintenance and repair information system 10. In either case, it must include the level of detail found in the original paper table of contents which included rules which is the InnerView document level for FARS.

Figure 67:
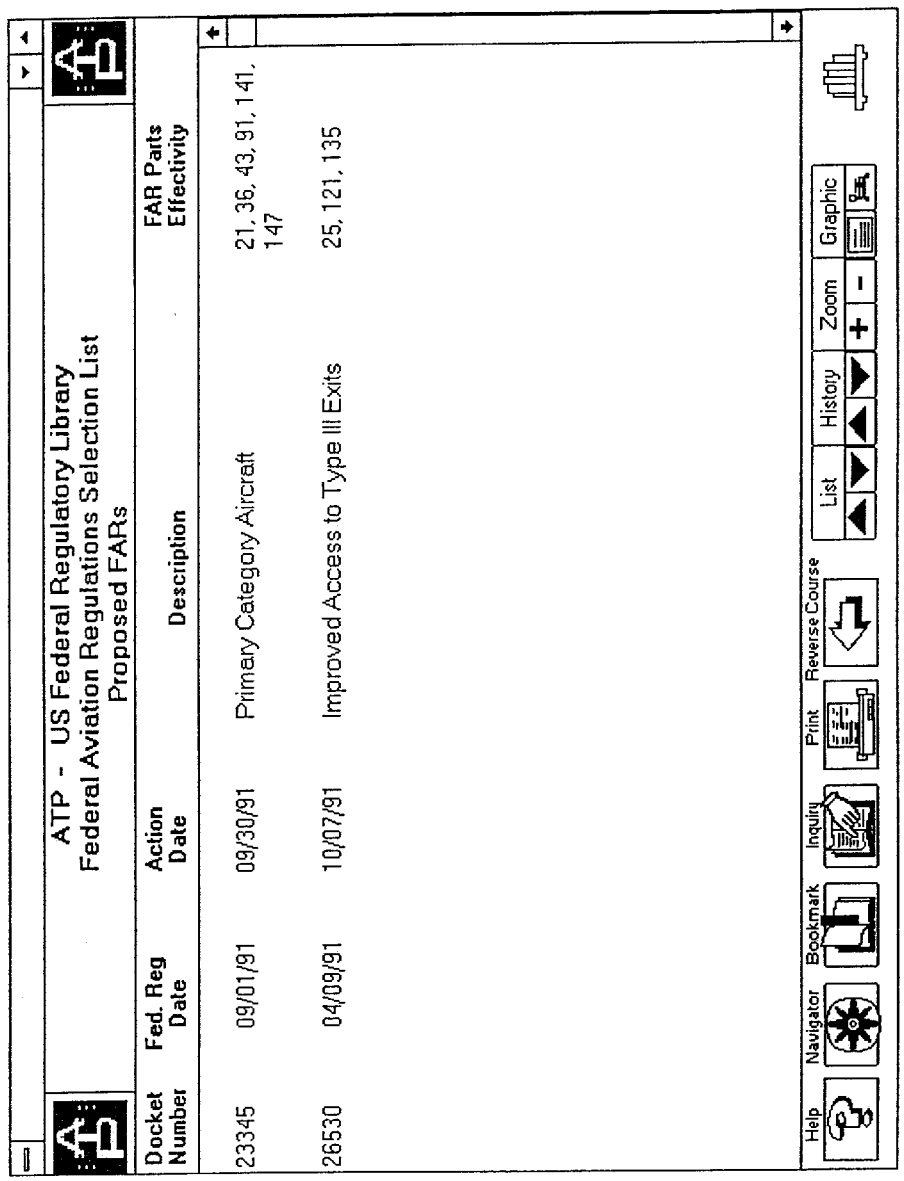

(See FIG. 67.)

Clicking on the Proposed FARs control button from the initial FAR Browse dialog box takes the user directly to the selection list of Proposed FARS ordered according to the Proposed FARs index which sorts by federal registry date.

3.1.8 Browse Access for Hazardous Materials

Description:

There is only one Browse sequence available for Hazardous Materials, namely, the order of the published law. There is a second Browse option, Proposed Amendments, that allows the user to view pending amendments to the law.

Figure 68:
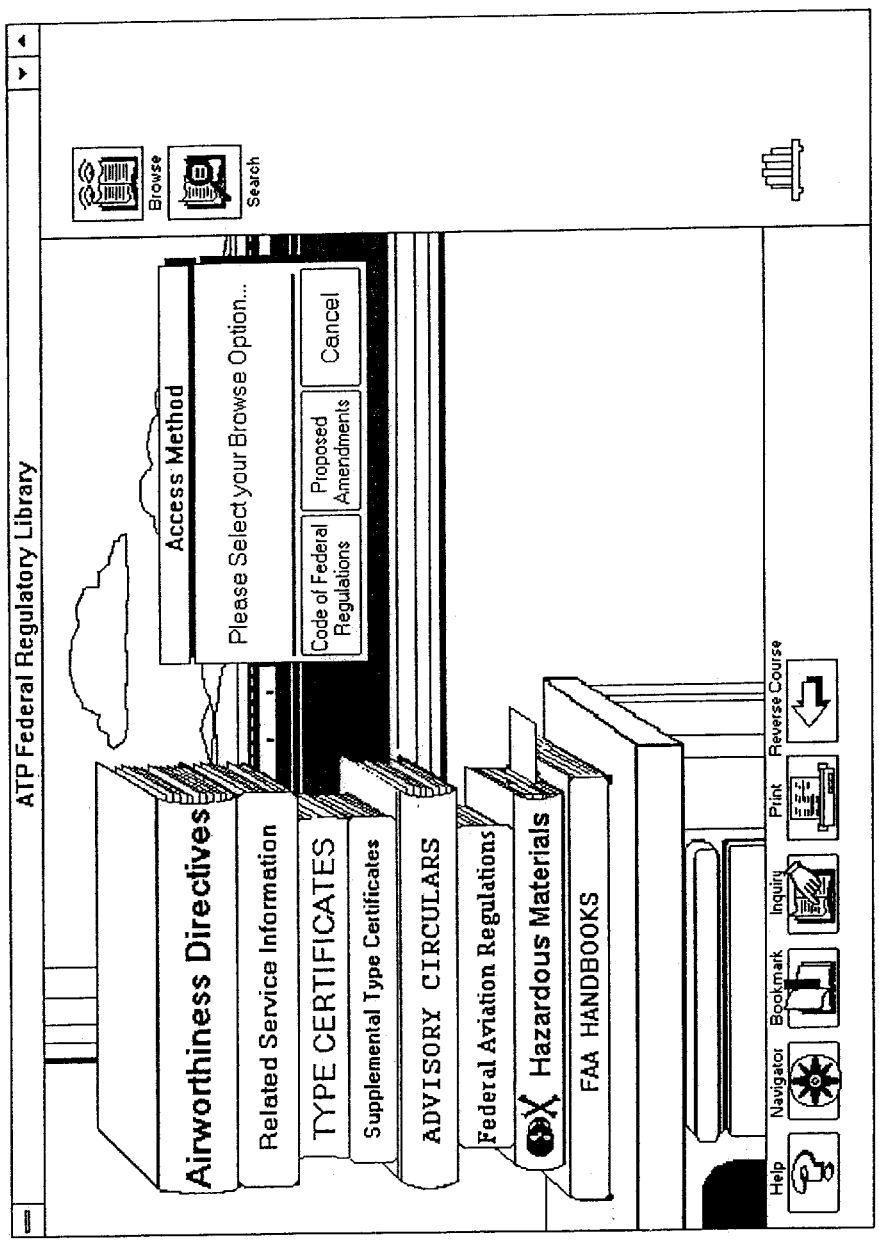

(See FIG. 68.)

Functionality:

With the Hazardous Materials book selected at the bookshelf, clicking the Browse icon brings up the Browse Options dialog box which allows the user to choose Code of Federal Regulations or Proposed Amendments. The choices are presented with control buttons in the same manner that the initial AD browse choices are presented.

Choosing Code of Federal Regulations takes the user directly to the table of contents for the hazardous materials law comprised of part, subpart, and section. Clicking on any level of the table of contents takes the user to the first section for that part of the document (since section is the InnerView document level). Because there is only one body of Hazardous Materials code, the table of contents is the selection list.

It is noted that depending upon the best software performance, this reconstruction of the table of contents can be a scanned and hyperlinked copy of the original table of contents or, alternatively, a selection list constructed by the maintenance and repair information system 10. In either case, it must include the level of detail found in the original paper table of contents which included sections.

Figure 70:

It is also noted that the decision of where to break the Code of Federal Regulations into InnerView documents should also be based on best software performance and has no significant impact on document flow within the interface. Therefore, that decision is left to the software developers. (See FIG. 70.)

With regard to proposed hazardous materials code, choosing Proposed Amendments takes the user to a selection list of proposed amendments ordered according to the Proposed Hazardous Materials index which sorts by Federal Registry Date. Clicking on one of the proposed amendments takes the user to the amendment which is an InnerView document.

3.1.9 Browse Access for Orders

Figure 71:
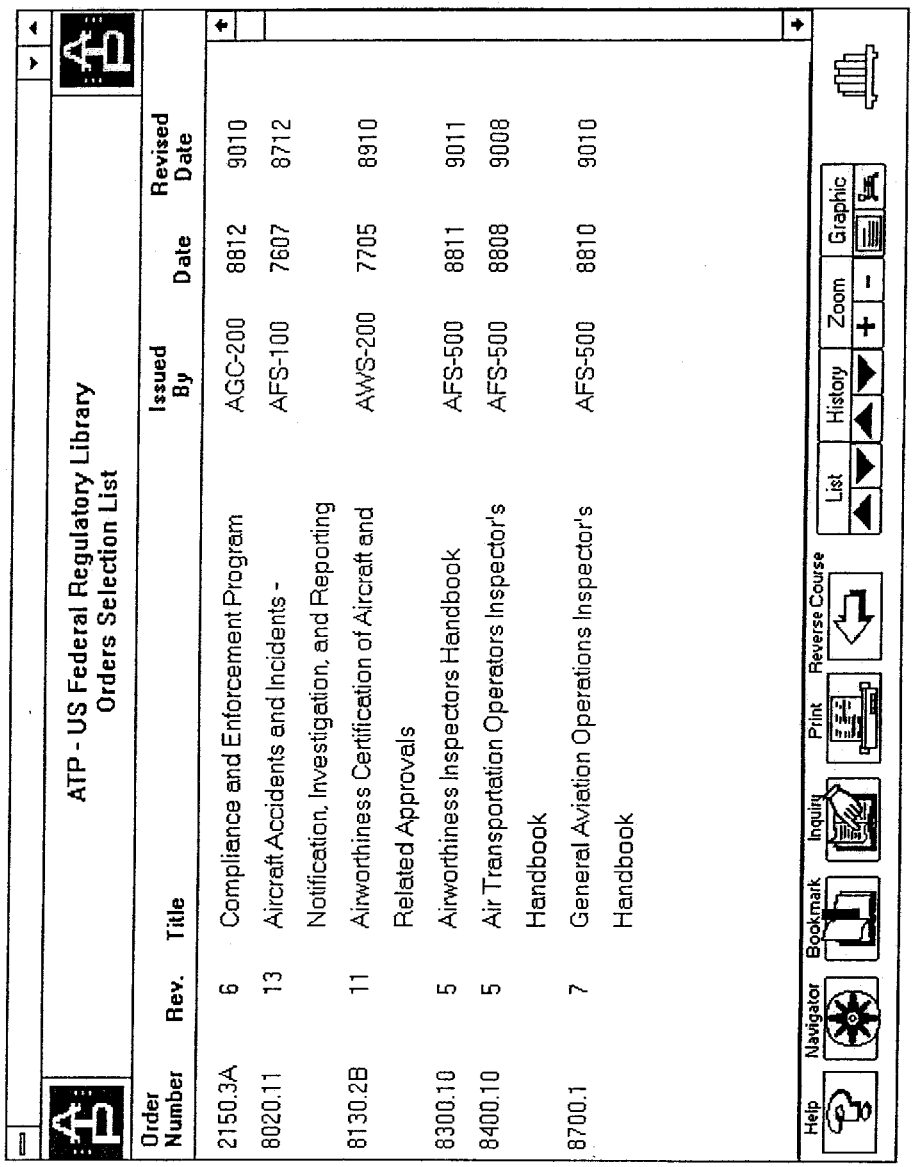

Description:

There is only one Browse sequence available for Orders, namely, numeric. This is also the CD-ROM order. (See FIG. 71.)

Functionality:

With the Orders book selected at the bookshelf, clicking the Browse icon takes the user directly to the selection list of Orders. There are so few orders that they can all reside on one document display screen, so there is no advantage to assigning them a word wheel Browse option to access this selection list.

Selecting a particular Order from the selection list of Orders brings up a reconstruction of the original table of contents complete with chapters, sections, and subsections within that Order. Clicking on any level of the table of contents takes the user to that part of the document.

It is noted that depending upon the best software performance, this reconstruction of the table of contents can be a scanned and hyperlinked copy of the original table of contents or, alternatively, a selection list constructed by the maintenance and repair information system 10. In either case, it must include the level of detail found in the original paper table of contents which included subsections.

It is also noted that the decision of where to break Orders into InnerView documents is preferably based on best software performance and has no significant impact on document flow within the interface. Therefore, that decision is left to the software developers.

3.1.10 Browse Access for ATA Maintenance Manuals

Description:

Although the focus of this exemplary embodiment is on the Gulfstream Maintenance Manuals, the conventions established apply for all ATA maintenance Manuals.

Figure 72:
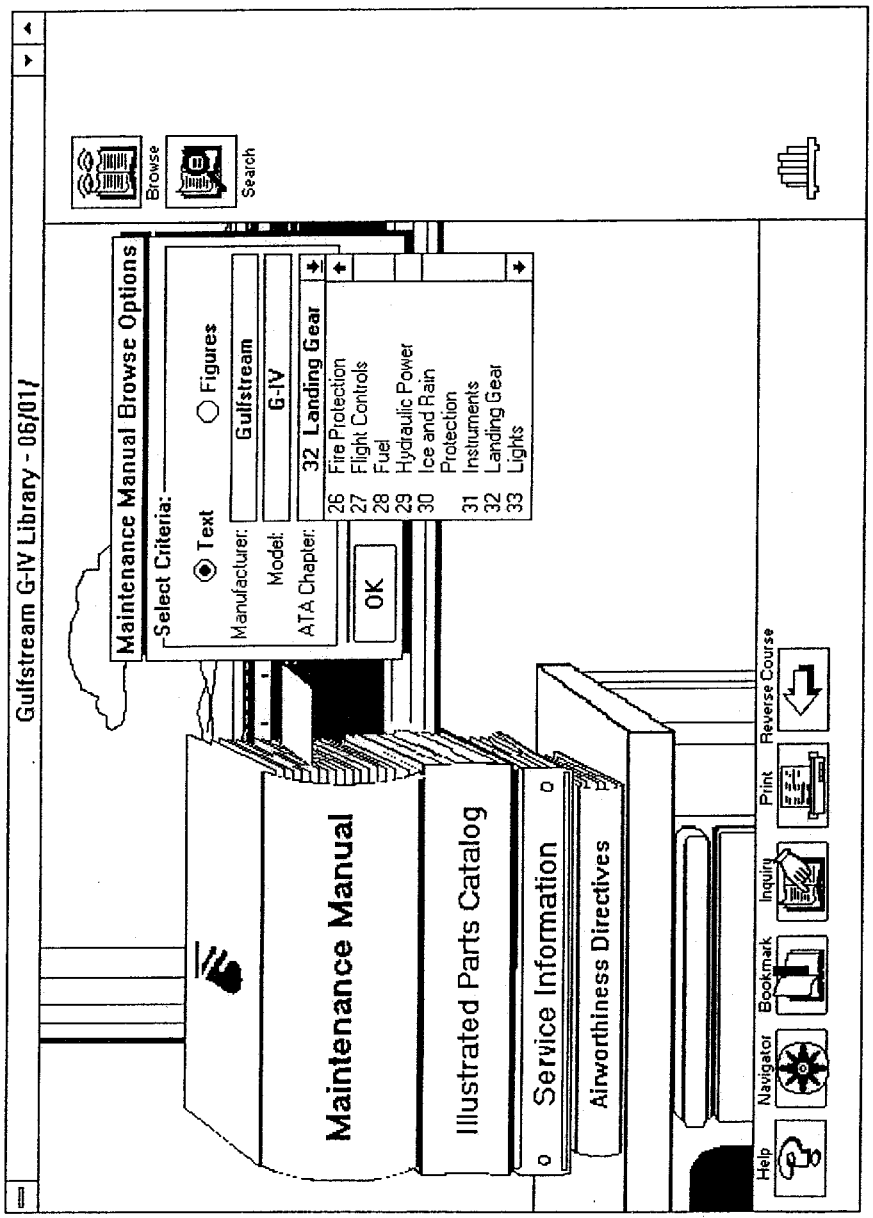

Functionality:

(See FIG. 72.)

Figure 73:
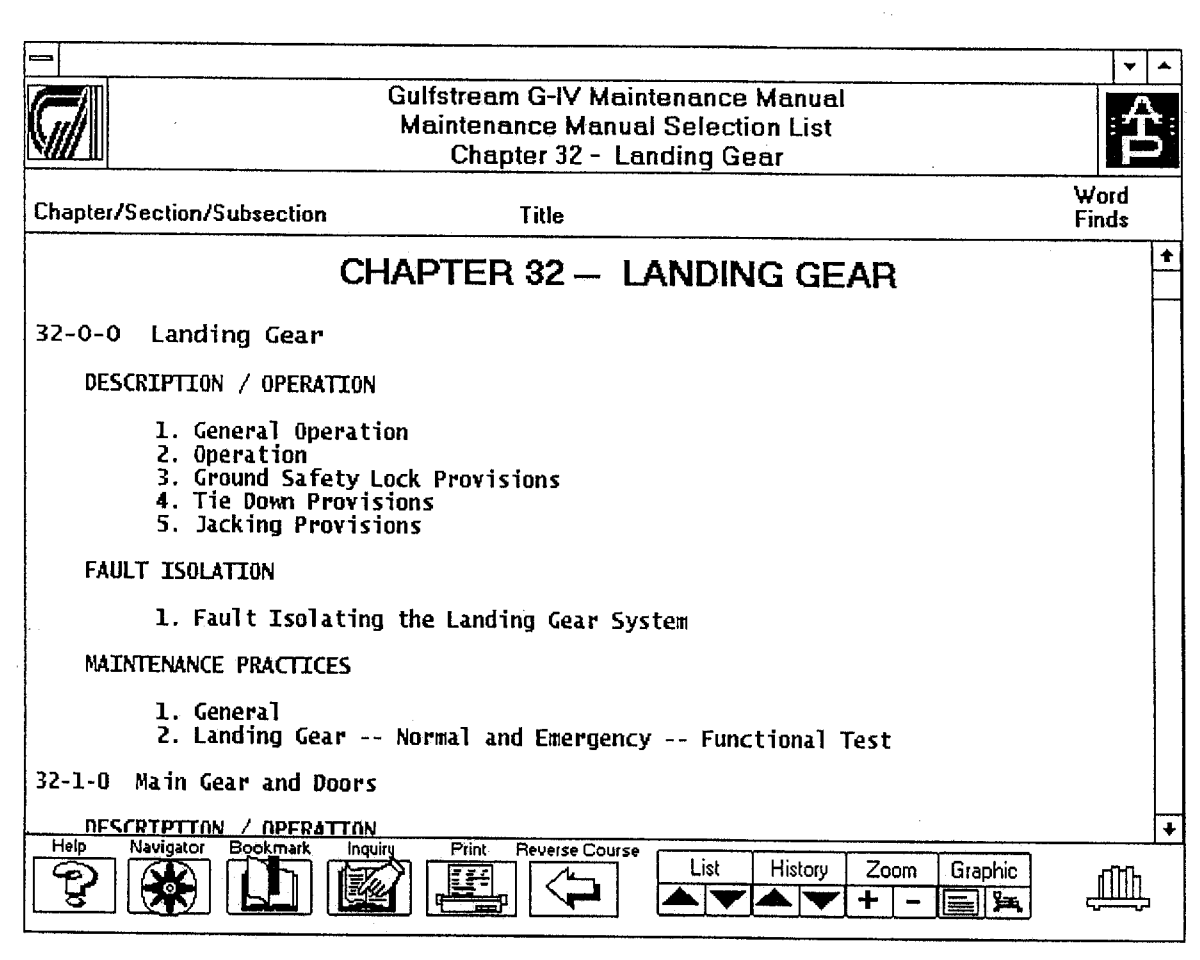

Browse for ATA Maintenance Manuals functions similarly to the Browse function for the regulatory publications. (See FIG. 73.)

Choosing the maintenance manual from the bookshelf immediately identifies one publication so, like Hazardous Materials, there is no need to indicate which maintenance manual. Therefore, the Browse options point right to where in the maintenance manual the user wants to be.

The Browse options are: ATA Chapter and Text or Figures. ATA Chapter is an optional pointer into the complete selection list of the maintenance manual ordered by chapter, section, subject. Next to the ATA Chapter option is the text/figures option. This option is unique to maintenance manuals. The default for this option is text, in which case everything functions normally.

(See FIG. 74.)

If the user changes this option to figures, then the selection list is actually the complete list of figures in the maintenance manual pointing to the first figure in the selected chapter. It is an alternate index to point to a location in the manual. What is unique is that it points to a place on the graphics side instead of the text. From the place on the text side, the user can use the text/graphics tool to get over to the text associated with that graphic.

Figure 75:
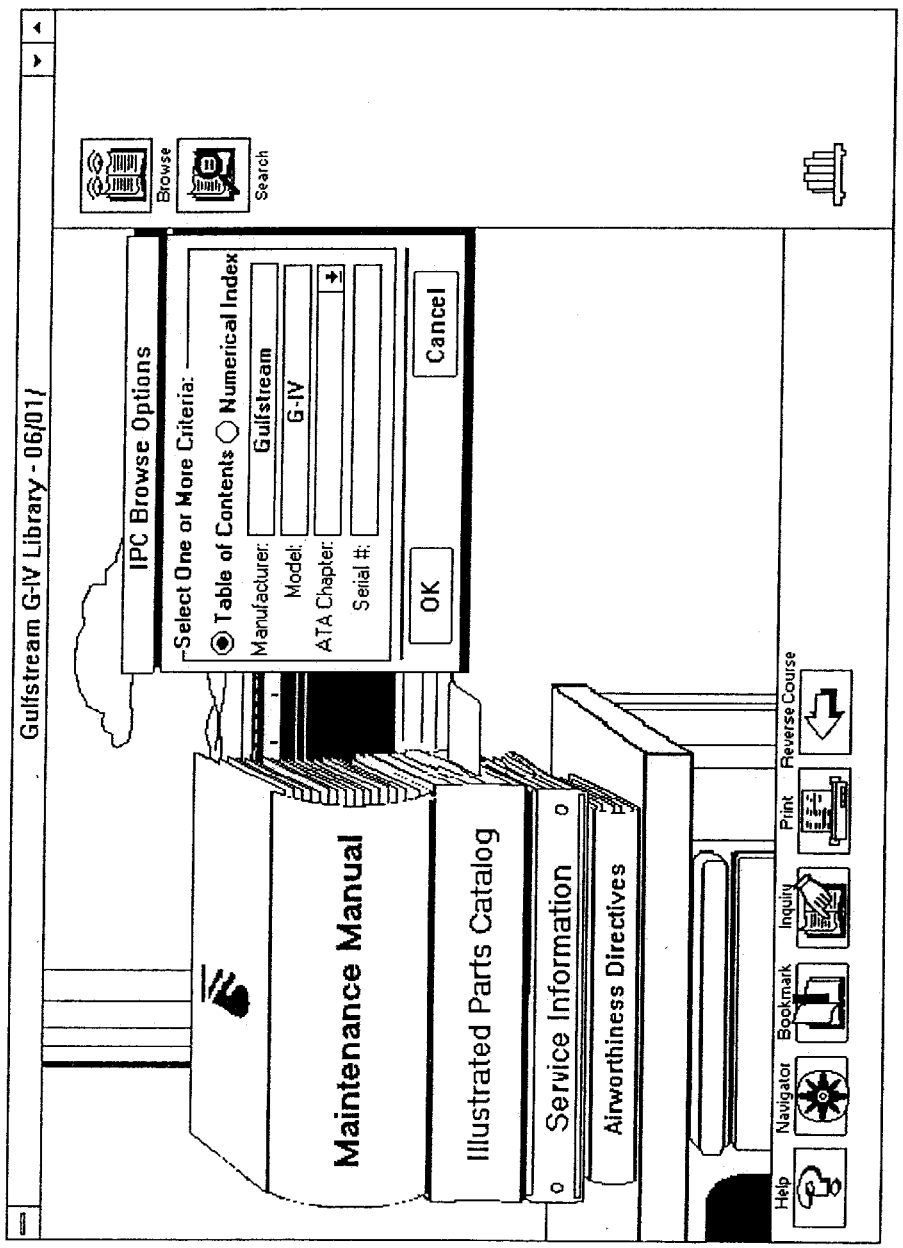

See the Authority file tables in Appendix A for a complete list of the fields presented on the selection list. (See FIG. 75.)

3.1.11 Browse Access for ATA Illustrated Parts Catalogs

Description:

Although the focus is on the Gulfstream ATA Illustrated Parts Catalogs, the conventions established apply for all ATA Illustrated Parts Catalogs.

Functionality:

Browse options include: ATA Chapter; Figure Reference; Part Number; and Serial Number.

With ATA Chapter Browse option it is assumed that the user wants to get to a Figure. The Browse options point the user to the IPC selection list of figures ordered by ATA chapter and then part number. (See FIG. 76.)

Selecting a figure from the selection list takes the user to that figure. The user can toggle to the text that references that figure using the text graphics icon on the toolbox.

See the Authority file tables in Appendix A for a complete list of the fields presented on the selection list.

Contemplated Modification:

The aircraft serial number affectivity (information the manufacturers are already tracking) can be tied to specific part numbers and thus specific figures.

3.1.12 Browse Access for Manufacturer Product SI

Description:

Although the focus is on the Gulfstream SI, the conventions established apply to the presentation of SI within any manufacturer specific product.

Each SI issue type appears as a separate book on the bookshelf. However, for the purposes of searching and displaying selection lists, all of a manufacturer's various SI issue types are treated as a single maintenance and repair information system 10 document type like they are in the regulatory library. The functionality of manufacturer specific SI Browse is the same as the regulatory SI Browse.

Figure 77:
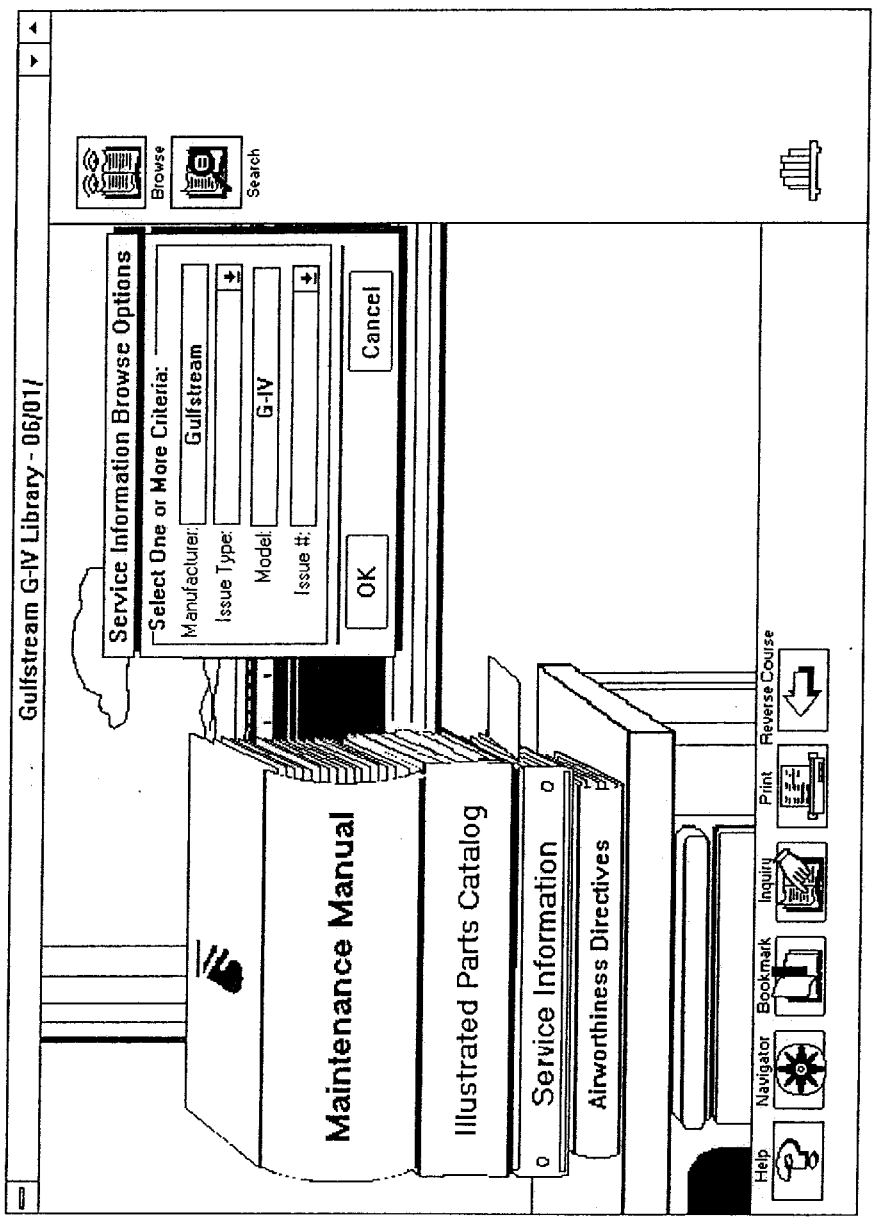

Functionality:

(See FIG. 77.)

Although manufacturer and model are predetermined for Gulfstream, those fields appear to be consistent with SI browse in all other products. There is only one choice available, so it is presented as the default.

Browse options are: Gulfstream Technical Bulletin type (publication types are ASC, ASB, and CB) and Bulletin Number.

(See FIG. 78.)

This will point the user into the Selection list of all Technical Bulletins. See the Authority file tables in Appendix A for a complete list of the fields presented on the selection list.

3.2.0 Search Mode

Description:

In contrast to Browse, the Search Mode has been expressly created to help the user narrow down the number of documents in a selection list and even point to specific document locations that are relevant to search criteria. Search criteria can include both aircraft identifying criteria, such as manufacturer, model, or component category or document criteria, such as document identifications, publication dates, or word search. The result of a search is a selection list compiled "on-the-fly" by the maintenance and repair information system 10 including only those documents that meet all specified search criteria.

The bookshelf word search function is the same as the word search option associated with the publications function in the Aircraft Specific Mode.

Figure 79:
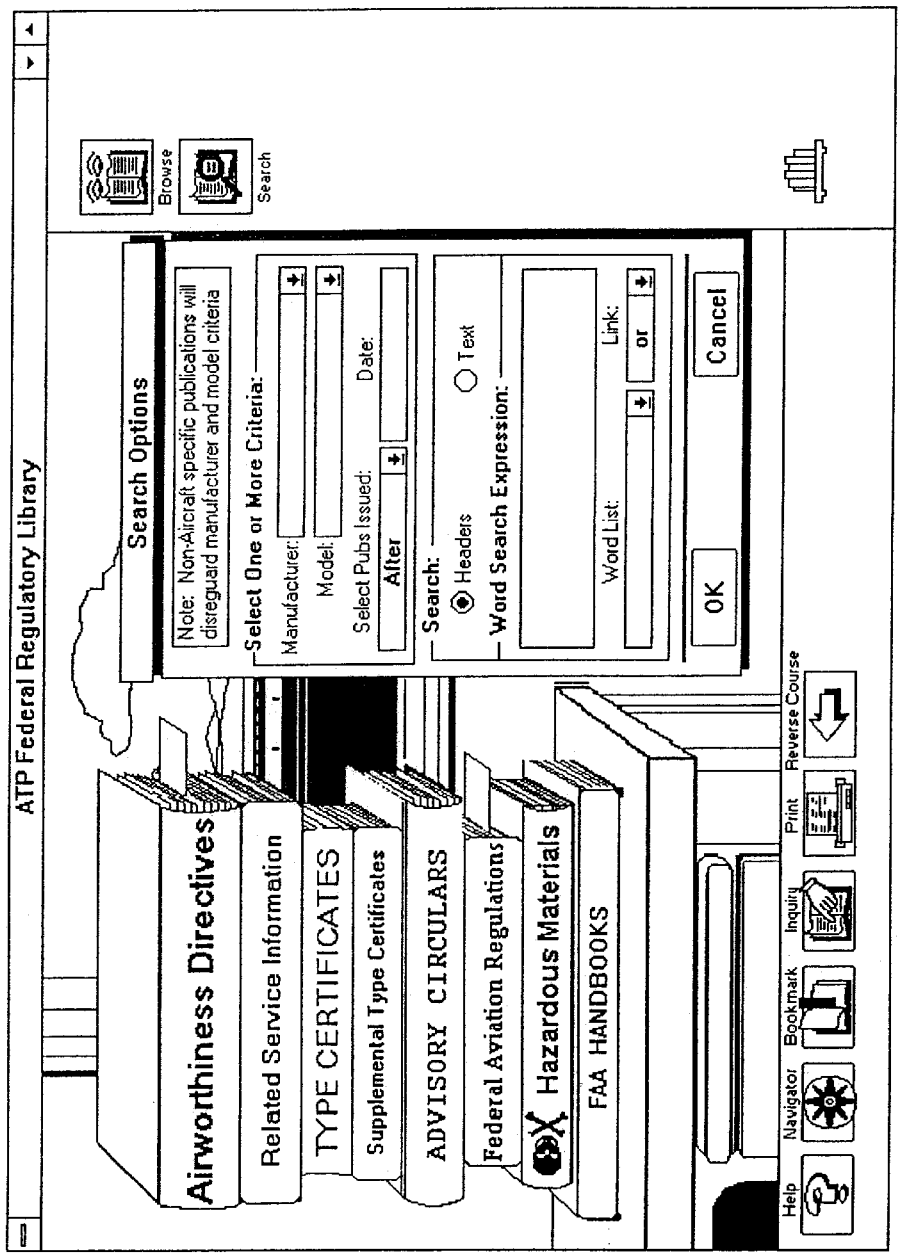

Functionality:

(See FIG. 79.)

With one or more books selected from the bookshelf, clicking on the Search icon brings up a search dialog box appropriate for the publication type(s) selected from the bookshelf. The search dialog box includes all of the fields which formerly acted as pointers into the complete selection lists with the Browse function, plus additional search fields. In the Search Mode, all of the fields limit the documents chosen for display in a selection list. Although a selection list only accommodates one document type at a time, the Search function searches through more than one document type at a time based on specified search criteria and then prompts the user to indicate which document type is preferred in a selection list.

If only regulatory publications are selected (which do not contain aircraft or component specific information), a "generic" search dialog box is used to search all selected document types. This generic search dialog box does not have fields to accommodate aircraft specific information.

Figure 80:
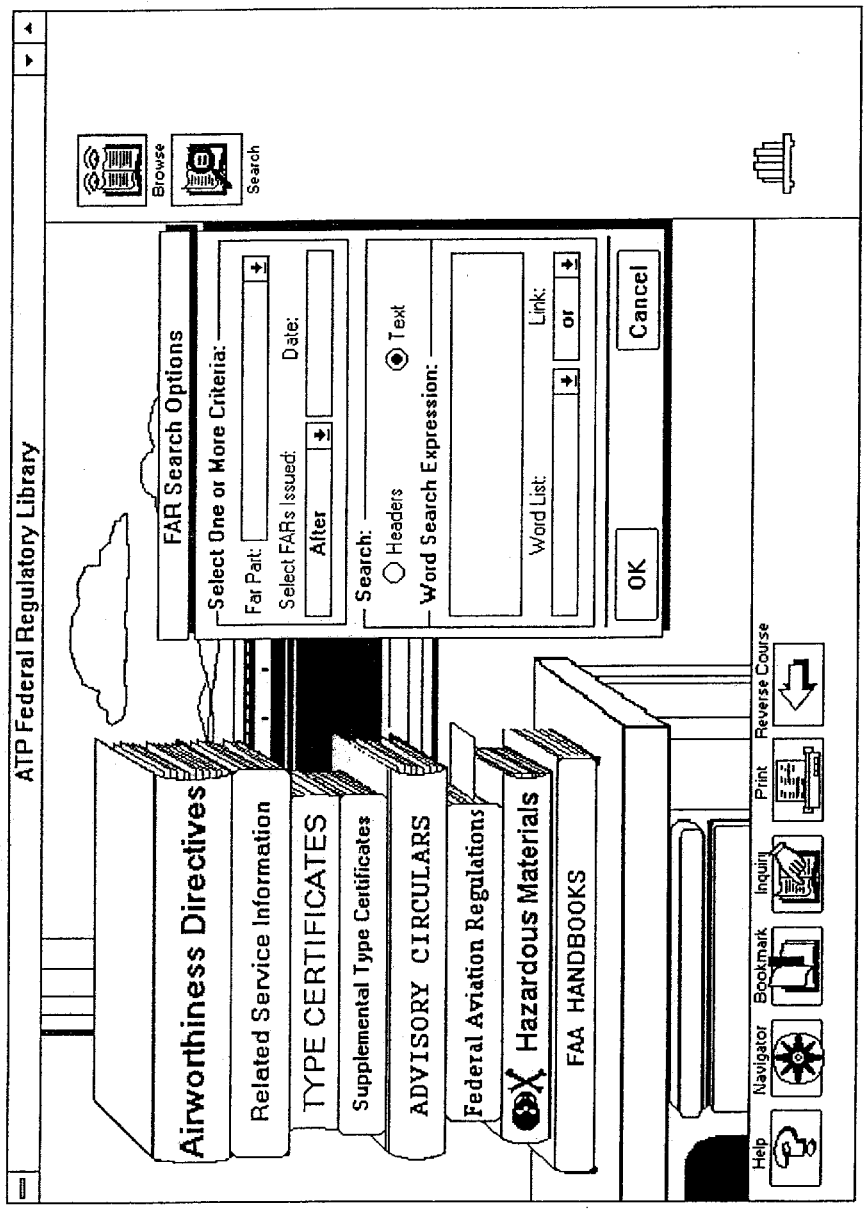

(See FIG. 80.)

If any aircraft specific publication has been selected from the bookshelf, the search dialog box accommodates aircraft specific information. When searching on publications of both types, any aircraft specific information is ignored in the search of regulatory publications. This allows the user to search both ADs and FARs specifying an aircraft model and a word search, yet still obtain the word search hits for FARs as a result of the search.

Whenever a user tries to perform an aircraft specific search on regulatory documents, an information box informs the user that regulatory publications do not contain any aircraft specific information and that the aircraft specific search criteria are being ignored for that specific publication type.

An Issue Date search option allows the user to limit his or her search based on a when a document was published. The user can indicate "before," "after," or "on" and then enter the date. The default is after a certain date. For document types with an existing issue date scheme (i.e., ADs Bi-Weekly or Alerts Monthly Issue), this issue date option accommodate the appropriate standard. For document types without an existing issue date scheme or when searching multiple document types, a standard month, day, year format is preferably employed.

It is noted that since issue dates for all documents are captured in date fields by Paradox, the Paradox engine resolves before, after, and on.

It is also noted that for international users, a system utilities option preferably makes it possible to configure dates in day, month, year format, the manner in which the rest of the world formats this information.

With regard to word searches, one of the search criteria added for every publication type is word search. The word search capability in bookshelf is preferably identical to the word search capability in the Aircraft Specific Mode. Search options associated with word search include radio buttons to indicate what text is searched, that is, headers only or the entire text, a word wheel of words and phrases to add to the search expression, and Links (the Boolean operators supported by InnerView) for attaching several selections from the word wheel of words and phrases into a single search expression.

There is a "word search finds" field in sort selection lists that counts the number of documents found to contain that word search expression. If a word search was not one of the search criteria, that field is left blank.

Once the search criteria have been established by the user, the Search function checks every document (at the InnerView document level) of the specified document type(s) for the search criteria. For example, with FARs the publication is a FAR, but the InnerView document level is FAR section. Therefore, the items on a selection list generated by a FAR search would be FAR sections that meet the search criteria. Other fields on a selection list of FAR sections clearly indicate the FAR part and subpart, but the selection list item is a FAR section.

Because an item on a selection list corresponds to an InnerView document, clicking on a selection list item takes the user to an InnerView document.

As in the Aircraft Specific Mode, if a search does not find any documents that meet the search criteria, an error message is displayed and the user is returned to the search options dialog box to broaden the search criteria.

Regardless of document type, if the user specifies an exact document identification (InnerView document) from the search options dialog box, the maintenance and repair information system 10 assumes that the user intends to go to a specific document and jumps directly to the beginning of that document without displaying a selection list that would have only that document listed. For the regulatory library, it is possible to specify a document identification for ADs, SI, STCs, and TCs (note that specifying a model for TCs and STCs can limit to a single document identification but should still take the user to a selection list; only specifying a TC number should take the user to the TC itself).

If in addition to a document identification, a word search is specified, then rather than going to the top of the specified document the user is taken to the first occurrence of the word hit.

Nonetheless, even if a single document is the result of a search that did not specify a document identification, the user is shown the selection list with one item. This allows the user to see the results of a search and decide if he or she wants to view the resulting document, rather than blindly forcing him or her into an InnerView document he or she did not specify.

With regard to proposed FARs, ADs, and Hazardous Materials in the Search Mode, when using the Search function to search a document type with an associated set of "proposed" documents (i.e., FARs, ADs, and Hazardous Materials), the proposed document is automatically included in the search. Consequently, they appear on the selection list generated by search. On the selection list, these items are marked proposed and added to the bottom of the selection list. Proposed items have the same fields as other items in the selection list.

With regard to authority file tables, by forcing the search criteria to be consistent with a finite list of word wheel choices, the maintenance and repair information system 10 insists that the user adheres to the established authority files. This ensures that the user is searching on components and data that are maintained by the library service provider. It allows the user to obtain consistent and repeatable results.

For a complete list of all possible search criteria and all selection list fields for each document type, see The Browse and Search Authority File Tables in Appendix A.

3.2.1 Search Access for ADs

Description:

This search access option conforms to the rules set forth globally for search access in section 3.2.0.

Figure 81:
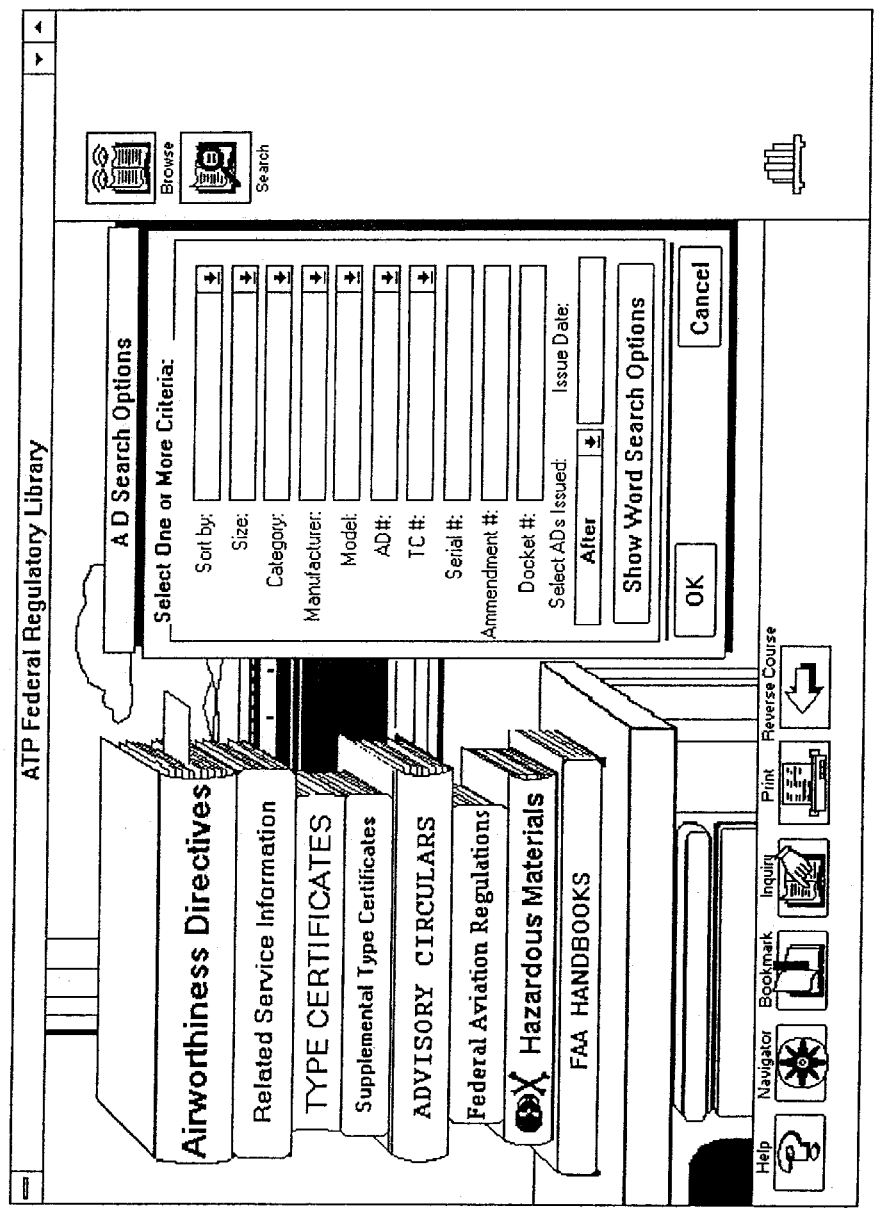

Functionality:

(See FIG. 81.)

The Authority File Tables in Appendix A provide a detailed list of fields available as search criteria, fields displayed in the selection list, and sources of that data.

3.2.2 Search Access for SIs

Figure 82:
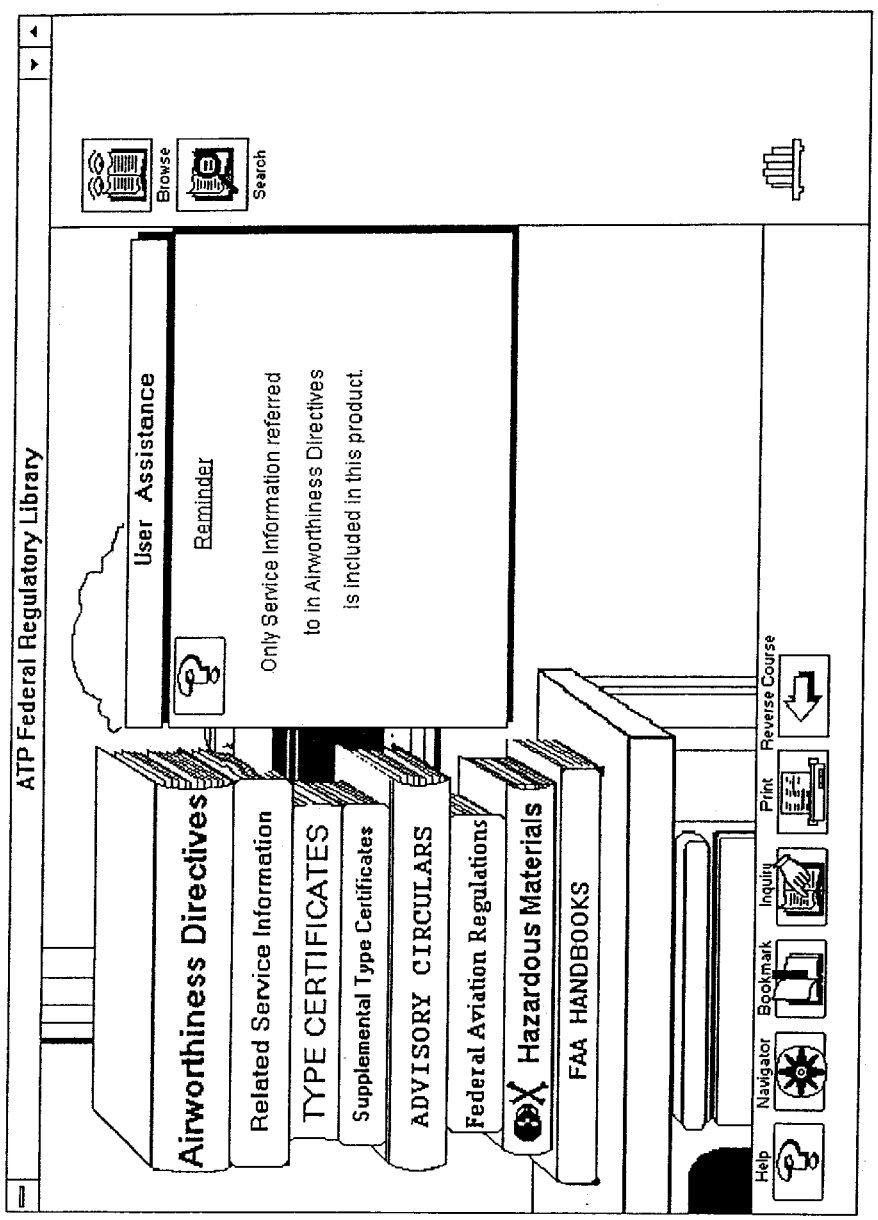

Description:

(See FIG. 82.)

This search access option conforms to the rules set forth globally for search access in section 3.2.0.

Figure 83:
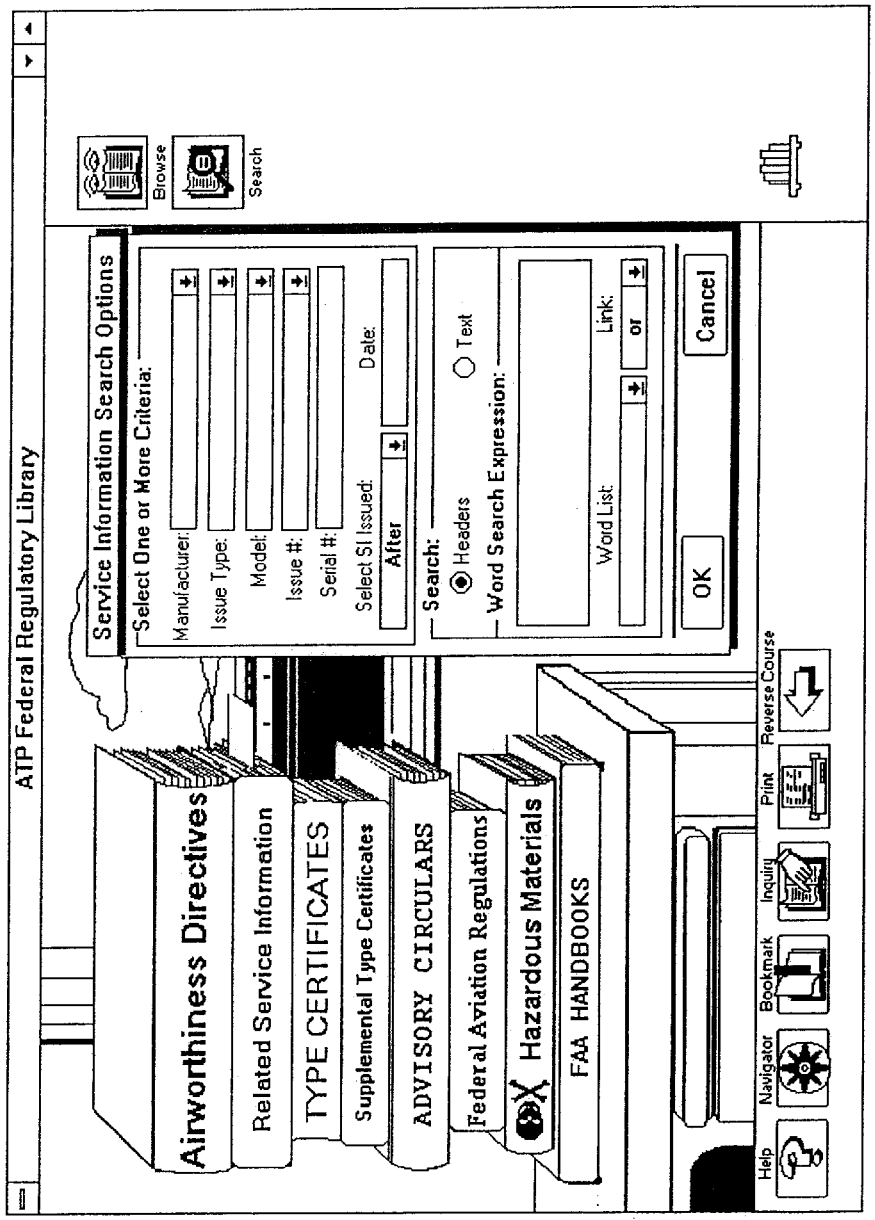

Functionality:

The Authority File Tables in Appendix A provide a detailed list of fields available as search criteria, fields displayed in the selection list, and sources of that data. (See FIG. 83.)

3.2.3 Search Access for Alerts

Description:

This search access option conforms to the rules set forth globally for search access in section 3.2.0.

Figure 84:
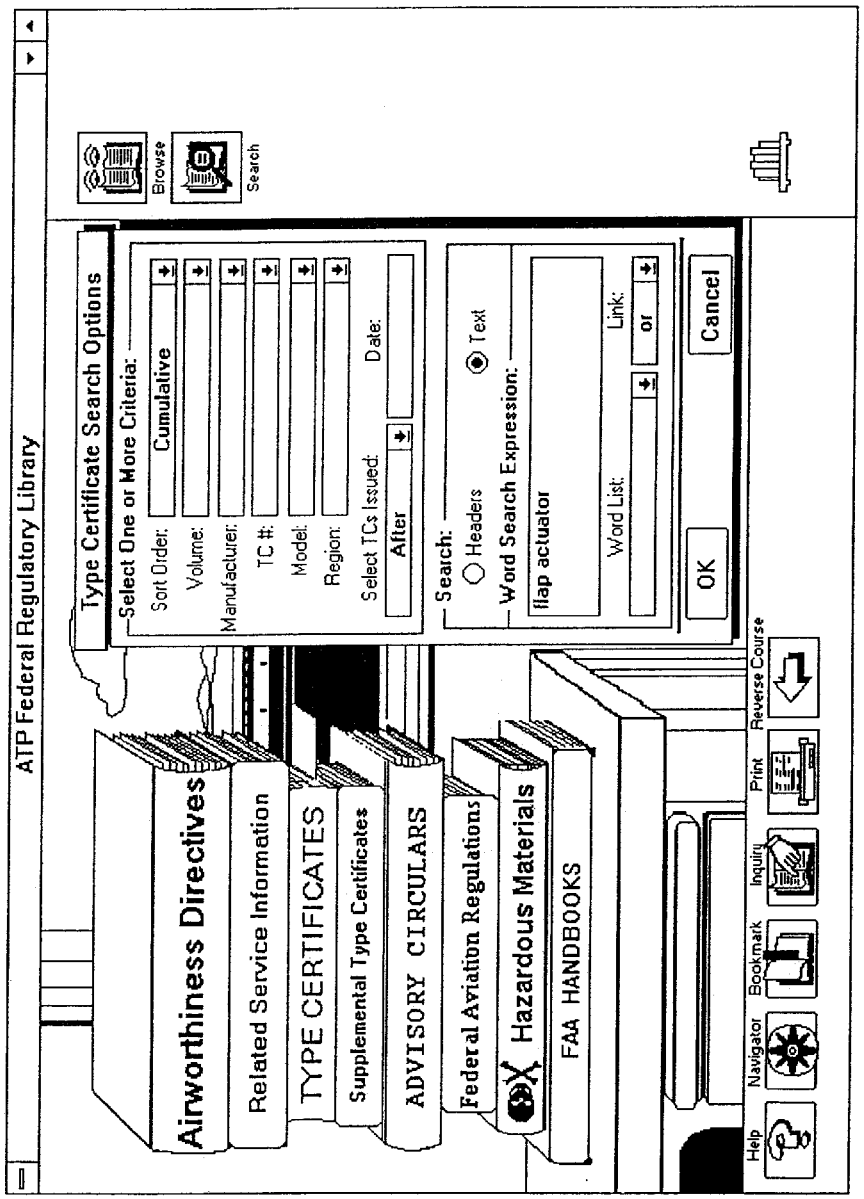

Functionality:

(See FIG. 84.)

The Authority File Tables in Appendix A provide a detailed list of fields available as search criteria, fields displayed in the selection list, and sources of that data.

3.2.4 Search Access for TCs

Description:

This search access option conforms to the rules set forth globally for search access in section 3.2.0.

Figure 85:
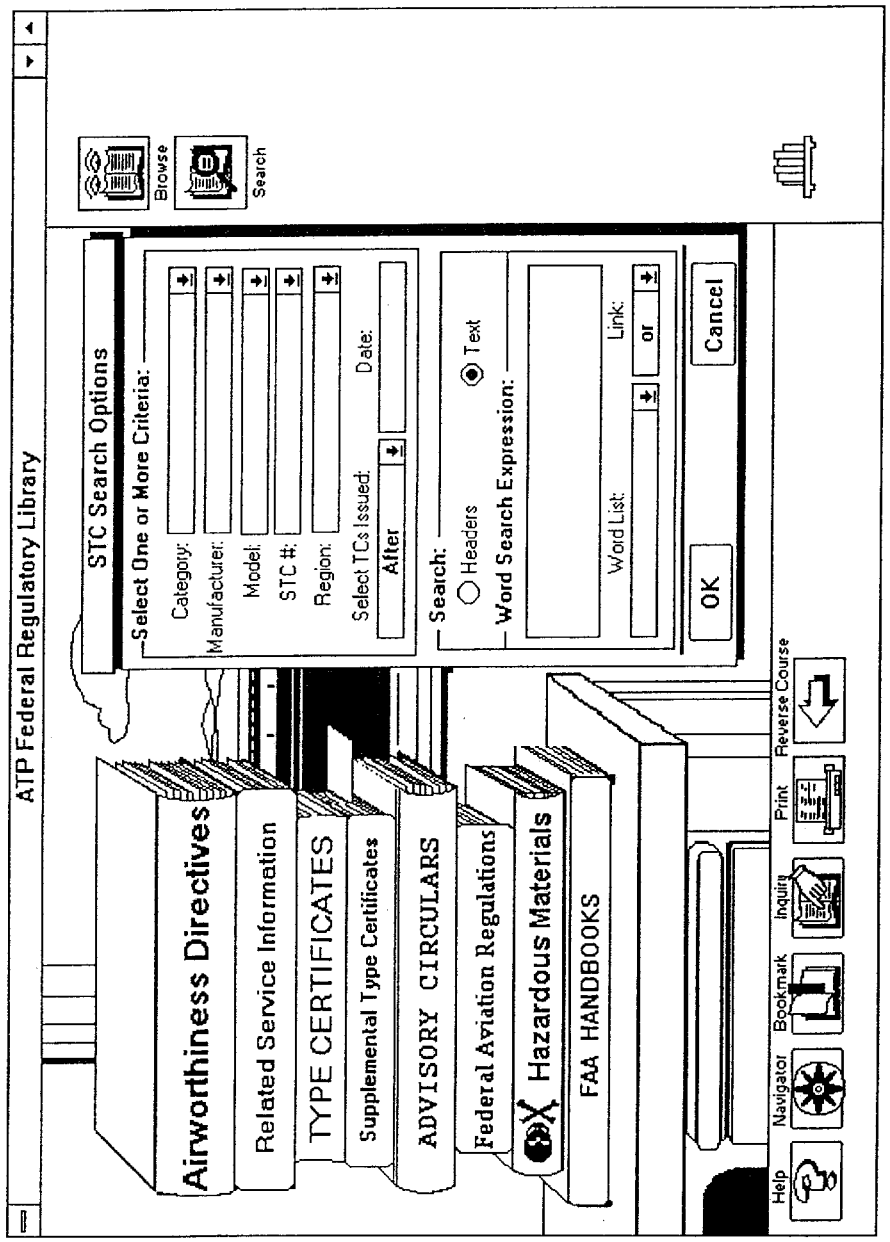

Functionality:

(See FIG. 85.)

Note that the FAA Volumes have never provided a means for users to view TCs in their numbered order. By providing a numerical sort option, users for the first time are able to automatically group TCs by their issuing authority and region, two characteristics built into the TC numbering scheme.

The Authority File Tables in Appendix A provide a detailed list of fields available as search criteria, fields displayed in the selection list, and sources of that data.

3.2.5 Search Access for STCs

Description:

This search access option conforms to the rules set forth globally for search access in section 3.2.0.

Figure 86:
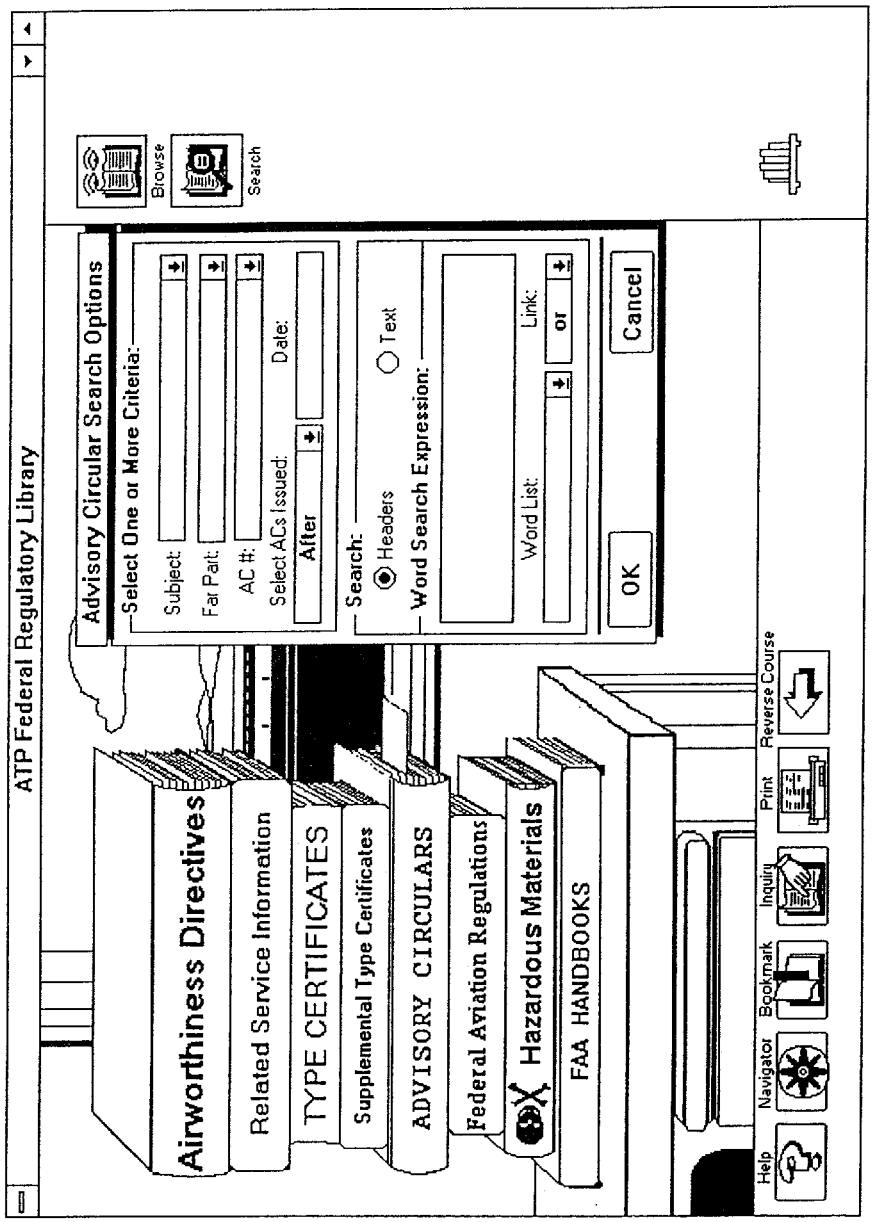

Functionality:

(See FIG. 86.)

The Authority File Tables in Appendix A provide a detailed list of fields available as search criteria, fields displayed in the selection list, and sources of that data.

3.2.6 Search Access for ACs

Description:

This search access option conforms to the rules set forth globally for search access in section 3.2.0.

Figure 87:
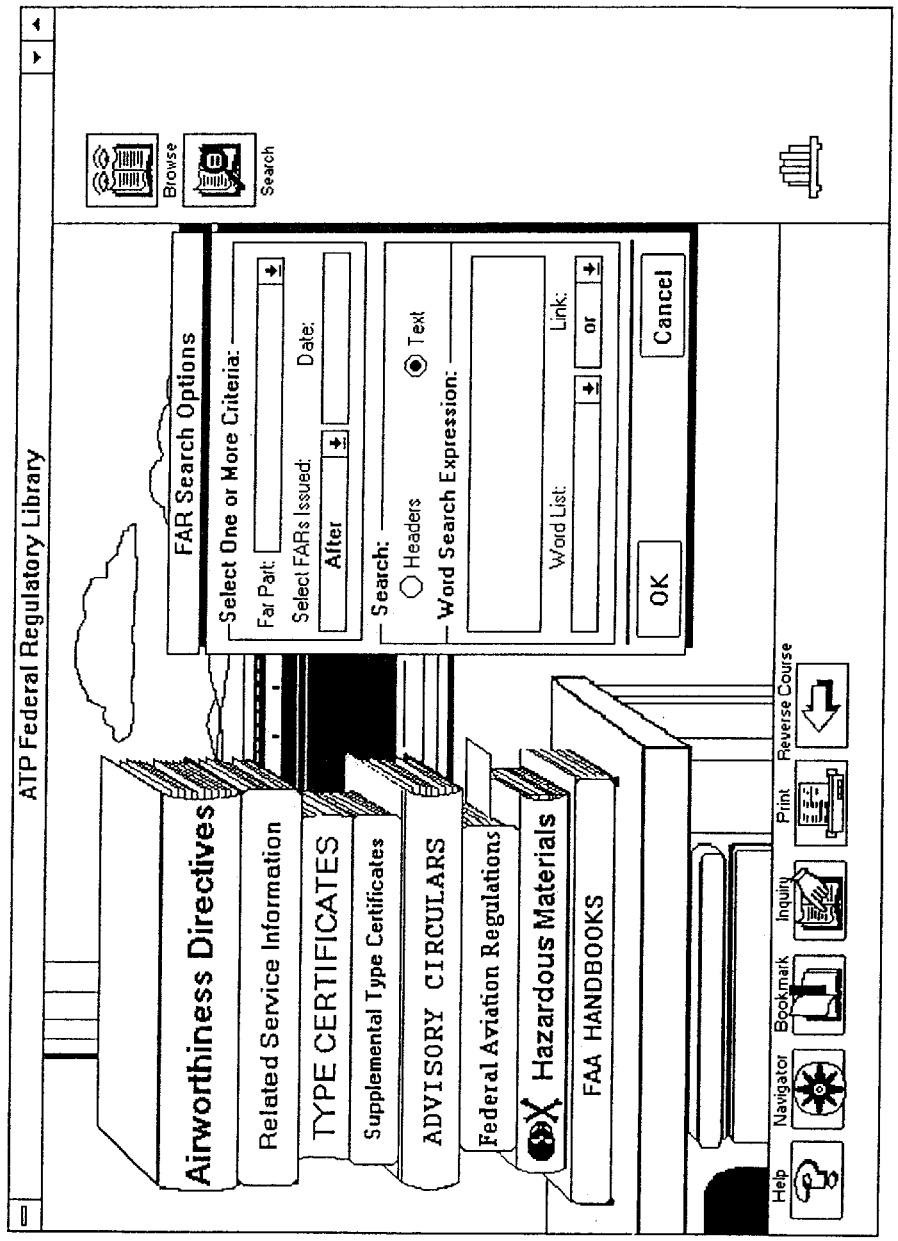

Functionality:

(See FIG. 87.)

The Authority File Tables in Appendix A provide a detailed list of fields available as search criteria, fields displayed in the selection list, and sources of that data.

3.2.7 Search Access for FARs

Description:

This search access option conforms to the rules set forth globally for search access in section 3.2.0.

Figure 88:
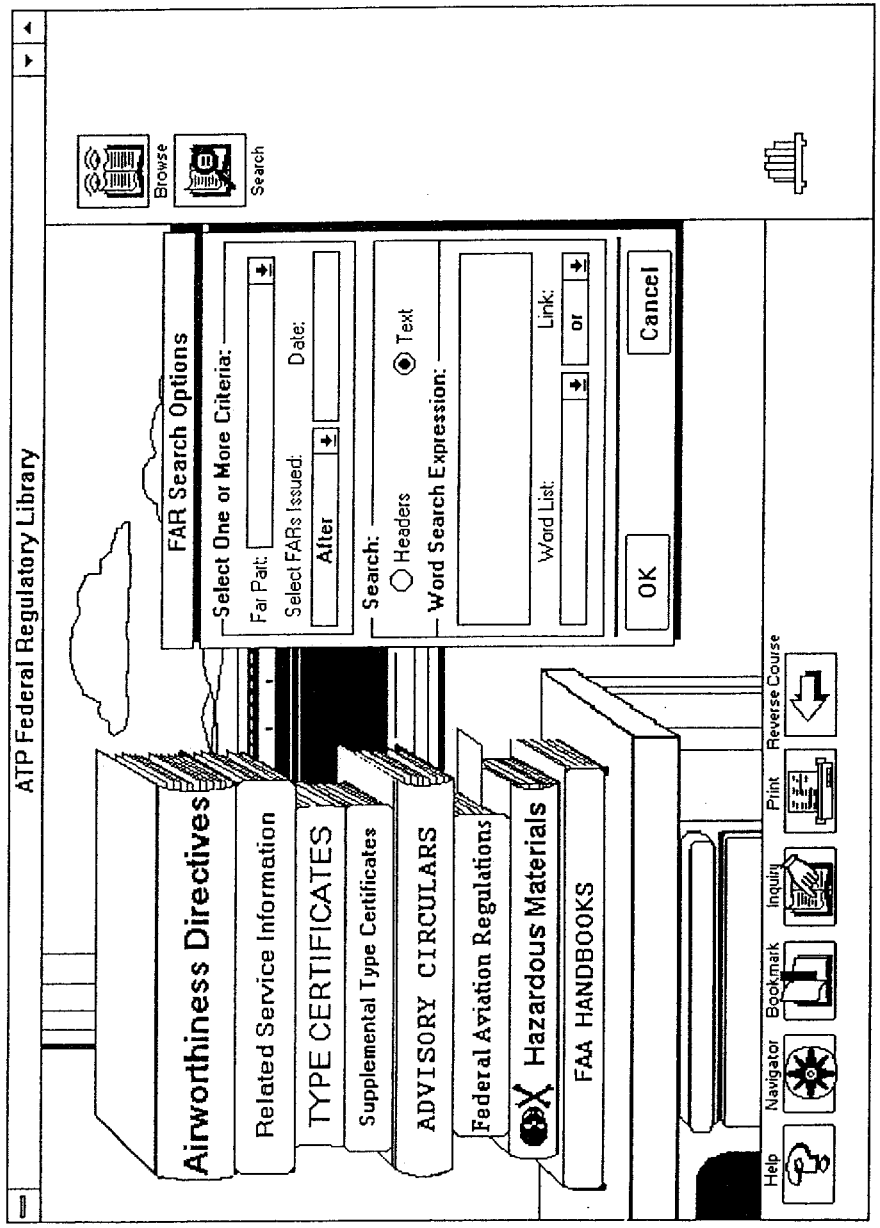

Functional:

(See FIG. 88.)

The Authority File Tables in Appendix A provide a detailed list of fields available as search criteria, fields displayed in the selection list, and sources of that data.

3.2.8 Search Access for Hazardous Materials

Description:

This search access option conforms to the rules set forth globally for search access in section 3.2.0.

Figure 89:
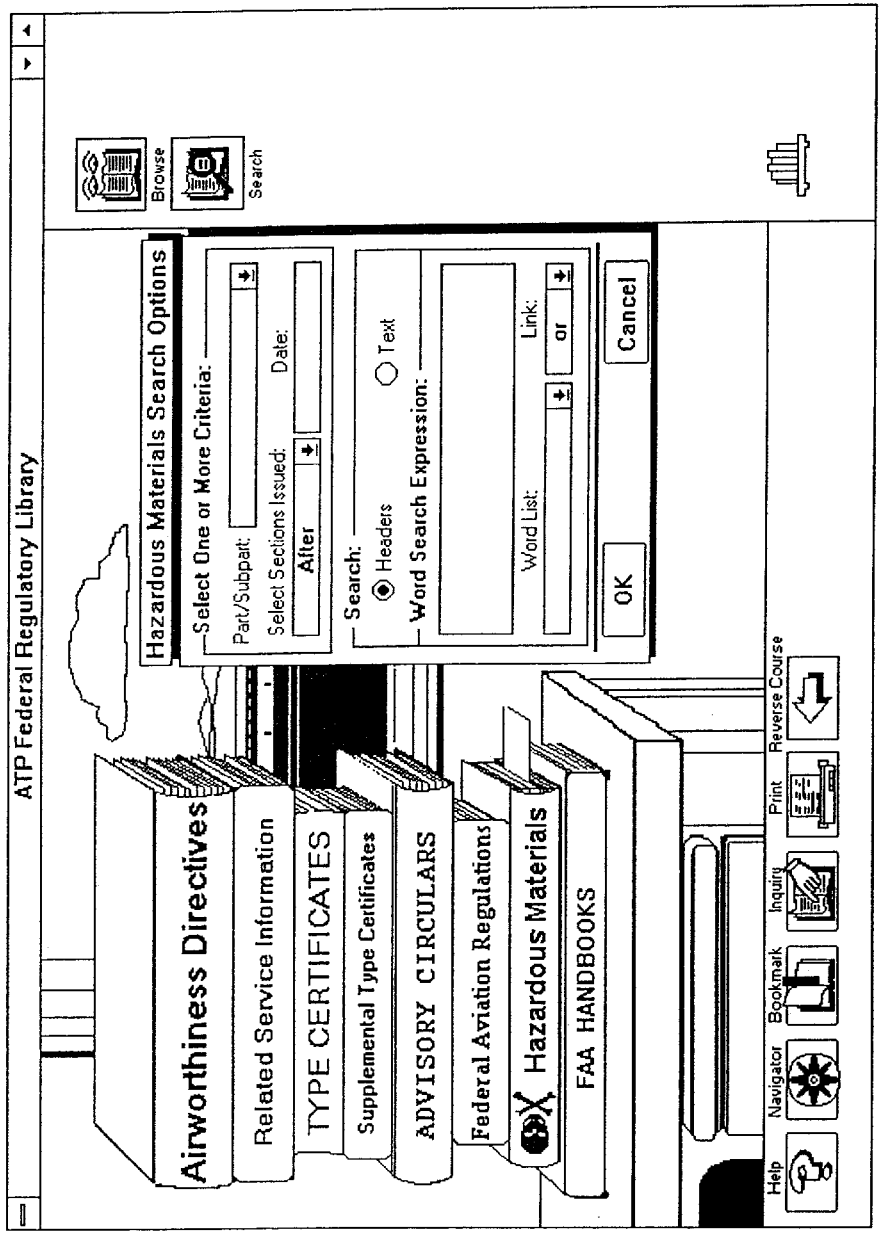

Functionality:

(See FIG. 89.)

The Authority File Tables in Appendix A provide a detailed list of fields available as search criteria, fields displayed in the selection list, and sources of that data.

3.2.9 Search Access for FAA Handbooks

Description:

This search access option conforms to the rules set forth globally for search access in section 3.2.0.

Figure 90:
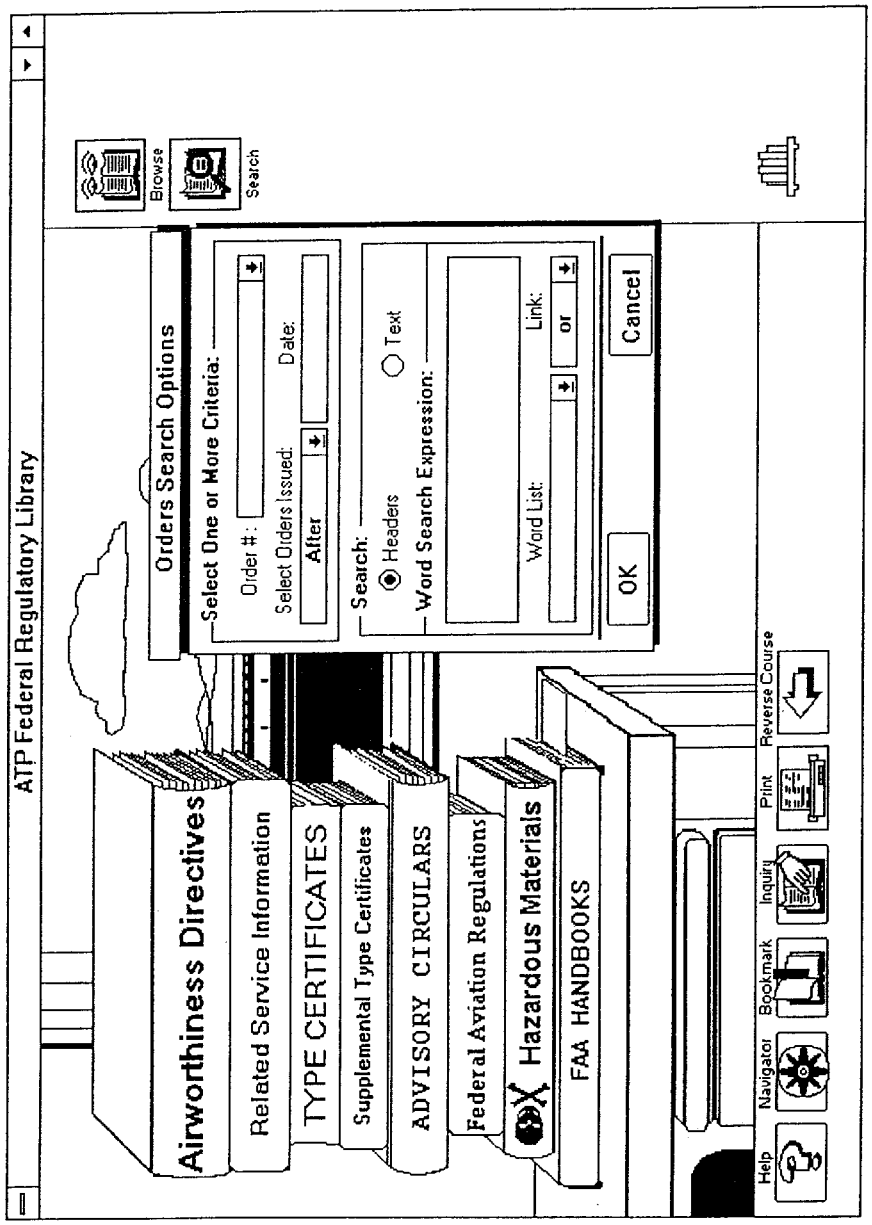

Functionality:

(See FIG. 90.)

The Authority File Tables in Appendix A provide a detailed list of fields available as search criteria, fields displayed in the selection list, and sources of that data.

3.2.10 Search Access for ATA Maintenance Manuals

Description:

Although the focus is on the Gulfstream Maintenance Manuals, the conventions established apply for all ATA maintenance Manuals.

Figure 91:
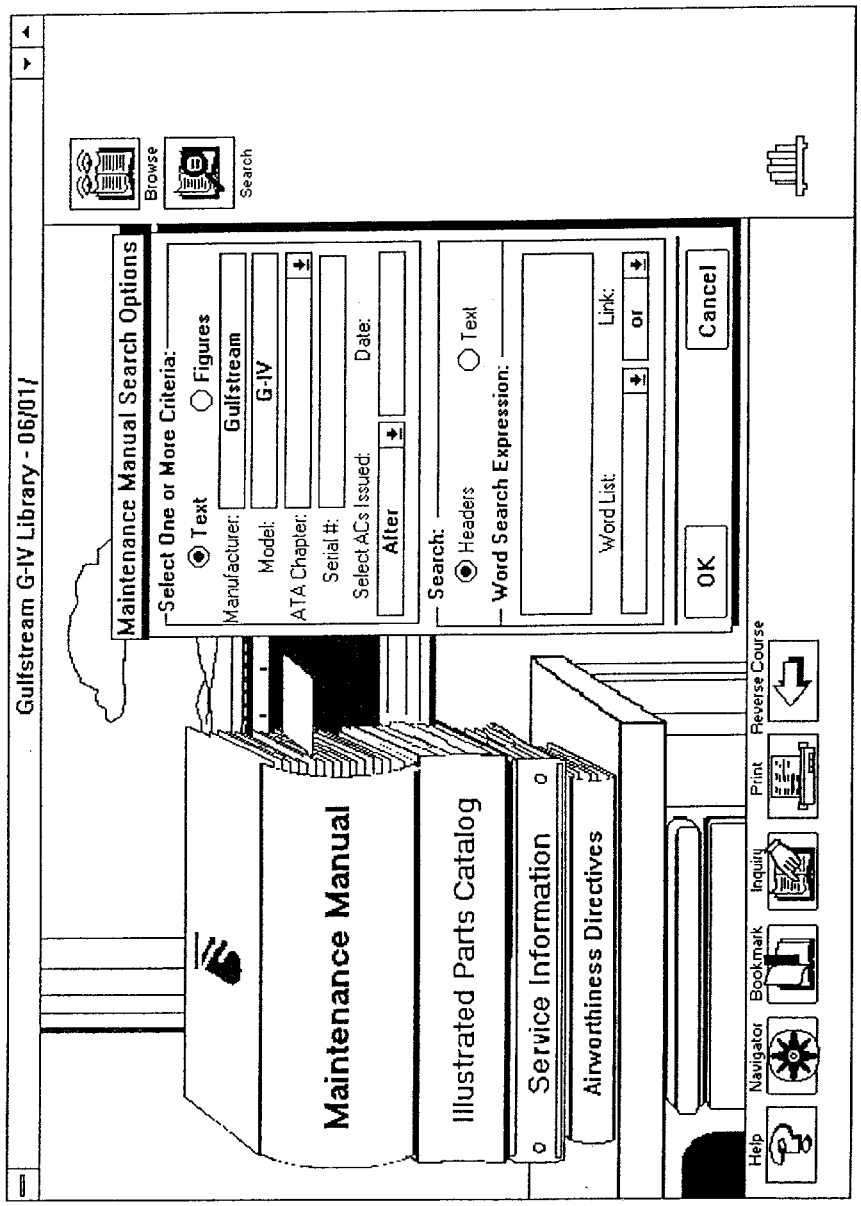

Functionality:

(See FIG. 91.)

Added search fields (in addition to those used to browse) for all ATA maintenance manuals include Aircraft Serial Number. See the Authority file tables in Appendix A for a complete list of the fields presented on the selection list.

3.2.11 Search Access for ATA Illustrated Parts Catalogs

Description:

Although the focus is on the Gulfstream ATA Illustrated Parts Catalogs, the conventions established apply for all ATA Illustrated Parts Catalogs.

Figure 92:
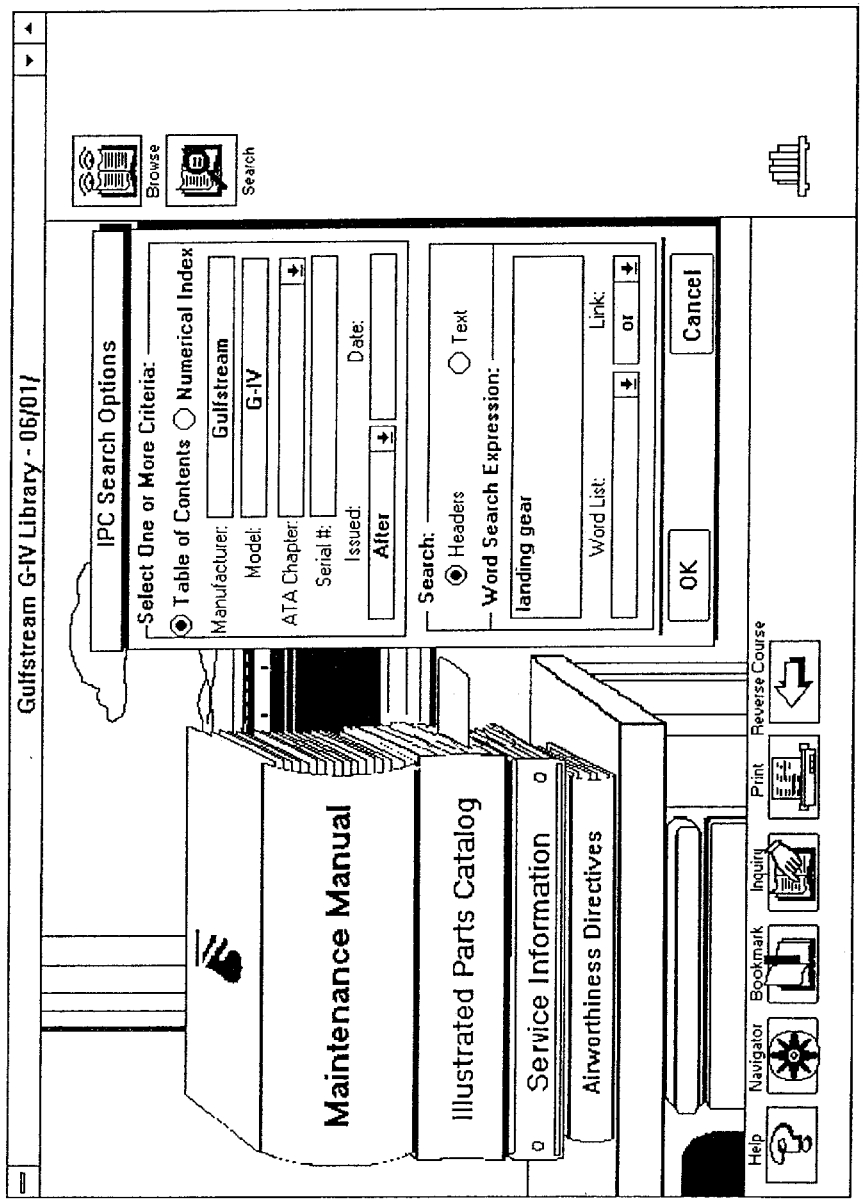

Functionality:

(See FIG. 92.)

All the fields associated with Browse are the only fields associated with search besides the usual issue date and word search that are on all search dialog boxes.

See the Authority file tables in Appendix A for a complete list of the fields presented on the selection list.

3.2.12 Search Access for Manufacturer Product SI

Description:

Although the focus is on the Gulfstream SI, the conventions established apply to the presentation of SI within any manufacturer specific product.

Each SI issue type appears as a separate book on the bookshelf. However, for the purposes of searching and displaying selection lists, all of a manufacturer's various SI issue types are treated as a single maintenance and repair information system 10 document type, as they are in the regulatory library. The functionality of the manufacturer specific SI search is the same as the regulatory SI browse.

Figure 93:
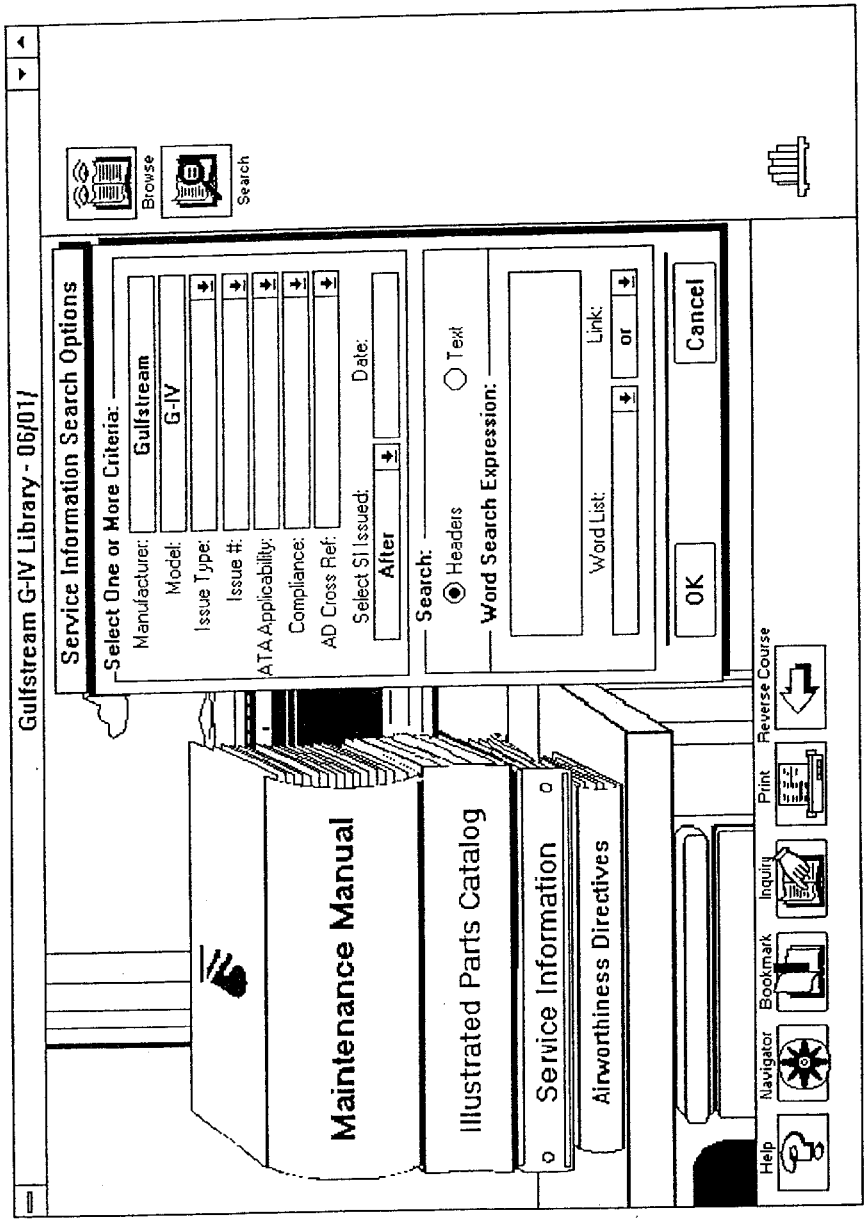

Functionality:

(See FIG. 93.)

Added search fields (in addition to those used to browse) for all SI types include: Serial Number; Compliance (mandatory, optional, etc.); and AD Cross Reference.

The user also has the ability to specify a search over all publication types, where in the Browse Mode the user had to point to only one publication type.

(See FIG. 94.)

See the Authority file tables in Appendix A for a complete list of the fields presented on the selection list.

4.0.0 Card Catalog

Description:

The Card Catalog Mode provides access to several more items of published information.

Figure 95:
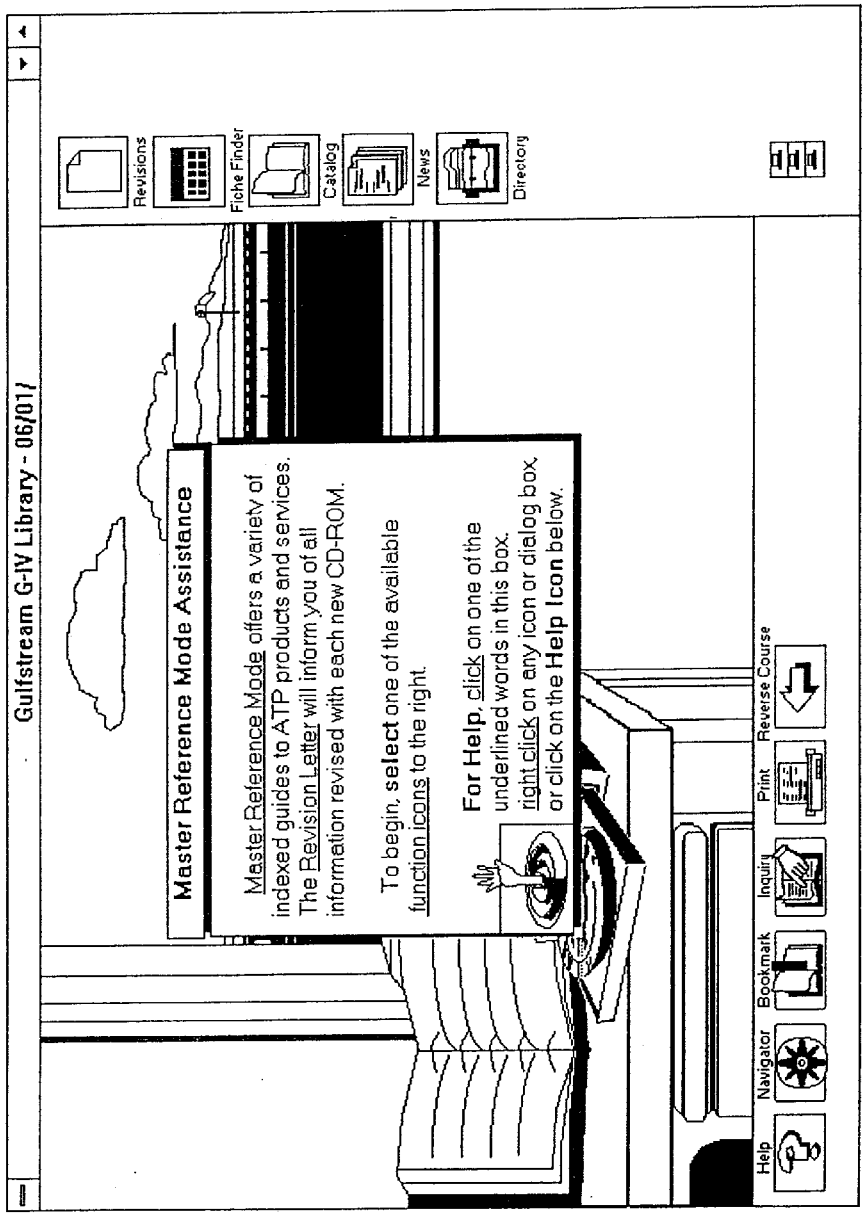

Functionality:

(See FIG. 95.)

Available from the Card Catalog Mode are: CD-ROM Revision Letter; "Fiche Finder" (Master Fiche Index File); Product Catalog; CD-ROM Bulletins; and Industry Directory.

4.1.0 CD-ROM Revision Letter Function

Description:

The CD-ROM Revision Letter is an index of all of the changes that have been made to documents ever included with the currently selected CD-ROM product from the library service provider. Preferably, there is a separate revision letter for each product. This letter employs the current RMS Revision Letter structure.

In addition to the revision letter for the current product, a new revision letter type which tracks CD-ROM bulletins (changes to the maintenance and repair information system 10 software) are kept in the RMS and included in revision letter searches for every product.

The revision letter index is cumulative in that it includes all changes, not just the changes since the last CD-ROM release. This index is in descending order, most recent first.

Figure 96:
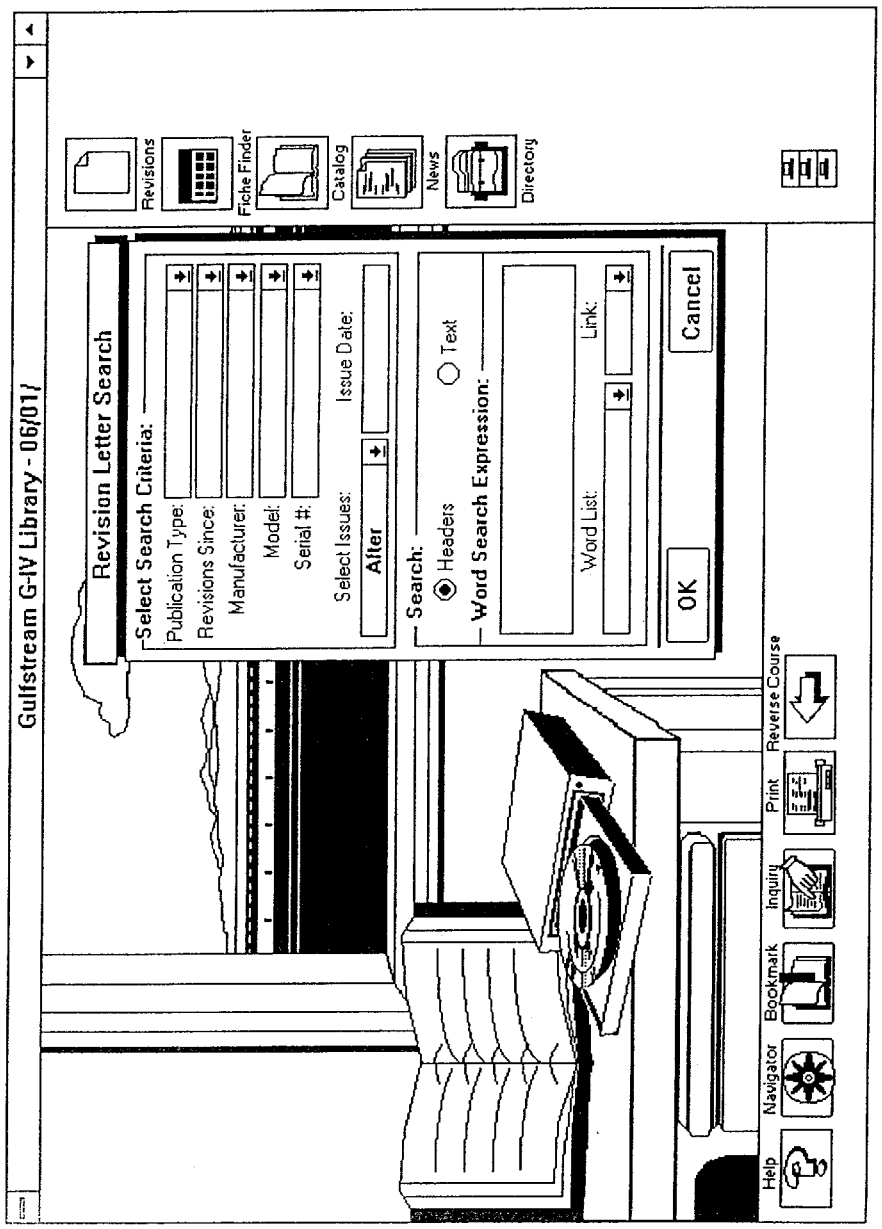

Functionality:

(See FIG. 96.)

Selecting CD-ROM Revision Letter brings up a search dialog box like those used in Bookshelf Mode search. The Search fields are: Publication Type; Revised Since (looks only for revisions after this date); Manufacturer; Model; Serial Number; Issue Date (of the publication); and Word Search (headers or text of the actual document).

Additionally, the user can use the "Sort" option to specify a Browse sequence of the resulting selection list. Specifying "by publication type" generates a selection list ordered by publication type and then document identification within publication type. This places all of the same type of document together (i.e., ADs then SI in numerical order). Specifying "by issue date" generates a selection list ordered by descending issue date, then publication type, and then document identification. This permits the user to see what is new first.

Figure 97:
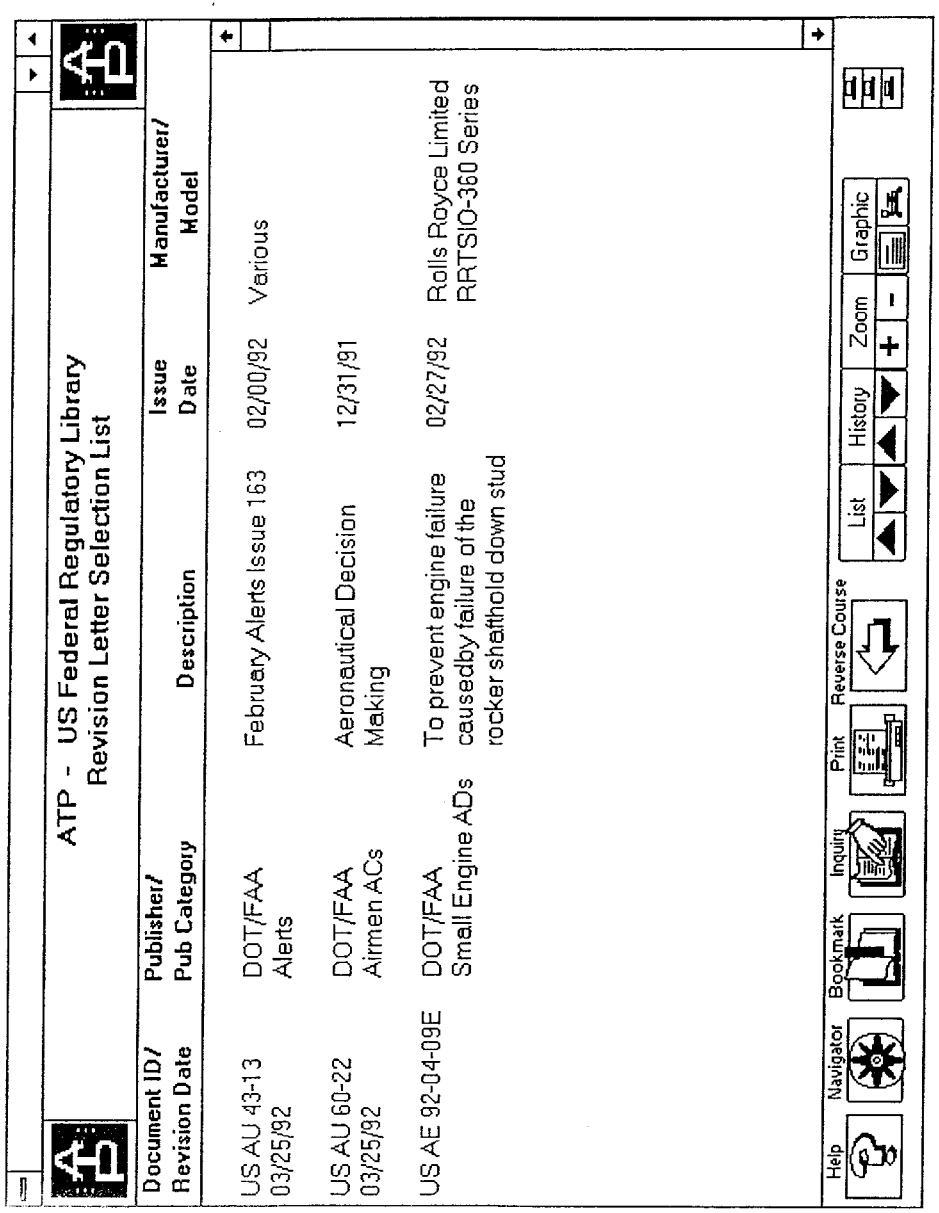

(See FIG. 97.)

It is noted that the result of this search is a revision selection list of revised documents. (In this one instance, multiple document types can be displayed on the same selection list because they are actually coming from the revision index.) Clicking on an item in the selection list takes the user to that document in document display.

4.2.0 Fiche Finder Function

Description:

The Master Fiche Index File is an index broken down by manufacturer, publication type, model, title, and first fiche number of the roughly 6,000 publications available on microfiche through the library service provider. This index comes directly from RMS into Paradox.

Figure 98:
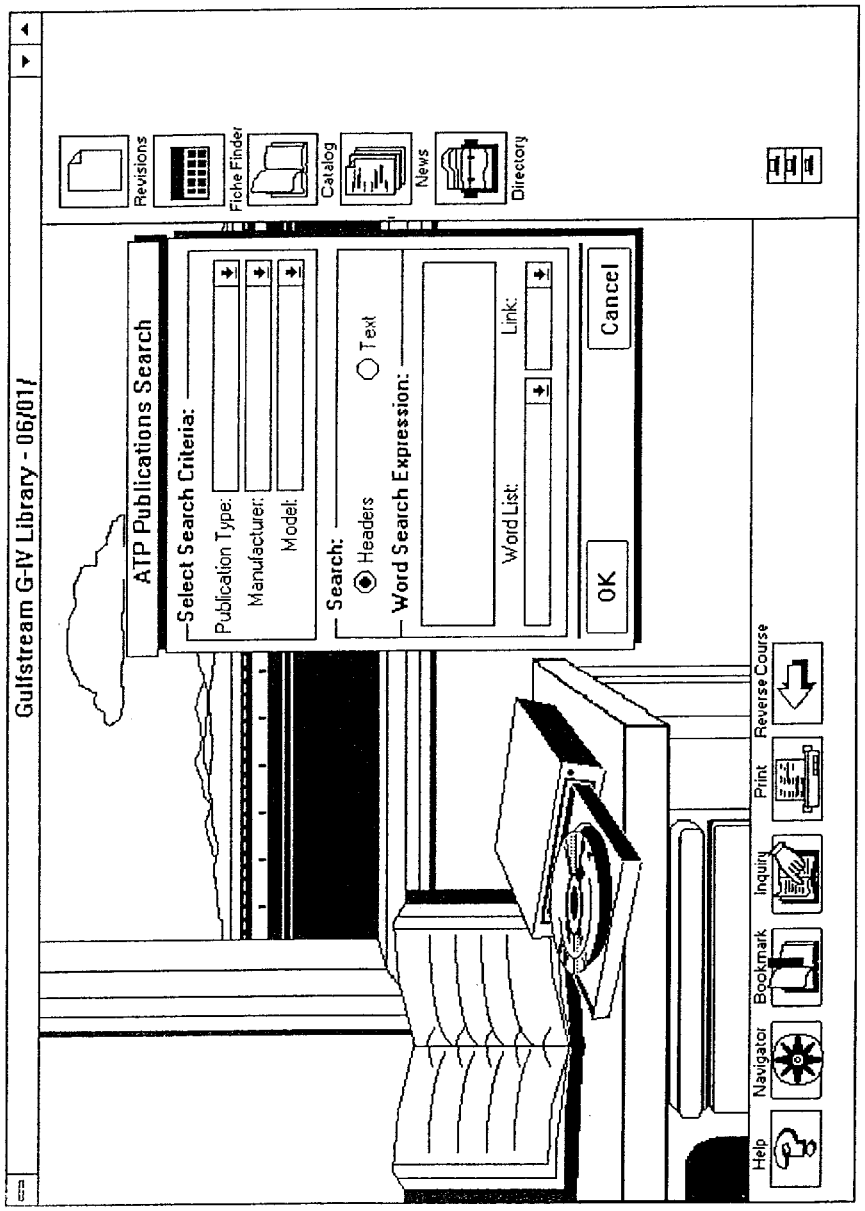

Functionality:

(See FIG. 98.)

Selecting Fiche Finder brings up a search dialog box like those used in Bookshelf Mode search. The search fields are: Publication Type; Manufacturer; Model; and Word Search (radio buttons shown but forced to "Headers" and reading "Text Unavailable" in gray).

These search fields allow the user to perform a search against all of the publications available on microfiche through the library service provider. The result of this search is a selection list of publications related to the profile specified by the search criteria. Like the selection list for STCs, the selection list is the data.

Figure 99:
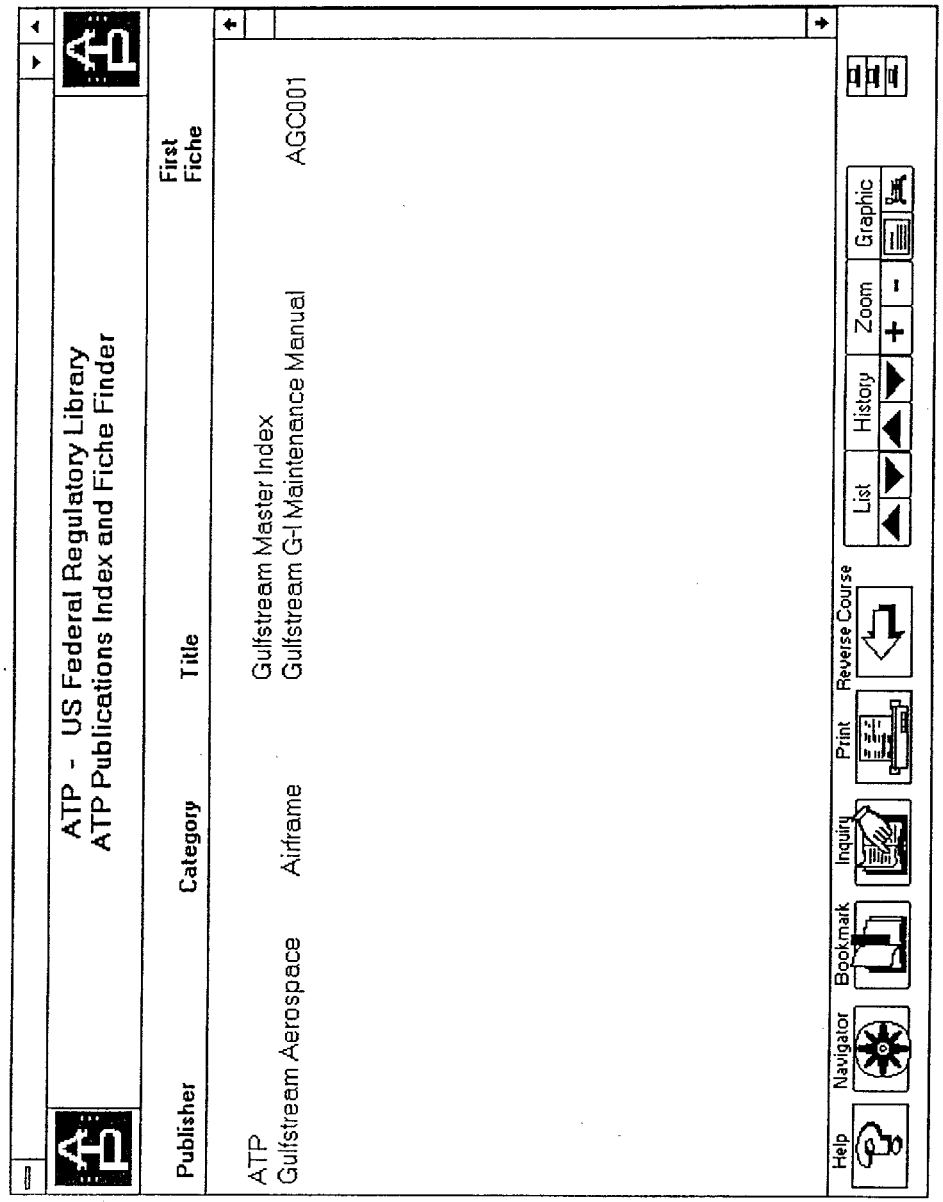

(See FIG. 99.)

The first fiche number indicates where in the fiche library this publication starts. Although fiche files are often updated, the first fiche number almost never changes and is preferably an accurate finding tool. The issue date is intentionally omitted from the selection list, since the issue date is likely to be out of date compared to the user's fiche subscription which is updated every two weeks.

4.3.0 Product Catalog

Description:

This is a complete listing of library service provider products and services including descriptions and pricing information. As an index, it provides the user with the ability to search the complete list for products or services based on aircraft specific criteria or a word search.

Functionality:

A search dialog box like those used in Bookshelf Browse allows the user to search: Manufacturer (Publisher); Model; Publication Type; and Word Search.

The result is a selection list of the products that meet the search criteria. Like STCs, the selection list is the data. Specifying no search criteria allows the user to Browse the entire list.

Contemplated Modification:

It is desired that the selection list be formatted as a purchase order complete with totals and sensitive to upgrade path pricing. Printing the selection list results in a completed purchase order.

4.4.0 CD-ROM Bulletins

Description:

These are actually service information bulletins issued by the library service provider about the CD-ROM. This service information bulletin indicates what is new, what has changed, and what the user should be aware of. As such, they are a document type. Every bulletin has a document identification. These are the documents pointed to by the revision letter index.

Functionality:

Selecting CD-ROM Bulletins brings up a search dialog box like those used in Bookshelf Mode search. The search fields are: Mode or Function affected and Revision Date.

It is noted that the result of this search is a revision selection list of CD-ROM Bulletins. Clicking on an item in the selection list takes the user to that document.

4.5.0 Micro-Scope Library

Description:

This is where the Micro-Scope Library issues organized by article are preferably made available to the user.

Contemplated Modification:

Like other publications available from the card catalog, searching is preferably supported to generate a selection list. A selection list is displayed of all Micro-Scope Issues contained on the CD-ROM. This list conforms to other selection lists organized hierarchically by issue and then article.

4.6.0 Industry Directory

Description:

This is a list of all manufacturers' product support personnel and their current names, addresses, and telephone numbers (work and home as available).

Functionality:

To be searched by manufacturer, location, and product specialization.

5.0.0 Reports (Form Printer)

Description:

Reports is where the aviation professional can preferably access the data being assembled by the maintenance and repair information system 10. Tools such as an editor and paradox view/edit are preferably available.

However, for the maintenance and repair information system 10, access tools to data are preferably not provided by the library service provider. Nonetheless, this is where FAA Forms are preferably filled out with the help of the maintenance and repair information system 10 engine. Therefore, printing the available FAA Forms is preferably available from this mode icon. This function can be simply referred to as FAA Forms Printer.

Figure 100:
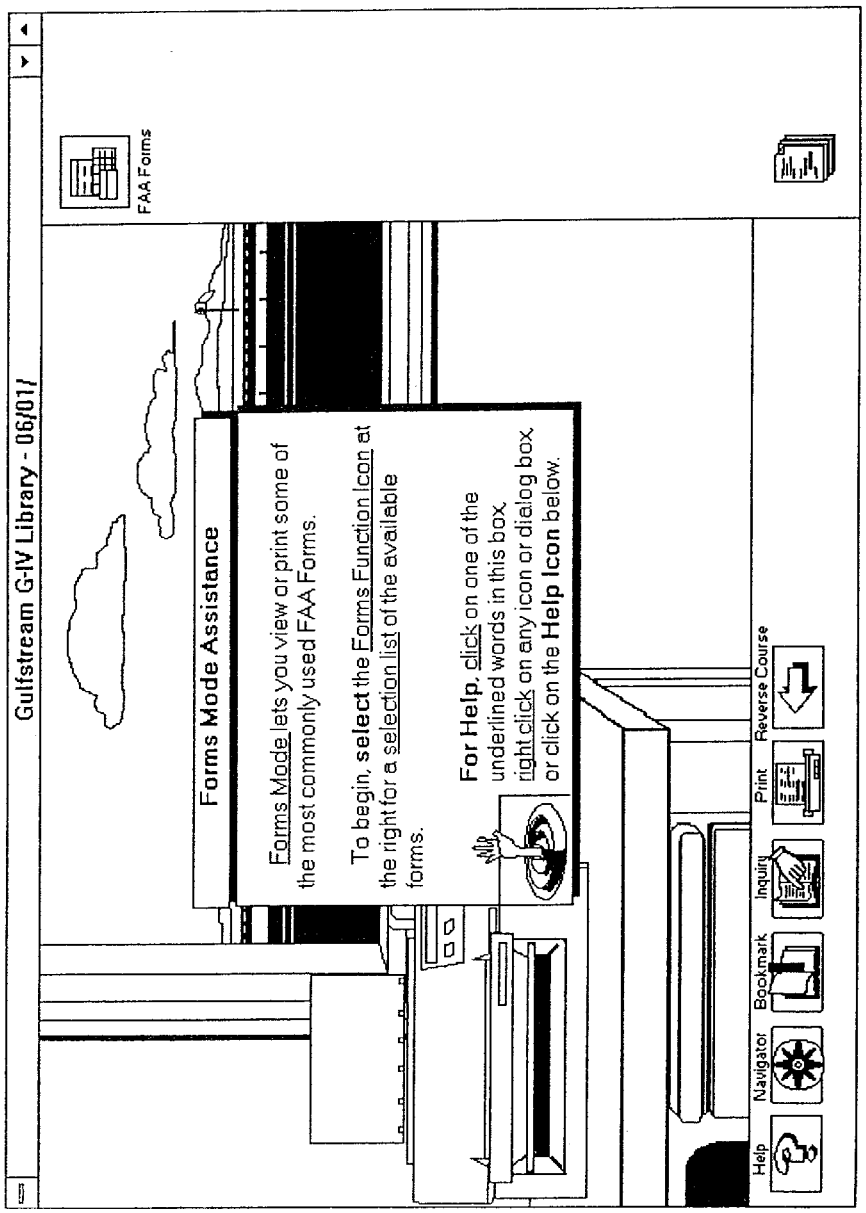

Functionality:

(See FIG. 100.)

When the user selects Form Printer from the Navigator Screen, the form printer mode is entered.

5.1.0 FAA Forms Printer

Description:

Note that FAA Forms Printer conforms to all the usual rules associated with selection list and InnerView documents viewed and printed in document display. The fact that the items presented in the selection list are graphics is no different than presenting graphics in the selection list for the IPC in manufacturer specific products.

Figure 101:
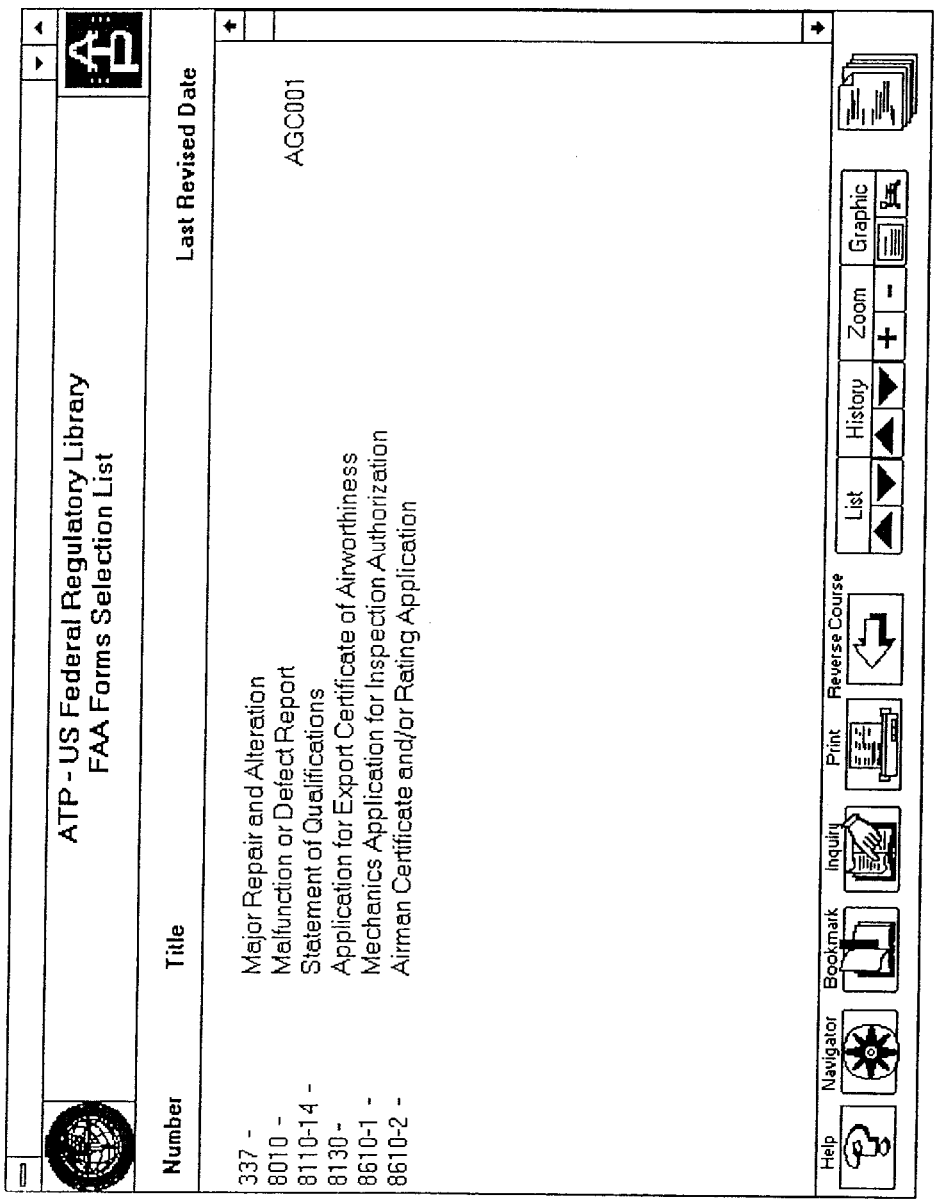

Functionality:

(See FIG. 101.)

Because FAA Form Printer is the only function in the mode, the user is immediately taken into document display where a selection list of all the available FAA forms is displayed. This selection list contains headings of Form Number, Revision, Revision Date, and Title.

Figure 102:
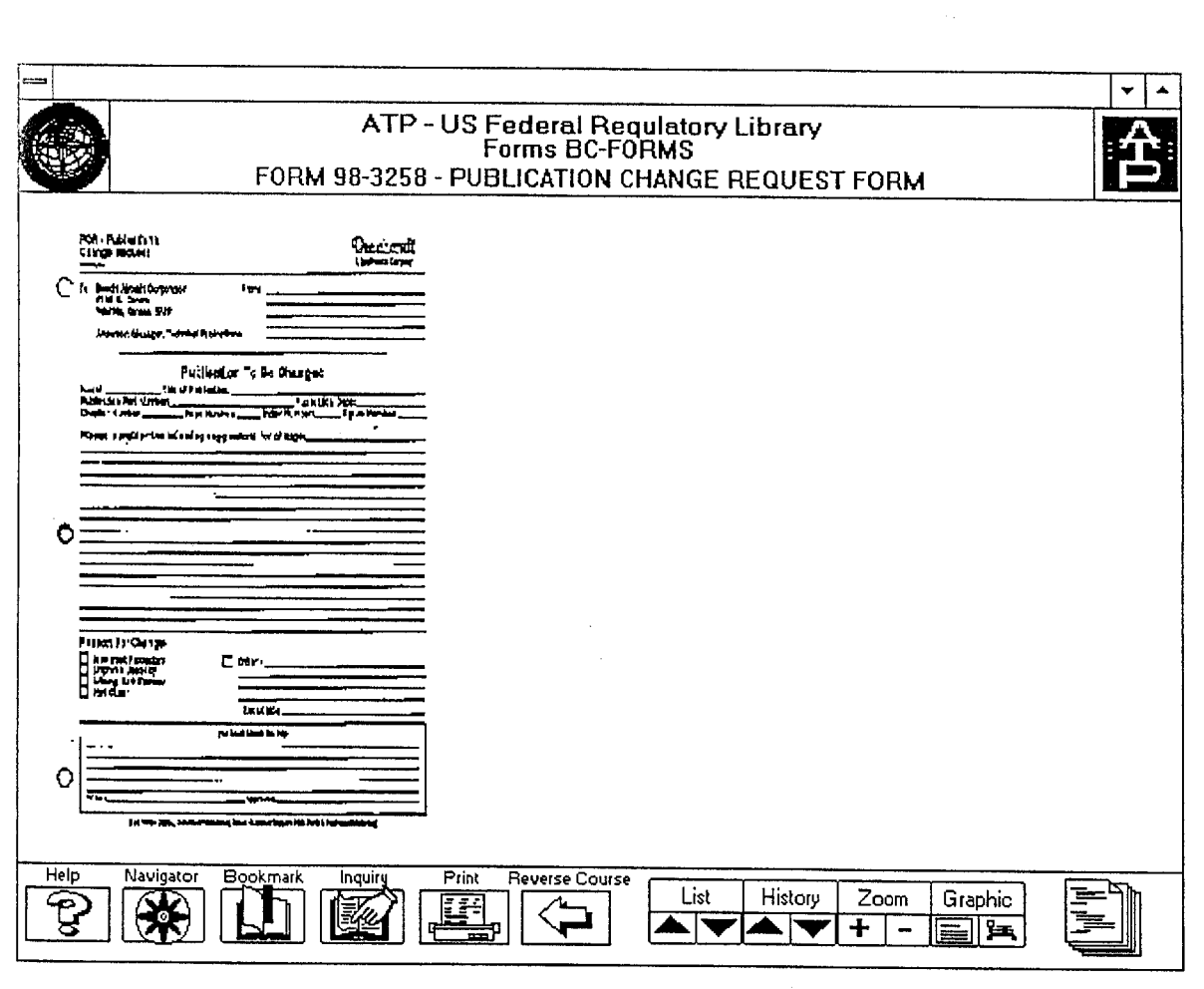

(See FIG. 102.)

Clicking on a form in the selection list brings the graphic image of that form into document display. These are TMS-FAX images retrieved from the CD-ROM.

Contemplated Modification:

When a built-in editor is supported, these FAA forms can be filled in, stored, and either printed or linked to the Electronic Logbook. When a higher level of database management is supported, to the extent that aircraft profile data answers the questions on the FAA forms, the maintenance and repair information system 10 can automatically fill out most of the FAA forms as soon as they are called into the editor.

5.2.0 Report Generator

Contemplated Modification:

A complete Paradox database management viewer editor is preferably built into the maintenance and repair information system 10. This allows users to perform database management tasks.

The report generator portion of this database management system offers the user the ability to assemble various fields of data into reports. The maintenance and repair information system 10 suggests some report formats. For example, report formats required by manufacturers in the paper world can be mimicked, printed, and attached to a paper logbook. The user can also have the ability to compose custom report formats.

In addition to preparing paper reports, reports conforming to manufacturers' data collection specifications can be compiled and transferred by disk or modem.

Reports also clearly point to the addition of a text editor. As soon as an editor is supported, there is the ability to fill out FAA Forms.

6.0.0 System Setup

Description:

All of the functions located under system utilities pertain to the maintenance or configuring of the maintenance and repair information system 10 software.

Functionality:

(See FIG. 103.)

When the user selects the library service provider icon from the Navigator Screen, the Utilities Mode is entered. The function icons along the right-hand side of the screen comprise: User Setup; System Setup; System Preferences; Backup/Restore; Update; and Troubleshooting.

6.1.0 User Setup

Description:

The user setup option allows all users to change their password, decide if they want their icons labeled, and decide whether or not to have the New User Assistance screens come up automatically. This provides access to the same user setup tasks associated with the user setup check box at log-in.

Figure 104:
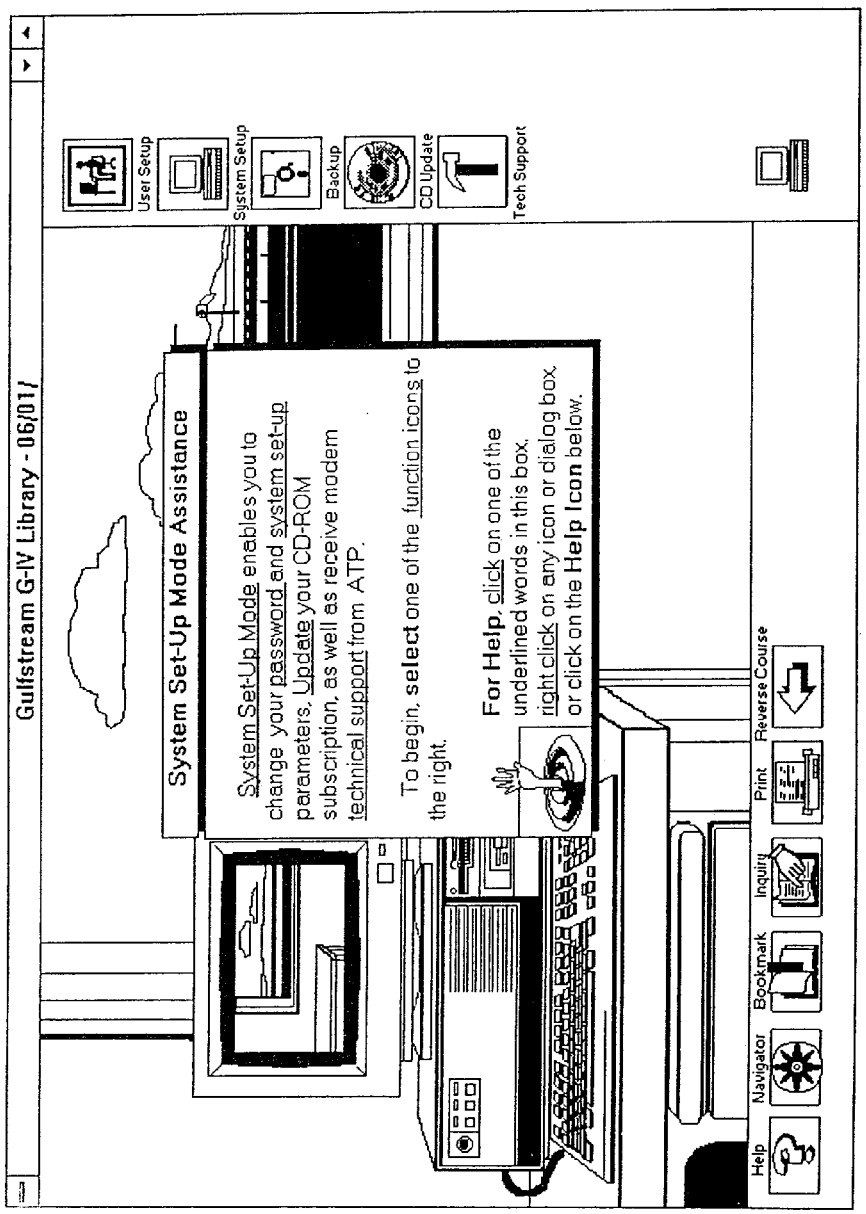

Functionality:

(See FIG. 104.)

If User Setup is checked at the password entry dialog box (and the user correctly enters his or her name and password) or User Setup is selected from System Setup, the user is given one of two opportunities based on the user's authority level.

When a user with standard "user authority" selects User Setup, only the User Setup dialog box is presented. Password security must be invoked for someone with "user authority" to be logged on. Otherwise there would only be a supervisor. The user can identify a log-in name, password, and new user help preferences regarding new user help information boxes and labeled icons. These preferences are recorded for that user and immediately effective.

When a user with "supervisor level authority" selects User Setup either at log-in or from system setup, the system administration dialog box is presented. Selecting Password from the system administration dialog box brings up the same user setup dialog box which can then be configured for each user. See system administration below.

Cross References: Authority Level

Contemplated Modification:

The User Utilities check box can allow users with higher authority levels to do some system administration for their own use of the maintenance and repair information system 10.

6.1.1 System Administration

Description:

A user with "supervisor level authority" who has marked the user setup check box on the user log-in dialog box or selected user setup from system setup is allowed to perform system administration. The supervisor can edit all or part of a current user profile. For any current user, the supervisor can change the log-in name, full name, password, or authority level and set privileges. Current users can also be deleted altogether.

System administration is preferably available even if password security is not currently invoked. This allows user information to be created and changed in preparation for invoking password security.

Figure 105:
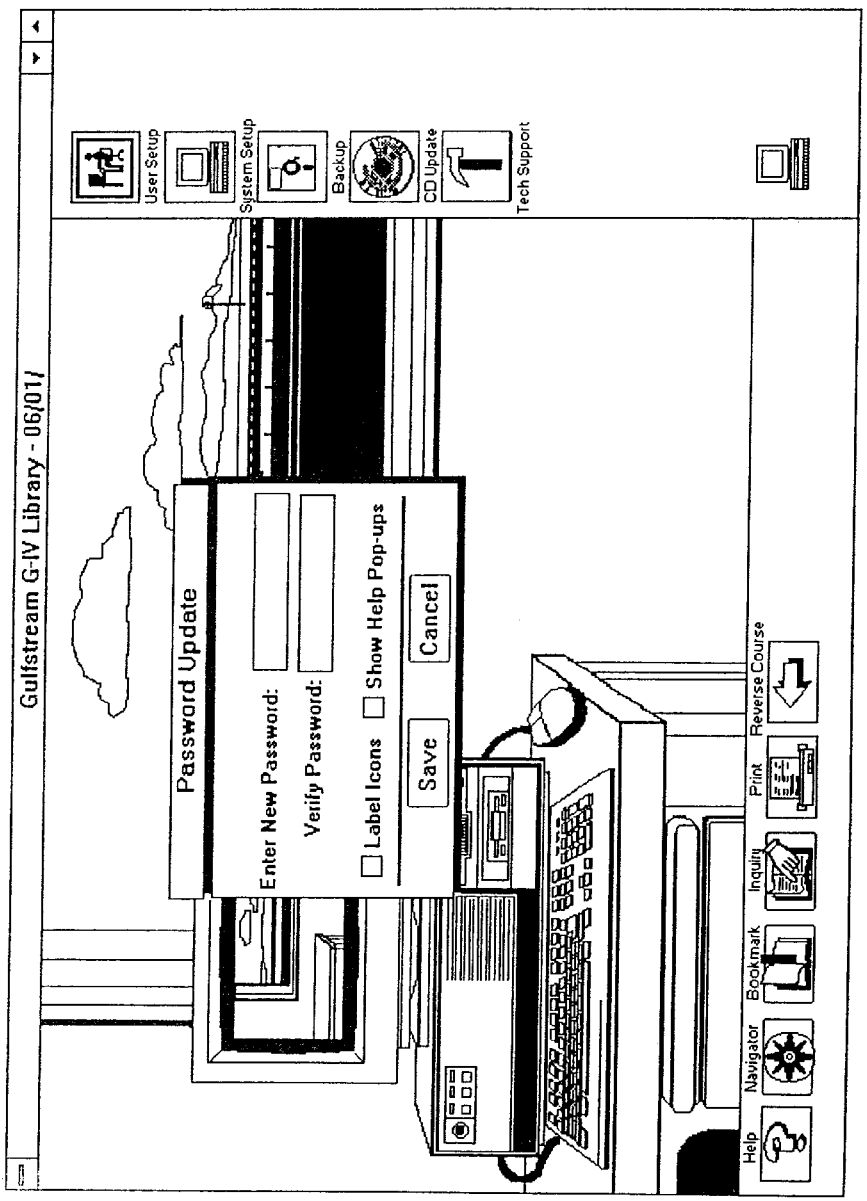

Functionality:

(See FIG. 105.)

If a user with "supervisor level authority" marks the user setup check box on the user log-in dialog box or selects user setup from system setup, that user is taken to the system administration dialog box.

If the supervisor selects a current user's name from the current user word wheel on the left of the dialog box, that user's current system administration information automatically fills the dialog box. Any or all of the other system administration data fields can be changed. Selecting the password control button allows the supervisor to fill in the User Setup dialog box for the selected user.

Contemplated Modification:

Users with a higher authority level but who are not supervisors can have access to a subset of the features available from the system administration dialog box.

6.1.2 Bookmark Privileges

Description:

A user with "supervisory level authority" is allowed to set the Bookmark Privileges for any user.

Functionality:

From the system administration dialog box the supervisor sets the bookmark privileges from a set of radio buttons. This determines what kind of bookmarks the user can create. Any user can view all types of bookmarks, except other users' private bookmarks as defined by InnerView.

Cross References:

See Bookmarks under section 1.3.0.

6.1.3 Profile Access

Description:

The following privileges can be set regarding Aircraft Profile Create/Change.

Profile Privileges: Create/Change; Transfer in; and Transfer out. All users can see existing records from the Profile Utilities function. These options limit what they can do with them.

Functionality:

From the system administration dialog box, the supervisor sets the profile access from a set of check boxes.

6.1.4 Authority Level

Description:

The maintenance and repair information system 10 supports nine authority levels. Level 1 is named User, while level nine is named Supervisor. Supervisor is the highest level of authority. For the maintenance and repair information system 10, supervisor authority allows a user to perform system administration tasks which include add, delete, and change user profiles. Everyone not given supervisor level authority is considered a user, the lower authority level.

Functionality:

At the system administration dialog box, a user can be defined as supervisor or user.

Contemplated Modification:

It is noted that programming of the authority keys should accommodate future intentions for authority level to limit data access to certain document types or domains. It can also limit functionality in terms of what operations or features can be accessed.

6.2.0 System Setup Utilities

Description:

System Setup allows the supervisor to reconfigure program options established during installation. These options are not user specific and therefore not set in system administration. These options are: Password Security; Hard Drive Space Allocation; Graphics Card Resolution; and Facility Information data for use in logbooks, reports, and document headers.

Figure 106:
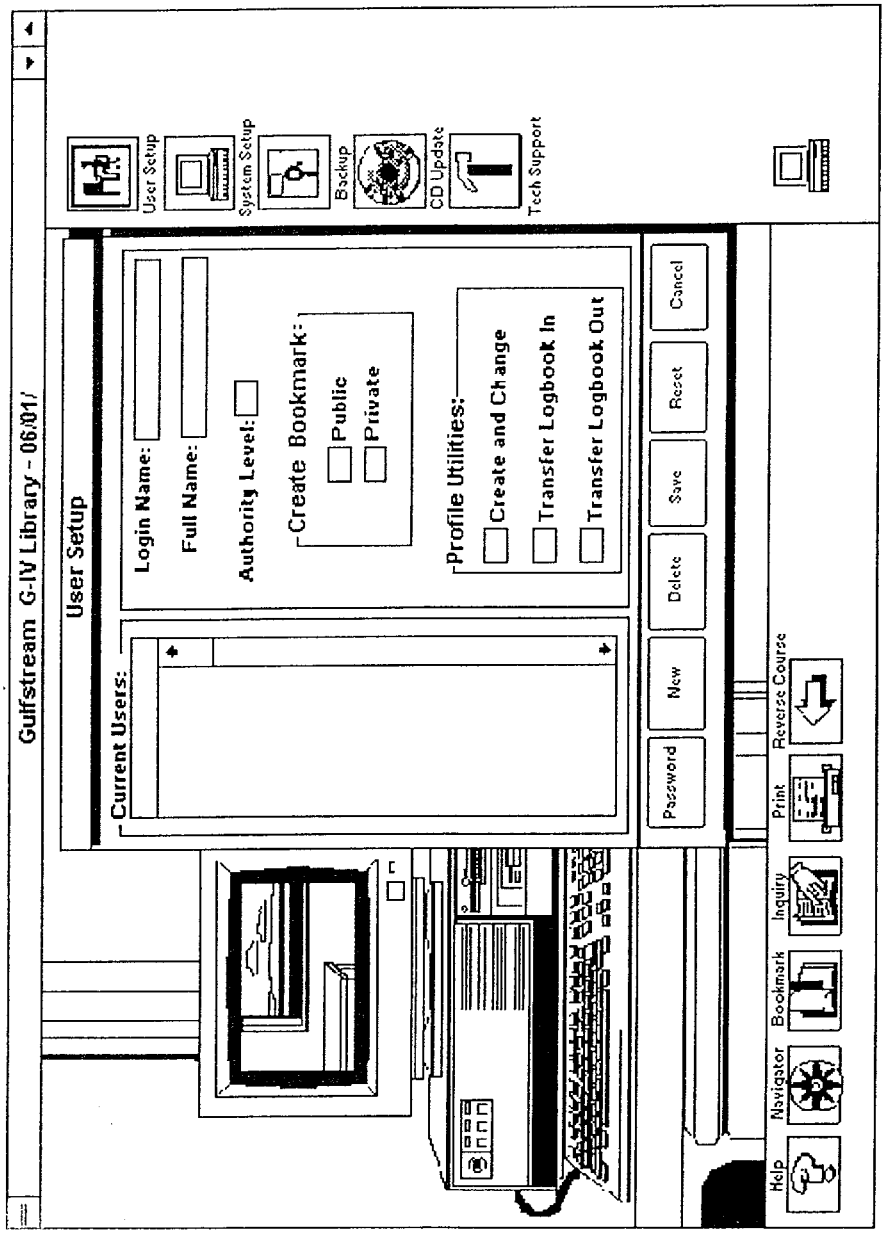

Functionality:

(See FIG. 106.)

All System Setup Utilities are available only to users with supervisor level authority.

Selecting System Setup Utilities brings up a dialog box of all of the options in different subparts of the box.

6.2.1 Password Security Option

Description:

If the user enables Password Security, the information stored in the system administration dialog box becomes active. There is at least one user named supervisor, with the password supervisor, as configured during installation.

It is noted that the maintenance and repair information system 10 preferably requires there to be at least one user with supervisor level authority at all times. Deleting the last user with supervisor level authority is preferably impossible and causes an error message.

It is also noted that the maintenance and repair information system 10 also installs a hidden library service provider technical support user with supervisor level authority and password. This user is hidden from the system administration dialog box and non-deletable. This allows a library service provider technician to gain access to the maintenance and repair information system 10 for maintenance.

Functionality:

A set of radio buttons presents the user with the choice to enable or disable password security.

6.2.2 Drive/Space Allocation

Description:

Upon installation, the maintenance and repair information system 10 allocates a predefined amount of space on a hard drive for the sole purpose of running the maintenance and repair information system and storing an ample number of records. These options allow the system administrator to determine where the CD-ROM drive(s) is, where the hard drive to be used for the maintenance and repair information system 10 is, and how much space is available.

Figure 107:
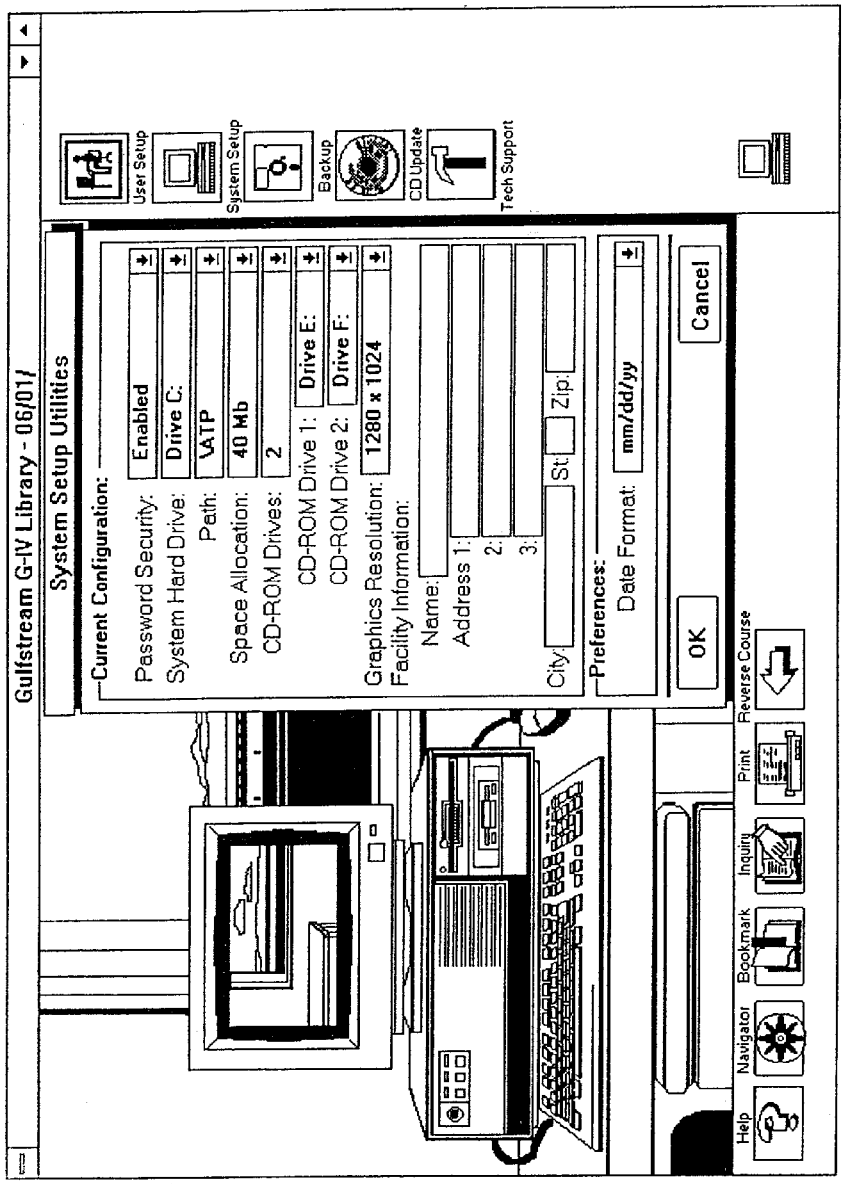

Functionality:
(See FIG. 107.)

The options presented in the system setup dialog box allow the user to indicate which hard drive is to be designated the maintenance and repair information system 10 hard drive, the amount of total allocated disk space, how much of that space still remains free, and options to increase or decrease that space by specified increments.

Other options allow the user to determine what drive letters correspond to the CD-ROM drive and hard drive(s) that are currently installed.

6.2.3 Graphics Card Resolution

Figure 108:
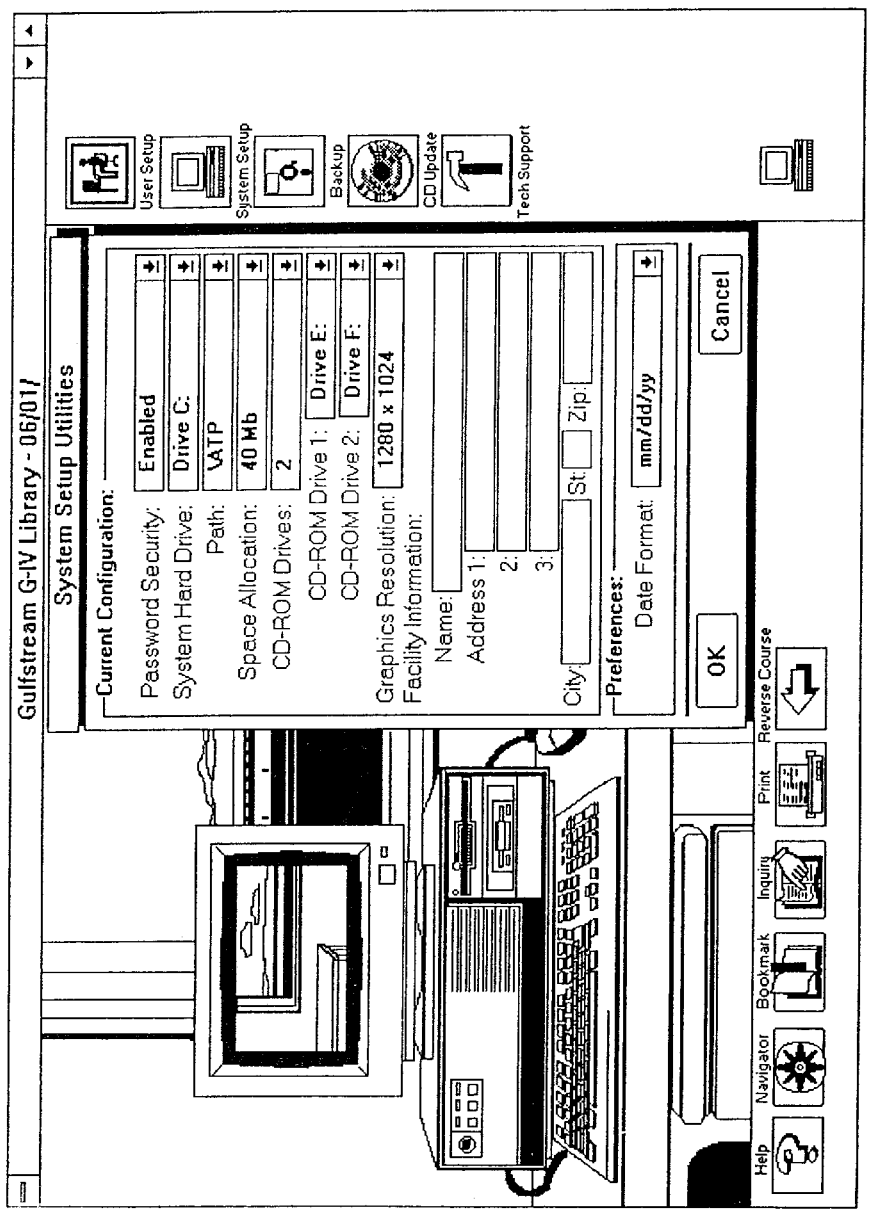

Description:

If the user changes graphics cards after installation, this option allows the user to change the monitor type setting.
Functionality:
(See FIG. 108.)

The Graphics Card Resolution variations are presented in a word wheel field within the System Setup Utilities dialog box. Selecting a different resolution does not affect operation until the next time the maintenance and repair information system 10 is started. This allows the user to change the graphics card setting before changing the actual card. If the user changes the graphics card before changing the setting, it is possible that the monitor may not work with the current settings.

6.2.4 Facility Information

Figure 109:
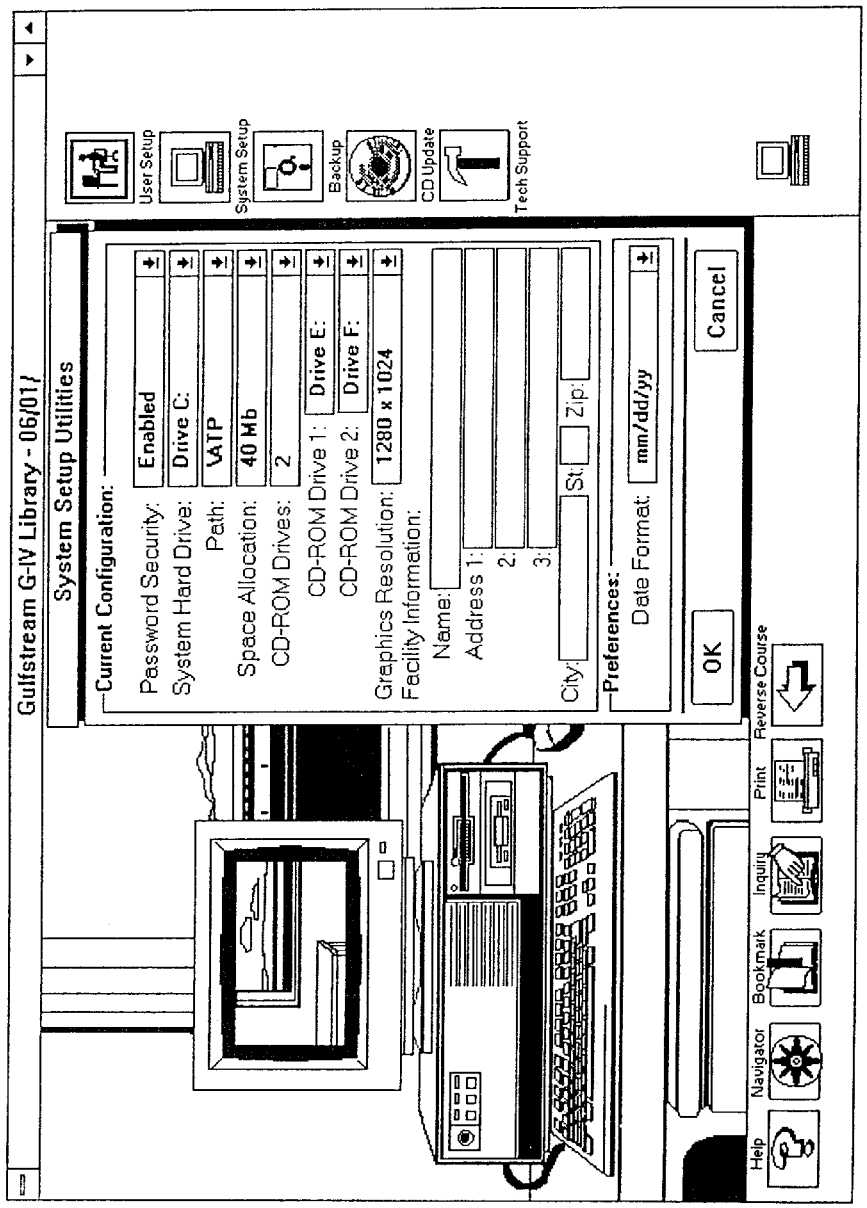

Description:

In reports, logbooks, and document printouts, the name, address, telephone number, and other facility information is used to identify the facility generating this information from the maintenance and repair information system 10. This information is initially provided upon installation, but this option allows the user to change that information.
Functionality:
(See FIG. 109.)

Free form text entry fields are provided in the dialog box to add, edit, or delete this information.

6.2.5 System Preferences Function

Figure 110:
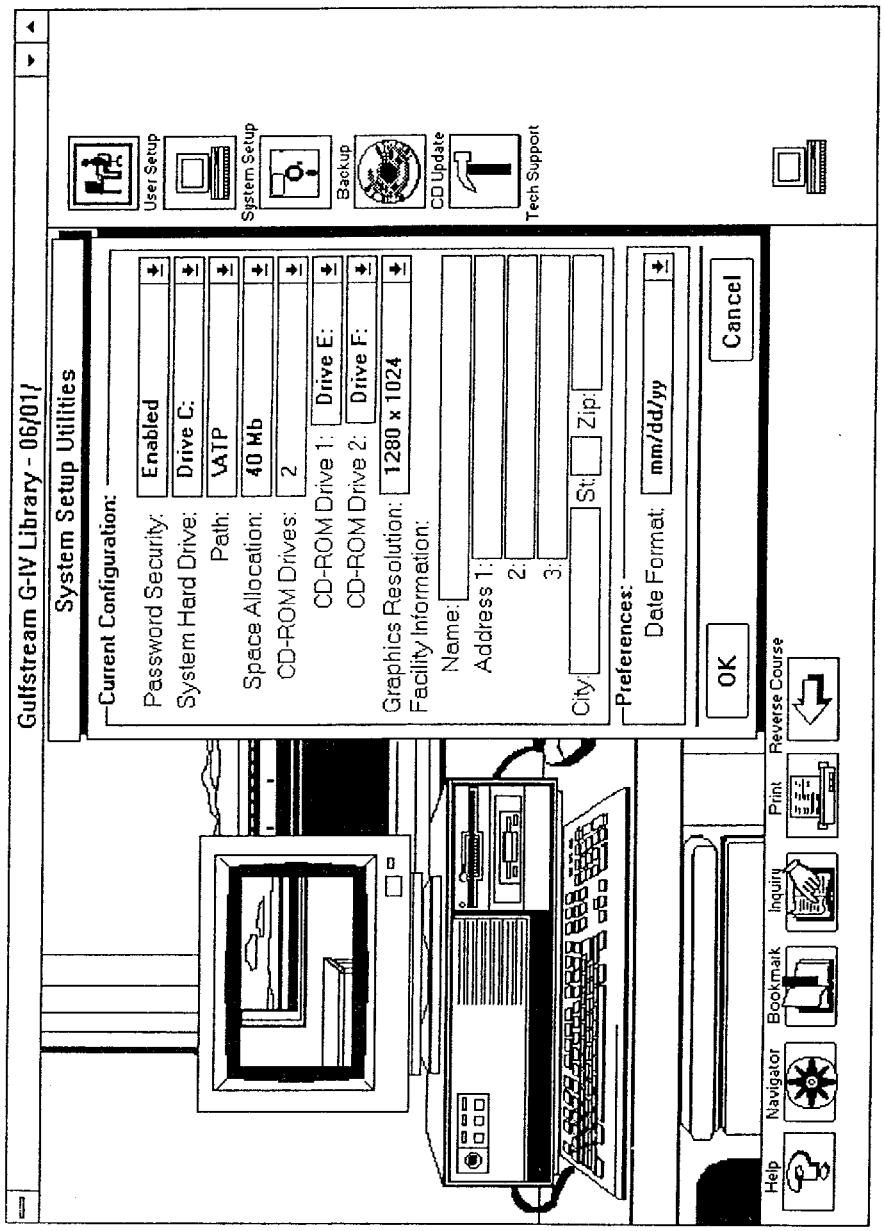

Description:

There are several system preferences that can be established for user throughout the maintenance and repair information system 10.
Functionality:
(See FIG. 110.)

Within the preferences subpart of the system setup, dialog box preference options are presented. For example, the Date Format option allows the user to identify MO/DA/YR or DA/MO/YR as the preferred date format.
Contemplated Modification:

The ability to establish default values for various fields throughout the maintenance and repair information system 10 interface is incorporated.

6.3.0 CD-ROM Update Function

Figure 111:
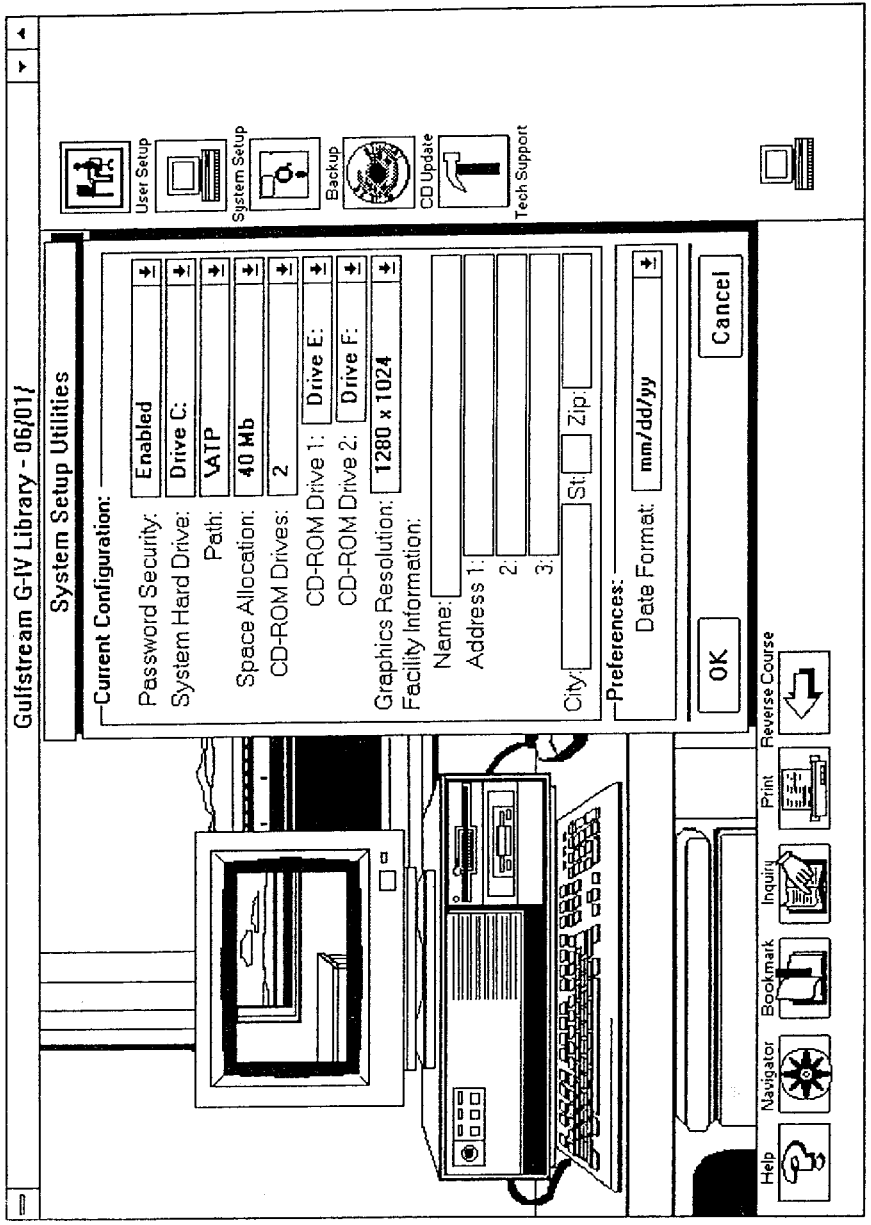

Description:

All information related to when the CD-ROM was last updated, as well as the routine for performing an update, is available here.
Functionality:
(See FIG. 111.)

The CD-ROM Update dialog box displays the Revision History (date when CD-ROM was last revised) and the Revision Status (when the current subscription with the library service provider is due to expire). In this way, the user knows how current the CD-ROM is and if the user should expect another one.

Also available from this dialog box is a place to enter a subscription extension code, a code provided to the user by the library service provider to extend the subscription period. There is also an update product control button that starts the CD-ROM update procedure.

6.4.0 Troubleshooting Function

Figure 112:
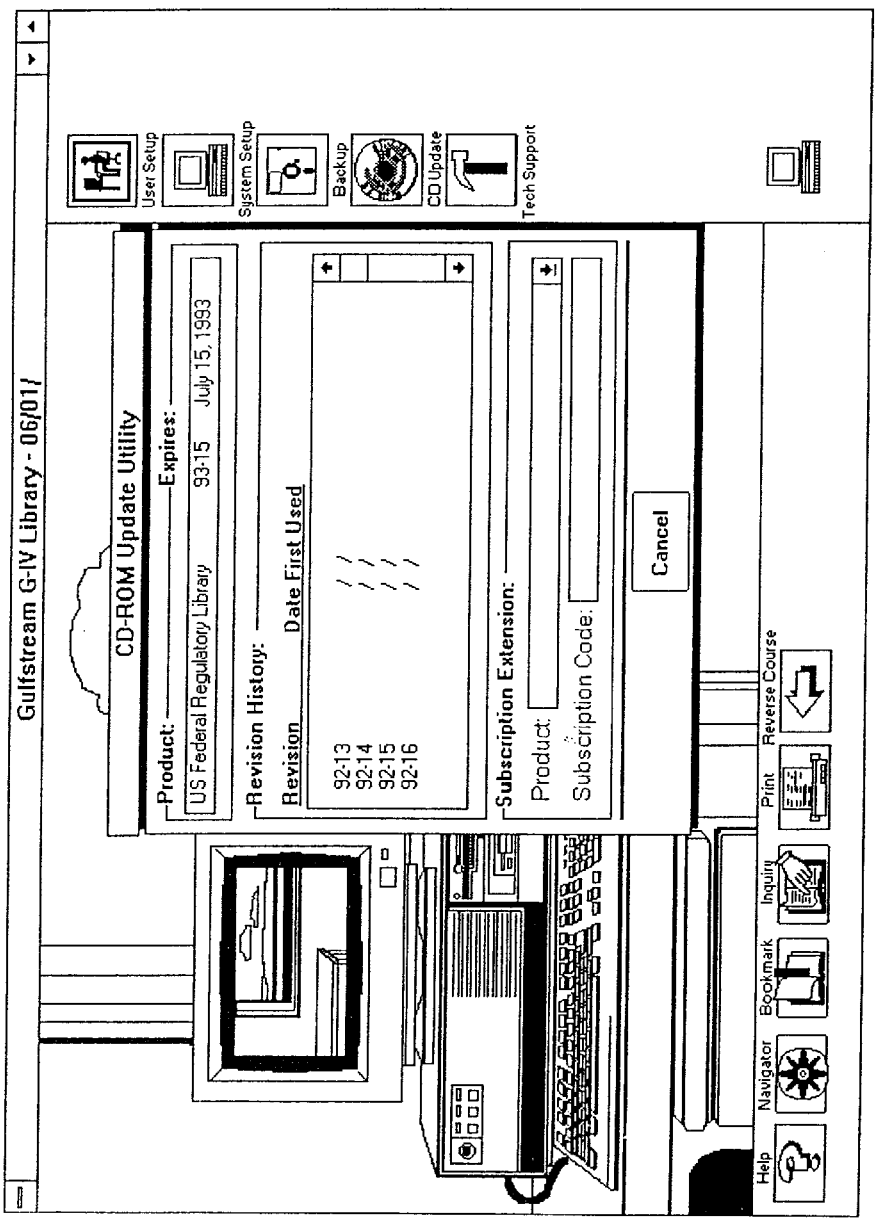

Description:

The Troubleshooting function allows either the user or the library service provider technical support to analyze the performance of the maintenance and repair information system 10 and view hardware status.
Functionality:
(See FIG. 112.)

Selecting the Troubleshooting function brings to the screen a dialog box with these system statistics: Hard Drive Space Available; RAM Available; Windows 3.1 Dr. Watson (Windows troubleshooting information); System File Sizes (all the maintenance and repair information system 10 and Logbook filenames and their sizes are shown in a scrollable view box). Also available from this dialog box are two control buttons, namely, Show Problem File and Close-Up Session.

Clicking on the Show Problem File allows the user to view the abnormal termination statistics that have been collected in a text file by the maintenance and repair information system 10. This file can be displayed either in document display or in a scrollable dialog box.

Clicking on Close-Up Session initiates the Close-Up remote software for users with a modem and allows a library service provider technician to control the maintenance and repair information system 10.

6.5.0 Data Backup/Restore Function

Description:

The primary purpose of the Data Backup and Restore Function is to allow users to maintain a secure backup copy of their database files in the event anything should go wrong with the computer. Backup and Restore also allows users to move inactive aircraft profile records out of the maintenance and repair information system 10 to free up disk space.

For the maintenance and repair information system 10 backup preferably allows the user to export database files out of the allocated system area to some other destination on the hard drive. Restore does the exact reverse. It is the responsibility of the user to actually get the files off the hard drive.
Functionality:

Selecting Data Backup/Restore brings up a dialog box offering three radio button options: Backup Logbooks; Backup System Files; and Backup Everything.

On that dialog box is also a place to insert a drive and path for the backup directory and filename. Adjacent to the backup directory is a set of two radio buttons that read "Backup to" or "Restore From."

With "Backup to" chosen and a valid path filled in, the Backup options are selectable. The maintenance and repair information system 10 automatically backs-up to the specified directory and filename.

If the user selects either Backup System Files or Backup Everything, the maintenance and repair information system 10 automatically proceeds to place all related files in the specified destination directory. An information box informs the user of how far along in the process the maintenance and repair information system 10 is in this procedure.

If the user selects Backup Logbooks, another dialog box presents a search options dialog box like those used with the Bookshelf Mode search function. This dialog box allows the user to search logbook records by component category, by file type, or for files tagged "archive" in the status field. This allows users to backup only certain records.

If Restore From is selected, then the directory and filename specified must be backup files previously created by the maintenance and repair information system 10. The backup options are grayed out. Selecting OK starts the restore process where the maintenance and repair information system 10 restores the data in the backup file. If data in the backup file is going to replace any existing data, the user is prompted to replace data or stop restoring.

7.0.0 Tutorial

Description:

This is the on-line tutorial available to teach the user how to use the entire maintenance and repair information system 10.

Figure 113:
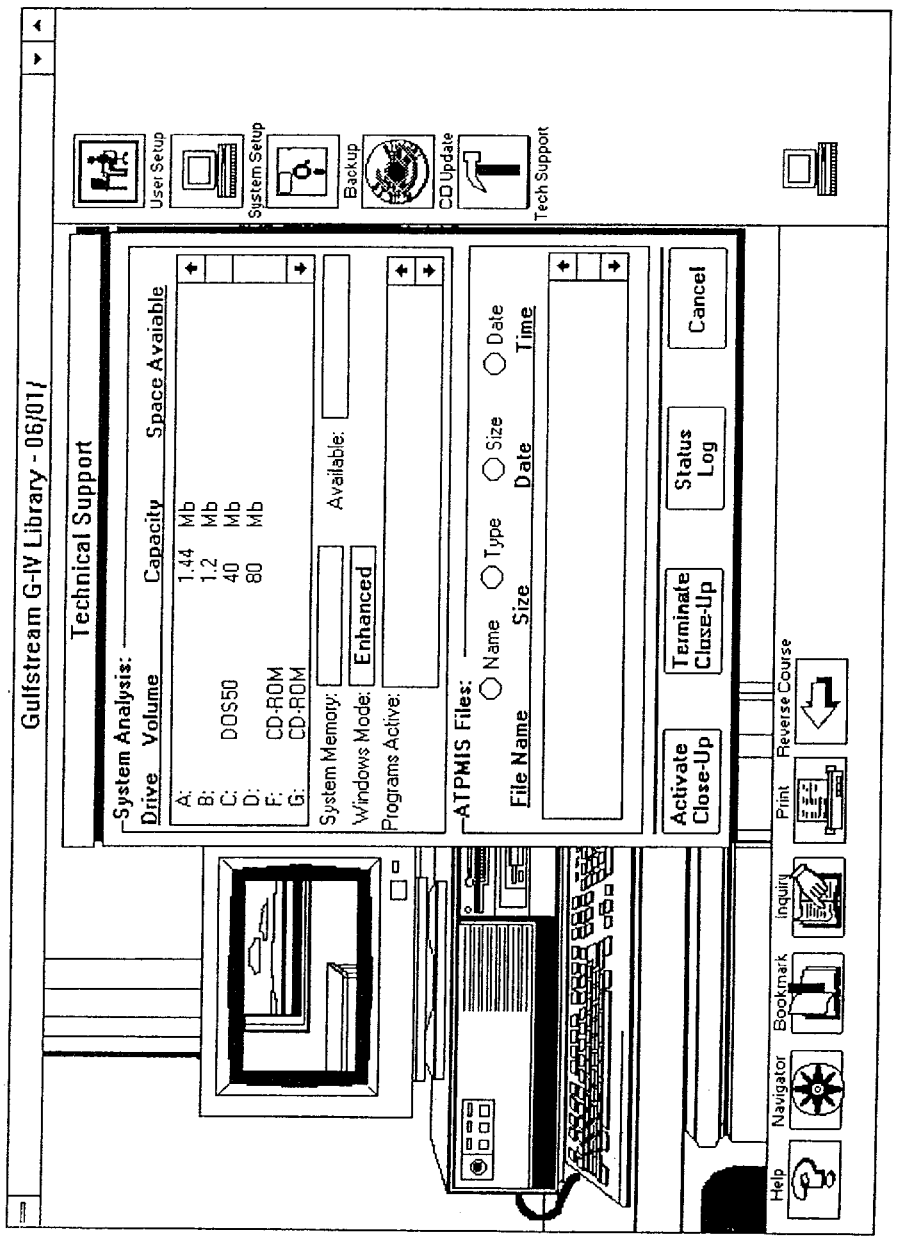

Functionality:

(See FIG. 113.)

Clicking on the tutorial mode icon starts the tutorial.

It will be understood that the embodiments of the present invention described above are susceptible to various modifications, changes, and adaptations. While the embodiment of the maintenance and repair system described above is directed to a database of aircraft technical information, the system can be modified to provide similar utilities for maintenance and repair of any kind of complex equipment. It is also contemplated that the system in accordance with the invention can be generalized to manage text and graphics necessary to assist other service providers (such as doctors, lawyers, accountants, and others) in providing services. All is intended to be comprehended within the meaning and range of equivalents of the appended claims.

APPENDIX A

| Document Type Usage | Browse | Search | List | Link | Field | Look up | Field Size | Display Size | Data Source |
|---|---|---|---|---|---|---|---|---|---|
| Aviation Maintenance Information System Authority Files Required for Browse and Search Functions | | | | | | | | | |
| | | ¤ | | | Serial # Effectivity | ¤ | 12 | | Avcom |
| ON; AFTER; BEFORE search criteria | | ¤ | | | Issued | ¤ | | | Code |
| Actual Issue Date input by User | | ¤ | ¤ | | Issue Date | ¤ | 8 | 8 | RMS/SGML |
| Created by user | | ¤ | | | Word Search Expression | | | | User |
| TMS InnerView Operators | | ¤ | | | Word Search Operator | | | | Code |
| ATP Created Words List | | ¤ | | | Word Search List | ¤ | | | ATP/IV |
| Chapter, Section and figure Titles | | | ¤ | | InnerView Doc Title | | | 40 | RMS/SGML |
| Aviation Maintenance Information System Authority Files Required for Revision Letter Functions | | | | | | | | | |
| Publication Type | | ¤ | ¤ | | Publication Type | ¤ | | 16 | RMS |
| CD-ROM Revision Cycle/Date | | ¤ | ¤ | | Revision Date | ¤ | 8 | 8 | RMS |
| Manufacturer Effected | | ¤ | ¤ | | Manufacturer Effected | ¤ | | | RMS |
| Model Effected | | ¤ | ¤ | | Model Effected | ¤ | 12 | | RMS |
| Reserved for Serial # Capability | | | | | Serial # Effectivity | | | | Avcom |
| ON; AFTER; BEFORE search criteria | | ¤ | | | Issued | ¤ | | | Code |
| Actual Issue Date input by User | | ¤ | ¤ | | Issue Date | ¤ | 8 | 8 | RMS/SGML |
| Created by user | | ¤ | | | Word Search Expression | | | | User |
| TMS InnerView Operators | | ¤ | | | Word Search Operator | | | | Code |
| ATP Created Words List | | ¤ | | | Word Search List | ¤ | | | ATP/IV |
| Chapter, Section and Figure Titles | | | ¤ | | Publication Document Title | | | | RMS/SGML |
| Document Titles | | | ¤ | ¤ | Document ID | | | | RMS |
| Publisher Issue Date | | | ¤ | | Issue Date | | | | RMS |
| Description | | | ¤ | | Description of Change | | | | RMS |
| Publisher | | | ¤ | | Publisher | | | | RMS |
| Aviation Maintenance Information System Authority Files Required for ATP Fiche Finder Function | | | | | | | | | |
| Publication Type | | ¤ | ¤ | | Publication Type | ¤ | | | RMS |
| Manufacturer | | ¤ | | | Manufacturer | ¤ | | | RMS |
| Model | | ¤ | | | Model | ¤ | | | RMS |
| Created by user | | ¤ | | | Word Search Expression | | | | User |
| TMS InnerView Operators | | ¤ | | | Word Search Operator | | | | Code |
| ATP Created Words List | | ¤ | | | Word Search List | ¤ | | | ATP/IV |
| Publication Title | | | ¤ | | Publication Title | | | | |
| First Fiche # | | | ¤ | | First Fiche # | | | | |
| Aviation Maintenance Information System Authority Files Required for | | | | | | | | | |

APPENDIX A-continued

Browse and Search Functions

| Document Type Usage | Browse | Search | List | Link | Field | Look up | Field Size | Display Size | Data Source |
|---|---|---|---|---|---|---|---|---|---|
| Airworthiness Directives | | | | | | | | | |
| Small A/C & Rotorcraft; Large Aircraft | ¤ | ¤ | | | Size | ¤ | 1A | | RMS |
| AD Categories (Airframe, Engine, Propeller, Accessories & other) | ¤ | ¤ | ¤ | | Category | ¤ | 1A | 12 | RMS/SGML |
| ATP Short Form & Long Form | ¤ | ¤ | ¤ | | Manufacturer | ¤ | 2A | 20 | RMS/SGML |
| Refers to Model but includes Series | ¤ | ¤ | ¤ | | Model | ¤ | 4N | | RMS/SGML |
| Portion of Doc ID after issue type | ¤ | ¤ | ¤ | ¤ | AD # | ¤ | 16 | 11 | RMS/SGML |
| Cumulative or Numerical Order | | ¤ | | | Sort By | ¤ | | 11 | Code |
| Cross Reference maintained in RMS | | ¤ | ¤ | ¤ | TC # | ¤ | | | RMS |
| To accommodate serial # searching | | ¤ | | | Serial # | | | | Avcom |
| Internal FAA reference | | ¤ | | | Amendment | ? | | | SGML |
| Internal FAA reference | | ¤ | | | Docket | ? | | | SGML |
| On; After; Before-User Search Criteria | | ¤ | | | Issued | ¤ | 1 | 6 | Code |
| Actual Issue Date | | ¤ | ¤ | | Issue Date | | 8 | 8 | RMS/SGML |
| Created by user | | ¤ | | | Word Search Expression | | | | User |
| TMS InnerView operators | | ¤ | | | Word Search Operator | ¤ | | | Code |
| ATP created words List | | ¤ | | | Word Search List | ¤ | | | ATP/IV |
| Abstracted Description | | | ¤ | | AD Description | | | 42W | RMS |
| Cross References in the Text | | | ¤ | ¤ | Applicable SI | | | 16 | RMS/SGML |
| First 5 digits of AD number | 2 | | 2 | | Bi-Weekly | ¤ | | | Code |
| Data from the Bi-Weekly | | | 2 | | AD Subject | | | 22 | SGML |
| Data from the Bi-Weekly | | | 2 | | General Applicability | | | 34 | SGML |
| Proposed Airworthiness Directives | | | | | | | | | |
| To be captured at conversion | | ¤ | ¤ | ¤ | Proposed AD Docket Number | | | 14 | SGML |
| To be captured at conversion | | | ¤ | | Federal Register Date | | | 8 | SGML |
| To be captured at conversion | | | ¤ | | Action Required Date | | | 8 | SGML |
| To be captured at conversion | | | ¤ | | Proposed AD Description | | | 52 | SGML |
| Related Service Information | | | | | | | | | |
| ATP Short Form & Long Form | ¤ | ¤ | ¤ | | Manufacturer | ¤ | 2 | | RMS/SGML |
| Combination Modtab & Serlib ?? | ¤ | ¤ | ¤ | | Model | ¤ | 4/8 | | RMS/SGML |
| Combination of Pub Type and Issue Type | ¤ | ¤ | ¤ | | Publication Type | ¤ | 2 | | RMS |
| Issue Number | ¤ | ¤ | ¤ | ¤ | SI Issue Number | ¤ | 16 | 16 | RMS/SGML |
| To accommodate serial # searching | | ¤ | | | Serial # | ¤ | 12 | | Avcom |
| ON; AFTER; BEFORE search criteria | | ¤ | | | Issued | ¤ | | | Code |
| Actual Issue Date | | ¤ | ¤ | | Issue Date | ¤ | 8 | 8 | RMS/SGML |
| Created by user | | ¤ | | | Word Search Expression | | | | User |
| TMS InnerView Operators | | ¤ | | | Word Search Operator | | | | Code |
| ATP Created Words List | | ¤ | | | Word Search List | ¤ | | | ATP/IV |
| RMS Abstract of SI Description | | | ¤ | | SI Description | | | 40 | RMS/SGML |
| Captured at conversion | | | ¤ | | Compliance | | | 10 | SGML |
| Captured at conversion | | | ¤ | | Applicable ATA Section | | | 2 | SGML |
| Reconciled with RMS at conversion | | | ¤ | | AD Cross Reference | | | 11 | RMS/SGML |
| Airworthiness Alerts | | | | | | | | | |
| Month and Issue Number | ¤ | ¤ | ¤ | | Alert Issue | ¤ | | | RMS/SGML |
| Alert Categories (Airframe, Engine, Propeller, Accessory, & other . . .) | ¤ | ¤ | ¤ | | Alert Category | ¤ | | | SGML/RMS |
| ATP Short Form | ¤ | ¤ | ¤ | | Manufacturer | ¤ | | 12 | SGML/RMS |
| Model Applicability | ¤ | ¤ | ¤ | | Model | ¤ | | 20 | SGML/RMS |
| ON; AFTER; BEFORE search criteria | | ¤ | | | Issued | ¤ | | | Code |
| Issue Month and Year | | ¤ | ¤ | | Issue Date | ¤ | | | RMS/SGML |
| Created by User | | ¤ | | | Word Search Expression | ¤ | | | User |
| TMS InnerView Operators | | ¤ | | | Word Search Operator | | | | Code |
| ATP Created Words List | | ¤ | | | Word Search List | | | | ATP/IV |
| Unique Identifying Doc ID consisting of Issue # and Alert # | | | ¤ | ¤ | Alert Number | | | | SGML/RMS |
| Abstracted Description | | | ¤ | | Alert Description | | | 34 | SGML/RMS |
| Applicability Text tagged at conversion | | | ¤ | | Alert Applicability | | | | SGML |

APPENDIX A-continued

| Document Type Usage | Browse | Search | List | Link | Field | Look up | Field Size | Display Size | Data Source |
|---|---|---|---|---|---|---|---|---|---|
| Cross References In the Text captured at conversion | | | ¤ | ¤ | Applicable SI | | | 16 | SGML/RMS |
| Type Certificates | | | | | | | | | |
| Volume Published In | ¤ | ¤ | ¤ | | Volume | ¤ | | | RMS/SGML |
| ATP Short & Long Form | ¤ | ¤ | ¤ | | Manufacturer | ¤ | | | RMS/SGML |
| Actual TC # not Doc ID | ¤ | ¤ | ¤ | ¤ | TC # | ¤ | | 12 | RMS/SGML |
| Models applicable | ¤ | ¤ | ¤ | | Models | ¤ | | 34 | RMS/SGML |
| Sort By (Numerical or Cumulative) search criteria | | ¤ | ¤ | | TC Sort By | ¤ | | | Code |
| FAA Region for Internal FAA use | | ¤ | ¤ | | Region | ¤ | | 4 | SGML |
| ON; BEFORE; AFTER search criteria | | ¤ | | | Issued | ¤ | | | Code |
| Latest revision date | | ¤ | ¤ | | Issue Date | | | | RMS |
| Created by User | | ¤ | | | Word Search Expression | | | | User |
| TMS InnerView Operators | | ¤ | | | Word Search Operator | ¤ | | | Code |
| ATP created Words List | | ¤ | | | Word Search List | ¤ | | | ATP/IV |
| Data captured at conversion from actual FAA Index | | ¤ | | | Data Sheet Revision Number | | | 12 | SGML |
| Data captured at conversion from actual FAA Index | | ¤ | | | Certification Basis | | | 16 | SGML |
| Supplemental Type Certificates | | | | | | | | | |
| Category Data Captured at Conversion | ¤ | ¤ | | | Category | ¤ | | | SGML |
| Manufacturer Data Captured at Conversion | ¤ | ¤ | ¤ | | Manufacturer | ¤ | | | SGML |
| Model Data Captured at Conversion | ¤ | ¤ | ¤ | | Model | ¤ | | 18 | SGML |
| STC # Data Captured at Conversion | ¤ | ¤ | ¤ | | STC # | ¤ | | 12 | SGML |
| Region Data Captured at Conversion | | ¤ | ¤ | | Region | ¤ | | 4 | SGML |
| ON; AFTER; BEFORE search criteria | | ¤ | | | Issued | ¤ | | | Code |
| Date Data Captured at Conversion | | ¤ | | | Issued Date | | | | SGML |
| Created by User | | ¤ | | | Word Search Expression | | | | User |
| TMS InnerView Operators | | ¤ | | | Word Search Operator | ¤ | | | Code |
| ATP Created Words List | | ¤ | | | Word Search List | ¤ | | | ATP/IV |
| STC Description Data Captured at Conversion | | | ¤ | | STC Description | | | 30W | SGML |
| STC Holder Data Captured at Conversion | | | ¤ | | STC Holder | | | 24W | SGML |
| Advisory Circulars | | | | | | | | | |
| AC 00.25 Subject List | ¤ | ¤ | ¤ | | Subject | ¤ | | 15 | RMS |
| First digits of AC # | ¤ | ¤ | | | FAR Part Number | ¤ | | | RMS/SGML |
| Portion of the ID After Pub Type | ¤ | ¤ | ¤ | ¤ | Advisory Circular # | ¤ | | 12 | RMS/SGML |
| ON; BEFORE; AFTER search criteria | | ¤ | | | Issued | ¤ | | | Code |
| Last Revision Date | | ¤ | ¤ | | Issue Date | | | 8 | RMS/SGML |
| Created by User | | ¤ | | | Word Search Expression | | | | User |
| TMS InnerView Operators | | ¤ | | | Word Search Operator | ¤ | | | Code |
| ATP Created Words List | | ¤ | | | Word Search List | | | | ATP/IV |
| AC Description | | | ¤ | | Description | | | 42 | RMS/SGML |
| Federal Aviation Regulations | | | | | | | | | |
| Part: Sub Part; Section | ¤ | ¤ | ¤ | ¤ | FAR Part Number | ¤ | | | RMS/SGML |
| ON; BEFORE; AFTER search Criteria | | ¤ | | | Issued | ¤ | | | Code |
| Last Revision Date | | ¤ | ¤ | | Issue Date | | | 8 | RMS/SGML |
| Created by User | | ¤ | | | Word Search Expression | | | | User |
| TMS InnerView Operators | | ¤ | | | Word Search Operator | ¤ | | | Code |
| ATP created Words List | | ¤ | | | Word Search List | ¤ | | | ATP/IV |
| Title of each InnerView document | | | ¤ | | FAR Title | | | | RMS/SGML |
| Issue Number | | | ¤ | | Issue Number | | | | RMS |
| Proposed FARs | | | | | | | | | |
| Data captured at conversion | | | ¤ | ¤ | Docket # | | | 8 | SGML |
| Data captured at conversion | | | ¤ | ¤ | Federal Register Date | | | 8 | SGML |
| Data captured at conversion | | | ¤ | | Action Date | | | 8 | SGML |
| Data captured at conversion | | | ¤ | | FAR Description | | | 36 | SGML |
| Data captured at conversion | | | ¤ | ¤ | Effectivity | | | 20 | SGML |
| Data captured at conversion | | | ¤ | | InnerView Doc Title | | | | SGML |

APPENDIX A-continued

| Document Type Usage | Browse | Search | List | Link | Field | Look up | Field Size | Display Size | Data Source |
|---|---|---|---|---|---|---|---|---|---|
| Hazardous Materials | | | | | | | | | |
| Part; Sub Part; Section | | ¤ | ¤ | ¤ | CFR Part Number | ¤ | | | RMS/SGML |
| ON; BEFORE; AFTER search criteria | ¤ | ¤ | | | Issued | ¤ | | | Code |
| Last Revision Date | | | ¤ | ¤ | Issue Date | | | | SGML |
| Created by the User | | | ¤ | | Word Search Expression | | | | User |
| TMS InnerView Operators | | ¤ | | | Word Search Operator | ¤ | | | Code |
| ATP created Words List | | | | | Word Search List | ¤ | | | ATP/IV |
| InnerView Document Titles | | | ¤ | | Part Section Title | | | | RMS/SGML |
| Proposed H M Regulations | | | | | | | | | |
| Data capture at conversion | | | ¤ | ¤ | Docket # | | | | SGML |
| Data capture at conversion | | | | ¤ | Federal Register Date | | | | SGML |
| Data capture at conversion | | | | ¤ | Action Date | | | | SGML |
| Data capture at conversion | | | | ¤ | Description | | | | SGML |
| Data capture at conversion | | | | ¤ | Regulations Effectivity | | | | SGML |
| Data capture at conversion | | | | ¤ | InnerView Doc Title | | | | SGML |
| Orders | | | | | | | | | |
| Part Sub part | ¤ | ¤ | ¤ | ¤ | Order Number | ¤ | | | RMS/SGML |
| ON; BEFORE; AFTER search criteria | | | | | Issued | ¤ | | | Code |
| Last revision date | | | ¤ | | Issue Date | | | | RMS/SGML |
| Created by the user | | | ¤ | | Word Search Expression | | | | User |
| TMS Innerview Operators | | ¤ | | | Word Search Operator | ¤ | | | Code |
| ATP created words list | | | ¤ | | Word Search List | ¤ | | | ATP/IV |
| Data capture at conversion | | | ¤ | | Order Title | | | | RMS/SGML |
| Data capture at conversion | | | ¤ | | Revision | | | | SGML |
| Data capture at conversion | | | ¤ | | Order Issued By | | | | SGML |
| Data capture at conversion | | | ¤ | | Original Issue Date | | | | SGML |
| Data capture at conversion | | | ¤ | | Re-Evaluation Date | | | | SGML |
| Data capture at conversion | | | ¤ | | InnerView Doc Title | | | | SGML |
| Gulfstream Illustrated Parts Catalog (IPC) | | | | | | | | | |
| ATA Chapter (field accommodates section for input only - just displays Chapter) | ¤ | ¤ | ¤ | ¤ | ATA Chapter | ¤ | 12 | 12 | RMS/SGML |
| Figure Reference (list of all figures by Chapter) | ¤ | ¤ | ¤ | ¤ | Figure Reference | ¤ | 12 | 12 | SGML |
| Part Number Reference | ¤ | ¤ | ¤ | ¤ | Part Number | ¤ | | | SGML |
| To accommodate serial # searching | | ¤ | | | Serial # Effectivity | ¤ | 12 | | GAC File |
| ON; AFTER; BEFORE search criteria | | ¤ | | | Issued | ¤ | | | Code |
| Actual Issue Date input by User | | ¤ | ¤ | | Issue (Revised) Date | ¤ | 8 | 8 | RMS/SGML |
| Created by user | | | ¤ | | Word Search Expression | | | | User |
| TMS InnerView Operators | | ¤ | | | Word Search Operator | | | | Code |
| ATP Created Words List | | ¤ | | | Word Search List | ¤ | | | ATP/IV |
| Chapter, Section and Figure Titles | | | ¤ | | InnerView Doc Title | | | 40 | RMS/SGML |
| Gulfstream SI (ASCs, ACBs, CBs) | | | | | | | | | |
| Issue Number (Specific for ASC, ACB, CB) | ¤ | ¤ | ¤ | ¤ | SI Issue Number | ¤ | 16 | 16 | RMS/SGML |
| To accommodate serial # searching | | ¤ | | | Serial # Effectivity | ¤ | 12 | | GAC File |
| Captured at conversion | | ¤ | ¤ | | Compliance | ¤ | | 10 | SGML |
| Captured at conversion | | ¤ | ¤ | | Applicable ATA Section | ¤ | | 2 | SGML |
| Reconciled with RMS at conversion | | ¤ | ¤ | | AD Cross Reference | ¤ | | 11 | RMS/SGML |
| ON; AFTER: BEFORE search criteria | | ¤ | | | Issued | ¤ | | | Code |
| Actual Issue Date | | ¤ | ¤ | | Issue Date | ¤ | 8 | 8 | RMS/SGML |
| Created by user | | | ¤ | | Word Search Expression | | | | User |
| TMS InnerView Operators | | ¤ | | | Word Search Operator | | | | Code |
| ATP Created Words List | | ¤ | | | Word Search List | ¤ | | | ATP/IV |
| RMS Abstract of SI Description - Subject Sentence | | | ¤ | | SI Description | | | 40 | RMS/SGML |
| 3 Character Issue Type Description | | | ¤ | | Publication Type | ¤ | | | |
| Gulfstream Maintenance | | | | | | | | | |

APPENDIX A-continued

| Document Type Usage | Browse | Search | List | Link | Field | Look up | Field Size | Display Size | Data Source |
|---|---|---|---|---|---|---|---|---|---|
| Manual (MM) | | | | | | | | | |
| ATA Chapter (field accommodates section & subject for input only displays Chapter) | ¤ | ¤ | ¤ | ¤ | ATA Chapter | ¤ | 12 | 12 | RMS/SGML |
| Figure Reference (list of all figures by Chapter) | ¤ | ¤ | ¤ | ¤ | Figure Reference | | 12 | 12 | SGML |
| To accommodate serial # searching (FUTURE IMPLEMENTATION) | | ¤ | | | Serial # Effectivity | ¤ | 12 | | GAC File |
| ON; AFTER; BEFORE search criteria | | ¤ | | | Issued | ¤ | | | Code |
| Actual Issue (Revision) Date Input by User | | ¤ | ¤ | | Issue (Revision) Date | ¤ | 8 | 8 | RMS/SGML |
| Created by user | | ¤ | | | Word Search Expression | | | | User |
| TMS InnerView Operators | | ¤ | | | Word Search Operator | ¤ | | | Code |
| ATP Created Words List | | ¤ | | | Word Search List | ¤ | | | ATP/IV |
| Chapter, Section and Figure Titles | | | ¤ | | InnerView Doc Title | | | 40 | RMS/SGML |

APPENDIX B

Codes Used in Electronic Logbook

| Code File | RMS Codes | GAMIS Codes | Profile | Components | Events | Inspections | Applicability | Squawk |
|---|---|---|---|---|---|---|---|---|
| Profile Key | | ¤ | ¤ | ¤ | ¤ | ¤ | ¤ | ¤ |
| Component Key | | ¤ | | ¤ | ¤ | | | ¤ |
| Inspection Key | | ¤ | | | ¤ | ¤ | ¤ | ¤ |
| Squawk Key | | ¤ | | | ¤ | | | ¤ |
| Component Category (Resolves AD, TC Domaine) | ¤ | ¤ | | ¤ | | | | |
| Component Type | | ¤ | | ¤ | | | | |
| Manufacturer Code | ¤ | | | ¤ | | | | |
| TC # | ¤ | | | ¤ | | | | |
| Model | ¤ | | | ¤ | | | | |
| Frequency Type | | ¤ | | ¤ | ¤ | | | ¤ |
| Appliance ADs | ¤ | | | | | | ¤ | |
| Inspection Type | | ¤ | | | | ¤ | | |
| State (SRS Table) | | ¤ | ¤ | | | ¤ | | |
| Compliance Type Code | | ¤ | | | ¤ | | | |
| Compliance Action Code | | ¤ | | | ¤ | | | |
| Authorization Type | | ¤ | | | ¤ | | | |
| Inspection Type | | ¤ | | | | ¤ | | |
| Component Record Code | | ¤ | | | | | ¤ | |

AMIS Electronic Logbook Profile File Structure

| Description | Code Table | Field Name | Type | Length |
|---|---|---|---|---|
| Registration Number or user identity | | Profile ID | Alpha | 18 |
| Computer Generated Key identifying this Profile | Y | Profile Key | Num | 4 |
| Active Status Flag | | Active | Alpha | 1 |
| Date Profile Created | | Profile Created Date | Date | 6 |
| Date Profile Changed Last | | Profile Changed Date | Date | 6 |
| Aircraft Operator Name | | Operator Name | Alpha | 40 |
| Principal Contact | | Operator Contact | Alpha | 30 |
| Principal Contact's Title | | Operator Contact Title | Alpha | 24 |
| Address Line 1 | | Operator Address 1 | Alpha | 30 |
| Address Line 2 | | Operator Address 2 | Alpha | 30 |
| Address Line 3 | | Operator Address 3 | Alpha | 30 |
| City | | Operator City | Alpha | 20 |
| State | Y | Operator State | Alpha | 2 |
| Zip Code | | Operator Zip | Alpha | 9 |
| Country | | Operator Country | Alpha | 20 |
| Postal Zone | | Operator Zone | Alpha | 8 |
| Business Phone Number | | Operator Phone | Alpha | 20 |
| Fax Phone Number | | Operator Fax | Alpha | 20 |
| Home Phone Number | | Operator Home Phone | Alpha | 20 |

APPENDIX B-continued

| Description | | Field Name | Type | Length |
|---|---|---|---|---|
| Certificate of Airworthiness Issued Date | | Certificated Date | Date | 6 |
| FAR Registration (91, 125, 131) | | FAR Registration | Alpha | 3 |
| User Text 1 | | User Text 1 | Alpha | 80 |
| User Text 2 | | User Text 2 | Alpha | 80 |

AMIS Electronic Logbook
Compliance Event File Structure

| Description | Code Table | Field Name | Type | Length |
|---|---|---|---|---|
| Computer Generated Key identifying this Compliance Event | | Compliance Event Key | Num | 4 |
| Computer Generated Key from Profile File | Y | Profile Key | Num | 4 |
| Inspection File Key | Y | Inspection Key | Num | 4 |
| Component File Key | Y | Component Key | Num | 4 |
| Squawk ID Key | Y | Squawk ID Key | Num | 4 |
| Recurring Instances Sequence | | Instance | Num | 2 |
| Service Information Document Type or Procedure Code | | Document Type | Alpha | 4 |
| Service Information Document ID | | Document ID | Alpha | 16 |
| Compliance Type Code | Y | Compliance Type | Alpha | 1 |
| Compliance Action Code | Y | Compliance Action | Alpha | 1 |
| Date of Compliance | | Compliance Date | Date | 6 |
| Aircraft Hours at Compliance | | Compliance Hours | Num | 5 |
| Frequency Type Code | Y | Compliance Frequency | Alpha | 1 |
| Units of specified Frequency Type at compliance | | Compliance Units | Num | 5 |
| Operation Type to Comply | | Operation | Alpha | 8 |
| Method of Compliance | | Method of Compliance | Alpha | 80 |
| Authorization Type Code (IA. A&P,) | Y | Authorization Type | Alpha | 1 |
| Authorization ID (Certificate #) | Y | Authorization ID | Num | 12 |
| Comment | | Comment | Alpha | 80 |
| Recurring Event Flag | | Recurring Flag | Alpha | 1 |
| Last Compliance Date | | Last Complied Date | Date | 6 |
| Last Compliance at specified Frequency Type | | Last Complied Units | Num | 5 |
| Next Compliance Due Date | | Next Due Date | Date | 6 |
| Next Compliance Due at specified Frequency Type | | Next Due Units | Num | 5 |

AMIS Electronic Logbook
Inspections File Structure

| Description | Code Table | Field Name | Type | Length |
|---|---|---|---|---|
| Computer Generated Key identifying this specific Inspection | Y | Inspection Key | Num | 4 |
| Computer Generated Key from Profile File | Y | Profile Key | Num | 4 |
| Inspection Type | Y | Inspection Type | Alpha | 1 |
| Inspection Date | | Inspection Date | Date | 6 |
| Flight Hours at this Inspection | | Flight Hours | Num | 5 |
| Cycles at this Inspection | | Flight Cycles | Num | 5 |
| Inspection Frequency Type 1 | Y | Inspection Frequency 1 | Alpha | 1 |
| Inspection Units at Frequency 2 | | Inspection Units 1 | Num | 5 |
| Inspection Frequency Type 2 | Y | Inspection Frequency 2 | Alpha | 1 |
| Inspection Units at Frequency 2 | | Inspection Units 2 | Num | 5 |
| Inspection Frequency Type 2 | Y | Inspection Frequency 3 | Alpha | 1 |
| Inspection Units at Frequency 2 | | Inspection Units 3 | Num | 5 |
| Repair Station # | | Repair Station # | Alpha | 12 |
| Facility Name | | Facility | Alpha | 40 |
| Principal Contact | | Facility Contact | Alpha | 30 |
| Principal Contact's Title | | Facility Contact Title | Alpha | 24 |
| Address Line 1 | | Facility Address 1 | Alpha | 30 |
| Address Line 2 | | Facility Address 2 | Alpha | 30 |
| Address Line 3 | | Facility Address 3 | Alpha | 30 |
| City | | Facility City | Alpha | 20 |
| State | Y | Facility State | Alpha | 2 |
| Zip Code | | Facility Zip | Alpha | 9 |
| Country | | Facility Country | Alpha | 20 |
| Business Phone Number | | Facility Phone | Alpha | 20 |
| Fax Phone Number | | Facility Fax | Alpha | 20 |
| User Text 1 | | Inspection Text 1 | Alpha | 80 |
| User Text 2 | | Inspection Text 2 | Alpha | 80 |
| Comment File Name | | Comment File | Alpha | 12 |

AMIS Electronic Logbook

APPENDIX B-continued

Appliance Applicability File Structure

| Description | Code Table | Field Name | Type | Length |
|---|---|---|---|---|
| Computer Generated Key from Profile File | Y | Profile Key | Num | 4 |
| Computer Generated Key from Inspection File | Y | Inspection Key | Num | 4 |
| Document ID for Appliance AD | Y | Appliance AD | Alpha | 14 |
| Computer Determined Applicability (Y, ?) | | Computer Flag | Alpha | 1 |
| Inspector Determined Applicability (Y, N) | | Applicable | Alpha | 1 |
| Component Record Code | Y | Component Record | Alpha | 1 |

AMIS Electronic Logbook Component File Structure

| Description | Code Table | Field Name | Type | Length |
|---|---|---|---|---|
| Computer Generated Key indicating this specific Component | Y | Component Key | Num | 4 |
| Computer Generated Key from the Profile File | Y | Profile Key | Num | 4 |
| Date Component Record Created | | Date Created | Date | 6 |
| Date Record Last Modified | | Date Modified | Date | 6 |
| Component Category | Y | Component Category | Alpha | 1 |
| Component Type | Y | Component Type | Alpha | 2 |
| Assigned Profile Category (user assignable sort location) | Y | Assigned Category | Alpha | 1 |
| Manufacturer Code | Y | Manufacturer Code | Alpha | 2 |
| Certification Number (TC #; TSO) | Y | Certification # | Alpha | 11 |
| Manufacturer Series Code | Y | Series | Num | 4 |
| Manufacturer Model Code | Y | Model | Num | 4 |
| Avcom Serlib Code | Y | Serlib | Num | 4 |
| Manufacturer Part Number | | Part Number | Alpha | 16 |
| Description | | Description | Alpha | 20 |
| Serial Number | | Serial Number | Alpha | 12 |
| Aircraft Manufactured Date | | Manufactured Date | Date | 6 |
| Aircraft Placed in Service Date | | Service Date | Date | 6 |
| Date Component Installed | | Component Install Date | Date | 6 |
| Aircraft Hours at Install | | Install Hours | Num | 5 |
| Time Since New Hours | | TSN Hours | Num | 5 |
| Time Since New Frequency | Y | TSN Frequency | Alpha | 1 |
| Time Since New Units | | TSN Units | Num | 5 |
| Time Since Overhaul Hours | | TSO Hours | Num | 5 |
| Time Since Overhaul Frequency | Y | TSO Frequency | Alpha | 1 |
| Time Since Overhaul Units at | | TSO Units | Num | 5 |
| Component Warranty Expires Date | | Warranty Expires Date | Date | 6 |
| Date Component Removed | | Removal Date | Date | 6 |
| Aircraft Hours at Component Removal | | Removal Hours | Num | 5 |
| Frequency Type at Removal | Y | Removal Frequency | Alpha | 1 |
| Units at Removal | | Removal Units | Num | 5 |

Squawks File Structure

| Description | Look-Up Table | Field Name | Type | Length |
|---|---|---|---|---|
| Profile Key | Y | Profile Key | Num | 4? |
| Squawk ID | Y | Squawk ID | Num | 4? |
| Inspection Key | Y | Inspection Key | Num | 4? |
| Component Key | Y | Component Key | Num | 4? |
| ATA Reference | Y | Squawk ATA Reference | Num | 2 |
| Squawk Report Date | | Squawk Report Date | Date | 6 |
| Aircraft Hours at Squawk | | Squawk Aircraft Hours | Num | 5 |
| Squawk Frequency Type 1 | Y | Squawk Frequency 1 | Alpha | 1 |
| Squawk Units 1 | | Squawk Units 1 | Num | 5 |
| Squawk Frequency Type 2 | Y | Squawk Frequency 2 | Alpha | 1 |
| Squawk Units 2 | | Squawk Units 2 | Num | 5 |
| Squawk Reported By | | Squawk Reported By | Alpha | 30 |
| Squawk Description | | Squawk Description | Alpha | 400 |
| Squawk Corrected Date | | Squawk Corrected Date | Date | 6 |
| Squawk Corrected Hours | | Squawk Corrected Hours | Num | 5 |
| Squawk Corrected By | | Squawk Corrected By | Alpha | 30 |
| Squawk Corrective Action | | Squawk Corrective | Alpha | 400 |

APPENDIX B-continued

| Squawk Inspection # | Action Squawk Inspection # | Alpha | 12 |
| Squawk Comment File Name | Squawk Comment | Alpha | 12 |

GAMIS Electronic Logbook Codes

| Definition | Code |
|---|---|

Frequency Types

| APU Hours | A |
| Cycles - Engine | C |
| Days - Calendar | D |
| Hours Aircraft | H |
| Landings - Aircraft | L |
| Months - Calendar | M |

Compliance Type

| Cancelled | C |
| Information Only | I |
| Mandatory | M |
| Not issued | N |
| Optional | O |
| Production Modification | P |
| Recommended | R |

Compliance Action Taken

| Complied With | C |
| Declined | D |
| Deferred to the Future | F |
| Monitoring Condition | M |
| Not Applicable | N |
| On-Condition | O |
| Production Equivalent | P |

Authorization Type

| A & P Mechanic | A |
| Inspection Authorization | I |
| Pilot | P |

Inspection Type

| Annual Inspection | A |
| Component Replacement | C |
| Major Repair | M |
| Minor Repair | R |
| Scheduled Maintenance | S |
| Unscheduled Maintenance | U |

Component Record Code

| Exists | E |
| Needed | N |
| Not Needed | U |

Category and Component Type

| Definition | Code |
|---|---|

Component Category

Airframe
Engine 1
Engine 2
Engine 3
Propeller
Appliance
Avionics

Airframe Types

Single Engine Airplane
Multi Engine Airplane
RotoCraft
Glider
Balloon

Engine Types

Reciprocating
Turbo-Prop
Turbine

APPENDIX B-continued

Thrust Reverser
Auxiliary Power Unit
Propeller Types

Governor
Hub
Blade
De-Ice Boots
Appliance Types
Avionics Types

ADF
COM
DME
EFIS
Flight Control
High Frequency
Instruments
MLS
NAV/
NAV/COM
Radar
Radar Altimeter
Radio Telephone
RNAV
TCAS
Transponder

What is claimed is:

1. A system to provide information to maintain and repair equipment or provide services, comprising means for knowledge-based access to, and management of, a technical database comprising electronically stored publications which are displayable and which are searchable on a keyword basis, the technical database being structured to enable a plurality of access modes including name of publication, key word, and identified profile with migration capability between related records and further to provide selective access to particular portions of reference publications dependent on one of various tasks selected by a user including problem diagnosis and trouble shooting, as well as allowing the user to import information to add to the knowledge base by means of private and public bookmarks and annotations and to export information and prepare reports and requisitions for material, including an authority file database comprised of all manufacturer make and model numbers for equipment and components including their synonyms to enable retrieval of all applicable publications.

2. The system of claim 1 further comprising means for providing a report generation mode.

3. The system of claim 1 further comprising means for providing a built-in software support mode.

4. The system of claim 1 wherein the system has a regulatory publication mode.

5. The system of claim 1 wherein the system has a microfiche reference mode.

6. The system of claim 1 wherein the system has a tutorial mode.

7. The system of claim 1 wherein the system is an aircraft maintenance and repair system.

* * * * *